US011716238B2

(12) United States Patent
Loghin et al.

(10) Patent No.: US 11,716,238 B2
(45) Date of Patent: Aug. 1, 2023

(54) CODING AND MODULATION APPARATUS USING NON-UNIFORM CONSTELLATION

(71) Applicant: Saturn Licensing LLC, New York, NY (US)

(72) Inventors: Nabil Loghin, Freiburg (DE); Lothar Stadelmeier, Stuttgart (DE); Jan Zoellner, Braunschweig (DE); Yuji Shinohara, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/993,373

(22) Filed: Nov. 23, 2022

(65) Prior Publication Data

US 2023/0088730 A1 Mar. 23, 2023

Related U.S. Application Data

(63) Continuation of application No. 17/451,112, filed on Oct. 15, 2021, now Pat. No. 11,539,569, which is a
(Continued)

(30) Foreign Application Priority Data

Jul. 5, 2013 (EP) ..................................... 13175370
Sep. 6, 2013 (EP) ..................................... 13183318
(Continued)

(51) Int. Cl.
*H04L 27/34* (2006.01)
*H04L 27/00* (2006.01)
(Continued)

(52) U.S. Cl.
CPC ........ *H04L 27/3405* (2013.01); *H04L 1/0003* (2013.01); *H04L 1/0009* (2013.01);
(Continued)

(58) Field of Classification Search
CPC . H04L 27/3405; H04L 1/0003; H04L 1/0009; H04L 1/0042; H04L 1/0057; H04L 27/36; H04L 27/362; H04L 1/0041
See application file for complete search history.

(56) References Cited

U.S. PATENT DOCUMENTS 8,750,398 B2 6/2014 Ko et al.
8,867,640 B2 10/2014 Ko et al.
(Continued)

FOREIGN PATENT DOCUMENTS

CN 1490972 A 4/2004
CN 1863182 A 11/2006
(Continued)

OTHER PUBLICATIONS

Erik Agrell et al., "On the Optimality of the Binary Reflected Gray Code", IEEE Transactions on Information Theory, vol. 50, No. 12, Dec. 2004, pp. 3170-3182.
(Continued)

*Primary Examiner* — Freshteh N Aghdam
(74) *Attorney, Agent, or Firm* — Oblon, McClelland, Maier & Neustadt, L.L.P.

(57) ABSTRACT

A coding and modulation apparatus and method are presented. The apparatus comprises an encoder that encodes input data into cell words, and a modulator that modulates said cell words into constellation values of a non-uniform constellation. The modulator is configured to use, based on the total number M of constellation points of the constellation and the code rate, a non-uniform constellation from one or several groups of constellations each comprising one or more constellations.

19 Claims, 64 Drawing Sheets

Related U.S. Application Data continuation of application No. 17/119,678, filed on Dec. 11, 2020, now Pat. No. 11,190,387, which is a continuation of application No. 16/406,746, filed on May 8, 2019, now Pat. No. 10,868,706, which is a continuation of application No. 16/105,666, filed on Aug. 20, 2018, now Pat. No. 10,326,635, which is a continuation of application No. 15/699,635, filed on Sep. 8, 2017, now Pat. No. 10,091,045, which is a continuation of application No. 15/340,672, filed on Nov. 1, 2016, now Pat. No. 9,813,279, which is a continuation of application No. 14/901,894, filed as application No. PCT/EP2014/064404 on Jul. 7, 2014, now abandoned.

(30) Foreign Application Priority Data

| Jan. 31, 2014 | (EP) | .................................. 14153438 |
| May 13, 2014 | (EP) | .................................. 14168129 |

(51) Int. Cl.
*H04L 27/38* (2006.01)
*H04L 1/00* (2006.01)
*H04L 27/36* (2006.01)

(52) U.S. Cl.
CPC .......... *H04L 1/0042* (2013.01); *H04L 1/0057* (2013.01); *H04L 27/0008* (2013.01); *H04L 27/36* (2013.01); *H04L 27/362* (2013.01); *H04L 27/38* (2013.01); *H04L 1/0041* (2013.01)

(56) References Cited

U.S. PATENT DOCUMENTS

| 9,094,276 | B2 | 7/2015 | Ko et al. |
| 9,148,251 | B2 | 9/2015 | Ko et al. |
| 9,240,916 | B2 | 1/2016 | Hwang et al. |
| 9,680,684 | B2 | 6/2017 | Stadelmeier et al. |
| 9,813,279 | B2 | 11/2017 | Loghin et al. |
| 9,906,392 | B2 | 2/2018 | Hwang et al. |
| 10,868,706 | B2 | 12/2020 | Loghin et al. |
| 10,958,498 | B2 | 3/2021 | Stadelmeier et al. |
| 2005/0047517 | A1 | 3/2005 | Georgios et al. |
| 2005/0220197 | A1 | 10/2005 | Noda |
| 2007/0115864 | A1 | 5/2007 | Bar-Ness et al. |
| 2009/0034635 | A1 | 2/2009 | Golitschek Edler Von Elbwart et al. |
| 2009/0097582 | A1 | 4/2009 | Barsoum et al. |
| 2009/0129477 | A1 | 5/2009 | Yang |
| 2009/0168909 | A1 | 7/2009 | Stadelmeier et al. |
| 2009/0220034 | A1 | 9/2009 | Ramprashad et al. |
| 2010/0210301 | A1 | 8/2010 | Dietz et al. |
| 2011/0090948 | A1 | 4/2011 | Zhou et al. |
| 2011/0274211 | A1 | 11/2011 | Ko et al. |
| 2011/0280327 | A1 | 11/2011 | Ko et al. |
| 2013/0064313 | A1 | 3/2013 | Gatti et al. |
| 2014/0269960 | A1 | 9/2014 | Petrov |
| 2014/0270012 | A1 | 9/2014 | Sagi |
| 2014/0314177 | A1 | 10/2014 | Choi et al. |
| 2015/0049844 | A1 | 2/2015 | Stott |
| 2015/0163085 | A1 | 6/2015 | Stadelmeier et al. |
| 2015/0222471 | A1 | 8/2015 | Myung et al. |

FOREIGN PATENT DOCUMENTS

| CN | 101106435 A | 1/2008 |
| CN | 101291200 A | 10/2008 |
| CN | 101640940 A | 2/2010 |
| CN | 101779453 A | 7/2010 |
| CN | 101867438 A | 10/2010 |
| CN | 102292982 A | 12/2011 |
| CN | 103036845 A | 4/2013 |
| EP | 2 031 786 A2 | 3/2009 |
| EP | 2134 051 A1 | 12/2009 |
| EP | 2 375 666 A1 | 10/2011 |
| EP | 2 378 666 A2 | 10/2011 |
| JP | 2010-538502 A | 12/2010 |
| WO | 2 211 493 A1 | 7/2010 |
| WO | 2010/078472 A1 | 7/2010 |
| WO | 2010/029615 A1 | 2/2012 |
| WO | 2015/002507 A1 | 1/2015 |

OTHER PUBLICATIONS

Giuseppe Caire et al., "Bit-Interleaved Coded Modulation", IEEE Transactions on Information Theory, vol. 44, No. 3, May 1998, pp. 927-946.

G. Caire et al., "Capacity of Bit Interleaved Channels", Electronics Letters, Jun. 6, 1996, vol. 32, No. 12, pp. 1060-1061.

Christine Fragouli et al., "Turbo Codes with Non-Uniform Constellations", ICC 2001. IEEE International Conference on Communications, 4 pages.

Stephane Y. LeGoff et al., "Signal Constellations for Bit-Interleaved Coded Modulation", Transactions on Information Theory, vol. 49, No. 1, Jan. 2003, pp. 307-313.

Jun LI et al., "Rayleigh Flat Fading Channels Capacity", Proceedings of the 3rd Annual Communication Networks and Services Research Conference (CNSR'05), 2005 IEEE, 4 pages.

Moss: TM-H1841_TM-NGH1259 Position Table, DVB, Nov. 2011, 2 pages.

Nabil Sven Muhammad: "Coding and Modulation for Spectral Efficient Transmission", Institut fur Nachrichtenubertragung der Universitat Stuttgart 2010, 173 pages.

Jonathan Stott: "CM and BICM Limits for Rectangular Constellations", BBC TN R&D 3420v1.0, JSC/BBC 022, Aug. 2012, 92 pages.

Jonathan Stott: TM-H2036_ TM-NGH1453 Position Table, DVB, Dec. 2012, 2 pages.

Udo Wachsmann et al. "Multilevel Codes Theoretical Concepts and Practical Design Rules", IEEE Transactions on Information Theory, vol. 45, No. 5, Jul. 1999, pp. 1361-1391.

"Digital Video Broadcasting (DVB):Implementation Guidelines for a Second Generation Television Broadcasting System DVB-T2", ETSI TR 102 831, vol. 10.04, 2010, 227 pages/ Jan. 1, 2010.

Liu et al., "APSK Constellation with Gray Mapping", IEEE Communications Letters, vol. 15, No. 12, pp. 1271-1273, (Dec. 1, 2011), XP011389300.

International Search Report dated Oct. 2, 2014 in PCT/EP14/064404 filed Jul. 7, 2014.

Notification of the First Office Action dated Jun. 22, 2021 in corresponding Chinese Patent Application No. 2019103899727 (with English translation)(11 pages).

Nokia 16-QAM for GERAN evolution, "3GPP TSG GERAN#26 GP-052084," published Sep. 2, 2005 (14 pages).

Office Action dated Feb. 28, 2022 in co-pending U.S. Appl. No. 16/844,844, 25 pages.

Chaudhari, (Oct. 7, 2016). Wireless Pi. Wirelesspi.Com. Retrieved Feb. 23. 2022, from https://wirelesspi.com/quadrature-amplitude-modulation-qam/ (Year:2016), 17 pages.

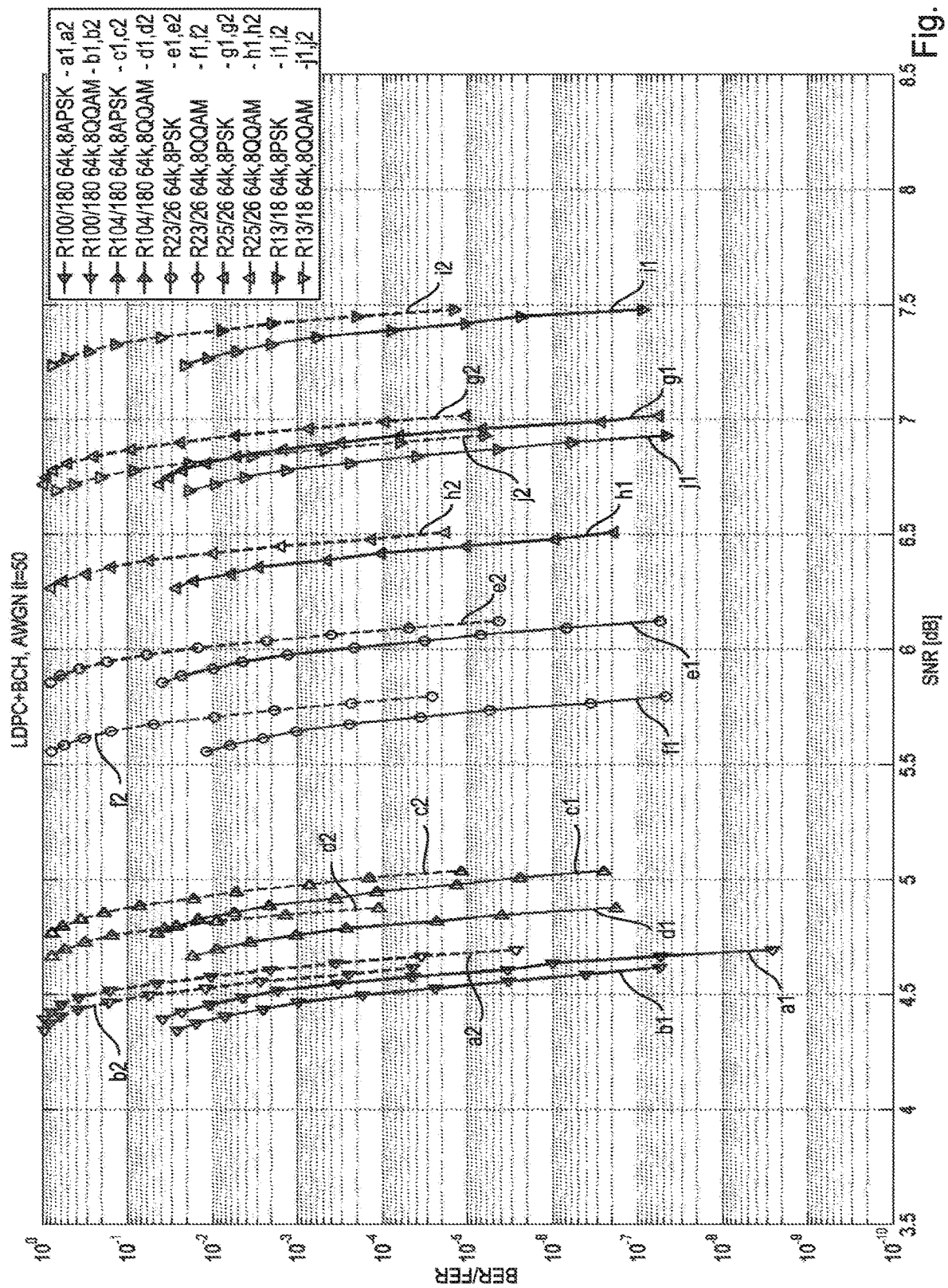

Code length=64800 bits, Rate=7/15:
2422 2919 3173 3795 4428 12681 13428 14654 17367 17687 19587 20017 23588 24353 25280 27167 29853 32040 32473 33170 33375
34 79 817 12478 12769 14798 15383 16688 16739 17538 21654 22792 25145 25588 26995 27388 31655 32133 32601 33452 34471
88 986 1907 2868 3657 6826 8595 11922 14704 17681 19503 20604 24251 28125 28612 29976 30687 31208 31464 33686 33909
526 3853 4486 6507 10616 11300 11453 13385 20007 21420 21441 22554 23794 24581 24959 27083 28710 30235 32852 34179 34327
43 1775 4405 5644 6553 8885 10337 11178 14114 15108 16189 16192 18490 18801 21475 22748 26269 28970 30758 31968 33554
27 624 1191 1470 4277 5054 5695 9632 10911 11365 13339 21097 23810 26677 27822 28433 29878 31026 32525 33335 33873
14 45 760 1098 1567 2003 6710 10195 12052 13024 13337 19088 22647 25050 25899 27035 28844 29927 33916 34033 34490
30 94 4493 11928 14051 17759 18541 20842 21277 24587 24948 25790 27442 31120 31205 31526 32107 32263 33696 34393 34529
3 4245 5284 7791 10196 10922 13992 14397 14947 16908 21032 24585 27219 30300 30981 32732 33362 33558 33725 34424 34537
78 6958 8297 15781 23302 23386 23863 25570 25734 31844 31919 32100 32815 33345 33531 33561 33889 34348 34504 34512 34530
52 90 775 3760 4099 6945 8954 11931 16578 20804 23252 26583 29420 32461 33695 33874 33964 34018 34177 34483 34506
81 1162 3084 3986 4494 8523 10309 10934 12819 16784 23113 23803 25952 29134 29930 30530 32021 33343 33400 33664 33685
0 35 57 1564 9062 19694 24489 24737 26422 27021 30630 31513 33317 33425 33545 33624 33743 33869 33875 34046 34519
58 639 2340 3613 13319 21917 24284 29214 29430 29736 32496 32785 32830 32835 33176 33323 33711 33967 34197 34438 3446 8
71 77 88 953 4233 7365 8395 15176 16662 18280 21989 24348 26847 27645 31050 31890 34119 34223 34235 34548 34551
163 4304 4697 7470 11857 12787 12837 18000 18472 18489 19730 27014 29653 29740 30070 30252 32769 33637 34382 34394 34555
7 29 79 7321 9770 11315 15354 16240 18888 19559 27783 28220 28924 30659 31474 33084 33310 33644 34282 34452 34557
8 24 41 4491 11252 14225 18230 25845 30258 30801 31349 32655 32932 32951 33058 33794 33889 34150 34338 34463 34494
13 13092 15747 23904 29675 29732 30199 31273 31928 32211 32704 32959 33056 33374 33646 33931 34043 34203 34426 34429 34509
6 11188 19937
11738 14763 34508
11 4674 25431

Code length=64800 bits, Rate=9/15:

Code length=64800 bits, Rate=11/15:
696 989 1238 3091 3116 3738 4269 6406 7033 8048 9157 10254 12033 16456 16912
444 1488 6541 8626 10735 12447 13111 13706 14135 15195 15947 16453 16916 17137 17268
401 460 992 1145 1576 1678 2238 2320 4280 6770 10027 12486 15363 16714 17157
1161 3108 3727 4508 5092 5348 5582 7727 11793 12515 12917 13362 14247 16717 17205
542 1190 6883 7911 8349 8835 10489 11631 14195 15009 15454 15482 16632 17040 17063
17 487 776 880 5077 6172 9771 11446 12798 16016 16109 16171 17087 17132 17226
1337 3275 3462 4229 9246 10180 10845 10866 12250 13633 14482 16024 16812 17186 17241
15 980 2305 3674 5971 8224 11499 11752 11770 12897 14082 14836 15311 16391 17209

Code length=64800 bits, Rate=13/15:
142 2307 2598 2650 4028 4434 5781 5881 6016 6323 6681 6698 8125
2932 4928 5248 5256 5983 6773 6828 7789 8426 8494 8534 8539 8583
899 3295 3833 5399 6820 7400 7753 7890 8109 8451 8529 8564 8602
21 3060 4720 5429 5636 5927 6966 8110 8170 8247 8355 8365 8616
20 1745 2838 3799 4380 4418 4646 5059 7343 8161 8302 8456 8631
9 6274 6725 6792 7195 7333 8027 8186 8209 8273 8442 8548 8632
494 1365 2405 3799 5188 5291 7044 7926 8139 8458 8504 8594 8625
192 574 1179 4387 4695 5089 5831 7673 7789 8298 8301 8612 8632
11 20 1406 6111 6176 6256 6708 6834 7828 8232 8457 8495 8602
6 2654 3554 4483 4966 5866 6795 8069 8249 8301 8497 8509 8623
21 1144 2355 3124 6773 6805 6887 7742 7994 8358 8374 8580 8611

Code length=16200 bits, Rate=6/15:

Code length=16200 bits, Rate=8/15:

Code length=16200 bits, Rate=10/15:
76 545 1005 1029 1390 1970 2525 2971 3448 3845 4088 4114 4163 4373 4640 4705 4970 5094
14 463 600 1676 2239 2319 2326 2815 2887 4278 4457 4493 4597 4918 4989 5038 5261 5384
451 632 829 1006 1530 1723 2205 2587 2801 3041 3849 4382 4595 4727 5006 5156 5224 5286
211 265 1293 1777 1926 2214 2909 2957 3178 3278 3771 4547 4563 4737 4879 5068 5232 5344
6 2901 3925 5384
2858 4152 5006 5202
9 1232 2063 2768
7 11 2781 3871
12 2161 2820 4078
3 3510 4668 5323
253 411 3215 5241

FIG. 15AX 3919 4789 5040 5302
12 513 5256 5352
9 1461 4004 5241
1688 3585 4480 5394
8 2127 3469 4360
2827 4049 5084 5379
1770 3331 5315 5386
1885 2817 4900 5088
2568 3854 4660
1604 3565 5373
2317 4636 5156
2480 2816 4094
14 4518 4826
127 1192 3872
93 2282 3663
2962 5085 5314
2078 4277 5089
9 5280 5292
50 2847 4742

Code length=16200 bits, Rate=12/15:
3 394 1014 1214 1361 1477 1534 1660 1856 2745 2987 2991 3124 3155

Code length=64800 bits, Rate=6/15:
253 1553 2024 4493 5350 5664 6351 8563 8803 9576 9936 11995 12166 13193 13412 17088 21893 22167 22478 22673 23735 35313 36981 37527
1238 1701 2316 3621 7222 8387 9190 10178 10599 10744 11743 18179 22465 23562 23820 26493 28168 28515 28940 29982 31196 32946 33687 34305
1475 1874 2994 3168 3381 3988 7646 9309 11199 12856 15025 20113 23155 24030 27491 28235 29392 30885 32896 33656 33785 34685 38713
512 721 1813 3144 3276 6198 13540 14553 15017 15548 16120 17449 19101 19763 24180 25629 27612 29682 30910 32038 35346 36607 36836 37876
333 1124 3269 4236 4920 5207 6154 7041 7282 7979 8472 9302 10033 14295 15888 16485 18963 24572 26642 27516 30242 31209 32000 33259
2528 4425 4656 6631 8875 10621 12590 13334 14011 16406 16937 18842 20315 24078 24889 27298 29555 30123 30513 33101 33403 33787 36651 37975
414 721 898 2093 3813 8358 9316 11235 12032 12568 14339 14908 15390 19210 19450 22689 22840 28044 31218 35042 35348 35863 37611 37837
979 3559 4988 6900 7254 7491 11518 12297 12928 14894 15473 16179 16667 17744 20883 22854 24913 25640 28792 29536 30428 32284 33732 34523
353 1877 2171 5080 7140 7878 8762 11558 14836 15000 15513 16490 17423 18943 21094 22348 23394 24182 26203 28328 32408 34284 38061 38259
142 1961 5219 5816 9555 10358 10675 15251 15716 16079 20566 21470 23007 25419 27130 28000 28693 30742 30862 33209 33472 33851 35546 36115
1388 4346 5764 6052 7940 9207 13401 13603 14233 14411 16310 16598 22524 22824 26535 27965 28433 30605 31984 34241 35730 36139 37261 37720
106 1441 3892 4300 5026 7207 8648 14012 15828 17007 19409 22942 26363 28806 29351 29722 33033 35204 35315 35824 37901 38036 38643
2607 5309 6506 9122 9318 9889 10322 12074 13373 14058 15341 15774 18154 18749 21949 27887 29865 31294 31487 32769 32890 37983 38403 38879
2154 4374 10366 10605 11179 15994 18855 20342 23936 24777 25768 26371 26745 27049 27324 27493 27985 29781 30148 33240 33673 34441 35057 35731
3054 6385 6561 6755 7735 9366 10392 12042 12832 14851 16187 17441 18536 20967 21792 24084 24505 26677 28167 28334 35199 36745 37533 37786
2735 3833 10268 17606
559 9607 17652 34573
9528 12139 14306 38416
11978 17094 25891 30040
14811 15531 27333 31274

Code length=64800 bits, Rate=8/15:

Code length=64800 bits, Rate=10/15:

Code length=64800 bits, Rate=12/15:
584 1472 1621 1867 3338 3568 3723 4185 5126 5889 7737 8632 8940 9725
221 445 590 3779 3835 6939 7743 8280 8448 8491 9367 10042 11242 12917
4662 4837 4900 5029 6449 6687 6751 8684 9936 11681 11811 11886 12089 12909
2418 3018 3647 4210 4473 7447 7502 9490 10067 11092 11139 11256 12201 12383
2591 2947 3349 3406 4417 4519 5176 6672 8498 8863 9201 11294 11376 12184
27 101 197 290 871 1727 3911 5411 6676 8701 9350 10310 10798 12439
1765 1897 2923 3584 3901 4048 6963 7054 7132 9165 10184 10824 11278 12669
2183 3740 4808 5217 5660 6375 6787 8219 8466 9037 10353 10583 11118 12762
6891 7654 15969
4002 13033 19217
7439 9192 13183
1390 8673 18485
24 4845 14633
6083 14765 15640
9652 13452 21404
7787 10616 17371
2959 6783 13581
11596 18575 20878
8318 14614 20870

Code length=16200 bits, Rate=7/15:

Code length=16200 bits, Rate=9/15:
692 1041 1719 1963 2149 2318 2562 2740 2821 3358 3581 4188 4412 5033 5058 6033 6161 6478
85 158 231 454 942 981 1569 1762 1848 3152 3286 4691 5119 5351 5886 5905 6254 6281
44 111 626 857 1244 1381 1401 1912 2694 2934 3178 3627 3679 3941 4469 5128 5406 6373
230 646 1245 1848 1889 2111 2179 2583 2756 2988 3589 4353 4688 4744 5712 5908 5935 6329
102 845 1103 1471 1788 1883 1928 2311 2898 2967 3112 3483 3806 4712 5041 5176 5349 5674
118 263 1040 1835 2259 2472 3104 3760 3837 3865 3906 3943 4119 5081 5119 5222 5332 5520

Code length=64800 bits, Rate=11/15:
191 507 760 1494 1713 1915 2438 2609 2928 3145 3392 3442
293 1177 1544 1563 2266 2508 2894 3285 3462 3703 3940 4223
530 708 822 1185 1282 1420 1715 2311 2715 2909 3776 3913
1168 1391 1424 1501 1557 1966 2227 2310 2940 3134 3219 4217
90 340 566 1393 1848 2251 2769 2931 3125 3383 3968 3994
378 559 827 1813 2124 2553 2734 3065 3374 3500 3951 4084
240 777 1022 1216 2303 2338 2581 2909 3183 3836 4038 4171
218 1601 2327
584 1204 1477
1380 2035 2571
1495 3429 4145
1878 2194 3025
1565 1704 2768
```

Code length=64800 bits, Rate=13/15:
812 1005 1572 1691 2092 2113
445 488 576 839 1059 1210
166 199 657 1259 1350 1712
162 771 820 1225 1412 1715
224 287 760 1071 1087 1194
64 241 1052 1335 1475 2130
44 267 307 1433 1632 1774
317 1255 1390 1437 1884 1946
716 774 808 1033 1505 1761
367 402 509 777 1454 1966
43 281 354 1142 1240 2043
65 352 570 705 751 956
893 903 1082
599 1200 2121
474 646 1729
1055 1408 1850
61 113 1418
730 1206 2138
811 1346 2085
35 1384 2106
1084 1245 1933

CODING AND MODULATION APPARATUS USING NON-UNIFORM CONSTELLATION

CROSS REFERENCE TO RELATED APPLICATIONS

This application is a continuation of and claims priority to U.S. application Ser. No. 17/451,112, filed Oct. 15, 2021, which is a continuation of U.S. application Ser. No. 17/119,678, filed Dec. 11, 2020 (now U.S. Pat. No. 11,190,387, issued Nov. 30, 2021), which is a continuation of U.S. application Ser. No. 16/406,746, filed May 8, 2019 (now U.S. Pat. No. 10,868,706, issued Dec. 15, 2020), which is a continuation of U.S. application Ser. No. 16/105,666, filed Aug. 20, 2018 (now U.S. Pat. No. 10,326,635, issued Jun. 18, 2019), which is a continuation of U.S. application Ser. No. 15/699,635, filed Sep. 8, 2017 (now U.S. Pat. No. 10,091,045, issued Oct. 2, 2018), which is a continuation of U.S. application Ser. No. 15/340,672, filed Nov. 1, 2016 (now U.S. Pat. No. 9,813,279, issued Nov. 7, 2017), which is a continuation of U.S. application Ser. No. 14/901,894, filed Dec. 29, 2015 (now abandoned), which is a National Stage of PCT/EP2014/064404, filed Jul. 7, 2014, and claims the benefit of priority to European Patent Application No. 14168129.6, filed May 13, 2014, European Patent Application No. 14153438.8, filed Jan. 31, 2014, European Patent Application No. 13183318.8, filed Sep. 6, 2013, and European Patent Application No. 13175370.9, filed Jul. 5, 2013, the contents of each of which are hereby incorporated by reference in their entirety.

BACKGROUND

Field of the Disclosure

The present disclosure relates to a coding and modulation apparatus and method. Further, the present disclosure relates to a transmission apparatus and method. Still further, the present disclosure relates to a computer program and a non-transitory computer-readable recording medium.

Description of Related Art

Modern communications systems typically employ, among other elements, a coding and modulation apparatus (as part of a transmission apparatus) and a decoding and demodulation apparatus (as part of a receiving apparatus). The coding and modulation apparatus is often part of a so called BICM (Bit Interleaved Coded Modulation) apparatus, which generally comprises (at the transmitter side) a serial concatenation of a FEC (Forward Error Correction) encoder, a bit interleaver, and a modulator, which uses spectral efficient modulation such as multilevel PAM (Pulse Amplitude Modulation), PSK (Phase Shift Keying), or QAM (Quadrature Amplitude Modulation). It should be noted that hereinafter, whenever QAM is mentioned it should be understood as a generally term covering PAM, PSK and QAM.

BICM allows for good performance over both non-fading and fading channels due to the use of the interleaver and/or the FEC encoder. It has a reasonable decoding complexity as opposed to multilevel coding (MLC) coding schemes and is thus used frequently in communications systems, such as in all DVB systems, powerline communications (e.g., Homeplug AV, DAB, LTE, WiFi, etc.).

Generally, the coding and modulation capacity, such as the BICM capacity in systems using a BICM apparatus, is considered as a target function, and it is desired to find optimum constellation points such that this capacity is maximized, often subject to a power normalization, i.e., the average power of the constellation points should be normalized to e.g. 1.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a coding and modulation apparatus and method providing an increased or even maximized capacity, a reduced bit error rate and reception with a reduced SNR (signal-to-noise ratio). It is a further object to provide a corresponding computer program and a non-transitory computer-readable recording medium for implementing said methods.

According to an aspect there is provided a coding and modulation apparatus comprising
  an encoder that encodes input data into cell words, and
  a modulator that modulates said cell words into constellation values of a non-uniform constellation,
wherein said modulator is configured to use, based on the total number M of constellation points of the constellation and the code rate,
  i) a non-uniform constellation from a group A or B of constellations comprising one or more of the following constellations defined by the constellation position vector u of length $v=\mathrm{sqrt}(M)/2-1$,
    wherein in one or more constellation position vectors of the constellations from group B two or more constellation positions are identical resulting from a condensation of preliminary constellation positions optimized before,
  or
  ii) a non-uniform constellation from a group C or D of constellations comprising one or more of the following constellations, wherein the constellation points are defined by a constellation position vector $w_{0 \ldots b-1}$ with $b=M/4$, wherein
    a first quarter of the constellation points $x_{0 \ldots b-1}$ are defined as $x_{0 \ldots b-1} = w_{0 \ldots b-1}$,
    a second quarter of the constellation points $x_{b \ldots 2b-1}$ are defined as $x_{b \ldots 2b-1} = \mathrm{conj}(w_{0 \ldots b-1})$,
    a third quarter of the constellation points $x_{2b \ldots 3b-1}$ are defined as $x_{2b \ldots 3b-1} = -\mathrm{conj}(w_{0 \ldots b-1})$, and
    a fourth quarter of the constellation points $x_{3b \ldots 4b-1}$ are defined as $x_{3b \ldots 4b-1} = -w_{0 \ldots b1}$,
    wherein conj is the complex conjugate,
    wherein in one or more constellation position vectors of the constellations from group D two or more constellation positions are identical resulting from a condensation of preliminary constellation positions optimized before,
  or
  iii) a non-uniform constellation from a group E of constellations comprising one or more of the following constellations, wherein the constellation points are defined by a constellation position vector $w_{0 \ldots M-1}$,
  or
  iv) a non-uniform constellation obtained from a constellation from anyone of groups A, B, C, D or E through rotation by an angle around the origin, through inversion of bit labels for all constellation points, through interchanging of bit positions and/or through predistortion for the (in particular for all) constellation points,
wherein the constellation position vectors of the different constellations of the groups A, B, C, D and E of constellations are defined as follows, wherein the respective values R of the code rate shall be understood as range of code rates R±1/30.

According to a further aspect there is provided a transmission apparatus comprising
a coding and modulation apparatus as proposed herein that encodes and modulates input data into constellation values,
a converter that converts said constellation values into one or more transmission streams to be transmitted, and
a transmitter that transmits said one or more transmission streams.

According to still further aspects corresponding methods, a computer program comprising program means for causing a computer to carry out the steps of the coding and modulation method disclosed herein, when said computer program is carried out on a computer, as well as a non-transitory computer-readable recording medium that stores therein a computer program product, which, when executed by a processor, causes the coding and modulation method disclosed herein to be performed are provided.

Preferred embodiments are defined in the dependent claims. It shall be understood that the claimed methods, the claimed computer program and the claimed computer-readable recording medium have similar and/or identical preferred embodiments as the claimed apparatus and as defined in the dependent claims.

One of the aspects of the disclosure is that the constellation points of the used non-uniform constellations (herein also called NUCs) are not located on a regular grid with equidistant symbols, but rather on optimized locations, dependent on the code rate of forward error correction encoder, like an LDPC or a turbo code or any other known code encoder (generally another forward error correction code encoder, e.g. a BCH encoder, may be provided in addition). Further, the used constellation may be selected (preferably in advance, but generally on the fly in other embodiments) dependent on the desired total number of constellation points of the used constellation (and, in some embodiments, on the channel characteristics).

In the tables various constellations are provided for different values of M and for different code rates. It should be noted that the code rate R indicated in the tables are not to be understood such that a particular constellation is only valid for exactly this code rate, but also for slightly different code rates, i.e. a range of code rates R±1/30. For instance, the indication 6/15 for a code rate (i.e. R=6/15) given in a proposed table means that the respective constellation is valid for a range of code rates 6/15±1/30, i.e. for the range of codes rates from 11/30 to 13/30.

It should also be noted that one or more of the following "invariant transformations" do not affect the properties of the constellations:
1. rotation of all symbols by an arbitrary angle $\varphi$,
2. inversion of m-th bit $y\_m=b\in\{0,1\}$ to $y\_m=\bar{b}$, where the bar indicates inversion,
3. interchanging of bit positions $y\_k1$ and $y\_k2$,
4. reflection on $Re\{x1\}$- and/or $Im\{x1\}$-axis,
5. predistortion (particularly for constellations of group E). Thus, the modulator may also use a non-uniform constellation obtained from a constellation from anyone of groups A, B, C, D or E through rotation by an angle around the origin, an inversion of bit labels for all constellation points, an interchanging of bit positions for all constellation points and/or a reflection on the real part and/or imaginary part axis. For instance, if one constellation point has bit labels 0010 for 16-QAM, all first bit labels can be inverted such that this point becomes 1010. Further, constellation obtained through any other trivial manipulation, such as rounding of the constellation points' positions shall generally be covered by the claims. Through one or more of these operations an equivalent mapping to the mapping of the constellations defined in the above mentioned four groups is achieved.

In case of satellite transmission, the modulator might as well transmit different constellation points, obtained by predistortion of proposed constellation points. This predistortion should can act as a countermeasure to the non-linearities of other blocks in the transmission system, in particular the power amplifier. The output of the transmission system however, should correspond to the transmission of the proposed constellations, such that the receiver might assume that these constellations have been transmitted.

It should be noted that to every M-QAM, one can also think of the underlying sqrt(M)-PAM. Further, it should be noted that in other aspects the group of constellations defined in the claims comprises less constellations. e.g. only constellations for non-fading channels, only constellations for fading channels, only constellations for selected values of M, only constellation for M-QAM or sqrt(M)-PAM and/or constellations for less SNR values. In other words, less constellations may be contained in the group of constellations available for selection and subsequent use by the modulator, i.e. the group of constellations available for use by the modulator may comprise one or more of the constellations defined in the claims. Accordingly, the present disclosure is also directed to a coding and modulation apparatus and method that have a smaller group of constellations available for use (as explained above) and/or where less constellations are available for a particular value of M.

A QAM mapping consisting of M constellation points is denoted as M-QAM. These constellations are summarized in group A. If a (uniform or non-uniform) QAM allows separate encoding and decoding of each of its two dimensions ("inphase" and "quadrature phase" in the literature), then this QAM will be called a $N^2$-QAM. This implies that the constellation can be designed by two N-PAM constellations, one for each dimension. $N^2$-QAMs have significantly lower decoding complexity for ML-decoding, as only N constellation points have to be investigated, compared with $N^2$ points for the M-QAM, when $M=N^2$, but when the two dimensions cannot be separated (as is usually the case for N-PSK, e.g. 8-PSK, where 8 points are located on a unit circle). In addition QAM constellations that are completely defined by a quarter of constellation values of the constellation will be called QQAM, with the other three quarters of constellation values being derived from the first quarter. E.g. normal uniform square QAM constellations (UC) are also QQAM constellations, due to their symmetry. These QQAM constellations are summarized in group C.

However, the constellation points of the QAM constellations according to embodiments considered in this disclosure are not located on a regular grid with equidistant symbols, but rather on optimized locations, dependent on the code rate.

According to the present disclosure an $N^2$-NUC optimization based on N-PAM optimization is considered, combined with a dynamic reduction of the number of constellation points guaranteeing a well defined performance with respect to the performance of the $N^2$-NUC without reduction of the number of constellation points.

Constellation sizes up to 1024-QAM will be considered, where large shaping gains are possible, especially in the high SNR region. By means of a dynamic reduction (also called condensation in the following) of constellation points that are close to each other, the number of constellations points and, thus, the required storage and decoding capacity can be significantly reduced. These constellations are summarized in groups B and D. For example, the 1024-Q-QAM constellation optimized for code rate 6/15 can be reduced from 1024 to 268 constellation points without significant impact on the performance.

It should be noted that the constellation position vector w as defined in the claims directed to a preferred embodiment needs not necessarily contain the constellation points of the first quarter of constellation points of the constellation, but could also contain the constellation points of any of the four quarters (expressed by the definition "of a first quarter" in the claims). Due to the symmetry (which is somewhat provided, but may not be readily visible by the bit labels; the constellation points are generally symmetric with respect to the quadrants) this leads to constellations with a different bit mapping but with identical performance. The constellation position vector w in the tables defined herein should therefore be considered as an example for all four symmetric constellations with different bit mapping but identical performance.

It is to be understood that both the foregoing general description of the disclosure and the following detailed description are exemplary, but are not restrictive, of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 shows a diagram illustrating the shaping gain for the above explained non-uniform 8-ary QAM constellations, and FIGS. 15AA-15CB show examples of LDPC codes for which the disclosed constellations have been optimized.

DESCRIPTION OF THE EMBODIMENTS

Figure 1:
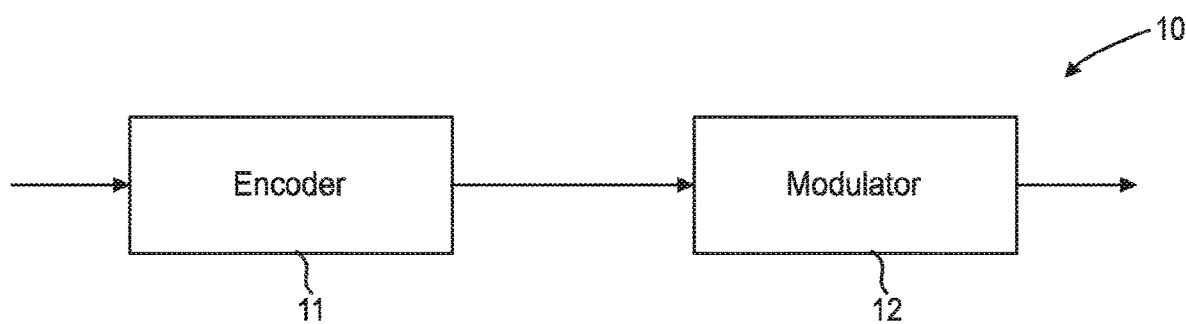
FIG. 1 shows an embodiment of a coding and modulation apparatus according to the present disclosure.

Referring now to the drawings, wherein like reference numerals designate identical or corresponding parts throughout the several views, FIG. 1 shows an embodiment of a coding and modulation apparatus 10 according to the present disclosure. It comprises an encoder 11 that encodes input data into cell words, and a modulator 12 that modulates said cell words into constellation values of a non-uniform constellation. Said modulator 12 is configured to use, based on the total number M of constellation points of the constellation and the code rate, a non-uniform constellation from one of several groups of constellations. Details of those different groups of constellations will be explained in more detail below.

In other embodiments of the coding and modulation apparatus 10 additional elements may be provided, such as a BCH encoder, an LDPC encoder (whose code rate is of interest for selecting and using an optimized constellation by the modulation disclosed herein), a bit interleaver and/or a demultiplexer (for demultiplexing bits of encoded data into the cell words). Some or all of these elements may separate elements or may be part of the encoder 11. For instance, a BICM device as conventionally used in the transmission apparatus of a DVB system may be used as coding and modulation apparatus 10.

Figure 2:
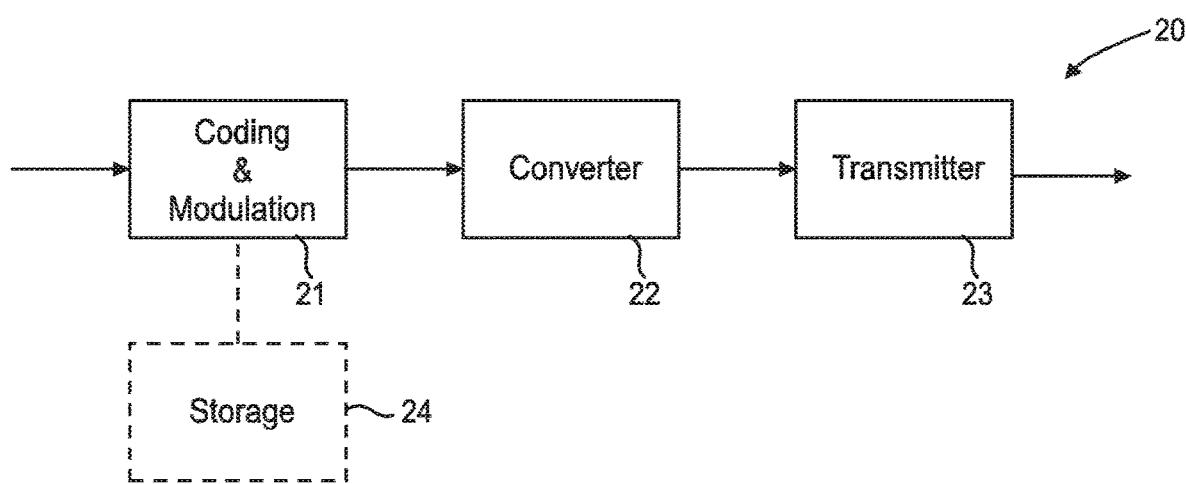
FIG. 2 shows an embodiment of a transmission apparatus according to the present disclosure.

FIG. 2 shows an embodiment of a transmission apparatus 20 according to the present disclosure comprising a coding and modulation apparatus 21 (referenced by 10 in FIG. 1) as proposed herein that encodes and modulates input data into constellation values, a converter 22 that converts said constellation values into one or more transmission streams to be transmitted, and a transmitter 23 that transmits said one or more transmission streams. In an exemplary embodiment the converter 22 may comprise one or more elements like a time, cell and/or frequency interleaver, a frame builder, an OFDM modulator, etc., as e.g. described in the various standards related to DVB and as may be provided in a coding and modulation apparatus in an upcoming ATSC standard. Other coding and modulation in accordance with other standards, such as the DVB-S2 or subsequent DVB-Sx standards, may not comprises one or more of those elements. The constellations and the constellations values are generally predetermined and e.g. stored in a constellations storage 24 or retrieved from an external source.

In other embodiments of the transmission apparatus 20 additional elements may be provided, such as an input processing unit, a frame building unit and/or an OFDM generation unit as e.g. conventionally used in a transmission apparatus of a DVB system.

Figure 3:
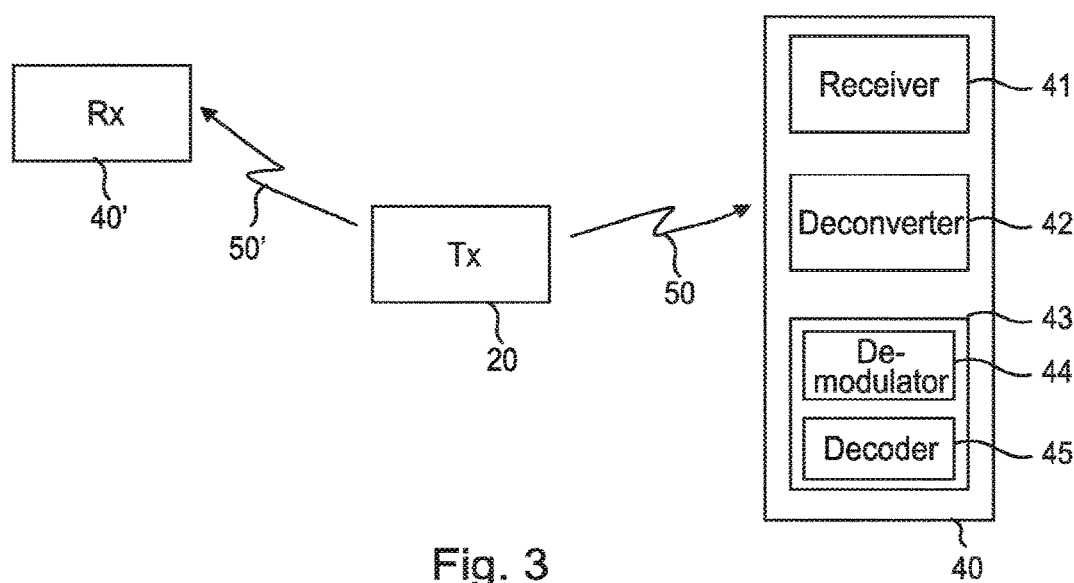
FIG. 3 shows an embodiment of a communications system according to the present disclosure.

FIG. 3 shows an embodiment of a communications system 30 according to the present disclosure comprising one (or more) transmission apparatus 20 (Tx) as shown in FIG. 2 and one or more receiving apparatus 40, 40' (Rx).

A receiving apparatus 40 generally comprises a receiver 41 that receives one or more transmission streams, a deconverter 42 that deconverts the received one or more transmission streams into constellation values, and a demodulation and decoding apparatus 43 that demodulates and decodes said constellation values into output data. The demodulation and decoding apparatus 43 generally comprises a demodulator 44 for demodulating constellation values of a non-uniform constellation into cell words, and a decoder 45 for decoding cell words into output data words, wherein based on the total number M of constellation points of the constellation and the code rate, a non-uniform constellation is selected from the one of several groups of constellations comprising the same predetermined constellations as used in the coding and modulation apparatus 10.

The preferred demodulation and decoding considers soft values as opposed to hard decided values (0 and 1). Soft values represent the continuously distributed received values (possibly after A/D conversion including quantization) by more than two states (as in the case of binary (hard) decision). The reason is that for hard decision, the NUCs are generally not optimal. Nowadays, BICM receivers typically are soft receivers anyway.

Generally, data (e.g. communications data, broadcast data, etc.) shall be transmitted from a transmission apparatus 20 to one or more of said receiving apparatus 40 over a transmission channel 50, 50'. The transmission channel 50, 50' can be unicast channel, multicast channel, a broadcast channel and may be employed as one-directional or bi-directional channel (i.e. having a return channel from the receiving apparatus to the transmission apparatus).

In an embodiment the modulator 12 is configured to use a non-uniform constellation based on the total number M of constellation points of the constellation, the required signal-to-noise ratio SNR for error free decoding in dB and the channel characteristics. In broadcasting applications the constellation is generally not selected dependent on the SNR in the receiver, but dependent on the SNR that is required for error free decoding with a used channel code (if a code is used, for example LDPC codes in case of DVB $2^{nd}$ generation transmission systems) for an expected channel characteristic, e.g., static reception or multipath fading.

For the broadcaster there may be a trade-off: using small constellation sizes M and/or low code rates R allow robust transmission (reception also at low SNR), but the throughput of the system scales with $\log_2(M)*R$. For instance, a 16-QAM with code rate R=3/4 can transmit three information bits per coded QAM symbol. This results in relatively small spectral efficiency. On the other hand, high (spectral) efficiency requires large SNR. Thus, the constellations should allow decreasing the SNR required for successful decoding, while leaving the efficiency constant. This is the so called "shaping gain" of the optimized constellations.

The total number M of constellation points is generally selected according to the desired payload throughput jointly with the code rate of the FEC encoder. The SNR for error free decoding for typical channel characteristic is generally known, e.g. by simulation. In broadcasting the channel characteristics of the receivers are not known, i.e. a compromise is selected. For instance, in broadcasting for each code rate of the FEC encoder one non-uniform constellation is selected, optimized for an SNR that is a compromise for all channel characteristics.

The transmitter generally targets a certain scenario. For instance, a broadcast transmission over cable or satellite considers the channel to be just a non-fading AWGN (appropriate channel model), while a terrestrial broadcaster typically considers the channel to be a fading channel, e.g. with Rayleigh distribution, as several echoes are usually received. Preferably, the proposed constellations consider the most relevant channel characteristics.

In another embodiment the modulator 12 is configured to adaptively select a non-uniform constellation based on the total number M of constellation points of the constellation, the signal-to-noise ratio SNR in dB and the channel characteristics, wherein said signal-to-noise ratio SNR in dB and channel characteristics are received from a receiving device 40 to which data shall be transmitted. Such an adaptive selection of the constellation is generally only possible with a return channel in unicast environments. A non-uniform constellation may be adapted e.g. in time and/or frequency domain, e.g. for different OFDM subcarriers.

The channel characteristics describe the statistical properties of the channel, e.g., the extent of the multipath propagation of the transmission channel between transmitter and receiver. If the channel is characterized by no multipath propagation, corresponding to the AWGN channel, the required SNR for error free decoding is relatively low, i.e. the NUC has to be selected accordingly for optimum performance. If the transmission channel is characterized by strong multipath propagation, the required SNR for error free reception is larger compared to a channel without multipath propagation, i.e. a NUC optimized for higher SNR has to be used. Further, the NUCs should be optimized taking the fading characteristics into account, as will be discussed below.

As mentioned above, the number M of the constellation points of the constellations is selected according to the desired payload throughput. Larger values of M allow for higher data throughput, but require a larger SNR for error free reception. This is further influenced by the code rate of the FEC encoder, if any FEC encoder is used.

Another explanation (which is closely related to the optimization task) is that the performance of the constellation in combination with a forward error correction code (e.g. LDPC and/or BCH code) having a certain code rate shall be optimized. Thus, for various codes/code rates optimized constellations are proposed for different values of M. Another optimization target is the capacity. For an expected SNR, say 15 dB of SNR should be guaranteed, M is chosen, for which the respective optimized NUC yields the largest capacity. As a general rule it holds that for low SNR a low value of M should be selected and vice versa. But from a theoretical point of view, it turns out that high M is generally optimum, e.g., choosing M=4096 or M=1024 is preferred, because even for low SNR, the optimized NUC will "look (almost) like" a constellation with effectively smaller M, as several points will overlap. However, modulation and demodulation complexity increase with increasing M, so a tradeoff is considered. Another aim is to reduce the BER (bit error rate) and/or the FER (frame error rate) and/or to achieve the same BER and/or the FER at a lower SNR compared to a situation where a "normal" (not optimized) constellation is used.

Figure 4:
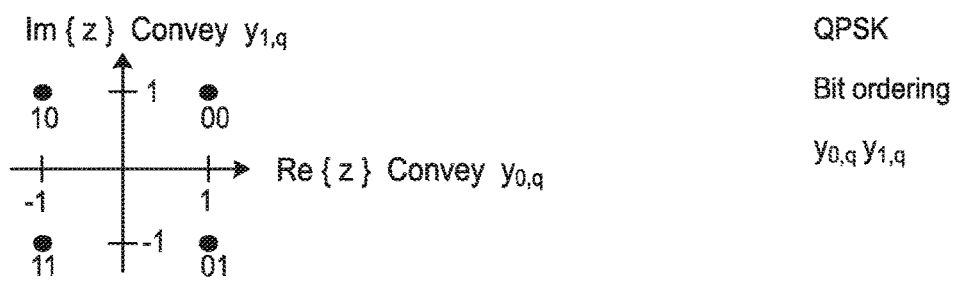
FIG. 4 shows a regular 4-QAM constellation as a simple example for a constellation.

A simple example of a constellation is shown in FIG. 4. Here a regular 4-QAM consisting of constellation points ($e^{j\pi/4}$, $e^{j7\pi/4}$, $e^{j3\pi/4}$, $e^{j5\pi/4}$) is depicted. The average symbol power is 1 (all symbols are located on unit circle here). The above symbol vector ($e^{j\pi/4}$, $e^{j7\pi/4}$, $e^{j3\pi/4}$, $e^{j5\pi/4}$) is to be understood such that the first entry ($e^{j\pi/4}$) belongs to the bit vector 00, the second entry ($e^{j7\pi/4}$) to 01 and so on, i.e. the entries belong to bit vectors with increasing values, where the first bit position is the most significant bit (MSB) and the last one the least significant bit (LSB). This 4-QAM is a particular case of an $N^2$-QAM, with N=2. Note that this definition (of being an $N^2$ QAM) does not only require $N^2$ being a square number ($N^2=2^2$), but also that the constellation is symmetrical and can be described by two independent N-PAM constellations, here a 2-PAM: the in-phase component (real-part of the complex symbols) is a 2-PAM with symbol vector (1/sqrt(2), −1/sqrt(2)) and describes the $1^{st}$ bit of the 4-QAM, whereas the quadrature-phase component (imaginary-part of the complex symbols) is the same 2-PAM, this time describing the $2^{nd}$ bit of the 4-QAM. Note further that the decomposition of the $N^2$-QAM into two N-PAMs is only possible if the bit labelling is according to binary reflected Gray mapping, which is typically applied (e.g. in DVB-systems).

The above example can be extended to higher order $N^2$-QAMs, with N>2. Then the underlying N-PAM describes for one component the $1^{st}$, $3^{rd}$, $5^{th}$ and so on bit label, while for the other component it describes the $2^{nd}$, $4^{th}$, $6^{th}$ and so on label.

All constellations preferably fulfil power constraint, i.e $$\mathcal{P}_x = E_{x_l}[|x_l|^2] = \frac{1}{M}\sum_{l=0}^{M-1} |x_l|^2 \stackrel{!}{=} 1,$$

where E[.] is the expectation operator, and $x_l$ is a particular symbol of the set of all M constellation symbols.

$N^2$-NUCs have been optimized as one embodiment with $N^2$ being 16, 64, 256, 1024 (1 k). This means that these constellations are optimized to allow minimum BER/FER for a given FEC code rate. The restriction on these constellations is that they should be able to be split into two separate one-dimensional PAM constellations, allowing low complexity mapping at the transmitter and demapping at the receiver.

As an example, a M=64 NUC described here yield the following values (an example from the tables could yield these three numbers, then there is the 1 at the beginning (normalization due to power constraint) and so on):

2.2794 4.6229 7.5291.

This means that the positive constellation values are 1 2.2794 4.6229 7.5291

(the 1 was redundant, due to the power normalization, which will be applied in the end). The underlying 1-dim. 8-PAM NUC is thus described by the symbol vector (1.6405 1.0073 0.2179 0.4967 −1.6405 −1.0073 −0.2179 −0.4967), where the values are already normalized to unit average power.

As described before, the first entry (1.6405) corresponds to the bit label 000, the next one (1.0073) to 001 and so on. The 2-dim. 64-NUC is then obtained by symmetry, where both in-phase and quadrature-phase component of the NUC are based on the 8-PAM NUC.

Figure 5A:
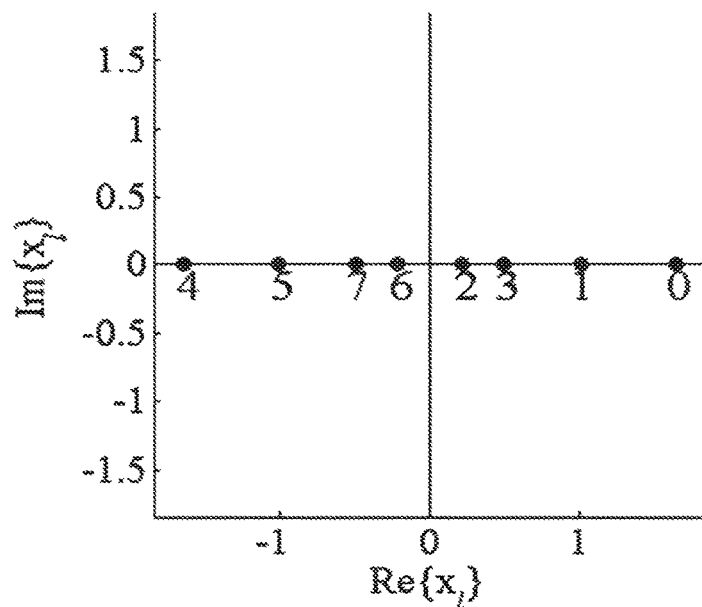
FIG. 5A shows a 8-PAM non-uniform constellation.
Figure 5B:
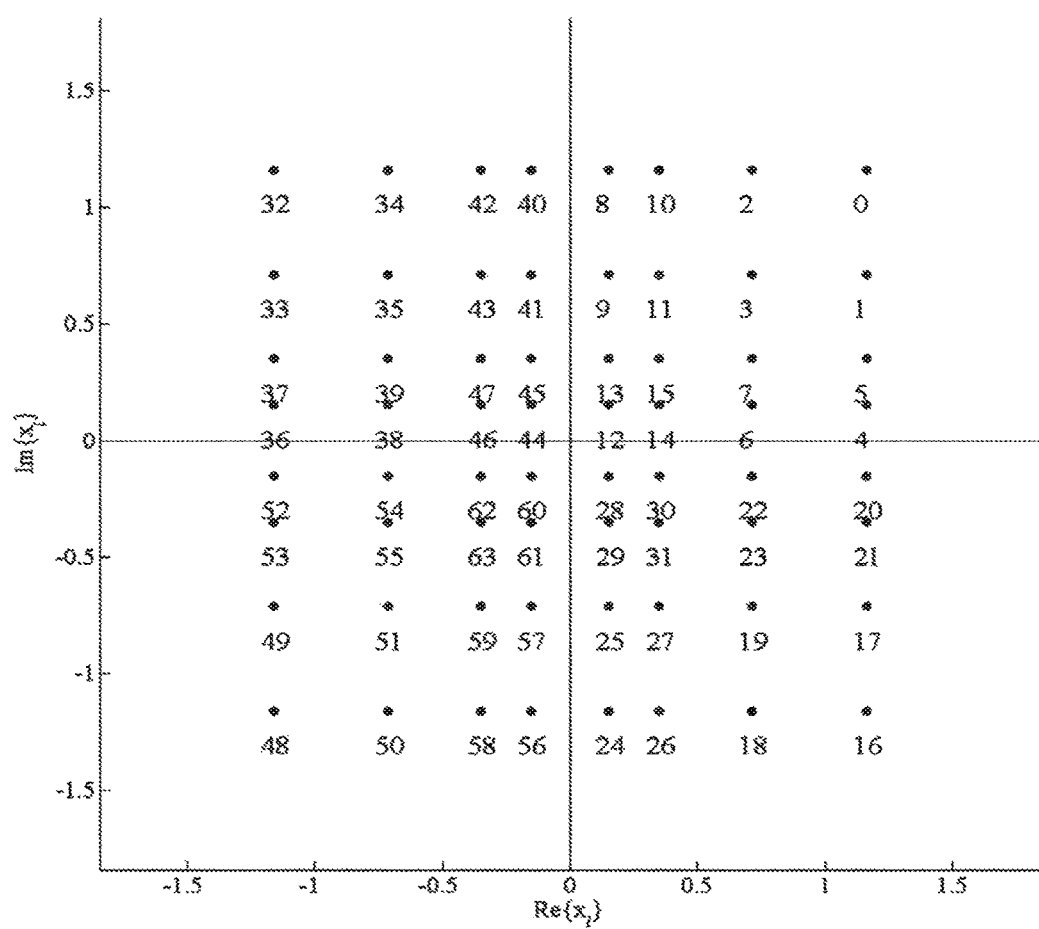
FIG. 5B shows a 64-QAM non-uniform constellation.

FIG. 5A depicts 8-PAM NUC. FIG. 5B depicts 64-QAM NUC. The bit labels are given in integer numbers (000→0, 001→1, 010→2 and so on).

The creation of the 2-dim. NUC based on the optimized degrees of freedom will be explained in more detail below.

Since the performance of NUCs depends on the SNR value they are optimized for, a thorough selection is preferably carried out depending on the (FEC) code rate to achieve optimum performance. If the channel characteristics are known, the required SNR value for FEC convergence can be determined by simulation. Then the NUC that has been optimized for this SNR value is chosen for best performance. If the SNR at the receiver is lower than this SNR decoding threshold, the constellation is not optimal. However, this is no drawback, since the capacity is too low for successful decoding anyhow. On the other hand if the SNR at the receiver is clearly higher than the decoding threshold, a sufficient amount of capacity for successful decoding is available, even though the NUC is suboptimal for this SNR range. Therefore, the NUC needs to be optimized for the SNR value at the waterfall region (i.e., decoding threshold for (quasi-) error free decoding) of the FEC. As the SNR value of the waterfall region depends on the code rate of the FEC, a different NUC is selected for each code rate.

The SNR value for (quasi-) error free decoding also depends on the channel characteristics of the receiver. For instance the required SNR for error free decoding of the DVB-T2 LDPC code in the AWGN channel is 0.8 dB, whereas 2.5 dB are required in the Rayleigh P1 multipath channel. The selected NUC for each code rate is thus not optimal in all channel environments and a tradeoff is necessary in a broadcasting environment that suits all (or most) users in the network. In a point-to-point network with return channel, the optimal NUC may be selected based on the measured channel characteristics in the receiver.

In the following some more explanation is provided regarding the definition of the non-uniform QAM constellations. Each input cell word $(y_{0,q} \ldots y_{m-1,q})$ (i.e. provided to the modulator) shall be modulated using a non-uniform QAM constellation to give a constellation point $z_q$ prior to normalization, where m corresponds to the number of bits per QAM symbol $m=\log_2(M)$. It should be noted that the parameter q used here for discrete time or subcarrier index corresponds to the parameter k as used in the above. The exact values of the real and imaginary components $\text{Re}(z_q)$ and $\text{Im}(z_q)$ for each combination of the relevant input bits $y_0 \ldots _{m-1,q}$ are given in the following tables for the various constellation sizes depending on the NUC position vector $u_1 \ldots _v$, which defines the constellation point position of the non-uniform constellation. The length of the NUC position vector u is defined by $$v = \frac{\sqrt{M}}{2} - 1.$$

Figure 6:
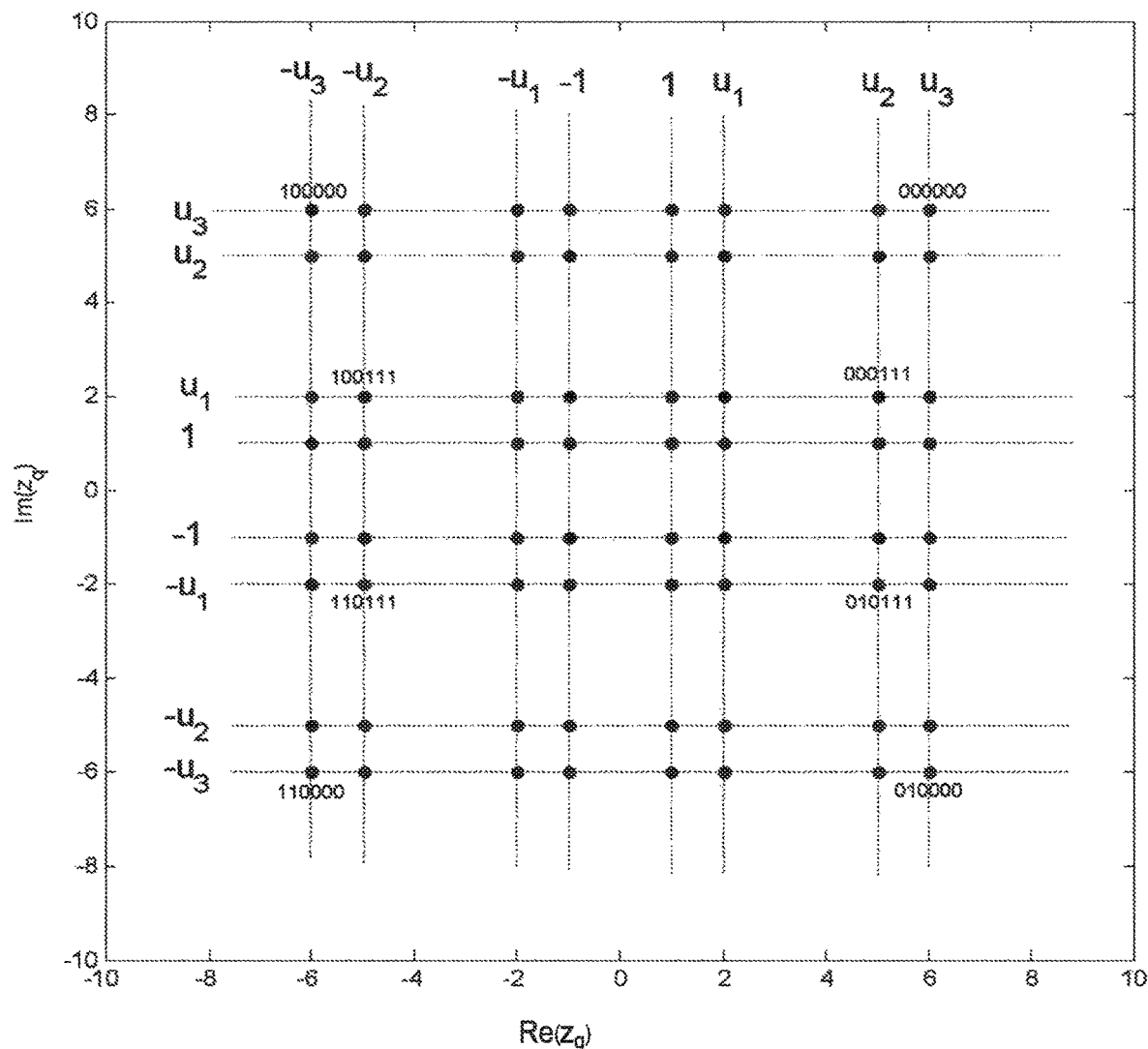
FIG. 6 shows a constellation for a 64-QAM non-uniform constellation generally defining the constellation points.

In one example, the corresponding constellation point $z_q$ for a 64-QAM NUC defined by the NUC position vector $(u_1 \ldots _3)=(2,5,6)$ and the input cell word $(y_{0,q} \ldots y_{m-1,q})=(100111)$ is $\text{Re}(z_q)=-u_2=-5$ and $\text{Im}(z_q)=u_1=2$. The complete constellation for this NUC position vector is shown in FIG. 6 with exemplary input cell words marked at the corresponding constellation points.

The resulting constellation mapping (also called labeling) for the non-uniform constellations follows a binary reflected Gray-Mapping (labeling), i.e. neighboring constellation points differ in only one bit. The power of the constellation points $z_q$ is normalized such that the expectation value of the normalized constellation point $f_q$ equals 1, i.e. $E(|f_q|^2)=1$. For example, the normalized constellation value $f_q$ of a uniform 16-QAM constellation results by $$f_q = \frac{z_q}{\sqrt{10}}.$$

The following tables define the constellation position vectors (prior to power normalization) as well as the bit labelling of the data cell words to the constellation points.

Constellation mapping for real part of 16-QAM

| | | | | | |
|---|---|---|---|---|---|
| $y_{0,q}$ | 1 | 1 | 0 | 0 | |
| $y_{2,q}$ | 0 | 1 | 1 | 0 | |
| $Re(z_q)$ | −3 | −1 | 1 | 3 | Uniform |
| | $-u_1$ | −1 | 1 | $u_1$ | NUC |

Constellation mapping for imaginary part of 16-QAM

| | | | | | |
|---|---|---|---|---|---|
| $y_{1,q}$ | 1 | 1 | 0 | 0 | |
| $y_{3,q}$ | 0 | 1 | 1 | 0 | |
| $Im(z_q)$ | −3 | −1 | 1 | 3 | Uniform |
| | $-u_1$ | −1 | 1 | $u_1$ | NUC |

Constellation mapping for real part of 64-QAM

| | | | | | | | | | |
|---|---|---|---|---|---|---|---|---|---|
| $y_{0,q}$ | 1 | 1 | 1 | 1 | 0 | 0 | 0 | 0 | |
| $y_{2,q}$ | 0 | 0 | 1 | 1 | 1 | 1 | 0 | 0 | |
| $y_{4,q}$ | 0 | 1 | 1 | 0 | 0 | 1 | 1 | 0 | |
| $Re(z_q)$ | −7 | −5 | −3 | −1 | 1 | 3 | 5 | 7 | Uniform |
| | $-u_3$ | $-u_2$ | $-u_1$ | −1 | 1 | $u_1$ | $u_2$ | $u_3$ | NUC |

Constellation mapping for imaginary part of 64-QAM

| | | | | | | | | | |
|---|---|---|---|---|---|---|---|---|---|
| $y_{1,q}$ | 1 | 1 | 1 | 1 | 0 | 0 | 0 | 0 | |
| $y_{3,q}$ | 0 | 0 | 1 | 1 | 1 | 1 | 0 | 0 | |
| $y_{5,q}$ | 0 | 1 | 1 | 0 | 0 | 1 | 1 | 0 | |
| $Im(z_q)$ | −7 | −5 | −3 | −1 | 1 | 3 | 5 | 7 | Uniform |
| | $-u_3$ | $-u_2$ | $-u_1$ | −1 | 1 | $u_1$ | $u_2$ | $u_3$ | NUC |

Constellation mapping for real part of 256-QAM

| | | | | | | | | | | | | | | | | |
|---|---|---|---|---|---|---|---|---|---|---|---|---|---|---|---|---|
| $y_{0,q}$ | 1 | 1 | 1 | 1 | 1 | 1 | 1 | 1 | 0 | 0 | 0 | 0 | 0 | 0 | 0 | 0 | |
| $y_{2,q}$ | 0 | 0 | 0 | 0 | 1 | 1 | 1 | 1 | 1 | 1 | 1 | 1 | 0 | 0 | 0 | 0 | |
| $y_{4,q}$ | 0 | 0 | 1 | 1 | 1 | 1 | 0 | 0 | 0 | 0 | 1 | 1 | 1 | 1 | 0 | 0 | |
| $y_{6,q}$ | 0 | 1 | 1 | 0 | 0 | 1 | 1 | 0 | 0 | 1 | 1 | 0 | 0 | 1 | 1 | 0 | |
| $Re(z_q)$ | −15 | −13 | −11 | −9 | −7 | −5 | −3 | −1 | 1 | 3 | 5 | 7 | 9 | 11 | 13 | 15 | Uniform |
| | $-u_7$ | $-u_6$ | $-u_5$ | $-u_4$ | $-u_3$ | $-u_2$ | $-u_1$ | −1 | 1 | $u_1$ | $u_2$ | $u_3$ | $u_4$ | $u_5$ | $u_6$ | $u_7$ | NUC |

Constellation mapping for real part of 256-QAM

| | | | | | | | | | | | | | | | | |
|---|---|---|---|---|---|---|---|---|---|---|---|---|---|---|---|---|
| $y_{1,q}$ | 1 | 1 | 1 | 1 | 1 | 1 | 1 | 1 | 0 | 0 | 0 | 0 | 0 | 0 | 0 | 0 | |
| $y_{3,q}$ | 0 | 0 | 0 | 0 | 1 | 1 | 1 | 1 | 1 | 1 | 1 | 1 | 0 | 0 | 0 | 0 | |
| $y_{5,q}$ | 0 | 0 | 1 | 1 | 1 | 1 | 0 | 0 | 0 | 0 | 1 | 1 | 1 | 1 | 0 | 0 | |
| $y_{7,q}$ | 0 | 1 | 1 | 0 | 0 | 1 | 1 | 0 | 0 | 1 | 1 | 0 | 0 | 1 | 1 | 0 | |
| $Im(z_q)$ | −15 | −13 | −11 | −9 | −7 | −5 | −3 | −1 | 1 | 3 | 5 | 7 | 9 | 11 | 13 | 15 | Uniform |
| | $-u_7$ | $-u_6$ | $-u_5$ | $-u_4$ | $-u_3$ | $-u_2$ | $-u_1$ | −1 | 1 | $u_1$ | $u_2$ | $u_3$ | $u_4$ | $u_5$ | $u_6$ | $u_7$ | NUC |

Constellation mapping for real part of 1024-QAM

| | | | | | | | | | | | | | | | | |
|---|---|---|---|---|---|---|---|---|---|---|---|---|---|---|---|---|
| $Y_{0,q}$ | 1 | 1 | 1 | 1 | 1 | 1 | 1 | 1 | 1 | 1 | 1 | 1 | 1 | 1 | 1 | 1 | |
| $y_{2,q}$ | 0 | 0 | 0 | 0 | 0 | 0 | 0 | 0 | 1 | 1 | 1 | 1 | 1 | 1 | 1 | 1 | |
| $y_{4,q}$ | 0 | 0 | 0 | 0 | 1 | 1 | 1 | 1 | 1 | 1 | 1 | 1 | 0 | 0 | 0 | 0 | |
| $y_{6,q}$ | 0 | 0 | 1 | 1 | 1 | 1 | 0 | 0 | 0 | 0 | 1 | 1 | 1 | 1 | 0 | 0 | |
| $y_{8,q}$ | 0 | 1 | 1 | 0 | 0 | 1 | 1 | 0 | 0 | 1 | 1 | 0 | 0 | 1 | 1 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $Y_{0,q}$ | 0 | 0 | 0 | 0 | 0 | 0 | 0 | 0 | 0 | 0 | 0 | 0 | 0 | 0 | 0 | 0 | |
| $y_{2,q}$ | 1 | 1 | 1 | 1 | 1 | 1 | 1 | 1 | 0 | 0 | 0 | 0 | 0 | 0 | 0 | 0 | |
| $y_{4,q}$ | 0 | 0 | 0 | 0 | 1 | 1 | 1 | 1 | 1 | 1 | 1 | 1 | 0 | 0 | 0 | 0 | |
| $y_{6,q}$ | 0 | 0 | 1 | 1 | 1 | 1 | 0 | 0 | 0 | 0 | 1 | 1 | 1 | 1 | 0 | 0 | |
| $y_{8,q}$ | 0 | 1 | 1 | 0 | 0 | 1 | 1 | 0 | 0 | 1 | 1 | 0 | 0 | 1 | 1 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

Constellation mapping for imaginary part of 1024-QAM

| | | | | | | | | | | | | | | | | |
|---|---|---|---|---|---|---|---|---|---|---|---|---|---|---|---|---|
| $y_{1,q}$ | 1 | 1 | 1 | 1 | 1 | 1 | 1 | 1 | 1 | 1 | 1 | 1 | 1 | 1 | 1 | 1 | |
| $y_{3,q}$ | 0 | 0 | 0 | 0 | 0 | 0 | 0 | 0 | 1 | 1 | 1 | 1 | 1 | 1 | 1 | 1 | |
| $y_{5,q}$ | 0 | 0 | 0 | 0 | 1 | 1 | 1 | 1 | 1 | 1 | 1 | 1 | 0 | 0 | 0 | 0 | |
| $y_{7,q}$ | 0 | 0 | 1 | 1 | 1 | 1 | 0 | 0 | 0 | 0 | 1 | 1 | 1 | 1 | 0 | 0 | |
| $y_{9,q}$ | 0 | 1 | 1 | 0 | 0 | 1 | 1 | 0 | 0 | 1 | 1 | 0 | 0 | 1 | 1 | 0 | |
| $Im(z_q)$ | −31 | −29 | −27 | −25 | −23 | −21 | −19 | −17 | −15 | −13 | −11 | −9 | −7 | −5 | −3 | −1 | Uniform |

-continued

Constellation mapping for imaginary part of 1024-QAM

| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
|---|---|---|---|---|---|---|---|---|---|---|---|---|---|---|---|---|---|
| $y_{1,q}$ | 0 | 0 | 0 | 0 | 0 | 0 | 0 | 0 | 0 | 0 | 0 | 0 | 0 | 0 | 0 | 0 | |
| $y_{3,q}$ | 1 | 1 | 1 | 1 | 1 | 1 | 1 | 1 | 0 | 0 | 0 | 0 | 0 | 0 | 0 | 0 | |
| $y_{5,q}$ | 0 | 0 | 0 | 0 | 1 | 1 | 1 | 1 | 1 | 1 | 1 | 1 | 0 | 0 | 0 | 0 | |
| $y_{7,q}$ | 0 | 0 | 1 | 1 | 1 | 1 | 0 | 0 | 0 | 0 | 1 | 1 | 1 | 1 | 0 | 0 | |
| $y_{9,q}$ | 0 | 1 | 1 | 0 | 0 | 1 | 1 | 0 | 0 | 1 | 1 | 0 | 0 | 1 | 1 | 0 | |
| $\operatorname{Im}(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

Constellation mapping for real part of 4096-QAM

| | | | | | | | | | | | | | | | | | |
|---|---|---|---|---|---|---|---|---|---|---|---|---|---|---|---|---|---|
| $y_{0,q}$ | 1 | 1 | 1 | 1 | 1 | 1 | 1 | 1 | 1 | 1 | 1 | 1 | 1 | 1 | 1 | 1 | |
| $y_{2,q}$ | 0 | 0 | 0 | 0 | 0 | 0 | 0 | 0 | 0 | 0 | 0 | 0 | 0 | 0 | 0 | 0 | |
| $y_{4,q}$ | 0 | 0 | 0 | 0 | 0 | 0 | 0 | 0 | 1 | 1 | 1 | 1 | 1 | 1 | 1 | 1 | |
| $y_{6,q}$ | 0 | 0 | 0 | 0 | 1 | 1 | 1 | 1 | 1 | 1 | 1 | 1 | 0 | 0 | 0 | 0 | |
| $y_{8,q}$ | 0 | 0 | 1 | 1 | 1 | 1 | 0 | 0 | 0 | 0 | 1 | 1 | 1 | 1 | 0 | 0 | |
| $y_{10,q}$ | 0 | 1 | 1 | 0 | 0 | 1 | 1 | 0 | 0 | 1 | 1 | 0 | 0 | 1 | 1 | 0 | |
| $\operatorname{Re}(z_q)$ | $-63$ | $-61$ | $-59$ | $-57$ | $-55$ | $-53$ | $-51$ | $-49$ | $-47$ | $-45$ | $-43$ | $-41$ | $-39$ | $-37$ | $-35$ | $-33$ | Uniform |
| | $-u_{31}$ | $-u_{30}$ | $-u_{29}$ | $-u_{28}$ | $-u_{27}$ | $-u_{26}$ | $-u_{25}$ | $-u_{24}$ | $-u_{23}$ | $-u_{22}$ | $-u_{21}$ | $-u_{20}$ | $-u_{19}$ | $-u_{18}$ | $-u_{17}$ | $-u_{16}$ | NUC |
| $y_{0,q}$ | 1 | 1 | 1 | 1 | 1 | 1 | 1 | 1 | 1 | 1 | 1 | 1 | 1 | 1 | 1 | 1 | |
| $y_{2,q}$ | 1 | 1 | 1 | 1 | 1 | 1 | 1 | 1 | 1 | 1 | 1 | 1 | 1 | 1 | 1 | 1 | |
| $y_{4,q}$ | 1 | 1 | 1 | 1 | 1 | 1 | 1 | 1 | 0 | 0 | 0 | 0 | 0 | 0 | 0 | 0 | |
| $y_{6,q}$ | 0 | 0 | 0 | 0 | 1 | 1 | 1 | 1 | 1 | 1 | 1 | 1 | 0 | 0 | 0 | 0 | |
| $y_{8,q}$ | 0 | 0 | 1 | 1 | 1 | 1 | 0 | 0 | 0 | 0 | 1 | 1 | 1 | 1 | 0 | 0 | |
| $y_{10,q}$ | 0 | 1 | 1 | 0 | 0 | 1 | 1 | 0 | 0 | 1 | 1 | 0 | 0 | 1 | 1 | 0 | |
| $\operatorname{Re}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $y_{0,q}$ | 0 | 0 | 0 | 0 | 0 | 0 | 0 | 0 | 0 | 0 | 0 | 0 | 0 | 0 | 0 | 0 | |
| $y_{2,q}$ | 1 | 1 | 1 | 1 | 1 | 1 | 1 | 1 | 1 | 1 | 1 | 1 | 1 | 1 | 1 | 1 | |
| $y_{4,q}$ | 0 | 0 | 0 | 0 | 0 | 0 | 0 | 0 | 1 | 1 | 1 | 1 | 1 | 1 | 1 | 1 | |
| $y_{6,q}$ | 0 | 0 | 0 | 0 | 1 | 1 | 1 | 1 | 1 | 1 | 1 | 1 | 0 | 0 | 0 | 0 | |
| $y_{8,q}$ | 0 | 0 | 1 | 1 | 1 | 1 | 0 | 0 | 0 | 0 | 1 | 1 | 1 | 1 | 0 | 0 | |
| $y_{10,q}$ | 0 | 1 | 1 | 0 | 0 | 1 | 1 | 0 | 0 | 1 | 1 | 0 | 0 | 1 | 1 | 0 | |
| $\operatorname{Re}(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| $y_{0,q}$ | 0 | 0 | 0 | 0 | 0 | 0 | 0 | 0 | 0 | 0 | 0 | 0 | 0 | 0 | 0 | 0 | |
| $y_{2,q}$ | 0 | 0 | 0 | 0 | 0 | 0 | 0 | 0 | 0 | 0 | 0 | 0 | 0 | 0 | 0 | 0 | |
| $y_{4,q}$ | 1 | 1 | 1 | 1 | 1 | 1 | 1 | 1 | 0 | 0 | 0 | 0 | 0 | 0 | 0 | 0 | |
| $y_{6,q}$ | 0 | 0 | 0 | 0 | 1 | 1 | 1 | 1 | 1 | 1 | 1 | 1 | 0 | 0 | 0 | 0 | |
| $y_{8,q}$ | 0 | 0 | 1 | 1 | 1 | 1 | 0 | 0 | 0 | 0 | 1 | 1 | 1 | 1 | 0 | 0 | |
| $y_{10,q}$ | 0 | 1 | 1 | 0 | 0 | 1 | 1 | 0 | 0 | 1 | 1 | 0 | 0 | 1 | 1 | 0 | |
| $\operatorname{Re}(z_q)$ | 33 | 35 | 37 | 39 | 41 | 43 | 45 | 47 | 49 | 51 | 53 | 55 | 57 | 59 | 61 | 63 | Uniform |
| | $u_{16}$ | $u_{17}$ | $u_{18}$ | $u_{19}$ | $u_{20}$ | $u_{21}$ | $u_{22}$ | $u_{23}$ | $u_{24}$ | $u_{25}$ | $u_{26}$ | $u_{27}$ | $u_{28}$ | $u_{29}$ | $u_{30}$ | $u_{31}$ | NUC |

Constellation mapping for imaginary part of 4096-QAM

| | | | | | | | | | | | | | | | | | |
|---|---|---|---|---|---|---|---|---|---|---|---|---|---|---|---|---|---|
| $y_{1,q}$ | 1 | 1 | 1 | 1 | 1 | 1 | 1 | 1 | 1 | 1 | 1 | 1 | 1 | 1 | 1 | 1 | |
| $y_{3,q}$ | 0 | 0 | 0 | 0 | 0 | 0 | 0 | 0 | 0 | 0 | 0 | 0 | 0 | 0 | 0 | 0 | |
| $y_{5,q}$ | 0 | 0 | 0 | 0 | 0 | 0 | 0 | 0 | 1 | 1 | 1 | 1 | 1 | 1 | 1 | 1 | |
| $y_{7,q}$ | 0 | 0 | 0 | 0 | 1 | 1 | 1 | 1 | 1 | 1 | 1 | 1 | 0 | 0 | 0 | 0 | |
| $y_{9,q}$ | 0 | 0 | 1 | 1 | 1 | 1 | 0 | 0 | 0 | 0 | 1 | 1 | 1 | 1 | 0 | 0 | |
| $y_{11,q}$ | 0 | 1 | 1 | 0 | 0 | 1 | 1 | 0 | 0 | 1 | 1 | 0 | 0 | 1 | 1 | 0 | |
| $\operatorname{Im}(z_q)$ | $-63$ | $-61$ | $-59$ | $-57$ | $-55$ | $-53$ | $-51$ | $-49$ | $-47$ | $-45$ | $-43$ | $-41$ | $-39$ | $-37$ | $-35$ | $-33$ | Uniform |
| | $-u31$ | $-u30$ | $-u23$ | $-u28$ | $-u27$ | $-u26$ | $-u25$ | $-u24$ | $-u23$ | $-u22$ | $-u21$ | $-u20$ | $-u19$ | $-u18$ | $-u17$ | $-u16$ | NUC |
| $y_{1,q}$ | 1 | 1 | 1 | 1 | 1 | 1 | 1 | 1 | 1 | 1 | 1 | 1 | 1 | 1 | 1 | 1 | |
| $y_{3,q}$ | 1 | 1 | 1 | 1 | 1 | 1 | 1 | 1 | 1 | 1 | 1 | 1 | 1 | 1 | 1 | 1 | |
| $y_{5,q}$ | 1 | 1 | 1 | 1 | 1 | 1 | 1 | 1 | 0 | 0 | 0 | 0 | 0 | 0 | 0 | 0 | |
| $y_{7,q}$ | 0 | 0 | 0 | 0 | 1 | 1 | 1 | 1 | 1 | 1 | 1 | 1 | 0 | 0 | 0 | 0 | |
| $y_{9,q}$ | 0 | 0 | 1 | 1 | 1 | 1 | 0 | 0 | 0 | 0 | 1 | 1 | 1 | 1 | 0 | 0 | |
| $y_{11,q}$ | 0 | 1 | 1 | 0 | 0 | 1 | 1 | 0 | 0 | 1 | 1 | 0 | 0 | 1 | 1 | 0 | |
| $\operatorname{Im}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u15$ | $-u14$ | $-u13$ | $-u12$ | $-u11$ | $-u10$ | $-u9$ | $-u8$ | $-u7$ | $-u6$ | $-u5$ | $-u4$ | $-u3$ | $-u2$ | $-u1$ | $-1$ | NUC |
| $y_{1,q}$ | 0 | 0 | 0 | 0 | 0 | 0 | 0 | 0 | 0 | 0 | 0 | 0 | 0 | 0 | 0 | 0 | |
| $y_{3,q}$ | 1 | 1 | 1 | 1 | 1 | 1 | 1 | 1 | 1 | 1 | 1 | 1 | 1 | 1 | 1 | 1 | |
| $y_{5,q}$ | 0 | 0 | 0 | 0 | 0 | 0 | 0 | 0 | 1 | 1 | 1 | 1 | 1 | 1 | 1 | 1 | |
| $y_{7,q}$ | 0 | 0 | 0 | 0 | 1 | 1 | 1 | 1 | 1 | 1 | 1 | 1 | 0 | 0 | 0 | 0 | |
| $y_{9,q}$ | 0 | 0 | 1 | 1 | 1 | 1 | 0 | 0 | 0 | 0 | 1 | 1 | 1 | 1 | 0 | 0 | |

-continued

Constellation mapping for imaginary part of 4096-QAM

| | | | | | | | | | | | | | | | | | |
|---|---|---|---|---|---|---|---|---|---|---|---|---|---|---|---|---|---|
| $y_{11,q}$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | u1 | u2 | u3 | u4 | u5 | u6 | u7 | u8 | u9 | u10 | u11 | u12 | u13 | u14 | u15 | NUC |
| $y_{1,q}$ | 0 | 0 | 0 | 0 | 0 | 0 | 0 | 0 | 0 | 0 | 0 | 0 | 0 | 0 | 0 | 0 | |
| $y_{3,q}$ | 0 | 0 | 0 | 0 | 0 | 0 | 0 | 0 | 0 | 0 | 0 | 0 | 0 | 0 | 0 | 0 | |
| $y_{5,q}$ | 1 | 1 | 1 | 1 | 1 | 1 | 1 | 1 | 0 | 0 | 0 | 0 | 0 | 0 | 0 | 0 | |
| $y_{7,q}$ | 0 | 0 | 0 | 0 | 1 | 1 | 1 | 1 | 1 | 1 | 1 | 1 | 0 | 0 | 0 | 0 | |
| $y_{9,q}$ | 0 | 0 | 1 | 1 | 1 | 1 | 0 | 0 | 0 | 0 | 1 | 1 | 1 | 1 | 0 | 0 | |
| $y_{11,q}$ | 0 | 1 | 1 | 0 | 0 | 1 | 1 | 0 | 0 | 1 | 1 | 0 | 0 | 1 | 1 | 0 | |
| $Im(z_q)$ | 33 | 35 | 37 | 39 | 41 | 43 | 45 | 47 | 49 | 51 | 53 | 55 | 57 | 59 | 61 | 63 | Uniform |
| | u16 | u17 | u18 | u19 | u20 | u21 | u22 | u23 | u24 | u25 | u26 | u27 | u28 | u29 | u30 | u31 | NUC |

In an embodiment the modulator of the disclosed coding and modulation apparatus modulates said cell words into constellation values of a non-uniform constellation wherein said modulator is configured to use, based on the total number M of constellation points of the constellation and the code rate, a non-uniform constellation from a group A of constellations comprising one or more of the following constellations defined by the constellation position vector u of length $v=\sqrt{M}/2-1$.

The following non-uniform constellations comprised in group A are proposed:

A) M-QAM non-uniform constellations of group A:

A1) 16-QAM NUC

| u/code rate | 6/15 | 7/15 | 8/15 | 9/15 | 10/15 | 11/15 | 12/15 | 13/15 |
|---|---|---|---|---|---|---|---|---|
| u1 | 3.1169 | 3.1973 | 3.2334 | 3.2473 | 3.2436 | 3.2312 | 3.2149 | 3.1976 |

A2) 64-AM NUC

| u/code rate | 6/15 | 7/15 | 8/15 | 9/15 | 10/15 | 11/15 | 12/15 | 13/15 |
|---|---|---|---|---|---|---|---|---|
| u1 | 1.5409 | 2.1208 | 2.3945 | 2.6067 | 2.8505 | 2.912 | 2.9751 | 3.0032 |
| u2 | 3.5826 | 4.3237 | 4.6577 | 4.9074 | 5.1674 | 5.2201 | 5.2491 | 5.2489 |
| u3 | 5.5069 | 6.8108 | 7.3475 | 7.7177 | 8.0398 | 8.068 | 8.0217 | 7.9528 |

A3) 256-QAM NUC

| u/code rate | 6/15 | 7/15 | 8/15 | 9/15 | 10/15 | 11/15 | 12/15 | 13/15 |
|---|---|---|---|---|---|---|---|---|
| u1 | 0.9918 | 0.9989 | 1.1155 | 1.3963 | 2.2282 | 2.6619 | 2.8437 | 2.9176 |
| u2 | 2.2615 | 2.6086 | 2.8419 | 3.1795 | 4.1541 | 4.664 | 4.8758 | 4.956 |
| u3 | 2.2873 | 2.7307 | 3.2659 | 3.9675 | 5.676 | 6.5386 | 6.8857 | 7.0096 |
| u4 | 4.2761 | 4.6692 | 5.1383 | 5.9281 | 7.9072 | 8.8521 | 9.1906 | 9.282 |
| u5 | 4.6871 | 5.3576 | 6.3082 | 7.4353 | 10.0292 | 11.2248 | 11.6157 | 11.6881 |
| u6 | 6.5483 | 7.3828 | 8.4196 | 9.7825 | 12.8864 | 14.2018 | 14.5326 | 14.508 |
| u7 | 8.6107 | 9.7612 | 11.0879 | 12.7927 | 16.5632 | 17.9894 | 18.1926 | 17.9984 |

A4) 1024-QAM NUC

| u/code rate | 5/15 | 6/15 | 7/15 | 8/15 | 9/15 | 10/15 | 11/15 | 12/15 | 13/15 |
|---|---|---|---|---|---|---|---|---|---|
| u1 | 0.9997 | 1.0003 | 0.9994 | 1.0005 | 1.0023 | 1.0772 | 2.0789 | 2.5983 | 2.8638 |
| u2 | 0.9916 | 1.0149 | 1.2742 | 2.0897 | 2.5667 | 2.8011 | 3.9147 | 4.5193 | 4.8422 |
| u3 | 0.9911 | 1.0158 | 1.2749 | 2.0888 | 2.5683 | 2.9634 | 5.0664 | 6.1649 | 6.7392 |
| u4 | 2.4349 | 2.6848 | 3.0323 | 3.9945 | 4.5468 | 4.8127 | 7.0579 | 8.2107 | 8.7961 |
| u5 | 2.4346 | 2.6903 | 3.0371 | 3.9931 | 4.5636 | 5.1864 | 8.3596 | 9.9594 | 10.7659 |
| u6 | 2.486 | 2.882 | 3.6813 | 5.3843 | 6.2876 | 6.7838 | 10.2901 | 12.0321 | 12.8844 |
| u7 | 2.4864 | 2.8747 | 3.6718 | 5.3894 | 6.4073 | 7.5029 | 11.834 | 13.9574 | 14.98 |
| u8 | 4.4576 | 4.7815 | 5.5854 | 7.5206 | 8.4282 | 9.238 | 14.0092 | 16.2598 | 17.2736 |
| u9 | 4.4646 | 4.7619 | 5.5804 | 7.6013 | 8.8692 | 10.32 | 15.8419 | 18.4269 | 19.5552 |
| u10 | 4.9706 | 5.5779 | 6.8559 | 9.3371 | 10.6112 | 12.0115 | 18.1472 | 20.9273 | 22.0472 |
| u11 | 4.9552 | 5.6434 | 7.0475 | 9.8429 | 11.6946 | 13.5356 | 20.4243 | 23.4863 | 24.6335 |
| u12 | 6.7222 | 7.3854 | 8.8436 | 11.9255 | 13.7334 | 15.6099 | 23.2381 | 26.4823 | 27.5337 |
| u13 | 7.0327 | 7.8797 | 9.7042 | 13.3962 | 15.6274 | 17.7524 | 26.2322 | 29.7085 | 30.6651 |

-continued

| u/code rate | 5/15 | 6/15 | 7/15 | 8/15 | 9/15 | 10/15 | 11/15 | 12/15 | 13/15 |
|---|---|---|---|---|---|---|---|---|---|
| u14 | 8.53S2 | 9.635 | 11.727 | 15.8981 | 18.2933 | 20.5256 | 29.973 | 33.6247 | 34.3579 |
| u15 | 10.4411 | 11.7874 | 14.2894 | 19.1591 | 21.7769 | 24.1254 | 34.7629 | 38.5854 | 38.9603 |

A5) 4096-QAM NUC

| u/code rate | 5/15 | 6/15 | 7/15 | 8/15 | 9/15 | 10/15 | 11/15 | 12/15 | 13/15 |
|---|---|---|---|---|---|---|---|---|---|
| u1 | 1.0004 | 0.9998 | 0.9988 | 0.9999 | 0.9999 | 1.0009 | 1.0043 | 2.031 | 2.7135 |
| u2 | 1.0009 | 0.9984 | 0.9996 | 1.0004 | 1.0364 | 2.272 | 2.7379 | 3.8448 | 4.6426 |
| u3 | 1.0008 | 0.9983 | 0.998 | 1.0013 | 1.037 | 2.2732 | 2.746 | 4.8763 | 6.3617 |
| u4 | 0.9953 | 1.2356 | 2.0374 | 2.5341 | 2.7604 | 4.1332 | 4.6828 | 6.8402 | 8.3598 |
| u5 | 0.9956 | 1.2354 | 2.0374 | 2.5347 | 2.7604 | 4.1327 | 4.7079 | 7.912 | 10.0999 |
| u6 | 0.9956 | 1.2372 | 2.0374 | 2.5328 | 2.8536 | 5.4651 | 6.4365 | 9.7373 | 12.0627 |
| u7 | 0.9957 | 1.2366 | 2.0366 | 2.5362 | 2.8534 | 5.4655 | 6.5065 | 10.8859 | 13.8413 |
| u8 | 2.5769 | 2.9864 | 3.93 | 4.5077 | 4.7342 | 7.4777 | 8.4445 | 12.8891 | 15.9032 |
| u9 | 2.5774 | 2.9867 | 3.931 | 4.5089 | 4.7345 | 7.478 | 8.6065 | 14.1091 | 17.7263 |
| u10 | 2.5794 | 2.9906 | 3.9297 | 4.5202 | 5.0028 | 8.9382 | 10.254 | 15.9704 | 19.7625 |
| u11 | 2.5793 | 2.9912 | 3.9294 | 4.5204 | 5.0025 | 8.9384 | 10.5627 | 17.2797 | 21.6431 |
| u12 | 2.6756 | 3.5858 | 5.277 | 6.2318 | 6.6184 | 10.9166 | 12.3025 | 19.2948 | 23.7857 |
| u13 | 2.6764 | 3.5859 | 5.2757 | 6.2314 | 6.6189 | 10.9185 | 12.8281 | 20.7185 | 25.7402 |
| u14 | 2.6747 | 3.577 | 5.2792 | 6.3219 | 7.215 | 12.5855 | 14.3539 | 22.6727 | 27.9051 |
| u15 | 2.6746 | 3.5775 | 5.2795 | 6.3212 | 7.2149 | 12.5908 | 15.1126 | 24.2439 | 29.9595 |
| u16 | 4.6252 | 5.474 | 7.4011 | 8.3718 | 8.9581 | 14.7944 | 16.7817 | 26.3916 | 32.2702 |
| u17 | 4.6243 | 5.4757 | 7.3997 | 8.372 | 8.9585 | 14.8184 | 17.7277 | 28.1062 | 34.4336 |
| u18 | 4.6188 | 5.4675 | 7.4646 | 8.7429 | 9.94 | 16.6805 | 19.2664 | 30.2335 | 36.7993 |
| u19 | 4.62 | 5.4681 | 7.4665 | 8.7398 | 9.9394 | 16.8025 | 20.3968 | 32.1242 | 39.1019 |
| u20 | 5.246 | 6.7028 | 9.1828 | 10.5001 | 11.5978 | 18.9131 | 22.1002 | 34.4644 | 41.6513 |
| u21 | 5.2441 | 6.7104 | 9.1919 | 10.4999 | 11.6041 | 19.325 | 23.4306 | 36.5679 | 44.1297 |
| u22 | 5.2556 | 6.8816 | 9.641 | 11.4966 | 12.9965 | 21.168 | 25.1704 | 39.027 | 46.8305 |
| u23 | 5.2584 | 6.8738 | 9.6278 | 11.5018 | 13.088 | 22.0945 | 26.7556 | 41.4123 | 49.5435 |
| u24 | 7.0279 | 8.6613 | 11.7039 | 13.483 | 14.878 | 24.1425 | 28.7536 | 44.2002 | 52.5353 |
| u25 | 7.0459 | 8.6344 | 11.6913 | 13.5672 | 15.2586 | 25.575 | 30.6214 | 46.9287 | 55.5551 |
| u26 | 7.4305 | 9.4101 | 12.9619 | 15.1187 | 16.8096 | 27.6541 | 32.829 | 50.0315 | 58.8707 |
| u27 | 7.3941 | 9.5027 | 13.2128 | 15.6519 | 17.8237 | 29.6567 | 35.1146 | 53.2678 | 62.3471 |
| u28 | 8.8516 | 11.1654 | 15.161 | 17.6098 | 19.6965 | 32.2679 | 37.8272 | 57.0085 | 66.2558 |
| u29 | 9.1461 | 11.7322 | 16.204 | 19.1046 | 21.4926 | 35.0526 | 40.7685 | 61.0847 | 70.5087 |
| u30 | 10.4828 | 13.5243 | 18.4804 | 21.5413 | 23.9997 | 38.6023 | 44.3725 | 65.9903 | 75.5397 |
| u31 | 12.3176 | 15.7967 | 21.4433 | 24.7641 | 27.2995 | 43.2007 | 48.9596 | 72.1993 | 81.8379 |

In the following the Q-NUC optimization will be described, i.e. the optimization of a 2-dimensional constellation that is derived from a single quadrant. The above described optimization of a $N^2$-QAM requires the optimization of $sqrt(M)/2-1$ degrees of freedom. Since the optimization of a 2-dimensional QAM constellation has $2*M$ degrees of freedom (real and imaginary part of each constellation point) the optimization is significantly more time consuming. Since the optimum 2D-constellations for the 16-QAM case are symmetric with respect to the different quadrants of the constellations, the following simplifications can be applied to describe these constellations: Only a first quarter of the total number of constellation points of a constellation (e.g. the first quadrant of the constellation) is described, reducing the number of table entries from $2*M$ to $M/2$. From the first quarter the remaining quarters can be derived, leading to a so called QQAM constellation. However, it shall be ensured that the properties of the bit labeling of the constellation points are retained. For instance, if the first quadrant is Gray-Mapped, offering a Hamming distance of 1 of the bit labels belonging to adjacent constellation points, the same must be ensured for the remaining quadrants of the QQAM constellation.

To uniquely define a 16-QQAM only 8 real values are required, corresponding to 4 complex values representing the constellation points of the first quadrant. Based on the QQAM approach 16-QQAM, 32-QQAM, 64QQAM, 128-QQAM, 256-QQAM and 1024-QQAM constellations have been optimized, clearly outperforming the $N^2$-QAM constellations. The presented QQAM optimization approach can be used for any channel condition, e.g. for the AWGN channel as well as for fading channels.

For other systems like a satellite communication system in accordance with the DVB-S2 or Sx standard, constellations for M=8 constellation points have been optimized. These constellations cannot be described by only a quarter of the constellations points. Rather all 8 complex values are explicitly described.

In an embodiment the modulator of the disclosed coding and modulation apparatus modulates said cell words into constellation values of a non-uniform constellation wherein said modulator is configured to use, based on the total number M of constellation points of the constellation and the code rate, a non-uniform constellation from a group C or D of constellations comprising one or more of the following constellations, wherein the constellation points are defined by a constellation position vector $w_{0 \ldots n-1}$ with $b=M/4$, wherein a first quarter of the constellation points $x_{0 \ldots b-1}$ are defined as $x_{0 \ldots b-1}=w_{0 \ldots b-1}$, a second quarter of the constellation points $x_{b \ldots 2b-1}$ are defined as $x_{b \ldots 2b-1}=\text{conj}(w_{0 \ldots b-1})$, a third quarter of the constellation points $x_{2b \ldots 3b-1}$ are defined as $x_{2b \ldots 3b-1}=-\text{conj}(w_{0 \ldots b-1})$, and a fourth quarter of the constellation points $x_{3b \ldots 4b-1}$ are defined as $x_{3b \ldots 4b-1}=-w_{0 \ldots b-1}$, wherein conj is the complex conjugate.

The following non-uniform constellations comprised in group C are proposed (i=srqt(−1) is the imaginary unit):

C) M-QAM non-uniform constellations of group C:

C1) 16-QQAM NUC

| w/code rate | 5/15 | 6/15 | 7/15 | 8/15 | 9/15 |
|---|---|---|---|---|---|
| w0 | 1.1928 + 0.5309i | 0.2663 + 0.4530i | 0.2626 + 0.4634i | 0.2575 + 0.4819i | 0.2474 + 0.5061i |
| w1 | 0.5309 + 1.1928i | 0.4530 + 0.2663i | 0.4634 + 0.2626i | 0.4819 + 0.2575i | 0.5061 + 0.2474i |
| w2 | 0.4633 + 0.2842i | 0.5115 + 1.2092i | 0.5023 + 1.2100i | 0.4951 + 1.2068i | 0.4909 + 1.2007i |
| w3 | 0.2842 + 0.4633i | 1.2092 + 0.5115i | 1.2100 + 0.5023i | 1.2068 + 0.4951i | 1.2007 + 0.4909i |

| w/code rate | 10/15 | 11/15 | 12/15 | 13/15 |
|---|---|---|---|---|
| w0 | 0.6186 + 0.2544i | 0.2881 + 0.9576i | −0.2949 + 0.2949i | −0.2999 + 0.2999i |
| w1 | 0.2213 + 0.4416i | 0.2881 + 0.2881i | −0.9555 + 0.2949i | −0.9540 + 0.2999i |
| w2 | 1.2080 + 0.5377i | 0.9576 + 0.9576i | −0.2949 + 0.9555i | −0.2999 + 0.9540i |
| w3 | 0.4487 + 1.1657i | 0.9576 + 0.2881i | −0.9555 + 0.9555i | −0.9540 + 0.9540i |

C2) 64-QQAM NUC

| w/code rate | 5/15 | 5/15 | 7/15 | 3/15 | 9/15 |
|---|---|---|---|---|---|
| w0 | 1.0257 + 0.5960i | 3.5656 + 0.9499i | 0.2925 + 1.4892i | 3.2920 + 1.4827i | 0.2978 + 1.4669i |
| w1 | 1.2181 + 0.7476i | 0.2750 + 1.0676i | 0.8449 + 1.2622i | 3.8411 + 0.9584i | 3.8421 + 1.2355i |
| w2 | 1.1509 + 0.3069i | 3.8202 + 1.2651i | 0.2351 + 1.0196i | 3.2174 + 1.0211i | 3.2135 + 1.0389i |
| w3 | 1.3S8S + 0.3325i | 3.3011 + 1.4529i | 0.5555 + 0.8926i | 3.5702 + 0.8798i | 0.6055 + 0.8654i |
| w4 | 3.5961 + 1.0257i | 0.9500 + 0.5641i | 1.4892 + 0.2925i | 1.4827 + 0.2920i | 1.4685 + 0.2859i |
| w5 | 3.7476 + 1.2181i | 1.0666 + 0.2744i | 1.2622 + 0.8449i | 1.2563 + 0.8410i | 1.2516 + 0.8201i |
| w6 | 3.3069 + 1.1510i | 1.2657 + 0.8178i | 1.0196 + 0.2351i | 1.0211 + 0.2174i | 1.0279 + 0.1981i |
| w7 | 3.3325 + 1.3888i | 1.4521 + 0.3005i | 0.8926 + 0.5555i | 3.8798 + 0.5702i | 3.8857 + 0.5642i |
| w8 | 3.4969 + 0.2870i | 3.3004 + 0.5417i | 0.1558 + 0.3029i | 9.1475 + 0.3040i | 0.1338 + 0.3767i |
| w9 | 3.4161 + 0.2486i | 0.2430 + 0.5607i | 0.1712 + 0.3021i | 3.1691 + 0.3028i | 3.1752 + 0.3563i |
| w10 | 3.4969 + 0.2500i | 3.2094 + 0.3579i | 0.2075 + 0.6586i | 3.1871 + 0.6855i | 3.1756 + 0.7261i |
| w11 | 3.4084 + 0.2266i | 3.1946 + 0.3566i | 0.3354 + 0.6030i | 0.3563 + 0.6126i | 3.4023 + 0.6180i |
| w12 | 0.2870 + 0.4969i | 3.5410 + 0.3002i | 0.3029 + 0.1558i | 3.3040 + 0.1475i | 3.2713 + 0.1337i |
| w13 | 3.2486 + 0.4162i | 3.5596 + 0.2431i | 0.3021 + 0.1712i | 3.3028 + 0.1691i | 3.2748 + 0.1572i |
| w14 | 3.2500 + 0.4969i | 3.3569 + 0.2094i | 0.6586 + 0.2075i | 0.6855 + 0.1871i | 3.6840 + 0.1578i |
| w15 | 3.2266 + 0.4054i | 3.3553 + 0.1948i | 0.6030 + 0.3354i | 3.6126 + 0.3563i | 3.6145 + 0.3556i |

| w/code rate | 10/15 | 11/15 | 12/15 | 13/15 |
|---|---|---|---|---|
| w0 | 0.2878 + 1.4388i | −0.4661 + 0.9856i | 1.0519 − 0.5188i | 1.0854 − 0.5394i |
| w1 | 0.8133 + 1.2150i | −0.4329 + 0.6825i | 0.7146 − 0.4532i | 0.7353 − 0.4623i |
| w2 | 0.2219 + 1.0386i | −0.1534 + 1.0366i | 1.0500 − 0.1642i | 1.0474 − 0.1695i |
| w3 | 0.6145 + 0.8494i | −0.1340 + 0.6796i | 0.7170 − 0.1473i | 0.7243 − 0.1504i |
| w4 | 1.4656 + 0.2931i | −0.8178 + 1.1580i | 1.0952 − 0.9115i | 1.0693 − 0.9408i |
| w5 | 1.2278 + 0.8230i | −0.8132 + 0.6913i | 0.6868 − 0.8108i | 0.7092 − 0.8073i |
| w6 | 1.0649 + 0.2069i | −0.2702 + 1.4529i | 1.4480 − 0.2403i | 1.4261 − 0.2216i |
| w7 | 0.8971 + 0.5677i | −1.2125 + 0.7097i | 0.6406 − 1.1995i | 0.6106 − 1.1783i |
| w8 | 0.1177 + 0.4119i | −0.4145 + 0.1264i | 3.1325 − 0.3998i | 0.1392 − 0.4078i |
| w9 | 0.2516 + 0.3998i | −0.4179 + 0.3948i | 0.4122 − 0.4120i | 0.4262 − 0.4205i |
| w10 | 0.1559 + 0.7442i | −0.1353 + 0.1272i | 0.1374 − 0.1295i | 0.1407 − 0.1336i |
| w11 | 0.4328 + 0.5954i | −0.1359 + 0.3877i | 0.4185 − 0.1357i | 0.4265 − 0.1388i |
| w12 | 0.1678 + 0.1166i | −0.7330 + 0.1416i | 0.1369 − 0.7073i | 0.1388 − 0.7057i |
| w13 | 0.3325 + 0.1582i | −0.7177 + 0.4018i | 0.4044 − 0.7057i | 0.4197 − 0.7206i |
| w14 | 0.7408 + 0.1355i | −1.0718 + 0.1686i | 0.1677 − 1.0405i | 0.1682 − 1.0316i |
| w15 | 0.6200 + 0.3227i | −1.4375 + 0.2732i | 0.2402 − 1.4087i | 0.2287 − 1.3914i |

C3) 256-QQAM NUC

| w/code rate | 5/15 | 6/15 | 7/15 | 8/15 | 9/15 |
|---|---|---|---|---|---|
| w0 | −0.3495 + 1.7549i | 0.6800 + 1.6926i | 0.7280 + 1.63841 | 1.0804 + 1.3788i | 1.6350 + 0.1593i |
| w1 | −0.2804 + 1.4293i | 0.3911 + 1.3645i | 0.4787 + 1.3492i | 1.0487 + 0.9862i | 1.5776 + 0.4735i |
| w2 | −0.2804 + 1.4293i | 0.2191 + 1.7524i | 0.2417 + 1.7872i | 1.6464 + 0.7428i | 1.3225 + 0.1320i |
| w3 | −0.2635 + 1.3614i | 0.2274 + 1.4208i | 0.1966 + 1.4478i | 1.8245 + 0.9414i | 1.2742 + 0.3922i |
| w4 | −0.9918 + 1.4880i | 0.6678 + 1.2487i | 0.9185 + 1.2490i | 0.7198 + 1.2427i | 1.2901 + 1.0495i |
| w5 | −0.8109 + 1.2116i | 0.7275 + 1.1667i | 0.7448 + 1.1524i | 0.8106 + 1.0040i | 1.4625 + 0.7740i |
| w6 | −0.8109 + 1.2116i | 0.8747 + 1.0470i | 0.9536 + 0.9516i | 0.5595 + 1.0317i | 1.0382 + 0.8623i |
| w7 | −0.7744 + 1.1516i | 0.7930 + 1.0406i | 0.8912 + 0.9461i | 0.6118 + 0.9722i | 1.1794 + 0.6376i |
| w8 | −0.2340 + 0.9857i | 0.2098 + 0.9768i | 0.2553 + 0.9993i | 1.6768 + 0.2002i | 0.9430 + 0.1100i |
| w9 | −0.2349 + 1.0112i | 0.2241 + 1.0454i | 0.2988 + 1.0689i | 0.9997 + 0.6844i | 0.9069 + 0.2829i |
| w10 | −0.2349 + 1.0112i | 0.1858 + 0.9878i | 0.1656 + 1.0288i | 1.4212 + 0.4769i | 1.0854 + 0.1139i |

-continued

| | | | | | |
|---|---|---|---|---|---|
| w11 | −0.2356 + 1.0372i | 0.1901 + 1.0659i | 0.1779 + 1.1140i | 1.1479 + 0.6312i | 1.0441 + 0.3296i |
| w12 | −0.5320 + 0.8680i | 0.5547 + 0.8312i | 0.5802 + 0.8040i | 0.6079 + 0.6566i | 0.7273 + 0.6160i |
| w13 | −0.5496 + 0.8870i | 0.5479 + 0.8651i | 0.5788 + 0.8534i | 0.7284 + 0.6957i | 0.8177 + 0.4841i |
| w14 | −0.5496 + 0.8870i | 0.6073 + 0.8182i | 0.6616 + 0.7612i | 0.5724 + 0.7031i | 0.8504 + 0.7217i |
| w15 | −0.5674 + 0.9058i | 0.5955 + 0.8420i | 0.6574 + 0.7871i | 0.6302 + 0.7259i | 0.9638 + 0.5407i |
| w16 | −1.7549 + 0.3495i | 1.4070 + 0.1790i | 1.4079 + 0.1358i | 0.1457 + 1.4010i | 0.1658 + 1.6747i |
| w17 | −1.4293 + 0.2804i | 1.7227 + 0.2900i | 1.7492 + 0.2856i | 0.1866 + 1.7346i | 0.4907 + 1.6084i |
| w13 | −1.4293 + 0.2804i | 1.3246 + 0.2562i | 1.3108 + 0.2733i | 0.1174 + 1.1035i | 0.1322 + 1.3631i |
| w19 | −1.3614 + 0.2635i | 1.3636 + 0.3654i | 1.3393 + 0.4031i | 0.1095 + 1.0132i | 0.3929 + 1.3102i |
| w20 | −1.4880 + 0.991Si | 1.3708 + 1.2834i | 1.3733 + 1.2596i | 0.4357 + 1.3636i | 1.0646 + 1.2876i |
| w21 | −1.2116 + 0.8109i | 1.6701 + 0.8403i | 1.6601 + 0.8198i | 0.5853 + 1.6820i | 0.7949 + 1.4772i |
| w22 | −1.2116 + 0.8109i | 1.1614 + 0.7909i | 1.1559 + 0.7249i | 0.3439 + 1.0689i | 0.8555 + 1.0542i |
| w23 | −1.1516 + 0.7744i | 1.2241 + 0.7367i | 1.2163 + 0.6897i | 0.3234 + 0.9962i | 0.6363 + 1.2064i |
| w24 | −0.9857 + 0.2340i | 0.9769 + 0.1863i | 0.9601 + 0.1547i | 0.1092 + 0.6174i | 0.1088 + 0.9530i |
| w25 | −1.0112 + 0.2349i | 0.9452 + 0.2057i | 0.9220 + 0.1683i | 0.1074 + 0.6307i | 0.2464 + 0.9270i |
| w26 | −1.0112 + 0.2349i | 1.0100 + 0.2182i | 1.0004 + 0.1894i | 0.1109 + 0.6996i | 0.1124 + 1.1327i |
| w27 | −1.0372 + 0.2356i | 0.9795 + 0.2417i | 0.9581 + 0.2045i | 0.1076 + 0.7345i | 0.3160 + 1.0913i |
| w28 | −0.8680 + 0.5320i | 0.8241 + 0.4856i | 0.8067 + 0.4374i | 0.3291 + 0.6264i | 0.5707 + 0.7662i |
| w29 | −0.8870 + 0.5496i | 0.8232 + 0.4837i | 0.8071 + 0.4310i | 0.3126 + 0.6373i | 0.4490 + 0.8461i |
| w30 | −0.8870 + 0.5496i | 0.8799 + 0.5391i | 0.8603 + 0.4941i | 0.3392 + 0.6999i | 0.6961 + 0.8850i |
| w31 | −0.9058 + 0.5674i | 0.8796 + 0.5556i | 0.8598 + 0.4876i | 0.3202 + 0.7282i | 0.5229 + 1.0037i |
| w32 | −0.1570 + 0.3085i | 0.1376 + 0.3342i | 0.1222 + 0.4300i | 0.9652 + 0.1066i | 0.3237 + 0.0849i |
| w33 | −0.1564 + 0.3061i | 0.1383 + 0.3292i | 0.1222 + 0.4272i | 0.9075 + 0.1666i | 0.3228 + 0.0867i |
| w34 | −0.1564 + 0.3061i | 0.1363 + 0.3322i | 0.1213 + 0.4297i | 0.9724 + 0.1171i | 0.4582 + 0.1123i |
| w35 | −0.1557 + 0.3037i | 0.1370 + 0.3273i | 0.1213 + 0.4269i | 0.9186 + 0.1752i | 0.4545 + 0.1251i |
| w36 | −0.1726 + 0.3073i | 0.1655 + 0.3265i | 0.1716 + 0.3987i | 0.6342 + 0.1372i | 0.2844 + 0.1296i |
| w37 | −0.1716 + 0.3050i | 0.1656 + 0.3227i | 0.1708 + 0.3972i | 0.6550 + 0.1495i | 0.2853 + 0.1309i |
| w38 | −0.1716 + 0.3050i | 0.1634 + 0.3246i | 0.1707 + 0.3976i | 0.6290 + 0.1393i | 0.3734 + 0.2560i |
| w39 | −0.1707 + 0.3028i | 0.1636 + 0.3208i | 0.1700 + 0.3962i | 0.6494 + 0.1504i | 0.3799 + 0.2517i |
| w40 | −0.2066 + 0.6354i | 0.1779 + 0.6841i | 0.1825 + 0.7468i | 1.3127 + 0.1240i | 0.7502 + 0.1138i |
| w41 | −0.2071 + 0.6404i | 0.1828 + 0.6845i | 0.1898 + 0.7378i | 0.9572 + 0.4344i | 0.7325 + 0.2088i |
| w42 | −0.2071 + 0.6404i | 0.1745 + 0.6828i | 0.1588 + 0.7521i | 1.2403 + 0.2631i | 0.6473 + 0.1138i |
| w43 | −0.2075 + 0.6460i | 0.1793 + 0.6S29i | 0.1666 + 0.7410i | 1.0254 + 0.4130i | 0.6339 + 0.1702i |
| w44 | −0.3219 + 0.5854i | 0.3547 + 0.6009i | 0.3967 + 0.6104i | 0.6096 + 0.4214i | 0.5902 + 0.4857i |
| w45 | −0.3250 + 0.5893i | 0.3593 + 0.6011i | 0.3971 + 0.6093i | 0.6773 + 0.4284i | 0.6355 + 0.4185i |
| w46 | −0.3250 + 0.5893i | 0.3576 + 0.5990i | 0.4022 + 0.5964i | 0.5995 + 0.4102i | 0.4968 + 0.3947i |
| w47 | −0.3285 + 0.5937i | 0.3624 + 0.5994i | 0.4020 + 0.5952i | 0.6531 + 0.4101i | 0.5231 + 0.3644i |
| w48 | −0.3085 + 0.1570i | 0.2697 + 0.1443i | 0.2177 + 0.1304i | 0.1250 + 0.1153i | 0.0872 + 0.1390i |
| w49 | −0.3061 + 0.1564i | 0.2704 + 0.1433i | 0.2168 + 0.1304i | 0.1252 + 0.1158i | 0.0871 + 0.1392i |
| w50 | −0.3061 + 0.1564i | 0.2644 + 0.1442i | 0.2184 + 0.1305i | 0.1245 + 0.1152i | 0.0928 + 0.3970i |
| w51 | −0.3037 + 0.1557i | 0.2650 + 0.1432i | 0.2174 + 0.1306i | 0.1247 + 0.1156i | 0.0937 + 0.3973i |
| w52 | −0.3073 + 0.1726i | 0.2763 + 0.1638i | 0.2264 + 0.1539i | 0.3768 + 0.1244i | 0.1053 + 0.1494i |
| w53 | −0.3050 + 0.1716i | 0.2768 + 0.1626i | 0.2255 + 0.1538i | 0.3707 + 0.1237i | 0.1052 + 0.1495i |
| w54 | −0.3050 + 0.1716i | 0.2715 + 0.1630i | 0.2269 + 0.1542i | 0.3779 + 0.1260i | 0.1938 + 0.3621i |
| w55 | −0.3028 + 0.1707i | 0.2719 + 0.1618i | 0.2260 + 0.1541i | 0.3717 + 0.1252i | 0.1909 + 0.3627i |
| w56 | −0.6354 + 0.2066i | 0.6488 + 0.1696i | 0.6100 + 0.1390i | 0.1161 + 0.3693i | 0.1091 + 0.7656i |
| w57 | −0.6404 + 0.2071i | 0.6462 + 0.1706i | 0.6146 + 0.1379i | 0.1157 + 0.3645i | 0.1699 + 0.7537i |
| w58 | −0.6404 + 0.2071i | 0.6456 + 0.1745i | 0.5973 + 0.1418i | 0.1176 + 0.3469i | 0.1054 + 0.5979i |
| w59 | −0.6460 + 0.2075i | 0.6431 + 0.1753i | 0.6021 + 0.1407i | 0.1171 + 0.3424i | 0.1230 + 0.5949i |
| w60 | −0.5854 + 0.3219i | 0.5854 + 0.3186i | 0.5671 + 0.2989i | 0.3530 + 0.3899i | 0.4294 + 0.6363i |
| w61 | −0.5893 + 0.3250i | 0.5862 + 0.3167i | 0.5699 + 0.2952i | 0.3422 + 0.3808i | 0.3744 + 0.6744i |
| w62 | −0.5893 + 0.3250i | 0.5864 + 0.3275i | 0.5622 + 0.3050i | 0.3614 + 0.3755i | 0.3224 + 0.5236i |
| w63 | −0.5937 + 0.3285i | 0.5873 + 0.3254i | 0.5648 + 0.3012i | 0.3509 + 0.3656i | 0.3016 + 0.5347i |

| w/code rate | 10/15 | 11/15 | 12/15 | 13/15 |
|---|---|---|---|---|
| w0 | 1.6097 + 0.1548i | 0.1512 + 1.5761i | 1.1980 + 1.1541i | 1.1014 + 1.1670i |
| w1 | 1.5549 + 0.4605i | 0.4510 + 1.5251i | 0.9192 + 1.2082i | 0.8557 + 1.2421i |
| w2 | 1.3226 + 0.1290i | 0.1269 + 1.3158i | 1.2778 + 0.8523i | 1.2957 + 0.8039i |
| w3 | 1.2772 + 0.3829i | 0.3773 + 1.2728i | 1.0390 + 0.9253i | 1.0881 + 0.8956i |
| w4 | 1.2753 + 1.0242i | 1.0045 + 1.2537i | 0.6057 + 1.2200i | 0.5795 + 1.2110i |
| w5 | 1.4434 + 0.7540i | 0.7386 + 1.4164i | 0.7371 + 1.4217i | 0.6637 + 1.4215i |
| w6 | 1.0491 + 0.8476i | 0.8392 + 1.0508i | 0.6678 + 1.0021i | 0.6930 + 1.0082i |
| w7 | 1.1861 + 0.6253i | 0.6172 + 1.1844i | 0.8412 + 0.9448i | 0.8849 + 0.9647i |
| w8 | 0.9326 + 0.0970i | 0.0939 + 0.9317i | 1.2128 + 0.5373i | 1.2063 + 0.5115i |
| w9 | 0.3962 + 0.2804i | 0.2781 + 0.8975i | 1.0048 + 0.5165i | 1.0059 + 0.4952i |
| w10 | 1.1044 + 0.1102i | 0.1093 + 1.1073i | 1.4321 + 0.6343i | 1.4171 + 0.5901i |
| w11 | 1.0648 + 0.3267i | 0.3230 + 1.0701i | 1.0245 + 0.7152i | 1.0466 + 0.6935i |
| w12 | 0.7325 + 0.6071i | 0.6074 + 0.7404i | 0.6384 + 0.6073i | 0.6639 + 0.6286i |
| w13 | 0.8260 + 0.4559i | 0.4499 + 0.8324i | 0.8175 + 0.5684i | 0.8353 + 0.5851i |
| w14 | 0.8744 + 0.7153i | 0.7128 + 0.8852i | 0.6568 + 0.7801i | 0.6879 + 0.8022i |
| w15 | 0.9882 + 0.5300i | 0.5259 + 0.9957i | 0.8311 + 0.7459i | 0.8634 + 0.7622i |
| w16 | 0.1646 + 1.6407i | 1.6163 + 0.1632i | 0.1349 + 1.4742i | 0.1213 + 1.4366i |
| w17 | 0.4867 + 1.5743i | 1.5486 + 0.4813i | 0.1105 + 1.2309i | 0.1077 + 1.2098i |
| w13 | 0.1363 + 1.3579i | 1.3596 + 0.1381i | 0.0634 + 0.9796i | 0.0651 + 0.9801i |
| w19 | 0.4023 + 1.3026i | 1.3018 + 0.4076i | 0.1891 + 1.0198i | 0.2009 + 1.0115i |
| w20 | 1.0542 + 1.2584i | 1.2347 + 1.0376i | 0.4142 + 1.4461i | 0.3764 + 1.4264i |
| w21 | 0.7875 + 1.4450i | 1.4193 + 0.7769i | 0.3323 + 1.2279i | 0.3237 + 1.2130i |
| w22 | 0.3637 + 1.0407i | 1.0335 + 0.8734i | 0.4998 + 0.9827i | 0.5205 + 0.9814i |

-continued

| | | | | | |
|---|---|---|---|---|---|
| w23 | 0.6502 + 1.1951i | 1.1905 + 0.6562i | 0.3467 + 1.0202i | 0.3615 + 1.0163i | |
| w24 | 0.0982 + 0.9745i | 0.9948 + 0.1006i | 0.0680 + 0.6501i | 0.0715 + 0.6596i | |
| w25 | 0.2842 + 0.9344i | 0.9492 + 0.2955i | 0.2016 + 0.6464i | 0.2116 + 0.6597i | |
| w26 | 0.1142 + 1.1448i | 1.1596 + 0.1180i | 0.0719 + 0.8075i | 0.0729 + 0.8131i | |
| w27 | 0.3335 + 1.0973i | 1.1091 + 0.3468i | 0.2088 + 0.8146i | 0.2158 + 0.8246i | |
| w28 | 0.6062 + 0.7465i | 0.7476 + 0.6205i | 0.4809 + 0.6296i | 0.5036 + 0.6467i | |
| w29 | 0.4607 + 0.8538i | 0.8645 + 0.4711i | 0.3374 + 0.6412i | 0.3526 + 0.6572i | |
| w30 | 0.7263 + 0.8764i | 0.8777 + 0.7384i | 0.4955 + 0.8008i | 0.5185 + 0.S086i | |
| w31 | 0.5450 + 1.0067i | 1.0128 + 0.5570i | 0.3431 + 0.8141i | 0.3593 + 0.8245i | |
| w32 | 0.2655 + 0.0746i | 0.0723 + 0.2545i | 1.2731 + 0.1108i | 1.2545 + 0.1010i | |
| w33 | 0.2664 + 0.0759i | 0.0761 + 0.2566i | 1.0794 + 0.0977i | 1.0676 + 0.0956i | |
| w34 | 0.4571 + 0.0852i | 0.0729 + 0.4512i | 1.5126 + 0.1256i | 1.4782 + 0.1167i | |
| w35 | 0.4516 + 0.1062i | 0.1145 + 0.4434i | 0.9029 + 0.0853i | 0.8981 + 0.0882i | |
| w36 | 0.2559 + 0.1790i | 0.2114 + 0.2443i | 0.5429 + 0.0694i | 0.5518 + 0.0690i | |
| w37 | 0.2586 + 0.1772i | 0.2043 + 0.2508i | 0.6795 + 0.0559i | 0.6903 + 0.0552i | |
| w38 | 0.3592 + 0.2811i | 0.3079 + 0.3516i | 0.5628 + 0.1945i | 0.5742 + 0.1987i | |
| w39 | 0.3728 + 0.2654i | 0.2673 + 0.3812i | 0.7326 + 0.1410i | 0.7374 + 0.1564i | |
| w40 | 0.7706 + 0.0922i | 0.0813 + 0.7729i | 1.2283 + 0.3217i | 1.2378 + 0.3049i | |
| w41 | 0.7407 + 0.2260i | 0.2345 + 0.7412i | 1.0269 + 0.3261i | 1.0518 + 0.3032i | |
| w42 | 0.6180 + 0.0927i | 0.0756 + 0.6187i | 1.4663 + 0.3716i | 1.4584 + 0.3511i | |
| w43 | 0.6019 + 0.1658i | 0.1815 + 0.5946i | 0.9085 + 0.2470i | 0.9107 + 0.2603i | |
| w44 | 0.6007 + 0.4980i | 0.5118 + 0.6039i | 0.6160 + 0.4549i | 0.6321 + 0.4729i | |
| w45 | 0.6673 + 0.3928i | 0.3821 + 0.6808i | 0.7818 + 0.4247i | 0.7880 + 0.4392i | |
| w46 | 0.4786 + 0.3935i | 0.4145 + 0.4734i | 0.5938 + 0.3170i | 0.6045 + 0.3274i | |
| w47 | 0.5176 + 0.3391i | 0.3230 + 0.5340i | 0.7600 + 0.2850i | 0.7629 + 0.2965i | |
| w48 | 0.0757 + 0.1003i | 0.0858 + 0.0734i | 0.0595 + 0.0707i | 0.0596 + 0.0739i | |
| w49 | 0.0753 + 0.1004i | 0.0860 + 0.0722i | 0.1722 + 0.0706i | 0.1767 + 0.0731i | |
| w50 | 0.0777 + 0.4788i | 0.5212 + 0.0693i | 0.0599 + 0.2119i | 0.0612 + 0.2198i | |
| w51 | 0.0867 + 0.4754i | 0.5118 + 0.0896i | 0.1748 + 0.2114i | 0.1815 + 0.2192i | |
| w52 | 0.1023 + 0.2243i | 0.2611 + 0.0940i | 0.4134 + 0.0701i | 0.4218 + 0.0715i | |
| w53 | 0.1010 + 0.2242i | 0.2628 + 0.0898i | 0.2935 + 0.0705i | 0.2978 + 0.0725i | |
| w54 | 0.1950 + 0.3919i | 0.4159 + 0.2145i | 0.4231 + 0.2066i | 0.4337 + 0.2115i | |
| w55 | 0.1881 + 0.3969i | 0.4287 + 0.1928i | 0.2979 + 0.2100i | 0.3057 + 0.2167i | |
| w56 | 0.0930 + 0.8122i | 0.8427 + 0.0848i | 0.0638 + 0.5002i | 0.0667 + 0.5124i | |
| w57 | 0.2215 + 0.7840i | 0.8036 + 0.2443i | 0.1905 + 0.4966i | 0.2008 + 0.5095i | |
| w58 | 0.0937 + 0.6514i | 0.6933 + 0.0788i | 0.0612 + 0.3552i | 0.0625 + 0.3658i | |
| w59 | 0.1540 + 0.6366i | 0.6649 + 0.1793i | 0.1810 + 0.3533i | 0.1899 + 0.3642i | |
| w60 | 0.4810 + 0.6306i | 0.6321 + 0.5048i | 0.4630 + 0.4764i | 0.4818 + 0.4946i | |
| w61 | 0.3856 + 0.7037i | 0.7279 + 0.3892i | 0.3231 + 0.4895i | 0.3380 + 0.5050i | |
| w62 | 0.3527 + 0.5230i | 0.5265 + 0.3752i | 0.4416 + 0.3397i | 0.4571 + 0.3499i | |
| w63 | 0.3100 + 0.5559i | 0.5885 + 0.3076i | 0.3083 + 0.3490i | 0.3216 + 0.3599i | |

C4) 1024-QQAM NUC

| w/code | 5/15 | 6/15 | 7/15 | 8/15 | 9/15 |
|---|---|---|---|---|---|
| w0 | 1.9734 + 0.6475i | 1.3555 + 1.1873i | 0.1119 + 1.7802i | 0.0966 + 1.7257i | 0.1003 + 1.7258i |
| w1 | 1.7794 + 0.9784i | 1.0871 + 1.4324i | 0.2324 + 2.0028i | 0.1799 + 1.9540i | 0.1722 + 1.9393i |
| w2 | 0.4642 + 1.8997i | 1.5003 + 1.4954i | 0.1416 + 1.5629i | 0.1216 + 1.5846i | 0.0956 + 1.5505i |
| w3 | 0.8851 + 1.9829i | 1.1127 + 1.7206i | 0.1594 + 1.5242i | 0.2925 + 1.5646i | 0.2621 + 1.5384i |
| w4 | 0.245S + 1.4077i | 0.2080 + 2.0408i | 0.8323 + 1.8356i | 0.7016 + 1.7899i | 0.6393 + 1.7656i |
| w5 | 0.2330 + 1.3704i | 0.7958 + 1.4948i | 0.5102 + 1.8340i | 0.4407 + 1.8294i | 0.3969 + 1.7846i |
| w6 | 0.2534 + 1.4887i | 0.5864 + 1.9337i | 0.4029 + 1.5128i | 0.6347 + 1.5255i | 0.6050 + 1.5226i |
| w7 | 0.2390 + 1.4079i | 0.7534 + 1.6241i | 0.4052 + 1.5296i | 0.4512 + 1.5701i | 0.4221 + 1.5525i |
| w8 | 2.0528 + 0.2197i | 1.0007 + 1.0906i | 0.1148 + 1.2394i | 0.0862 + 1.3505i | 0.0799 + 1.3199i |
| w9 | 1.6003 + 1.3185i | 0.9660 + 1.1761i | 0.1154 + 1.2420i | 0.2378 + 1.3237i | 0.2425 + 1.3020i |
| w10 | 0.1805 + 2.0047i | 0.9193 + 1.0471i | 0.1214 + 1.2990i | 0.0908 + 1.3996i | 0.0833 + 1.3795i |
| w11 | 1.3579 + 1.6516i | 0.8984 + 1.1061i | 0.1225 + 1.3035i | 0.2515 + 1.3739i | 0.2487 + 1.3670i |
| w12 | 0.1550 + 1.4302i | 0.8715 + 1.0845i | 0.3454 + 1.2010i | 0.5334 + 1.2483i | 0.5352 + 1.2272i |
| w13 | 0.1532 + 1.3846i | 0.8468 + 1.2089i | 0.3437 + 1.2030i | 0.4112 + 1.2843i | 0.3974 + 1.2734i |
| w14 | 0.1492 + 1.5422i | 0.8508 + 1.0556i | 0.3550 + 1.2490i | 0.5634 + 1.3178i | 0.5666 + 1.3364i |
| w15 | 0.1517 + 1.4313i | 0.8263 + 1.1474i | 0.3538 + 1.2523i | 0.4201 + 1.3450i | 0.4117 + 1.3592i |
| w16 | 0.7168 + 1.4422i | 1.3097 + 0.8498i | 1.0272 + 1.4142i | 1.3853 + 1.1272i | 1.4270 + 1.2101i |
| w17 | 0.7660 + 1.4662i | 1.2703 + 0.7763i | 0.9293 + 1.2912i | 1.3369 + 1.3509i | 1.2720 + 1.3913i |
| w18 | 0.7079 + 1.5478i | 1.2081 + 0.7277i | 1.0481 + 1.1977i | 1.2114 + 1.0355i | 1.2297 + 1.0783i |
| w19 | 0.7980 + 1.5832i | 1.2071 + 0.6996i | 1.0032 + 1.1946i | 1.1082 + 1.1877i | 1.1069 + 1.2225i |
| w20 | 0.5674 + 1.2974i | 1.0048 + 0.6022i | 0.8044 + 1.5410i | 0.9388 + 1.6673i | 0.8723 + 1.6736i |
| w21 | 0.5570 + 1.2867i | 1.0126 + 0.5967i | 0.7504 + 1.3903i | 1.1497 + 1.5199i | 1.0846 + 1.5470i |
| w22 | 0.5617 + 1.3143i | 1.0323 + 0.6017i | 0.6179 + 1.4465i | 0.8175 + 1.4408i | 0.7883 + 1.4518i |
| w23 | 0.5529 + 1.2989i | 1.0417 + 0.5962i | 0.6325 + 1.4075i | 0.9821 + 1.3219i | 0.9583 + 1.3483i |
| w24 | 0.8742 + 1.2358i | 1.0660 + 0.8517i | 0.8146 + 1.0099i | 0.9456 + 0.9078i | 0.9564 + 0.8979i |
| w25 | 1.0042 + 1.2986i | 1.0641 + 0.8183i | 0.8127 + 1.0327i | 0.8986 + 0.9677i | 0.8843 + 0.9882i |
| w26 | 0.8860 + 1.2440i | 1.0285 + 0.8226i | 0.8473 + 1.0124i | 1.0292 + 0.9494i | 1.0738 + 0.9718i |
| w27 | 1.0594 + 1.3586i | 1.0409 + 0.7932i | 0.8449 + 1.0337i | 0.9610 + 1.0336i | 0.9788 + 1.0896i |
| w28 | 0.7008 + 1.1590i | 0.9638 + 0.7014i | 0.5913 + 1.1381i | 0.6851 + 1.1662i | 0.6658 + 1.1650i |
| w29 | 0.6902 + 1.1593i | 0.9746 + 0.6713i | 0.6094 + 1.1512i | 0.7736 + 1.1030i | 0.7770 + 1.0888i |

-continued

| | | | | | |
|---|---|---|---|---|---|
| w30 | 0.7007 + 1.1521i | 0.9707 + 0.7014i | 0.5776 + 1.1648i | 0.7229 + 1.2479i | 0.7185 + 1.2809i |
| w31 | 0.6896 + 1.1523i | 0.9855 + 0.6704i | 0.5938 + 1.1785i | 0.8384 + 1.1668i | 0.8561 + 1.1944i |
| w32 | 0.1611 + 0.9287i | 0.1594 + 1.5423i | 0.1087 + 0.9091i | 0.0966 + 1.0145i | 0.0797 + 1.0130i |
| w33 | 0.1608 + 0.9363i | 0.4384 + 1.3764i | 0.1086 + 0.9089i | 0.1317 + 1.0089i | 0.1572 + 1.0022i |
| w34 | 0.1614 + 0.9216i | 0.1970 + 1.5197i | 0.1087 + 0.9043i | 0.0967 + 1.0148i | 0.0798 + 1.0164i |
| w35 | 0.1611 + 0.9285i | 0.4247 + 1.3981i | 0.1087 + 0.9041i | 0.1321 + 1.0094i | 0.1595 + 1.0061i |
| w36 | 0.1712 + 1.0245i | 0.1795 + 1.6689i | 0.2745 + 0.8789i | 0.3350 + 0.9404i | 0.3545 + 0.9275i |
| w37 | 0.1697 + 1.0409i | 0.5087 + 1.4080i | 0.2738 + 0.8784i | 0.3155 + 0.9521i | 0.3073 + 0.9500i |
| w38 | 0.1718 + 1.0083i | 0.2493 + 1.6121i | 0.2739 + 0.8757i | 0.3367 + 0.9420i | 0.3612 + 0.9352i |
| w39 | 0.1708 + 1.0242i | 0.4934 + 1.4431i | 0.2735 + 0.8752i | 0.3169 + 0.9535i | 0.3106 + 0.9572i |
| w40 | 0.1550 + 0.9260i | 0.6215 + 0.9847i | 0.1067 + 1.0307i | 0.0929 + 1.1822i | 0.0757 + 1.1766i |
| w41 | 0.1543 + 0.9335i | 0.5972 + 1.0599i | 0.1069 + 1.0300i | 0.1873 + 1.1711i | 0.2119 + 1.1624i |
| w42 | 0.1556 + 0.9190i | 0.6316 + 0.9798i | 0.1079 + 1.0156i | 0.0940 + 1.1707i | 0.0756 + 1.1591i |
| w43 | 0.1551 + 0.9258i | 0.6074 + 1.0427i | 0.1077 + 1.0150i | 0.1834 + 1.1604i | 0.2059 + 1.1425i |
| w44 | 0.1582 + 1.0189i | 0.6300 + 1.0019i | 0.3076 + 1.0010i | 0.4382 + 1.0945i | 0.4674 + 1.0931i |
| w45 | 0.1556 + 1.0360i | 0.6093 + 1.0947i | 0.3060 + 0.9997i | 0.3734 + 1.1192i | 0.3582 + 1.1287i |
| w46 | 0.1601 + 1.0026i | 0.6399 + 0.9951i | 0.3080 + 0.9912i | 0.4257 + 1.0781i | 0.4464 + 1.0591i |
| w47 | 0.1580 + 1.0187i | 0.6168 + 1.0734i | 0.3061 + 0.9896i | 0.3674 + 1.1037i | 0.3492 + 1.0994i |
| w48 | 0.4305 + 0.8503i | 0.6548 + 0.5942i | 0.6039 + 0.7137i | 0.6162 + 0.7109i | 0.6167 + 0.6970i |
| w49 | 0.4276 + 0.8519i | 0.6548 + 0.5843i | 0.6032 + 0.7136i | 0.6144 + 0.7145i | 0.6104 + 0.7078i |
| w50 | 0.4301 + 0.8475i | 0.6527 + 0.5981i | 0.6030 + 0.7126i | 0.6198 + 0.7139i | 0.6332 + 0.7078i |
| w51 | 0.4273 + 0.8489i | 0.6524 + 0.5877i | 0.6024 + 0.7124i | 0.6179 + 0.7177i | 0.6256 + 0.7206i |
| w52 | 0.4534 + 0.9213i | 0.7095 + 0.5855i | 0.4771 + 0.7956i | 0.4894 + 0.8433i | 0.4840 + 0.8400i |
| w53 | 0.4482 + 0.9250i | 0.7116 + 0.5764i | 0.4770 + 0.7949i | 0.4962 + 0.8351i | 0.5034 + 0.8211i |
| w54 | 0.4535 + 0.9141i | 0.7054 + 0.5909i | 0.4761 + 0.7943i | 0.4924 + 0.8463i | 0.4939 + 0.8521i |
| w55 | 0.4485 + 0.9174i | 0.7071 + 0.5813i | 0.4760 + 0.7936i | 0.4995 + 0.8381i | 0.5165 + 0.8320i |
| w56 | 0.4694 + 0.8468i | 0.6632 + 0.6851i | 0.6996 + 0.8382i | 0.7823 + 0.8229i | 0.8208 + 0.8194i |
| w57 | 0.4651 + 0.8471i | 0.6607 + 0.6616i | 0.6979 + 0.8370i | 0.7702 + 0.8443i | 0.7795 + 0.8678i |
| w58 | 0.4688 + 0.8444i | 0.6646 + 0.6947i | 0.6978 + 0.8327i | 0.7576 + 0.8080i | 0.7654 + 0.7871i |
| w59 | 0.4646 + 0.8447i | 0.6610 + 0.6704i | 0.6962 + 0.8314i | 0.7479 + 0.8250i | 0.7366 + 0.8230i |
| w60 | 0.5028 + 0.9103i | 0.7067 + 0.6677i | 0.5209 + 0.9384i | 0.6015 + 1.0047i | 0.5960 + 1.0246i |
| w61 | 0.4954 + 0.9108i | 0.7094 + 0.6445i | 0.5212 + 0.9362i | 0.6374 + 0.9795i | 0.6739 + 0.9765i |
| w62 | 0.5026 + 0.9052i | 0.7058 + 0.6791i | 0.5174 + 0.9321i | 0.5872 + 0.9815i | 0.5730 + 0.9785i |
| w63 | 0.4954 + 0.9055i | 0.7074 + 0.6548i | 0.5173 + 0.9297i | 0.6168 + 0.9591i | 0.6332 + 0.9357i |
| w64 | 1.5469 + 0.5626i | 1.6936 + 1.0501i | 1.9725 + 0.1409i | 1.9480 + 0.1481i | 1.8978 + 0.1329i |
| w65 | 1.5047 + 0.6160i | 1.9944 + 0.7935i | 1.9915 + 0.4357i | 1.6746 + 0.0974i | 1.6495 + 0.0908i |
| w66 | 1.3738 + 0.4946i | 1.3942 + 0.1121i | 1.6673 + 0.1308i | 1.4082 + 0.0951i | 1.3940 + 0.0760i |
| w67 | 1.3649 + 0.5049i | 1.3717 + 0.1144i | 1.6321 + 0.1768i | 1.4516 + 0.1035i | 1.4413 + 0.1092i |
| w68 | 1.3196 + 0.4650i | 1.0307 + 0.1191i | 1.5727 + 0.6014i | 1.8289 + 0.4101i | 1.8256 + 0.3950i |
| w69 | 1.3158 + 0.4688i | 1.0338 + 0.1191i | 1.8127 + 0.6892i | 1.6508 + 0.2818i | 1.6372 + 0.2691i |
| w70 | 1.2898 + 0.4456i | 1.1039 + 0.1200i | 1.5630 + 0.4516i | 1.4163 + 0.3400i | 1.4120 + 0.3476i |
| w71 | 1.2884 + 0.4467i | 1.1098 + 0.1196i | 1.6016 + 0.3840i | 1.4507 + 0.3041i | 1.4494 + 0.2700i |
| w72 | 1.6559 + 0.1897i | 1.7938 + 0.1356i | 1.3202 + 0.1147i | 1.1659 + 0.1018i | 1.1536 + 0.0892i |
| w73 | 1.5179 + 0.1778i | 2.0345 + 0.2783i | 1.3218 + 0.1223i | 1.1609 + 0.1045i | 1.1504 + 0.1147i |
| w74 | 1.4640 + 0.1827i | 1.4715 + 0.1190i | 1.3747 + 0.1240i | 1.2293 + 0.1016i | 1.2370 + 0.0895i |
| w75 | 1.4219 + 0.1747i | 1.4204 + 0.1246i | 1.3790 + 0.1334i | 1.2169 + 0.1055i | 1.2259 + 0.1210i |
| w76 | 1.4105 + 0.1820i | 1.0246 + 0.1169i | 1.2916 + 0.4109i | 1.1530 + 0.3086i | 1.1410 + 0.3239i |
| w77 | 1.3863 + 0.1750i | 1.0275 + 0.1169i | 1.2789 + 0.3878i | 1.1493 + 0.3027i | 1.1412 + 0.2881i |
| w78 | 1.3673 + 0.1851i | 1.0922 + 0.1187i | 1.3285 + 0.3971i | 1.2238 + 0.3152i | 1.2488 + 0.3303i |
| w79 | 1.3567 + 0.1780i | 1.0982 + 0.1184i | 1.3164 + 0.3727i | 1.2129 + 0.3073i | 1.2365 + 0.2820i |
| w80 | 1.1863 + 0.7845i | 1.5434 + 0.7244i | 1.2691 + 1.5656i | 1.6390 + 1.1100i | 1.5621 + 1.0168i |
| w81 | 1.2415 + 0.8159i | 1.5406 + 0.6573i | 1.4951 + 1.3067i | 1.5553 + 0.8585i | 1.5618 + 0.8013i |
| w82 | 1.1494 + 0.7611i | 1.3607 + 0.4309i | 1.2022 + 1.0523i | 1.2808 + 0.8598i | 1.3176 + 0.9273i |
| w83 | 1.1827 + 0.7792i | 1.3555 + 0.4468i | 1.2512 + 1.0757i | 1.3544 + 0.7773i | 1.3667 + 0.7657i |
| w84 | 1.1076 + 0.7355i | 1.0258 + 0.3527i | 1.4652 + 0.7406i | 1.6452 + 0.5697i | 1.6308 + 0.5333i |
| w85 | 1.1303 + 0.7414i | 1.0288 + 0.3578i | 1.6787 + 0.9971i | 1.8084 + 0.7652i | 1.7890 + 0.7298i |
| w86 | 1.0983 + 0.7232i | 1.0909 + 0.3601i | 1.3845 + 0.8297i | 1.4221 + 0.5360i | 1.4307 + 0.4998i |
| w87 | 1.1152 + 0.7262i | 1.0957 + 0.3657i | 1.4003 + 0.9431i | 1.3824 + 0.5909i | 1.3837 + 0.6127i |
| w88 | 1.0345 + 0.9742i | 1.6599 + 0.4298i | 1.0078 + 0.8244i | 1.0340 + 0.7391i | 1.0281 + 0.7705i |
| w89 | 1.1011 + 1.0156i | 1.6784 + 0.4687i | 1.0057 + 0.8180i | 1.0451 + 0.7019i | 1.0650 + 0.6889i |
| w90 | 1.0197 + 0.9589i | 1.4321 + 0.3566i | 1.0397 + 0.8590i | 1.1099 + 0.7731i | 1.1472 + 0.8418i |
| w91 | 1.0694 + 0.9950i | 1.4129 + 0.3717i | 1.0328 + 0.8510i | 1.1202 + 0.7192i | 1.1907 + 0.7241i |
| w92 | 0.9596 + 0.9120i | 1.0173 + 0.3328i | 1.2051 + 0.6323i | 1.1139 + 0.5015i | 1.1184 + 0.4819i |
| w93 | 0.9791 + 0.9149i | 1.0197 + 0.3375i | 1.1706 + 0.6245i | 1.1120 + 0.5168i | 1.1069 + 0.5409i |
| w94 | 0.9570 + 0.9021i | 1.0770 + 0.3368i | 1.2080 + 0.6634i | 1.1853 + 0.5143i | 1.2340 + 0.4863i |
| w95 | 0.9734 + 0.9037i | 1.0813 + 0.3415i | 1.1727 + 0.6492i | 1.1855 + 0.5378i | 1.2237 + 0.5735i |
| w96 | 0.9735 + 0.2722i | 0.6486 + 0.1129i | 0.9439 + 0.1093i | 0.8385 + 0.0878i | 0.8339 + 0.0846i |
| w97 | 0.9760 + 0.2688i | 0.6481 + 0.1134i | 0.9437 + 0.1096i | 0.8386 + 0.0880i | 0.8336 + 0.0873i |
| w98 | 0.9858 + 0.2783i | 0.6394 + 0.1125i | 0.9423 + 0.1100i | 0.8388 + 0.0878i | 0.8392 + 0.0851i |
| w99 | 0.9886 + 0.2747i | 0.6388 + 0.1129i | 0.9423 + 0.1101i | 0.8388 + 0.0880i | 0.8390 + 0.0880i |
| w100 | 0.9973 + 0.2866i | 0.7450 + 0.1144i | 0.9180 + 0.2421i | 0.8158 + 0.2520i | 0.8098 + 0.2558i |
| w101 | 1.0007 + 0.2829i | 0.7438 + 0.1150i | 0.9185 + 0.2421i | 0.8156 + 0.2515i | 0.8100 + 0.2529i |
| w102 | 1.0124 + 0.2932i | 0.7230 + 0.1146i | 0.9172 + 0.2415i | 0.8167 + 0.2524i | 0.8176 + 0.2581i |
| w103 | 1.0156 + 0.2894i | 0.7219 + 0.1151i | 0.9178 + 0.2417i | 0.8165 + 0.2521i | 0.8179 + 0.2549i |
| w104 | 1.0020 + 0.1705i | 0.6508 + 0.1099i | 1.1232 + 0.1104i | 0.9987 + 0.0950i | 1.0049 + 0.0907i |
| w105 | 1.0074 + 0.1670i | 0.6502 + 0.1104i | 1.1238 + 0.1134i | 1.0002 + 0.0959i | 1.0062 + 0.1014i |
| w106 | 1.0163 + 0.1718i | 0.6412 + 0.1095i | 1.1140 + 0.1133i | 0.9842 + 0.0938i | 0.9787 + 0.0904i |
| w107 | 1.0223 + 0.1679i | 0.6407 + 0.1099i | 1.1151 + 0.1163i | 0.9858 + 0.0946i | 0.9795 + 0.0992i |
| w108 | 1.0286 + 0.1747i | 0.7492 + 0.1114i | 1.0835 + 0.3155i | 0.9815 + 0.2840i | 0.9920 + 0.2940i |

-continued

| | | | | | |
|---|---|---|---|---|---|
| w109 | 1.0350 + 0.1706i | 0.7480 + 0.1119i | 1.0867 + 0.3167i | 0.9827 + 0.2819i | 0.9935 + 0.2797i |
| w110 | 1.0455 + 0.1760i | 0.7273 + 0.1114i | 1.0770 + 0.3117i | 0.9640 + 0.2806i | 0.9572 + 0.2864i |
| w111 | 1.0525 + 0.1716i | 0.7261 + 0.1120i | 1.0804 + 0.3126i | 0.9653 + 0.2791i | 0.9590 + 0.2755i |
| w112 | 0.7928 + 0.5945i | 0.6514 + 0.3325i | 0.7575 + 0.5588i | 0.7081 + 0.5671i | 0.7002 + 0.5651i |
| w113 | 0.7897 + 0.5907i | 0.6514 + 0.3347i | 0.7580 + 0.5589i | 0.7084 + 0.5650i | 0.7022 + 0.5593i |
| w114 | 0.8003 + 0.5948i | 0.6438 + 0.3315i | 0.7568 + 0.5578i | 0.7111 + 0.5692i | 0.7158 + 0.5744i |
| w115 | 0.7970 + 0.5910i | 0.6438 + 0.3338i | 0.7573 + 0.5581i | 0.7113 + 0.5670i | 0.7181 + 0.5674i |
| w116 | 0.8160 + 0.6049i | 0.7361 + 0.3361i | 0.8354 + 0.4419i | 0.7707 + 0.4169i | 0.7657 + 0.4118i |
| w117 | 0.8129 + 0.6005i | 0.7356 + 0.3388i | 0.8364 + 0.4424i | 0.7706 + 0.4179i | 0.7647 + 0.4153i |
| w118 | 0.8244 + 0.6048i | 0.7203 + 0.3375i | 0.8348 + 0.4413i | 0.7726 + 0.4178i | 0.7777 + 0.4162i |
| w119 | 0.8214 + 0.6005i | 0.7199 + 0.3401i | 0.8357 + 0.4419i | 0.7727 + 0.4187i | 0.7768 + 0.4204i |
| w120 | 0.7429 + 0.6578i | 0.6521 + 0.3194i | 0.8669 + 0.6851i | 0.8775 + 0.6587i | 0.8969 + 0.6804i |
| w121 | 0.7394 + 0.6522i | 0.6520 + 0.3218i | 0.8702 + 0.6831i | 0.8810 + 0.6474i | 0.9133 + 0.6445i |
| w122 | 0.7471 + 0.6586i | 0.6441 + 0.3185i | 0.8641 + 0.6821i | 0.8558 + 0.6467i | 0.8465 + 0.6504i |
| w123 | 0.7435 + 0.6530i | 0.6441 + 0.3207i | 0.8674 + 0.6805i | 0.8591 + 0.6378i | 0.8578 + 0.6258i |
| w124 | 0.7608 + 0.6810i | 0.7398 + 0.3226i | 0.9918 + 0.5150i | 0.9442 + 0.4649i | 0.9649 + 0.4631i |
| w125 | 0.7572 + 0.6740i | 0.7392 + 0.3253i | 0.9952 + 0.5177i | 0.9446 + 0.4697i | 0.9612 + 0.4859i |
| w126 | 0.7652 + 0.6815i | 0.7233 + 0.3240i | 0.9852 + 0.5133i | 0.9241 + 0.4600i | 0.9194 + 0.4551i |
| w127 | 0.7617 + 0.6746i | 0.7228 + 0.3268i | 0.9888 + 0.5164i | 0.9246 + 0.4640i | 0.9160 + 0.4712i |
| w128 | 0.1292 + 0.2157i | 0.1046 + 0.9193i | 0.0853 + 0.3377i | 0.0692 + 0.0842i | 0.0662 + 0.0839i |
| w129 | 0.1293 + 0.2160i | 0.1097 + 0.9188i | 0.0863 + 0.3374i | 0.0693 + 0.0843i | 0.0662 + 0.0839i |
| w130 | 0.1292 + 0.2152i | 0.1045 + 0.9180i | 0.0863 + 0.3374i | 0.0693 + 0.0842i | 0.0663 + 0.0838i |
| w131 | 0.1293 + 0.2155i | 0.1095 + 0.9177i | 0.0863 + 0.3371i | 0.0693 + 0.0843i | 0.0662 + 0.0838i |
| w132 | 0.1290 + 0.2197i | 0.1041 + 0.9237i | 0.0891 + 0.3353i | 0.0693 + 0.0845i | 0.0659 + 0.0848i |
| w133 | 0.1290 + 0.2200i | 0.1094 + 0.9231i | 0.0891 + 0.3350i | 0.0693 + 0.0844i | 0.0658 + 0.0848i |
| w134 | 0.1290 + 0.2192i | 0.1039 + 0.9226i | 0.0891 + 0.3349i | 0.0692 + 0.0846i | 0.0658 + 0.0847i |
| w135 | 0.1290 + 0.2195i | 0.1091 + 0.9218i | 0.0891 + 0.3348i | 0.0693 + 0.0844i | 0.0658 + 0.0847i |
| w136 | 0.1296 + 0.2151i | 0.1540 + 0.8701i | 0.1160 + 0.4413i | 0.0699 + 0.5333i | 0.0641 + 0.5375i |
| w137 | 0.1296 + 0.2154i | 0.1581 + 0.8741i | 0.1161 + 0.4411i | 0.0698 + 0.5333i | 0.0640 + 0.5374i |
| w138 | 0.1296 + 0.2146i | 0.1538 + 0.8693i | 0.1163 + 0.4410i | 0.0697 + 0.5334i | 0.0640 + 0.5377i |
| w139 | 0.1296 + 0.2149i | 0.1579 + 0.8731i | 0.1162 + 0.4409i | 0.0697 + 0.5330i | 0.0640 + 0.5377i |
| w140 | 0.1293 + 0.2191i | 0.1530 + 0.8726i | 0.1295 + 0.4371i | 0.0818 + 0.5272i | 0.0828 + 0.5271i |
| w141 | 0.1294 + 0.2194i | 0.1571 + 0.8765i | 0.1294 + 0.4370i | 0.0817 + 0.5270i | 0.0828 + 0.5270i |
| w142 | 0.1293 + 0.2186i | 0.1527 + 0.8717i | 0.1297 + 0.4368i | 0.0817 + 0.5271i | 0.0830 + 0.5271i |
| w143 | 0.1294 + 0.2189i | 0.1569 + 0.8755i | 0.1295 + 0.4367i | 0.0816 + 0.5270i | 0.0827 + 0.5271i |
| w144 | 0.1499 + 0.2251i | 0.1387 + 0.6051i | 0.1325 + 0.2882i | 0.0839 + 0.2583i | 0.0816 + 0.2715i |
| w145 | 0.1501 + 0.2254i | 0.1385 + 0.6035i | 0.1326 + 0.2882i | 0.0838 + 0.2584i | 0.0816 + 0.2716i |
| w146 | 0.1498 + 0.2247i | 0.1386 + 0.6054i | 0.1324 + 0.2881i | 0.0840 + 0.2585i | 0.0816 + 0.2716i |
| w147 | 0.1499 + 0.2250i | 0.1385 + 0.6038i | 0.1325 + 0.2881i | 0.0839 + 0.2585i | 0.0816 + 0.2716i |
| w148 | 0.1501 + 0.2286i | 0.1381 + 0.6038i | 0.1347 + 0.2891i | 0.0822 + 0.2580i | 0.0765 + 0.2732i |
| w149 | 0.1502 + 0.2289i | 0.1380 + 0.6021i | 0.1347 + 0.2892i | 0.0823 + 0.2580i | 0.0765 + 0.2733i |
| w150 | 0.1500 + 0.2281i | 0.1380 + 0.6041i | 0.1347 + 0.2891i | 0.0822 + 0.2583i | 0.0765 + 0.2732i |
| w151 | 0.1501 + 0.2284i | 0.1379 + 0.6025i | 0.1347 + 0.2891i | 0.0822 + 0.2583i | 0.0765 + 0.2733i |
| w152 | 0.1503 + 0.2247i | 0.1494 + 0.6226i | 0.2521 + 0.3591i | 0.1735 + 0.4189i | 0.1940 + 0.4225i |
| w153 | 0.1504 + 0.2250i | 0.1489 + 0.6207i | 0.2522 + 0.3590i | 0.1735 + 0.4189i | 0.1941 + 0.4225i |
| w154 | 0.1502 + 0.2242i | 0.1494 + 0.6229i | 0.2521 + 0.3591i | 0.1734 + 0.4187i | 0.1939 + 0.4226i |
| w155 | 0.1503 + 0.2245i | 0.1489 + 0.6211i | 0.2524 + 0.3589i | 0.1730 + 0.4187i | 0.1940 + 0.4224i |
| w156 | 0.1505 + 0.2282i | 0.1483 + 0.6210i | 0.2493 + 0.3649i | 0.1648 + 0.4258i | 0.1700 + 0.4355i |
| w157 | 0.1506 + 0.2285i | 0.1479 + 0.6193i | 0.2493 + 0.3647i | 0.1649 + 0.4258i | 0.1699 + 0.4353i |
| w158 | 0.1504 + 0.2277i | 0.1483 + 0.6214i | 0.2493 + 0.3648i | 0.1646 + 0.4255i | 0.1700 + 0.4355i |
| w159 | 0.1505 + 0.2280i | 0.1479 + 0.6197i | 0.2493 + 0.3647i | 0.1647 + 0.4256i | 0.1699 + 0.4353i |
| w160 | 0.1384 + 0.6201i | 0.1421 + 1.2512i | 0.1151 + 0.7097i | 0.0914 + 0.8604i | 0.0802 + 0.8666i |
| w161 | 0.1390 + 0.6188i | 0.2382 + 1.1965i | 0.1150 + 0.7098i | 0.0995 + 0.8584i | 0.1059 + 0.8614i |
| w162 | 0.1381 + 0.6219i | 0.1425 + 1.2561i | 0.1148 + 0.7109i | 0.0910 + 0.8610i | 0.0800 + 0.8663i |
| w163 | 0.1386 + 0.6206i | 0.2356 + 1.2021i | 0.1148 + 0.7112i | 0.0994 + 0.8588i | 0.1055 + 0.8609i |
| w164 | 0.1387 + 0.6009i | 0.1521 + 1.2137i | 0.2018 + 0.6963i | 0.2520 + 0.8084i | 0.2667 + 0.8027i |
| w165 | 0.1391 + 0.5995i | 0.2390 + 1.1744i | 0.2019 + 0.6965i | 0.2484 + 0.8118i | 0.2541 + 0.8118i |
| w166 | 0.1384 + 0.6027i | 0.1511 + 1.2191i | 0.2020 + 0.6975i | 0.2521 + 0.8090i | 0.2654 + 0.8017i |
| w167 | 0.1389 + 0.6013i | 0.2364 + 1.1788i | 0.2021 + 0.6977i | 0.2483 + 0.8124i | 0.2530 + 0.8108i |
| w168 | 0.1398 + 0.6186i | 0.3956 + 0.9473i | 0.1161 + 0.6371i | 0.0884 + 0.7037i | 0.0734 + 0.7154i |
| w169 | 0.1404 + 0.6173i | 0.3897 + 0.9873i | 0.1161 + 0.6373i | 0.0894 + 0.7033i | 0.0772 + 0.7142i |
| w170 | 0.1395 + 0.6204i | 0.3981 + 0.9439i | 0.1157 + 0.6384i | 0.0883 + 0.7037i | 0.0734 + 0.7154i |
| w171 | 0.1400 + 0.6191i | 0.3913 + 0.9827i | 0.1157 + 0.6387i | 0.0893 + 0.7035i | 0.0772 + 0.7142i |
| w172 | 0.1401 + 0.5994i | 0.3909 + 0.9535i | 0.1747 + 0.6231i | 0.1683 + 0.6742i | 0.1809 + 0.6740i |
| w173 | 0.1406 + 0.5981i | 0.3871 + 0.9933i | 0.1748 + 0.6232i | 0.1680 + 0.6747i | 0.1796 + 0.6758i |
| w174 | 0.1398 + 0.6012i | 0.3931 + 0.9500i | 0.1751 + 0.6240i | 0.1681 + 0.6742i | 0.1808 + 0.6740i |
| w175 | 0.1403 + 0.5999i | 0.3884 + 0.9890i | 0.1748 + 0.6242i | 0.1681 + 0.6749i | 0.1797 + 0.6758i |
| w176 | 0.2908 + 0.5788i | 0.4093 + 0.5865i | 0.4759 + 0.5693i | 0.4794 + 0.6184i | 0.4901 + 0.6096i |
| w177 | 0.2913 + 0.5780i | 0.4082 + 0.5813i | 0.4761 + 0.5693i | 0.4797 + 0.6188i | 0.4892 + 0.6118i |
| w178 | 0.2904 + 0.5800i | 0.4101 + 0.5870i | 0.4760 + 0.5696i | 0.4797 + 0.6185i | 0.4866 + 0.6071i |
| w179 | 0.2909 + 0.5792i | 0.4090 + 0.5818i | 0.4764 + 0.5697i | 0.4797 + 0.6190i | 0.4858 + 0.6094i |
| w180 | 0.2860 + 0.5645i | 0.4003 + 0.5867i | 0.4146 + 0.6061i | 0.3938 + 0.7103i | 0.3909 + 0.7181i |
| w181 | 0.2864 + 0.5637i | 0.3990 + 0.5817i | 0.4147 + 0.6063i | 0.3948 + 0.7082i | 0.3949 + 0.7124i |
| w182 | 0.2857 + 0.5657i | 0.4011 + 0.5872i | 0.4147 + 0.6070i | 0.3938 + 0.7106i | 0.3886 + 0.7158i |
| w183 | 0.2862 + 0.5649i | 0.3999 + 0.5822i | 0.4148 + 0.6070i | 0.3949 + 0.7084i | 0.3924 + 0.7102i |
| w184 | 0.2982 + 0.5797i | 0.4162 + 0.6419i | 0.3951 + 0.4837i | 0.3421 + 0.5305i | 0.3503 + 0.5195i |
| w185 | 0.29S6 + 0.5789i | 0.4126 + 0.6321i | 0.3954 + 0.4837i | 0.3423 + 0.5305i | 0.3505 + 0.5197i |
| w186 | 0.2978 + 0.5808i | 0.4174 + 0.6433i | 0.3953 + 0.4841i | 0.3420 + 0.5303i | 0.3509 + 0.5198i |
| w187 | 0.2983 + 0.5801i | 0.4136 + 0.6334i | 0.3952 + 0.4842i | 0.3423 + 0.5303i | 0.3511 + 0.5200i |

-continued

| | | | | | |
|---|---|---|---|---|---|
| w188 | 0.2930 + 0.5656i | 0.4081 + 0.6402i | 0.3670 + 0.5086i | 0.3015 + 0.5757i | 0.2929 + 0.5907i |
| w189 | 0.2935 + 0.5649i | 0.4043 + 0.6309i | 0.3672 + 0.5083i | 0.3017 + 0.5754i | 0.2932 + 0.5899i |
| w190 | 0.2928 + 0.5668i | 0.4093 + 0.6415i | 0.3672 + 0.5086i | 0.3015 + 0.5755i | 0.2932 + 0.5909i |
| w191 | 0.2932 + 0.5660i | 0.4053 + 0.6321i | 0.3672 + 0.5087i | 0.3015 + 0.5753i | 0.2936 + 0.5901i |
| w192 | 0.4268 + 0.1258i | 0.1208 + 0.1207i | 0.1311 + 0.0863i | 0.2346 + 0.0773i | 0.2289 + 0.0740i |
| w193 | 0.4268 + 0.1259i | 0.1209 + 0.1209i | 0.1311 + 0.0865i | 0.2344 + 0.0773i | 0.2289 + 0.0739i |
| w194 | 0.4259 + 0.1257i | 0.1208 + 0.1206i | 0.1310 + 0.0865i | 0.2344 + 0.0772i | 0.2290 + 0.0739i |
| w195 | 0.4258 + 0.1259i | 0.1210 + 0.1208i | 0.1312 + 0.0864i | 0.2345 + 0.0773i | 0.2290 + 0.0739i |
| w196 | 0.4251 + 0.1266i | 0.1200 + 0.1205i | 0.1315 + 0.0865i | 0.2348 + 0.0806i | 0.2295 + 0.0818i |
| w197 | 0.4251 + 0.1267i | 0.1200 + 0.1206i | 0.1317 + 0.0865i | 0.2349 + 0.0804i | 0.2296 + 0.0816i |
| w198 | 0.4242 + 0.1265i | 0.1201 + 0.1205i | 0.1314 + 0.0865i | 0.2349 + 0.0S04i | 0.2296 + 0.0817i |
| w199 | 0.4242 + 0.1267i | 0.1202 + 0.1207i | 0.1318 + 0.0865i | 0.2349 + 0.0804i | 0.2296 + 0.0817i |
| w200 | 0.4273 + 0.1240i | 0.1209 + 0.1196i | 0.3858 + 0.0903i | 0.4025 + 0.0825i | 0.4038 + 0.0702i |
| w201 | 0.4272 + 0.1242i | 0.1210 + 0.1197i | 0.3857 + 0.0903i | 0.4025 + 0.0825i | 0.4038 + 0.0701i |
| w202 | 0.4263 + 0.1240i | 0.1210 + 0.1197i | 0.3857 + 0.0903i | 0.4023 + 0.0825i | 0.4037 + 0.0703i |
| w203 | 0.4263 + 0.1242i | 0.1210 + 0.1197i | 0.3857 + 0.0903i | 0.4024 + 0.0824i | 0.4038 + 0.0702i |
| w204 | 0.4256 + 0.1248i | 0.1202 + 0.1194i | 0.3861 + 0.0908i | 0.3972 + 0.1073i | 0.3965 + 0.1175i |
| w205 | 0.4255 + 0.1250i | 0.1202 + 0.1195i | 0.3858 + 0.0908i | 0.3973 + 0.1073i | 0.3966 + 0.1173i |
| w206 | 0.4246 + 0.1248i | 0.1202 + 0.1194i | 0.3858 + 0.0908i | 0.3972 + 0.1073i | 0.3965 + 0.1174i |
| w207 | 0.4246 + 0.1250i | 0.1202 + 0.1196i | 0.3858 + 0.0909i | 0.3971 + 0.1071i | 0.3964 + 0.1174i |
| w208 | 0.3887 + 0.1755i | 0.1274 + 0.3523i | 0.1425 + 0.1033i | 0.2201 + 0.2167i | 0.2148 + 0.2237i |
| w209 | 0.3888 + 0.1758i | 0.1278 + 0.3529i | 0.1428 + 0.1035i | 0.2201 + 0.2167i | 0.2148 + 0.2238i |
| w210 | 0.3882 + 0.1753i | 0.1274 + 0.3523i | 0.1427 + 0.1035i | 0.2200 + 0.2167i | 0.2149 + 0.2238i |
| w211 | 0.3883 + 0.1755i | 0.1277 + 0.3529i | 0.1427 + 0.1036i | 0.2201 + 0.2168i | 0.2148 + 0.2239i |
| w212 | 0.3877 + 0.1764i | 0.1269 + 0.3519i | 0.1430 + 0.1034i | 0.2239 + 0.2131i | 0.2225 + 0.2148i |
| w213 | 0.3877 + 0.1767i | 0.1272 + 0.3525i | 0.1434 + 0.1037i | 0.2240 + 0.2131i | 0.2225 + 0.2147i |
| w214 | 0.3872 + 0.1762i | 0.1269 + 0.3520i | 0.1432 + 0.1035i | 0.2239 + 0.2131i | 0.2225 + 0.2146i |
| w215 | 0.3872 + 0.1764i | 0.1273 + 0.3525i | 0.1432 + 0.1036i | 0.2241 + 0.2131i | 0.2225 + 0.2147i |
| w216 | 0.3879 + 0.1740i | 0.1266 + 0.3485i | 0.3522 + 0.1798i | 0.3173 + 0.2993i | 0.3152 + 0.3142i |
| w217 | 0.3879 + 0.1743i | 0.1269 + 0.3490i | 0.3521 + 0.1797i | 0.3172 + 0.2993i | 0.3152 + 0.3143i |
| w218 | 0.3874 + 0.1738i | 0.1265 + 0.3485i | 0.3522 + 0.1799i | 0.3173 + 0.2993i | 0.3153 + 0.3141i |
| w219 | 0.3874 + 0.1740i | 0.1269 + 0.3490i | 0.3520 + 0.1796i | 0.3172 + 0.2994i | 0.3152 + 0.3142i |
| w220 | 0.3869 + 0.1750i | 0.1260 + 0.3482i | 0.3523 + 0.1777i | 0.3319 + 0.2783i | 0.3453 + 0.2672i |
| w221 | 0.3869 + 0.1753i | 0.1264 + 0.3486i | 0.3522 + 0.1774i | 0.3319 + 0.2783i | 0.3451 + 0.2673i |
| w222 | 0.3863 + 0.1747i | 0.1261 + 0.3482i | 0.3523 + 0.1777i | 0.3320 + 0.2785i | 0.3454 + 0.2671i |
| w223 | 0.3864 + 0.1750i | 0.1263 + 0.3487i | 0.3522 + 0.1775i | 0.3319 + 0.2784i | 0.3453 + 0.2671i |
| w224 | 0.7232 + 0.1962i | 0.3800 + 0.1152i | 0.7557 + 0.1088i | 0.6890 + 0.0866i | 0.6942 + 0.0765i |
| w225 | 0.7232 + 0.1961i | 0.3800 + 0.1155i | 0.7555 + 0.1086i | 0.6890 + 0.0867i | 0.6942 + 0.0771i |
| w226 | 0.7229 + 0.1975i | 0.3828 + 0.1149i | 0.7562 + 0.1088i | 0.6898 + 0.0864i | 0.6939 + 0.0763i |
| w227 | 0.7228 + 0.1973i | 0.3829 + 0.1152i | 0.7561 + 0.1087i | 0.6896 + 0.0865i | 0.6938 + 0.0770i |
| w223 | 0.7225 + 0.1978i | 0.3600 + 0.1161i | 0.7442 + 0.1635i | 0.6675 + 0.2113i | 0.6699 + 0.2221i |
| w229 | 0.7225 + 0.1977i | 0.3600 + 0.1164i | 0.7440 + 0.1634i | 0.6675 + 0.2111i | 0.6700 + 0.2217i |
| w230 | 0.7222 + 0.1991i | 0.3626 + 0.1159i | 0.7447 + 0.1638i | 0.6683 + 0.2113i | 0.6690 + 0.2216i |
| w231 | 0.7221 + 0.1990i | 0.3627 + 0.1162i | 0.7446 + 0.1637i | 0.6683 + 0.2112i | 0.6690 + 0.2210i |
| w232 | 0.7307 + 0.1679i | 0.3794 + 0.1131i | 0.5899 + 0.1041i | 0.5532 + 0.0886i | 0.5559 + 0.0719i |
| w233 | 0.7309 + 0.1677i | 0.3795 + 0.1134i | 0.5900 + 0.1043i | 0.5532 + 0.0885i | 0.5558 + 0.0720i |
| w234 | 0.7302 + 0.1691i | 0.3821 + 0.1129i | 0.5900 + 0.1041i | 0.5532 + 0.0885i | 0.5558 + 0.0719i |
| w235 | 0.7303 + 0.1689i | 0.3822 + 0.1132i | 0.5903 + 0.1041i | 0.5532 + 0.0884i | 0.5558 + 0.0720i |
| w236 | 0.7296 + 0.1697i | 0.3592 + 0.1141i | 0.5875 + 0.1188i | 0.5399 + 0.1631i | 0.5350 + 0.1768i |
| w237 | 0.7297 + 0.1695i | 0.3593 + 0.1145i | 0.5874 + 0.1191i | 0.5398 + 0.1629i | 0.5350 + 0.1768i |
| w238 | 0.7290 + 0.1709i | 0.3621 + 0.1139i | 0.5875 + 0.1189i | 0.5397 + 0.1628i | 0.5349 + 0.1770i |
| w239 | 0.7291 + 0.1707i | 0.3621 + 0.1142i | 0.5876 + 0.1192i | 0.5397 + 0.1628i | 0.5350 + 0.1769i |
| w240 | 0.5910 + 0.4140i | 0.3928 + 0.3384i | 0.6291 + 0.4134i | 0.5675 + 0.4802i | 0.5654 + 0.4901i |
| w241 | 0.5904 + 0.4138i | 0.3935 + 0.3395i | 0.6288 + 0.4137i | 0.5675 + 0.4799i | 0.5656 + 0.4890i |
| w242 | 0.5909 + 0.4147i | 0.3945 + 0.3373i | 0.6294 + 0.4138i | 0.5677 + 0.4801i | 0.5622 + 0.4879i |
| w243 | 0.5904 + 0.4145i | 0.3952 + 0.3385i | 0.6291 + 0.4139i | 0.5678 + 0.4800i | 0.5623 + 0.4869i |
| w244 | 0.5918 + 0.4100i | 0.3772 + 0.3413i | 0.6638 + 0.3651i | 0.6155 + 0.3723i | 0.6239 + 0.3628i |
| w245 | 0.5912 + 0.4098i | 0.3780 + 0.3425i | 0.6637 + 0.3650i | 0.6155 + 0.3724i | 0.6237 + 0.3634i |
| w246 | 0.5917 + 0.4107i | 0.3790 + 0.3406i | 0.6644 + 0.3652i | 0.6160 + 0.3723i | 0.6217 + 0.3615i |
| w247 | 0.5911 + 0.4105i | 0.3797 + 0.3417i | 0.6641 + 0.3653i | 0.6161 + 0.3725i | 0.6216 + 0.3621i |
| w248 | 0.5751 + 0.4230i | 0.3886 + 0.3306i | 0.5203 + 0.3091i | 0.4402 + 0.3949i | 0.4324 + 0.4076i |
| w249 | 0.5747 + 0.4228i | 0.3891 + 0.3317i | 0.5202 + 0.3090i | 0.4404 + 0.3949i | 0.4323 + 0.4075i |
| w250 | 0.5750 + 0.4237i | 0.3904 + 0.3296i | 0.5203 + 0.3093i | 0.4401 + 0.3947i | 0.4326 + 0.4080i |
| w251 | 0.5746 + 0.4235i | 0.3909 + 0.3308i | 0.5203 + 0.3093i | 0.4402 + 0.3948i | 0.4327 + 0.4079i |
| w252 | 0.5756 + 0.4178i | 0.3727 + 0.3341i | 0.5296 + 0.2915i | 0.4747 + 0.3329i | 0.4849 + 0.3128i |
| w253 | 0.5752 + 0.4176i | 0.3733 + 0.3352i | 0.5297 + 0.2912i | 0.4748 + 0.3330i | 0.4849 + 0.3128i |
| w254 | 0.5755 + 0.4185i | 0.3746 + 0.3332i | 0.5297 + 0.2913i | 0.4746 + 0.3329i | 0.4850 + 0.3129i |
| w255 | 0.5750 + 0.4183i | 0.3751 + 0.3343i | 0.5295 + 0.2913i | 0.4745 + 0.3331i | 0.4851 + 0.3130i |

| w/code | 10/15 | 11/15 | 12/15 | 13/15 |
|---|---|---|---|---|
| w0 | 1.7268 + 0.3306i | 0.0827 + 1.7001i | 1.6707 + 0.0830i | 0.0862 + 1.6154i |
| w1 | 1.4295 + 1.1791i | 0.2495 + 1.7069i | 1.6596 + 0.2486i | 0.2532 + 1.5973i |
| w2 | 1.5265 + 0.9329i | 0.0759 + 1.5315i | 1.5191 + 0.0748i | 0.0628 + 1.4840i |
| w3 | 1.3311 + 0.9796i | 0.2264 + 1.5296i | 1.5087 + 0.2253i | 0.1933 + 1.4746i |
| w4 | 1.0476 + 1.3141i | 0.5781 + 1.6238i | 1.5860 + 0.5707i | 0.5623 + 1.5170i |
| w5 | 1.2433 + 1.3224i | 0.4153 + 1.6700i | 1.6299 + 0.4118i | 0.4115 + 1.5641i |
| w6 | 1.0060 + 1.1520i | 0.5222 + 1.4586i | 1.4405 + 0.5184i | 0.4717 + 1.4136i |
| w7 | 1.1831 + 1.1052i | 0.3761 + 1.5021i | 1.4814 + 0.3733i | 0.3318 + 1.4521i |

-continued

| | | | | |
|---|---|---|---|---|
| w8 | 1.6816 + 0.6120i | 0.0654 + 1.2745i | 1.2786 + 0.0635i | 0.0573 + 1.2656i |
| w9 | 1.1961 + 0.7851i | 0.1916 + 1.2647i | 1.2678 + 0.1901i | 0.1750 + 1.2589i |
| w10 | 1.4907 + 0.7274i | 0.0709 + 1.3936i | 1.3905 + 0.0691i | 0.0712 + 1.3686i |
| w11 | 1.3242 + 0.7939i | 0.2071 + 1.3855i | 1.3801 + 0.2066i | 0.2106 + 1.3583i |
| w12 | 0.9444 + 0.8682i | 0.4344 + 1.2067i | 1.2103 + 0.4364i | 0.4128 + 1.2072i |
| w13 | 1.0778 + 0.8297i | 0.3137 + 1.2425i | 1.2453 + 0.3150i | 0.2939 + 1.2391i |
| w14 | 0.9728 + 1.0019i | 0.4756 + 1.3240i | 1.3174 + 0.4751i | 0.4756 + 1.2940i |
| w15 | 1.1117 + 0.9612i | 0.3426 + 1.3612i | 1.3555 + 0.3427i | 0.3462 + 1.3333i |
| w16 | 0.7139 + 1.4630i | 1.1609 + 1.2807i | 1.2549 + 1.1333i | 1.1029 + 1.1970i |
| w17 | 0.7740 + 1.6553i | 1.0285 + 1.3890i | 1.3567 + 1.0038i | 0.9805 + 1.3006i |
| w18 | 0.6485 + 1.3230i | 1.0435 + 1.1532i | 1.1390 + 1.0306i | 0.9776 + 1.1396i |
| w19 | 0.6195 + 1.1967i | 0.9255 + 1.2490i | 1.2324 + 0.9142i | 0.8621 + 1.2273i |
| w20 | 0.8720 + 1.3702i | 0.7336 + 1.5577i | 1.5191 + 0.7201i | 0.7053 + 1.4577i |
| w21 | 0.9942 + 1.5551i | 0.8851 + 1.4823i | 1.4492 + 0.8682i | 0.8463 + 1.3878i |
| w22 | 0.8479 + 1.1984i | 0.6624 + 1.4006i | 1.3816 + 0.6559i | 0.6073 + 1.3617i |
| w23 | 0.7405 + 1.1635i | 0.7974 + 1.3323i | 1.3154 + 0.7901i | 0.7380 + 1.3004i |
| w24 | 0.5584 + 0.9220i | 0.8662 + 0.9554i | 0.9559 + 0.8672i | 0.8450 + 0.9697i |
| w25 | 0.6047 + 0.9153i | 0.7681 + 1.0353i | 1.0355 + 0.7698i | 0.7464 + 1.0441i |
| w26 | 0.5599 + 1.0238i | 0.9483 + 1.0473i | 1.0408 + 0.9445i | 0.9365 + 1.0264i |
| w27 | 0.6007 + 1.0581i | 0.8407 + 1.1336i | 1.1266 + 0.8383i | 0.8308 + 1.1108i |
| w28 | 0.8173 + 0.9002i | 0.5509 + 1.1608i | 1.1624 + 0.5530i | 0.5291 + 1.1627i |
| w29 | 0.7235 + 0.9143i | 0.6621 + 1.1020i | 1.1043 + 0.6650i | 0.6409 + 1.1079i |
| w30 | 0.8457 + 1.0230i | 0.6018 + 1.2720i | 1.2643 + 0.6023i | 0.6007 + 1.2427i |
| w31 | 0.7336 + 1.0397i | 0.7241 + 1.2084i | 1.2025 + 0.7245i | 0.7195 + 1.1826i |
| w32 | 1.4546 + 0.3656i | 0.0467 + 0.9059i | 0.9195 + 0.0458i | 0.0451 + 0.9145i |
| w33 | 1.1503 + 0.4997i | 0.1350 + 0.8973i | 0.9105 + 0.1382i | 0.1354 + 0.9073i |
| w34 | 1.3573 + 0.4202i | 0.0497 + 0.9867i | 0.9998 + 0.0502i | 0.0490 + 0.9960i |
| w35 | 1.2496 + 0.4668i | 0.1471 + 0.9764i | 0.9903 + 0.1497i | 0.1462 + 0.9883i |
| w36 | 0.8612 + 0.5359i | 0.3086 + 0.8542i | 0.8664 + 0.3143i | 0.3118 + 0.8700i |
| w37 | 1.0300 + 0.5234i | 0.2240 + 0.8802i | 0.8929 + 0.2275i | 0.2251 + 0.8927i |
| w38 | 0.8730 + 0.5582i | 0.3372 + 0.9296i | 0.9434 + 0.3421i | 0.3384 + 0.9473i |
| w39 | 0.9827 + 0.5433i | 0.2436 + 0.9574i | 0.9718 + 0.2472i | 0.2432 + 0.9721i |
| w40 | 1.5800 + 0.4522i | 0.0597 + 1.1699i | 1.1777 + 0.0583i | 0.0573 + 1.1691i |
| w41 | 1.1744 + 0.6454i | 0.1751 + 1.1583i | 1.1673 + 0.1754i | 0.1729 + 1.1617i |
| w42 | 1.4318 + 0.5695i | 0.0546 + 1.0770i | 1.0856 + 0.0541i | 0.0527 + 1.0803i |
| w43 | 1.2928 + 0.6164i | 0.1620 + 1.0654i | 1.0759 + 0.1619i | 0.1592 + 1.0726i |
| w44 | 0.9085 + 0.7546i | 0.3987 + 1.1039i | 1.1138 + 0.4023i | 0.3967 + 1.1112i |
| w45 | 1.0445 + 0.6871i | 0.2892 + 1.1363i | 1.1461 + 0.2901i | 0.2351 + 1.1427i |
| w46 | 0.8937 + 0.6812i | 0.3688 + 1.0131i | 1.0258 + 0.3708i | 0.3660 + 1.0273i |
| w47 | 0.9938 + 0.6542i | 0.2650 + 1.0458i | 1.0553 + 0.2677i | 0.2633 + 1.0553i |
| w48 | 0.5415 + 0.5711i | 0.6137 + 0.6750i | 0.6837 + 0.6227i | 0.6365 + 0.6957i |
| w49 | 0.5649 + 0.5698i | 0.5476 + 0.7291i | 0.7398 + 0.5527i | 0.5615 + 0.7517i |
| w50 | 0.5433 + 0.6037i | 0.6692 + 0.7370i | 0.7451 + 0.6776i | 0.6869 + 0.7563i |
| w51 | 0.5681 + 0.6024i | 0.5949 + 0.7949i | 0.8068 + 0.6014i | 0.6061 + 0.8169i |
| w52 | 0.7445 + 0.5538i | 0.3955 + 0.8179i | 0.8322 + 0.3986i | 0.3973 + 0.8394i |
| w53 | 0.6842 + 0.5618i | 0.4712 + 0.7798i | 0.7900 + 0.4779i | 0.4813 + 0.7997i |
| w54 | 0.7494 + 0.5848i | 0.4286 + 0.8921i | 0.9065 + 0.4330i | 0.4306 + 0.9123i |
| w55 | 0.6877 + 0.5945i | 0.5132 + 0.8496i | 0.8606 + 0.5201i | 0.5207 + 0.8689i |
| w56 | 0.5534 + 0.7977i | 0.7942 + 0.8748i | 0.8797 + 0.7981i | 0.7988 + 0.8850i |
| w57 | 0.5889 + 0.7966i | 0.7046 + 0.9424i | 0.9527 + 0.7086i | 0.7056 + 0.9563i |
| w58 | 0.5501 + 0.7239i | 0.7290 + 0.8039i | 0.8102 + 0.7357i | 0.7403 + 0.8195i |
| w59 | 0.5813 + 0.7226i | 0.6487 + 0.8706i | 0.8771 + 0.6533i | 0.6540 + 0.3851i |
| w60 | 0.7892 + 0.7789i | 0.5056 + 1.0627i | 1.0703 + 0.5098i | 0.5042 + 1.0698i |
| w61 | 0.7107 + 0.7905i | 0.6075 + 1.0087i | 1.0160 + 0.6122i | 0.6076 + 1.0178i |
| w62 | 0.7731 + 0.7034i | 0.4669 + 0.9761i | 0.9854 + 0.4703i | 0.4657 + 0.9891i |
| w63 | 0.7020 + 0.7141i | 0.5603 + 0.9273i | 0.9357 + 0.5645i | 0.5623 + 0.9416i |
| w64 | 0.0599 + 1.4685i | 1.7073 + 0.0837i | 0.0829 + 1.6709i | 1.6374 + 0.0732i |
| w65 | 0.1246 + 1.8836i | 1.7027 + 0.2504i | 0.2503 + 1.6668i | 1.6151 + 0.2229i |
| w66 | 0.0726 + 1.3309i | 1.5368 + 0.0756i | 0.0746 + 1.5195i | 1.5081 + 0.0892i |
| w67 | 0.0737 + 1.2419i | 1.5297 + 0.2272i | 0.2237 + 1.5133i | 1.4856 + 0.2487i |
| w68 | 0.1916 + 1.5130i | 1.6271 + 0.5805i | 0.5739 + 1.5837i | 1.5452 + 0.5306i |
| w69 | 0.1084 + 1.6780i | 1.6704 + 0.4169i | 0.4139 + 1.6300i | 1.5894 + 0.3775i |
| w70 | 0.2135 + 1.3547i | 1.4619 + 0.5241i | 0.5163 + 1.4416i | 1.4079 + 0.5384i |
| w71 | 0.2135 + 1.2428i | 1.5031 + 0.3768i | 0.3716 + 1.4836i | 1.4548 + 0.3961i |
| w72 | 0.0613 + 0.9634i | 1.2795 + 0.0648i | 0.0639 + 1.2810i | 1.2939 + 0.0694i |
| w73 | 0.0608 + 0.9515i | 1.2691 + 0.1929i | 0.1907 + 1.2711i | 1.2819 + 0.2049i |
| w74 | 0.0653 + 1.0817i | 1.3982 + 0.0700i | 0.0695 + 1.3921i | 1.3970 + 0.0586i |
| w75 | 0.0672 + 1.1221i | 1.3874 + 0.2089i | 0.2069 + 1.3839i | 1.3864 + 0.1843i |
| w76 | 0.1830 + 0.9565i | 1.2099 + 0.4372i | 0.4372 + 1.2114i | 1.2145 + 0.4581i |
| w77 | 0.1815 + 0.9438i | 1.2462 + 0.3168i | 0.3150 + 1.2471i | 1.2539 + 0.3358i |
| w78 | 0.1937 + 1.0728i | 1.3264 + 0.4784i | 0.4753 + 1.3187i | 1.3215 + 0.4564i |
| w79 | 0.1984 + 1.1179i | 1.3636 + 0.3452i | 0.3425 + 1.3569i | 1.3601 + 0.3221i |
| w80 | 0.5319 + 1.5225i | 1.2821 + 1.1603i | 1.1360 + 1.2473i | 1.2143 + 1.0841i |
| w81 | 0.5499 + 1.7288i | 1.3913 + 1.0297i | 1.0132 + 1.3576i | 1.3161 + 0.9594i |
| w82 | 0.4997 + 1.3566i | 1.1526 + 1.0455i | 1.0324 + 1.1353i | 1.0841 + 1.0388i |
| w83 | 0.4782 + 1.2237i | 1.2494 + 0.9275i | 0.9181 + 1.2338i | 1.1820 + 0.9284i |
| w84 | 0.3541 + 1.5303i | 1.5638 + 0.7384i | 0.7279 + 1.5222i | 1.4838 + 0.6792i |
| w85 | 0.3305 + 1.7214i | 1.4790 + 0.8844i | 0.8723 + 1.4426i | 1.4032 + 0.8235i |
| w86 | 0.3534 + 1.3681i | 1.4048 + 0.6656i | 0.6568 + 1.3858i | 1.3468 + 0.6764i |

-continued

| | | | | |
|---|---|---|---|---|
| w87 | 0.3443 + 1.2387i | 1.3309 + 0.7987i | 0.7900 + 1.3143i | 1.2717 + 0.8072i |
| w88 | 0.4341 + 0.9300i | 0.9550 + 0.8673i | 0.8674 + 0.9560i | 0.9364 + 0.8864i |
| w89 | 0.4208 + 0.9180i | 1.0345 + 0.7695i | 0.7705 + 1.0366i | 1.0217 + 0.7923i |
| w90 | 0.4493 + 1.0436i | 1.0460 + 0.9487i | 0.9433 + 1.0406i | 1.0343 + 0.9303i |
| w91 | 0.4518 + 1.1001i | 1.1334 + 0.8419i | 0.8396 + 1.1292i | 1.1243 + 0.8240i |
| w92 | 0.3046 + 0.9458i | 1.1624 + 0.5543i | 0.5539 + 1.1644i | 1.1623 + 0.5765i |
| w93 | 0.3045 + 0.9315i | 1.1032 + 0.6643i | 0.6655 + 1.1051i | 1.0975 + 0.6885i |
| w94 | 0.3191 + 1.0603i | 1.2741 + 0.6060i | 0.6027 + 1.2677i | 1.2691 + 0.5857i |
| w95 | 0.3265 + 1.1096i | 1.2092 + 0.7268i | 0.7240 + 1.2029i | 1.2035 + 0.7094i |
| w96 | 0.0563 + 0.5733i | 0.9150 + 0.0466i | 0.0457 + 0.9211i | 0.9523 + 0.0461i |
| w97 | 0.0563 + 0.5732i | 0.9065 + 0.1343i | 0.1367 + 0.9126i | 0.9440 + 0.1381i |
| w98 | 0.0562 + 0.6144i | 0.9948 + 0.0500i | 0.0499 + 1.0026i | 1.0315 + 0.0501i |
| w99 | 0.0561 + 0.6142i | 0.9843 + 0.1473i | 0.1484 + 0.9932i | 1.0228 + 0.1507i |
| w100 | 0.1687 + 0.5745i | 0.8612 + 0.3092i | 0.3131 + 0.8696i | 0.9013 + 0.3169i |
| w101 | 0.1685 + 0.5743i | 0.8883 + 0.2248i | 0.2258 + 0.8952i | 0.9267 + 0.2286i |
| w102 | 0.1683 + 0.6135i | 0.9363 + 0.3378i | 0.3412 + 0.9466i | 0.9750 + 0.3455i |
| w103 | 0.1682 + 0.6131i | 0.9652 + 0.2442i | 0.2456 + 0.9743i | 1.0035 + 0.2492i |
| w104 | 0.0575 + 0.8275i | 1.1753 + 0.0596i | 0.0588 + 1.1805i | 1.2011 + 0.0566i |
| w105 | 0.0576 + 0.8303i | 1.1638 + 0.1759i | 0.1753 + 1.1699i | 1.1922 + 0.1721i |
| w106 | 0.0560 + 0.7361i | 1.0837 + 0.0551i | 0.0537 + 1.0888i | 1.1135 + 0.0544i |
| w107 | 0.0559 + 0.7364i | 1.0729 + 0.1619i | 0.1620 + 1.0787i | 1.1046 + 0.1637i |
| w108 | 0.1725 + 0.8204i | 1.1085 + 0.4018i | 0.4022 + 1.1152i | 1.1352 + 0.4033i |
| w109 | 0.1726 + 0.8234i | 1.1424 + 0.2906i | 0.2901 + 1.1486i | 1.1698 + 0.2887i |
| w110 | 0.1682 + 0.7342i | 1.0200 + 0.3694i | 0.3708 + 1.0280i | 1.0522 + 0.3750i |
| w111 | 0.1680 + 0.7346i | 1.0510 + 0.2673i | 0.2674 + 1.0584i | 1.0842 + 0.2706i |
| w112 | 0.4176 + 0.5754i | 0.6784 + 0.6112i | 0.6203 + 0.6858i | 0.7062 + 0.6318i |
| w113 | 0.4108 + 0.5751i | 0.7341 + 0.5461i | 0.5514 + 0.7429i | 0.7682 + 0.5621i |
| w114 | 0.4190 + 0.6086i | 0.7381 + 0.6680i | 0.6762 + 0.7467i | 0.7616 + 0.6876i |
| w115 | 0.4118 + 0.6082i | 0.7989 + 0.5949i | 0.6008 + 0.8092i | 0.3233 + 0.6116i |
| w116 | 0.2872 + 0.5759i | 0.8261 + 0.3941i | 0.3968 + 0.8352i | 0.8663 + 0.4030i |
| w117 | 0.2885 + 0.5759i | 0.7851 + 0.4703i | 0.4768 + 0.7929i | 0.8211 + 0.4847i |
| w118 | 0.2872 + 0.6116i | 0.8991 + 0.4288i | 0.4321 + 0.9090i | 0.9357 + 0.4393i |
| w119 | 0.2887 + 0.6114i | 0.8540 + 0.5134i | 0.5196 + 0.8634i | 0.8873 + 0.5281i |
| w120 | 0.4293 + 0.8008i | 0.8748 + 0.7945i | 0.7985 + 0.8805i | 0.8857 + 0.8048i |
| w121 | 0.4175 + 0.8025i | 0.9480 + 0.7052i | 0.7091 + 0.9536i | 0.9624 + 0.7150i |
| w122 | 0.4251 + 0.7274i | 0.8034 + 0.7296i | 0.7351 + 0.8110i | 0.8208 + 0.7452i |
| w123 | 0.4152 + 0.7279i | 0.8718 + 0.6493i | 0.6536 + 0.8786i | 0.8922 + 0.6622i |
| w124 | 0.2916 + 0.8082i | 1.0647 + 0.5073i | 0.5098 + 1.0718i | 1.0390 + 0.5137i |
| w125 | 0.2941 + 0.8113i | 1.0114 + 0.6096i | 0.6126 + 1.0178i | 1.0308 + 0.6179i |
| w126 | 0.2877 + 0.7306i | 0.9801 + 0.4685i | 0.4703 + 0.9876i | 1.0092 + 0.4766i |
| w127 | 0.2900 + 0.7314i | 0.9294 + 0.5603i | 0.5649 + 0.9379i | 0.9560 + 0.5733i |
| w128 | 1.4412 + 0.0759i | 0.0425 + 0.2306i | 0.2331 + 0.0555i | 0.0356 + 0.2800i |
| w129 | 1.0926 + 0.0446i | 0.0444 + 0.2300i | 0.2334 + 0.0560i | 0.0833 + 0.2651i |
| w130 | 1.3092 + 0.0863i | 0.0476 + 0.3236i | 0.3231 + 0.0410i | 0.0320 + 0.3485i |
| w131 | 1.2012 + 0.0699i | 0.0482 + 0.3229i | 0.3229 + 0.0418i | 0.0823 + 0.3458i |
| w132 | 0.8295 + 0.0591i | 0.0431 + 0.1967i | 0.1828 + 0.0378i | 0.0352 + 0.2157i |
| w133 | 0.9538 + 0.0508i | 0.0415 + 0.1973i | 0.1828 + 0.0375i | 0.0357 + 0.2042i |
| w134 | 0.8321 + 0.0585i | 0.0971 + 0.3204i | 0.3359 + 0.1034i | 0.1700 + 0.3635i |
| w135 | 0.9265 + 0.0539i | 0.0967 + 0.3186i | 0.3352 + 0.1033i | 0.1363 + 0.3448i |
| w136 | 1.6156 + 0.0830i | 0.0491 + 0.5030i | 0.5231 + 0.0416i | 0.0279 + 0.5173i |
| w137 | 1.0810 + 0.1364i | 0.0551 + 0.5022i | 0.5212 + 0.0599i | 0.0833 + 0.5156i |
| w138 | 1.8273 + 0.1110i | 0.0450 + 0.4214i | 0.4318 + 0.0381i | 0.0279 + 0.4291i |
| w139 | 1.1228 + 0.1520i | 0.0459 + 0.4205i | 0.4318 + 0.0416i | 0.0778 + 0.4336i |
| w140 | 0.8365 + 0.1745i | 0.1576 + 0.4806i | 0.4974 + 0.1612i | 0.2048 + 0.4951i |
| w141 | 0.9617 + 0.1567i | 0.1517 + 0.4814i | 0.5029 + 0.1426i | 0.1456 + 0.5085i |
| w142 | 0.8394 + 0.1738i | 0.1288 + 0.4032i | 0.4196 + 0.1280i | 0.1871 + 0.4221i |
| w143 | 0.9441 + 0.1623i | 0.1285 + 0.4037i | 0.4202 + 0.1224i | 0.1338 + 0.4355i |
| w144 | 0.5274 + 0.0607i | 0.1241 + 0.1723i | 0.1832 + 0.1354i | 0.1306 + 0.1707i |
| w145 | 0.5432 + 0.0608i | 0.1254 + 0.1726i | 0.1834 + 0.1345i | 0.1465 + 0.2102i |
| w146 | 0.5274 + 0.0608i | 0.1944 + 0.2361i | 0.2526 + 0.1984i | 0.2606 + 0.2717i |
| w147 | 0.5432 + 0.0608i | 0.1934 + 0.2367i | 0.2521 + 0.1992i | 0.2014 + 0.2359i |
| w148 | 0.7095 + 0.0603i | 0.0829 + 0.1628i | 0.1217 + 0.0561i | 0.0802 + 0.1457i |
| w149 | 0.6618 + 0.0606i | 0.0848 + 0.1601i | 0.1225 + 0.0560i | 0.0348 + 0.1352i |
| w150 | 0.7099 + 0.0602i | 0.1720 + 0.2748i | 0.3099 + 0.1696i | 0.2175 + 0.3255i |
| w151 | 0.6617 + 0.0606i | 0.1725 + 0.2756i | 0.3096 + 0.1709i | 0.1851 + 0.2925i |
| w152 | 0.5277 + 0.1827i | 0.3327 + 0.3852i | 0.3962 + 0.3429i | 0.4097 + 0.4098i |
| w153 | 0.5445 + 0.1827i | 0.3285 + 0.3880i | 0.4063 + 0.3289i | 0.3696 + 0.4239i |
| w154 | 0.5278 + 0.1823i | 0.2737 + 0.3181i | 0.3287 + 0.2818i | 0.3109 + 0.3161i |
| w155 | 0.5446 + 0.1824i | 0.2748 + 0.3180i | 0.3305 + 0.2788i | 0.3384 + 0.3541i |
| w156 | 0.7143 + 0.1797i | 0.2463 + 0.4429i | 0.4629 + 0.2415i | 0.2626 + 0.4826i |
| w157 | 0.6635 + 0.1813i | 0.2507 + 0.4400i | 0.4538 + 0.2587i | 0.3138 + 0.4582i |
| w158 | 0.7142 + 0.1794i | 0.2140 + 0.3608i | 0.3839 + 0.2101i | 0.2496 + 0.3897i |
| w159 | 0.6633 + 0.1811i | 0.2148 + 0.3606i | 0.3811 + 0.2145i | 0.2356 + 0.3968i |
| w160 | 1.4477 + 0.2272i | 0.0444 + 0.8222i | 0.8404 + 0.0429i | 0.0413 + 0.8350i |
| w161 | 1.1203 + 0.3790i | 0.1214 + 0.8152i | 0.8322 + 0.1261i | 0.1250 + 0.8291i |
| w162 | 1.3161 + 0.2454i | 0.0454 + 0.7459i | 0.7634 + 0.0391i | 0.0386 + 0.7570i |
| w163 | 1.2096 + 0.3196i | 0.1052 + 0.7420i | 0.7562 + 0.1141i | 0.1144 + 0.7509i |
| w164 | 0.8538 + 0.4205i | 0.2798 + 0.7766i | 0.7916 + 0.2874i | 0.2870 + 0.7948i |
| w165 | 0.9971 + 0.4062i | 0.2069 + 0.7984i | 0.8156 + 0.2082i | 0.2067 + 0.8150i |

-continued

| | | | | |
|---|---|---|---|---|
| w166 | 0.8603 + 0.4160i | 0.2499 + 0.7071i | 0.7184 + 0.2607i | 0.2642 + 0.7207i |
| w167 | 0.9655 + 0.4069i | 0.1934 + 0.7233i | 0.7408 + 0.1901i | 0.1898 + 0.7386i |
| w168 | 1.6269 + 0.2588i | 0.0518 + 0.5868i | 0.6079 + 0.0387i | 0.0311 + 0.6001i |
| w169 | 1.0884 + 0.2705i | 0.0688 + 0.5849i | 0.6023 + 0.0822i | 0.0947 + 0.5947i |
| w170 | 1.8201 + 0.3520i | 0.0495 + 0.6628i | 0.6861 + 0.0374i | 0.0347 + 0.6790i |
| w171 | 1.1299 + 0.2516i | 0.0856 + 0.6604i | 0.6795 + 0.1006i | 0.1047 + 0.6731i |
| w172 | 0.8457 + 0.2930i | 0.1845 + 0.5595i | 0.5731 + 0.1989i | 0.2220 + 0.5721i |
| w173 | 0.9743 + 0.2827i | 0.1701 + 0.5641i | 0.5854 + 0.1576i | 0.1586 + 0.5847i |
| w174 | 0.8491 + 0.2938i | 0.2149 + 0.6311i | 0.6454 + 0.2320i | 0.2421 + 0.6464i |
| w175 | 0.9565 + 0.2825i | 0.1814 + 0.6396i | 0.6642 + 0.1725i | 0.1741 + 0.6621i |
| w176 | 0.5349 + 0.4466i | 0.5570 + 0.6126i | 0.6237 + 0.5684i | 0.5383 + 0.6374i |
| w177 | 0.5550 + 0.4455i | 0.4996 + 0.6598i | 0.6752 + 0.5053i | 0.5182 + 0.6889i |
| w178 | 0.5344 + 0.4359i | 0.5027 + 0.5591i | 0.5655 + 0.5162i | 0.5425 + 0.5800i |
| w179 | 0.5543 + 0.4350i | 0.4587 + 0.5943i | 0.6118 + 0.4591i | 0.4782 + 0.6270i |
| w180 | 0.7304 + 0.4323i | 0.3616 + 0.7417i | 0.7598 + 0.3644i | 0.3667 + 0.7681i |
| w181 | 0.6740 + 0.4376i | 0.4272 + 0.7061i | 0.7208 + 0.4365i | 0.4442 + 0.7324i |
| w182 | 0.7290 + 0.4235i | 0.3335 + 0.6719i | 0.6887 + 0.3313i | 0.3373 + 0.6966i |
| w183 | 0.6729 + 0.4278i | 0.3844 + 0.6452i | 0.6540 + 0.3956i | 0.4091 + 0.6660i |
| w184 | 0.5295 + 0.3071i | 0.3879 + 0.4475i | 0.4535 + 0.4040i | 0.4524 + 0.4675i |
| w185 | 0.5477 + 0.3068i | 0.3776 + 0.4571i | 0.4792 + 0.3721i | 0.4008 + 0.5029i |
| w186 | 0.5297 + 0.3097i | 0.4424 + 0.5022i | 0.5082 + 0.4618i | 0.4977 + 0.5232i |
| w187 | 0.5479 + 0.3092i | 0.4191 + 0.5225i | 0.5468 + 0.4147i | 0.4386 + 0.5659i |
| w188 | 0.7223 + 0.3006i | 0.2791 + 0.5203i | 0.5417 + 0.2697i | 0.2843 + 0.5533i |
| w189 | 0.6675 + 0.3031i | 0.2927 + 0.5124i | 0.5222 + 0.3074i | 0.3447 + 0.5290i |
| w190 | 0.7215 + 0.3022i | 0.3056 + 0.5933i | 0.6164 + 0.2990i | 0.3097 + 0.6251i |
| w191 | 0.6671 + 0.3051i | 0.3356 + 0.5770i | 0.5877 + 0.3530i | 0.3756 + 0.5986i |
| w192 | 0.0563 + 0.0613i | 0.1787 + 0.0387i | 0.0499 + 0.2055i | 0.1765 + 0.0357i |
| w193 | 0.0563 + 0.0613i | 0.1788 + 0.0380i | 0.0509 + 0.2049i | 0.2273 + 0.0412i |
| w194 | 0.0563 + 0.0613i | 0.2844 + 0.0453i | 0.0399 + 0.2999i | 0.3691 + 0.0298i |
| w195 | 0.0563 + 0.0614i | 0.2853 + 0.0454i | 0.0401 + 0.3002i | 0.2911 + 0.0346i |
| w196 | 0.1675 + 0.0612i | 0.0534 + 0.0447i | 0.0338 + 0.1277i | 0.1117 + 0.0289i |
| w197 | 0.1675 + 0.0612i | 0.0536 + 0.0460i | 0.0333 + 0.1274i | 0.0382 + 0.0258i |
| w198 | 0.1675 + 0.0612i | 0.3158 + 0.0720i | 0.0946 + 0.3296i | 0.3643 + 0.0969i |
| w199 | 0.1675 + 0.0613i | 0.3142 + 0.0743i | 0.0941 + 0.3290i | 0.3097 + 0.0874i |
| w200 | 0.0566 + 0.1845i | 0.5089 + 0.0486i | 0.0419 + 0.5217i | 0.5699 + 0.0285i |
| w201 | 0.0565 + 0.1845i | 0.5084 + 0.0527i | 0.0573 + 0.5200i | 0.5487 + 0.0713i |
| w202 | 0.0565 + 0.1839i | 0.4222 + 0.0426i | 0.0352 + 0.4266i | 0.4393 + 0.0368i |
| w203 | 0.0565 + 0.1839i | 0.4214 + 0.0422i | 0.0371 + 0.4263i | 0.4320 + 0.0488i |
| w204 | 0.1681 + 0.1844i | 0.4864 + 0.1436i | 0.1548 + 0.4959i | 0.5432 + 0.1831i |
| w205 | 0.1682 + 0.1844i | 0.4880 + 0.1415i | 0.1395 + 0.5007i | 0.5356 + 0.1368i |
| w206 | 0.1681 + 0.1838i | 0.4019 + 0.1047i | 0.1182 + 0.4140i | 0.4214 + 0.1199i |
| w207 | 0.1682 + 0.1838i | 0.4023 + 0.1060i | 0.1141 + 0.4149i | 0.4661 + 0.1312i |
| w208 | 0.4059 + 0.0609i | 0.1614 + 0.0913i | 0.1305 + 0.1866i | 0.1610 + 0.1081i |
| w209 | 0.4022 + 0.0608i | 0.1612 + 0.0906i | 0.1305 + 0.1856i | 0.2042 + 0.1262i |
| w210 | 0.4058 + 0.0609i | 0.2488 + 0.1623i | 0.1936 + 0.2536i | 0.2973 + 0.2229i |
| w211 | 0.4022 + 0.0609i | 0.2488 + 0.1628i | 0.1935 + 0.2542i | 0.2455 + 0.1743i |
| w212 | 0.2835 + 0.0610i | 0.0659 + 0.0671i | 0.0466 + 0.0504i | 0.1014 + 0.0859i |
| w213 | 0.2840 + 0.0610i | 0.0654 + 0.0671i | 0.0470 + 0.0503i | 0.0352 + 0.0762i |
| w214 | 0.2835 + 0.0611i | 0.2866 + 0.1555i | 0.1636 + 0.3085i | 0.3374 + 0.1692i |
| w215 | 0.2840 + 0.0610i | 0.2872 + 0.1564i | 0.1629 + 0.3022i | 0.2914 + 0.1413i |
| w216 | 0.4066 + 0.1836i | 0.3982 + 0.3161i | 0.3355 + 0.4003i | 0.4468 + 0.3221i |
| w217 | 0.4027 + 0.1835i | 0.4005 + 0.3136i | 0.3227 + 0.4102i | 0.4545 + 0.3221i |
| w218 | 0.4066 + 0.1831i | 0.3333 + 0.2586i | 0.2750 + 0.3318i | 0.3539 + 0.2625i |
| w219 | 0.4027 + 0.1830i | 0.3330 + 0.2579i | 0.2722 + 0.3342i | 0.3954 + 0.2905i |
| w220 | 0.2842 + 0.1841i | 0.4515 + 0.2301i | 0.2346 + 0.4627i | 0.5230 + 0.2380i |
| w221 | 0.2847 + 0.1841i | 0.4493 + 0.2334i | 0.2495 + 0.4548i | 0.4892 + 0.2652i |
| w222 | 0.2842 + 0.1835i | 0.3681 + 0.1950i | 0.2020 + 0.3827i | 0.3945 + 0.1942i |
| w223 | 0.2847 + 0.1836i | 0.3693 + 0.1954i | 0.2054 + 0.3804i | 0.4344 + 0.2178i |
| w224 | 0.0567 + 0.4509i | 0.8318 + 0.0442i | 0.0421 + 0.5420i | 0.8751 + 0.0419i |
| w225 | 0.0566 + 0.4510i | 0.8239 + 0.1192i | 0.1247 + 0.8342i | 0.8676 + 0.1257i |
| w226 | 0.0568 + 0.4376i | 0.7562 + 0.0454i | 0.0384 + 0.7648i | 0.7986 + 0.0381i |
| w227 | 0.0568 + 0.4376i | 0.7500 + 0.1031i | 0.1132 + 0.7575i | 0.7927 + 0.1144i |
| w223 | 0.1691 + 0.4514i | 0.7842 + 0.2789i | 0.2858 + 0.7945i | 0.8293 + 0.2896i |
| w229 | 0.1691 + 0.4515i | 0.8063 + 0.2068i | 0.2067 + 0.8184i | 0.3523 + 0.2091i |
| w230 | 0.1694 + 0.4387i | 0.7167 + 0.2465i | 0.2585 + 0.7216i | 0.7578 + 0.2626i |
| w231 | 0.1693 + 0.4387i | 0.7319 + 0.1921i | 0.1886 + 0.7429i | 0.7786 + 0.1893i |
| w232 | 0.0568 + 0.3093i | 0.5933 + 0.0507i | 0.0401 + 0.6073i | 0.6439 + 0.0332i |
| w233 | 0.0568 + 0.3093i | 0.5924 + 0.0642i | 0.0800 + 0.6023i | 0.6363 + 0.0929i |
| w234 | 0.0567 + 0.3125i | 0.6712 + 0.0500i | 0.0378 + 0.6868i | 0.7212 + 0.0348i |
| w235 | 0.0568 + 0.3125i | 0.6689 + 0.0819i | 0.0991 + 0.6806i | 0.7163 + 0.1032i |
| w236 | 0.1690 + 0.3097i | 0.5683 + 0.1760i | 0.1934 + 0.5729i | 0.6122 + 0.2069i |
| w237 | 0.1690 + 0.3097i | 0.5720 + 0.1640i | 0.1567 + 0.5853i | 0.6268 + 0.1493i |
| w238 | 0.1690 + 0.3128i | 0.6410 + 0.2092i | 0.2285 + 0.6450i | 0.6353 + 0.2349i |
| w239 | 0.1689 + 0.3128i | 0.6491 + 0.1788i | 0.1719 + 0.6651i | 0.7046 + 0.1699i |
| w240 | 0.4128 + 0.4506i | 0.6189 + 0.5514i | 0.5654 + 0.6265i | 0.6521 + 0.5790i |
| w241 | 0.4075 + 0.4506i | 0.6665 + 0.4960i | 0.5027 + 0.6784i | 0.7094 + 0.5138i |
| w242 | 0.4124 + 0.4395i | 0.5667 + 0.4955i | 0.5121 + 0.5697i | 0.6013 + 0.5265i |
| w243 | 0.4073 + 0.4395i | 0.6028 + 0.4546i | 0.4555 + 0.6162i | 0.6524 + 0.4667i |
| w244 | 0.2866 + 0.4518i | 0.7506 + 0.3592i | 0.3624 + 0.7630i | 0.7984 + 0.3673i |

-continued

| | | | | |
|---|---|---|---|---|
| w245 | 0.2875 + 0.4520i | 0.7156 + 0.4239i | 0.4347 + 0.7245i | 0.7580 + 0.4428i |
| w246 | 0.2868 + 0.4399i | 0.6809 + 0.3299i | 0.3286 + 0.6923i | 0.7298 + 0.3325i |
| w247 | 0.2876 + 0.4400i | 0.6544 + 0.3786i | 0.3924 + 0.6581i | 0.6964 + 0.4016i |
| w248 | 0.4087 + 0.3094i | 0.4599 + 0.3752i | 0.3972 + 0.4584i | 0.5005 + 0.4181i |
| w249 | 0.4044 + 0.3093i | 0.4675 + 0.3645i | 0.3657 + 0.4832i | 0.5359 + 0.3697i |
| w250 | 0.4087 + 0.3122i | 0.5121 + 0.4317i | 0.4563 + 0.5135i | 0.5509 + 0.4732i |
| w251 | 0.4044 + 0.3121i | 0.5325 + 0.4077i | 0.4093 + 0.5514i | 0.5953 + 0.4196i |
| w252 | 0.2855 + 0.3099i | 0.5290 + 0.2684i | 0.2657 + 0.5428i | 0.5896 + 0.2686i |
| w253 | 0.2861 + 0.3100i | 0.5240 + 0.2788i | 0.2996 + 0.5248i | 0.5635 + 0.3210i |
| w254 | 0.2855 + 0.3129i | 0.6016 + 0.2998i | 0.2962 + 0.6193i | 0.6601 + 0.3001i |
| w255 | 0.2861 + 0.3130i | 0.5877 + 0.3267i | 0.3481 + 0.5915i | 0.6312 + 0.3619i |

Next, a definition of the QQAM constellation shall be provided. Each input cell word ($y_0, \ldots, y_{m-1}$) shall be modulated using a non-uniform QQAM constellations to give a constellation point zq prior to normalization, where m corresponds to the number of bits per QAM symbol $m=\log_2(M)$. The vector of complex constellation points $x_{0 \ldots M-1}$ for all combinations of the input bits $y_{0 \ldots m-1}$ (corresponding to the decimal values 0 to M−1) are given in the above shown tables for the various constellation sizes depending on the QQAM position vector $w_{0 \ldots b-1}$, which defines the constellation point positions of a first quarter of the non-uniform constellation. The length b of the QQAM position vector w is defined by b=M/4. The QQAM position vector defines a first quarter of the constellation, namely the constellation points with the decimal values 0 ($y_{0 \ldots m}=0000$ for the example of a 16-QQAM) to b−1 ($y_{0 \ldots m}=0011$ for the example of a 16-QQAM), while the remaining constellation points are derived as follows:

$x_{0 \ldots b-1} = w_{0 \ldots b-1}$ (first quarter)

$x_{b \ldots 2b-1} = \operatorname{conj}(w_{0 \ldots b-1})$ (second quarter)

$x_{2b \ldots 3b-1} = -\operatorname{conj}(w_{0 \ldots b-1})$ (third quarter)

Figure 7:
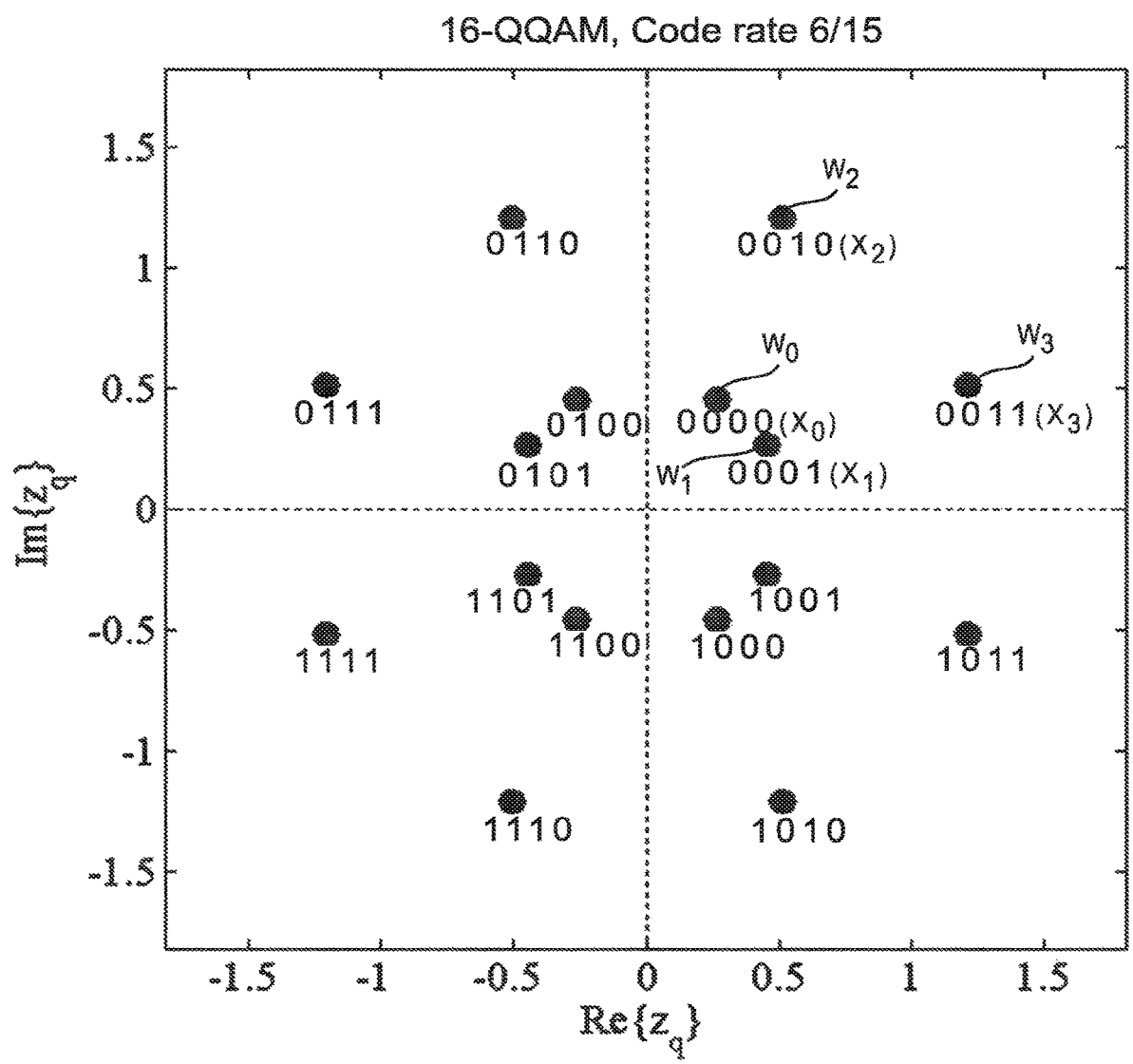
FIG. 7 shows a non-uniform 16-QQAM constellation.

$x_{3b \ldots 4b-1} = -w_{0 \ldots b-1}$ (fourth quarter)

with conj being the complex conjugate. For example, the corresponding constellation point $z_q$ for a 16-QQAM defined by the QQAM position vector (we 3)=(0.2663+0.4530i 0.4530+0.2663i 0.5115+1.2092i 1.2092+0.5115i) and the input cell word ($y_0 \ldots y_{m-1}$)=(1100) is $x_{12}=-w_0=-0.2663 -0.4530i$. The complete constellation for this NUC position vector (optimized for code rate 6/15) is shown in the FIG. 7 with all input cell words marked at the corresponding constellation points.

The QQAM and the $N^2$-NUC constellations have been defined in such a way that the bit-wise mutual information is increasing with the bit position, i.e. the MSB (leftmost bit label) carries the largest mutual information, while the LSB (rightmost bit label) carries the least mutual information. As mentioned above the constellation position vector w as defined herein does not necessarily contain the constellation points of a quadrant, e.g. the first quadrant, of the constellation, but could also contain the constellation points of any of the four quadrants or a quarter of constellation points which are not all located in a single quadrant. Due to the symmetry this leads to constellations with a different bit mapping but with identical performance. The constellation position vector w in the tables defined herein should therefore be considered as an example for all four symmetric constellations with different bit mapping but identical performance.

Figure 8:
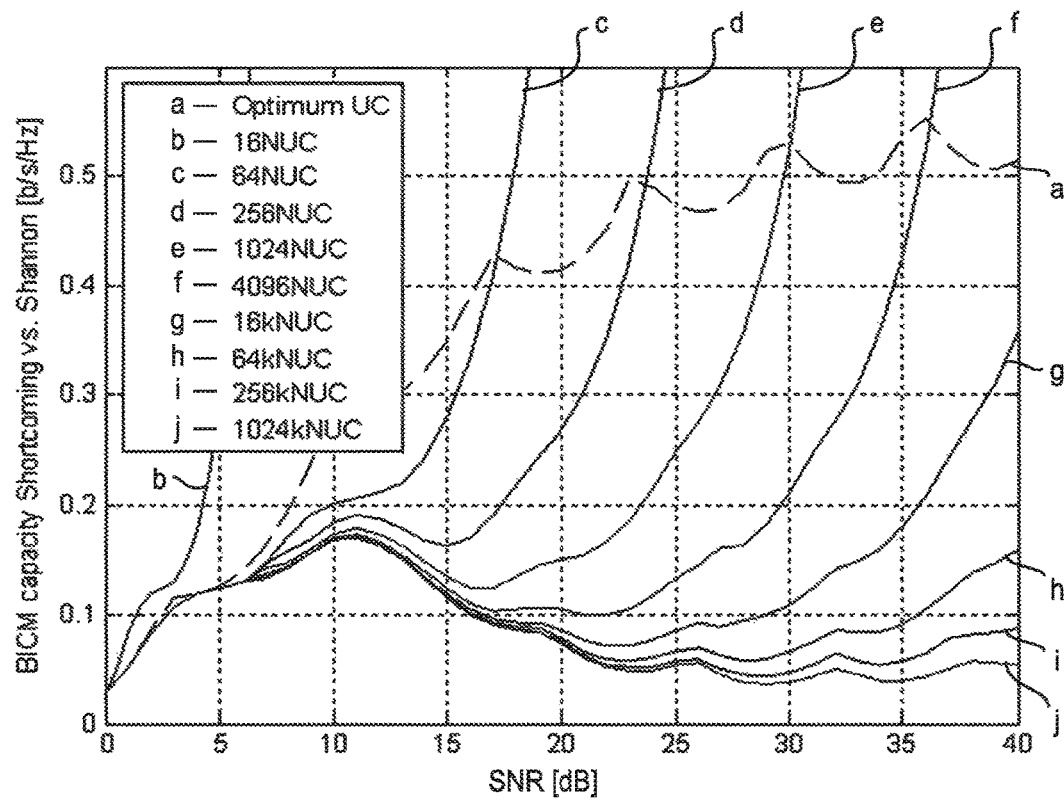
FIG. 8 shows a diagram illustrating the performance of non-uniform $N^2$-QAM constellations.

Using $N^2$-QAM constellations it is meaningful from an information theoretic point of view to use high constellation orders, since these constellations offer more degrees of freedom for the optimization and perform closer to the Shannon capacity as depicted in FIG. 8. However, with increasing constellation size the complexity for demapping in the receiver also increases. Since for large $N^2$QAM constellations many constellation points are very close to each other in the complex plane it is proposed in Jonathan Stott, "CM and BICM limits for rectangular constellations", DVB document server, document TM-MIMO0007. August 2012, to "condense" non-uniform constellations by means of forcing particular constellation points to have the same position before the optimization process, accepting a small performance loss compared to its "mother constellation". Such constellations are called there "ConQAM" (condensed QAM) and the condensed constellations of QQAM constellations are called there "ConQQAM". This provides a reduced complexity during the optimization process, since fewer degrees of freedom have to be optimized and a reduced complexity for demapping in the receiver, due to the reduced number of "effective" constellation points. In the above mentioned document of Jonathan Stott a condensed 16 kQAM has been presented with only 3600 remaining constellation point positions, offering a good performance in the SNR region from 20 to 25 dB.

When the condensation is performed before the optimization, assumptions must be made, how a good performing constellation may look like (i.e. which particular points are condensed and which not). This requires a deep analysis for high constellation sizes. Based on these assumptions of the chosen structure of the constellation, the optimization is carried out over an SNR region with the corresponding number of constellation points (e.g. 268 condensed constellation points instead of 1024). The drawback of this approach is that the optimal structure of the constellation practically changes for each SNR value, which cannot be taken into account. That is the resulting ConQAM constellation with a fixed number of constellations points is not optimal over a broad SNR range. Therefore different structures are herein derived and optimized.

An improved alternative to condensing the constellation before the optimization is the reduction of the constellation points after the optimization which is proposed according to the present disclosure. The optimization of all degrees of freedom of the $N^2$-QAM constellation is thus required, but several advantages are obtained. When performing the condensation after the optimization, a constellation requiring the minimum required number of constellation points can be derived to offer a desired performance. This allows for a seamless change of the required number of constellation points over the SNR range, which leads to a reduction of the number of constellation points compared to the approach proposed in the above mentioned document of Jonathan Stott. This approach will be called dynamic condensation, since it is carried out for each SNR point individually. This approach is outlined for the $N^2$-QAM case in the following.

Figure 9:
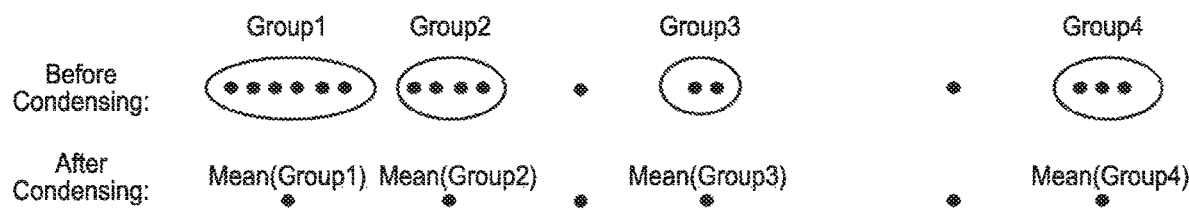
FIG. 9 shows an example for 1D condensing according to an embodiment of the present disclosure.
Figure 10:
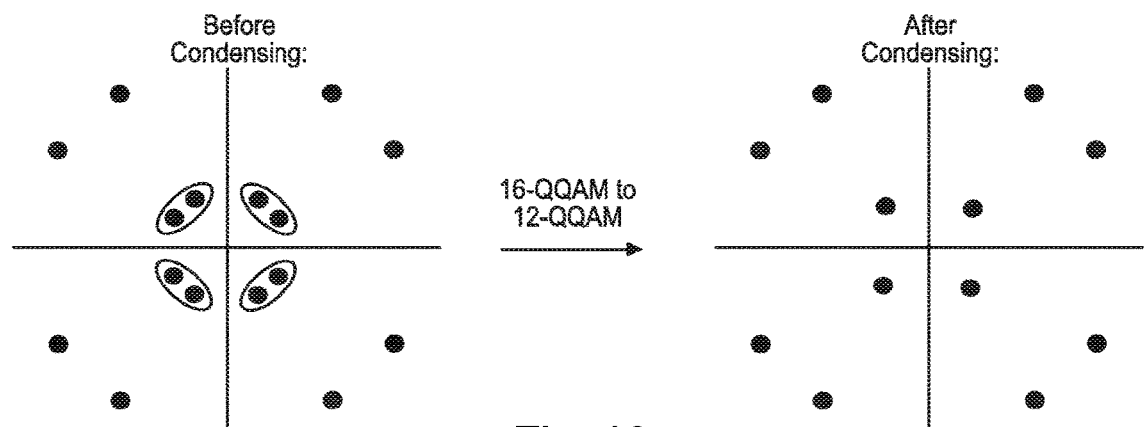
FIG. 10 shows an example for 2D condensing according to an embodiment of the present disclosure.

An example of the algorithm is shown in FIG. 9 for 17 constellation points of a PAM constellation: The constellation points with a distance smaller than the threshold t result in a group of constellation points, i.e. are condensed to a single constellation point position. In the end only 6 constellation points are remaining. Of course, the algorithm can analogously be extended to the 2D-case as will be briefly explained below.

The required number of constellation points of the dynamic approach is clearly lower, in addition guaranteeing a maximum performance penalty with respect to the mother constellation. This leads to a reduced number of constellation points, further reducing the complexity in the demapper.

In an embodiment modulator of the disclosed coding and modulation apparatus modulates said cell words into constellation values of a non-uniform constellation wherein said modulator is configured to use, based on the total number M of constellation points of the constellation and the code rate, a non-uniform constellation from a group B of constellations comprising one or more of the following constellations defined by the constellation position vector u of length v=sqrt(M)/2−1, wherein in one or more constellation position vectors of the constellations from group B two or more constellation positions are identical resulting from a condensation of preliminary constellation positions optimized before.

The following non-uniform constellations comprised in group B are proposed:
B) condensed M-QAM non-uniform constellations of group B:
B1) 256-ConQAM NUC

|   | code rate | | | |
|---|---|---|---|---|
| u | 6/15 | 7/15 | 8/15 | 9/15 |
| u1 | 1 | 1 | 1 | 1 |
| u2 | 2.2838 | 2.6712 | 2.6867 | 2.6537 |
| u3 | 2.2838 | 2.6712 | 3.0876 | 3.3114 |
| u4 | 4.2938 | 4.6718 | 4.8578 | 4.9478 |
| u5 | 4.7065 | 5.3606 | 5.9639 | 6.2057 |
| u6 | 6.5754 | 7.387 | 7.9599 | 8.1648 |
| u7 | 8.6463 | 9.7667 | 10.4826 | 10.6773 |

B2) 1024-ConQAM NUC

| u/code rate | 5/15 | 6/15 | 7/15 | 8/15 | 9/15 | 10/15 |
|---|---|---|---|---|---|---|
| u1 | 1 | 1 | 1 | 1 | 1 | 1 |
| u2 | 1 | 1 | 1 | 2.0888 | 2.5646 | 2.7751 |
| u3 | 1 | 1 | 1 | 2.0888 | 2.5646 | 2.7751 |
| u4 | 2.4714 | 2.7615 | 2.6688 | 3.9929 | 4.55 | 4.8138 |
| u5 | 2.4714 | 2.7615 | 2.6688 | 3.9929 | 4.55 | 4.8138 |
| u6 | 2.4714 | 2.7615 | 3.2331 | 5.3856 | 6.3402 | 6.878 |
| u7 | 2.4714 | 2.7615 | 3.2331 | 5.3856 | 6.3402 | 6.878 |
| u8 | 4.4808 | 4.735 | 4.9096 | 7.5592 | 8.6388 | 8.8948 |
| u9 | 4.4808 | 4.735 | 4.9096 | 7.5592 | 8.6388 | 9.9366 |
| u10 | 4.9849 | 5.5675 | 6.1134 | 9.3349 | 10.5992 | 11.5652 |
| u11 | 4.9849 | 5.5675 | 6.1134 | 9.8406 | 11.6813 | 13.0327 |
| u12 | 6.9079 | 7.3286 | 7.7771 | 11.9228 | 13.7177 | 15.0299 |
| u13 | 6.9079 | 7.819 | 8.5339 | 13.3931 | 15.6096 | 17.0928 |
| u14 | 8.576 | 9.5608 | 10.3128 | 15.8944 | 18.2724 | 19.7629 |
| u15 | 10.4874 | 11.6967 | 12.5661 | 19.1546 | 21.7521 | 23.229 |

B3) 4096-ConQAM NUC

| u/code rate | 5/15 | 6/15 | 7/15 | 8/15 | 9/15 | 10/15 | 11/15 | 12/15 |
|---|---|---|---|---|---|---|---|---|
| u1 | 1 | 1 | 1 | 1 | 1 | 1 | 1 | 1 |
| u2 | 1 | 1 | 1 | 1 | 1 | 2.2716 | 2.7361 | 2.8773 |
| u3 | 1 | 1 | 1 | 1 | 1 | 2.2716 | 2.7361 | 2.8773 |
| u4 | 1 | 1 | 2.039 | 2.5335 | 2.7564 | 4.1311 | 4.6854 | 4.8671 |
| u5 | 1 | 1 | 2.039 | 2.5335 | 2.7564 | 4.1311 | 4.6854 | 4.8671 |
| u6 | 1 | 1 | 2.039 | 2.5335 | 2.7564 | 5.4628 | 6.4578 | 6.804 |
| u7 | 1 | 1 | 2.039 | 2.5335 | 2.7564 | 5.4628 | 6.4578 | 6.804 |
| u8 | 2.632 | 2.6741 | 3.9335 | 4.5125 | 4.7808 | 7.4745 | 8.5074 | 8.5047 |
| u9 | 2.632 | 2.6741 | 3.9335 | 4.5125 | 4.7808 | 7.4745 | 8.5074 | 9.3098 |
| u10 | 2.632 | 2.6741 | 3.9335 | 4.5125 | 4.7808 | 8.9342 | 10.3862 | 10.538 |
| u11 | 2.632 | 2.6741 | 3.9335 | 4.5125 | 4.7808 | 8.9342 | 10.3862 | 11.4018 |
| u12 | 2.632 | 3.2045 | 5.2825 | 6.2741 | 6.7922 | 10.9126 | 12.5386 | 12.7315 |
| u13 | 2.632 | 3.2045 | 5.2825 | 6.2741 | 6.7922 | 10.9126 | 12.5386 | 13.671 |
| u14 | 2.632 | 3.2045 | 5.2825 | 6.2741 | 6.7922 | 12.5824 | 14.7019 | 14.9604 |
| u15 | 2.632 | 3.2045 | 5.2825 | 6.2741 | 6.7922 | 12.5824 | 14.7019 | 15.9972 |
| u16 | 4.6312 | 4.8953 | 7.4395 | 8.5533 | 8.7969 | 14.7996 | 17.2181 | 17.4143 |
| u17 | 4.6312 | 4.8953 | 7.4395 | 8.5533 | 8.7969 | 14.7996 | 17.2181 | 18.5456 |
| u18 | 4.6312 | 4.8953 | 7.4395 | 8.5533 | 9.7606 | 16.7338 | 19.7895 | 19.9493 |
| u19 | 4.6312 | 4.8953 | 7.4395 | 8.5533 | 9.7606 | 16.7338 | 19.7895 | 21.1969 |
| u20 | 5.2613 | 6.077 | 9.1955 | 10.4959 | 11.3919 | 19.1103 | 22.0532 | 22.741 |
| u21 | 5.2613 | 6.077 | 9.1955 | 10.4959 | 11.3919 | 19.1103 | 23.3808 | 24.129 |
| u22 | 5.2613 | 6.077 | 9.6429 | 11.4947 | 12.8073 | 21.6213 | 25.1169 | 25.7517 |
| u23 | 5.2613 | 6.077 | 9.6429 | 11.4947 | 12.8073 | 21.6213 | 26.6987 | 27.3256 |
| u24 | 7.0507 | 7.7374 | 11.7079 | 13.5198 | 14.7968 | 24.1315 | 28.6925 | 29.1651 |
| u25 | 7.0507 | 7.7374 | 11.7079 | 13.5198 | 14.7968 | 25.5633 | 30.5564 | 30.9655 |
| u26 | 7.4269 | 8.4608 | 13.0989 | 15.1128 | 16.5067 | 27.6414 | 32.7592 | 33.0129 |

-continued

| u/code rate | 5/15 | 6/15 | 7/15 | 8/15 | 9/15 | 10/15 | 11/15 | 12/15 |
|---|---|---|---|---|---|---|---|---|
| u27 | 7.4269 | 8.4608 | 13.0989 | 15.6457 | 17.5025 | 29.6431 | 35.04 | 35.1483 |
| u28 | 8.869 | 9.9898 | 15.1744 | 17.6029 | 19.3416 | 32.2532 | 37.7468 | 37.6166 |
| u29 | 9.1641 | 10.497 | 16.2183 | 19.0971 | 21.1053 | 35.0366 | 40.6819 | 40.3063 |
| u30 | 10.5034 | 12.1004 | 18.4967 | 21.5328 | 23.5673 | 38.5846 | 44.2782 | 43.5432 |
| u31 | 12.3418 | 14.1335 | 21.4623 | 24.7544 | 26.8076 | 43.1809 | 48.8556 | 47.6401 |

When optimizing non-uniform QAM constellations, some of the constellation points tend to merge. This can be exploited by deliberately merging constellation points that lie close to each other in order to reduce the complexity in the QAM demapper (but also in the QAM mapper), by simplifying the calculation of the soft-decision log likelihood ratios (LLRs). Such constellations are called condensed QAM constellations. If chosen carefully, the loss in performance compared to non-condensed non-uniform constellations can be neglected. As an example, the 1024-QQAM constellation optimized for code rate 6/15 can be condensed to 268 constellation point positions reducing the demapping complexity while retaining the performance.

In an embodiment the modulator of the disclosed coding and modulation apparatus modulates said cell words into constellation values of a non-uniform constellation wherein said modulator is configured to use, based on the total number M of constellation points of the constellation and the code rate, a non-uniform constellation from a group D of constellations comprising one or more of the following constellations, wherein the constellation points are defined by a constellation position vector $w_{0 \ldots b-1}$ with $b=M/4$, wherein a first quarter of the constellation points $x_{0 \ldots b-1}$ are defined as $x_{0 \ldots b-1} = w_{0 \ldots b-1}$,
a second quarter of the constellation points $x_{b \ldots 2b-1}$ are defined as $x_{b \ldots 2b-1} = \text{conj}(w_{0 \ldots b-1})$,
a third quarter of the constellation points $x_{2b \ldots 3b-1}$ are defined as $x_{2b \ldots 3b-1} = -\text{conj}(w_{0 \ldots b-1})$, and a fourth quarter of the constellation points $x_{3b \ldots 4b-1}$ are defined as $x_{3b \ldots 4b-1} = -w_{0 \ldots b1}$, wherein conj is the complex conjugate, wherein in one or more constellation position vectors of the constellations from group D two or more constellation positions are identical resulting from a condensation of preliminary constellation positions optimized before.

The following non-uniform constellations comprised in group D are proposed:
D) condensed M-QAM non-uniform constellations of group D:
D1) 64-ConQQAM NUC

| | | code rate | | | |
|---|---|---|---|---|---|
| w | 5/15 | 6/15 | 7/15 | 8/15 | 9/15 |
| w0 | 1.0257 + 0.5960i | 0.5656 + 0.9499i | 0.2925 + 1.4892i | 0.2920 + 1.4827i | 0.2978 + 1.4669i |
| w1 | 1.2181 + 0.7476i | 0.2750 + 1.0676i | 0.8449 + 1.2622i | 0.8411 + 1.2563i | 0.8421 + 1.2355i |
| w2 | 1.1509 + 0.3069i | 0.8202 + 1.2651i | 0.2351 + 1.0196i | 0.2174 + 1.0211i | 0.2135 + 1.0389i |
| w3 | 1.3888 + 0.3325i | 0.3011 + 1.4529i | 0.5555 + 0.8926i | 0.5702 + 0.8798i | 0.6055 + 0.8654i |
| w4 | 0.5961 + 1.0257i | 0.9500 + 0.5641i | 1.4892 + 0.2925i | 1.4827 + 0.2920i | 1.4685 + 0.2859i |
| w5 | 0.7476 + 1.2181i | 1.0666 + 0.2744i | 1.2622 + 0.8449i | 1.2563 + 0.8410i | 1.2516 + 0.8201i |
| w6 | 0.3069 + 1.1510i | 1.2657 + 0.8178i | 1.0196 + 0.2351i | 1.0211 + 0.2174i | 1.0279 + 0.1981i |
| w7 | 0.3325 + 1.3888i | 1.4521 + 0.3005i | 0.8926 + 0.5555i | 0.8798 + 0.5702i | 0.8857 + 0.5642i |
| w8 | 0.4969 + 0.2685i | 0.2717 + 0.5512i | 0.1635 + 0.3025i | 0.1583 + 0.3034i | 0.1545 + 0.3665i |
| w9 | 0.4123 + 0.2376i | 0.2717 + 0.5512i | 0.1635 + 0.3025i | 0.1583 + 0.3034i | 0.1545 + 0.3665i |
| w10 | 0.4969 + 0.2685i | 0.2020 + 0.3572i | 0.2075 + 0.6586i | 0.1871 + 0.6855i | 0.1756 + 0.7261i |
| w11 | 0.4123 + 0.2376i | 0.2020 + 0.3572i | 0.3354 + 0.6030i | 0.3563 + 0.6126i | 0.4023 + 0.6126i |
| w12 | 0.2685 + 0.4969i | 0.5503 + 0.2716i | 0.3025 + 0.1635i | 0.3034 + 0.1583i | 0.2731 + 0.1455i |
| w13 | 0.2376 + 0.4123i | 0.5503 + 0.2716i | 0.3025 + 0.1635i | 0.3034 + 0.1583i | 0.2731 + 0.1455i |
| w14 | 0.2685 + 0.4969i | 0.3561 + 0.2021i | 0.6586 + 0.2075i | 0.6855 + 0.1871i | 0.6840 + 0.1578i |
| w15 | 0.2376 + 0.4123i | 0.3561 + 0.2021i | 0.6030 + 0.3354i | 0.6126 + 0.3563i | 0.6145 + 0.3556i |

D2) 256-ConQQAM NUC

| w/code | 5/15 | 6/15 | 7/15 | 8/15 | 9/15 | 10/15 | 11/15 |
|---|---|---|---|---|---|---|---|
| w0 | −0.3495 + 1.7549i | 0.6800 + 1.6926i | 0.7280 + 1.6384i | 1.0804 + 1.3788i | 1.6350 + 0.1593i | 1.6097 + 0.1548i | 0.1512 + 1.5761i |
| w1 | −0.2804 + 1.4293i | 0.3911 + 1.3645i | 0.4787 + 1.3492i | 1.0487 + 0.9862i | 1.5776 + 0.4735i | 1.5549 + 0.4605i | 0.4510 + 1.5251i |
| w2 | −0.2804 + 1.4293i | 0.2191 + 1.7524i | 0.2417 + 1.7872i | 1.6464 + 0.7428i | 1.3225 + 0.1320i | 1.3226 + 0.1290i | 0.1269 + 1.3158i |
| w3 | −0.2635 + 1.3614i | 0.2274 + 1.4208i | 0.1966 + 1.4478i | 1.3245 + 0.9414i | 1.2742 + 0.3922i | 1.2772 + 0.3829i | 0.3773 + 1.2728i |
| w4 | −0.9918 + 1.4880i | 0.8678 + 1.2487i | 0.9185 + 1.2490i | 0.7198 + 1.2427i | 1.2901 + 1.0495i | 1.2753 + 1.0242i | 1.0045 + 1.2537i |
| w5 | −0.8109 + 1.21161i | 0.7275 + 1.1667i | 0.7448 + 1.1524i | 0.8106 + 1.0040i | 1.4625 + 0.7740i | 1.4434 + 0.7540i | 0.7386 + 1.4164i |
| w6 | −0.8109 + 1.2116i | 0.8747 + 1.0470i | 0.9536 + 0.9516i | 0.5595 + 1.0317i | 1.0382 + 0.8623i | 1.0491 + 0.8476i | 0.8392 + 1.0508i |
| w7 | −0.7744 + 1.1516i | 0.7930 + 1.0406i | 0.8912 + 0.9461i | 0.6118 + 0.9722i | 1.1794 + 0.6376i | 1.1861 + 0.6253i | 0.6172 + 1.1844i |
| w8 | −0.2349 + 1.0113i | 0.1978 + 0.9823i | 0.2553 + 0.9993i | 1.6768 + 0.2002i | 0.9430 + 0.1100i | 0.9326 + 0.0970i | 0.0939 + 0.9317i |
| w9 | −0.2349 + 1.0113i | 0.2071 + 1.0557i | 0.2988 + 1.0689i | 0.9997 + 0.6844i | 0.9069 + 0.2829i | 0.8962 + 0.2804i | 0.2781 + 0.8975i |
| w10 | −0.2349 + 1.0113i | 0.1978 + 0.9823i | 0.1656 + 1.0288i | 1.4212 + 0.4769i | 1.0854 + 0.1139i | 1.1044 + 0.1102i | 0.1093 + 1.1073i |
| w11 | −0.2349 + 1.0113i | 0.2071 + 1.0557i | 0.1779 + 1.1140i | 1.1479 + 0.6312i | 1.0441 + 0.3296i | 1.0648 + 0.3267i | 0.3230 + 1.0701i |
| w12 | −0.5497 + 0.8869i | 0.5660 + 0.8461i | 0.5795 + 0.8287i | 0.6079 + 0.6566i | 0.7273 + 0.6160i | 0.7325 + 0.6071i | 0.6074 + 0.7404i |
| w13 | −0.5497 + 0.8869i | 0.5660 + 0.8461i | 0.5795 + 0.8287i | 0.7284 + 0.6957i | 0.8177 + 0.4841i | 0.8260 + 0.4559i | 0.4499 + 0.8324i |

-continued

| w/code | 5/15 | 6/15 | 7/15 | 8/15 | 9/15 | 10/15 | 11/15 |
|---|---|---|---|---|---|---|---|
| w14 | −0.5497 + 0.8869i | 0.6073 + 0.8182i | 0.6595 + 0.7742i | 0.5724 + 0.7031i | 0.8504 + 0.7217i | 0.8744 + 0.7153i | 0.7128 + 0.8852i |
| w15 | −0.5497 + 0.8869i | 0.5660 + 0.8461i | 0.6595 + 0.7742i | 0.6302 + 0.7259i | 0.9638 + 0.5407i | 0.9882 + 0.5300i | 0.5259 + 0.9957i |
| w16 | −1.7549 + 0.3495i | 1.4070 + 0.1790i | 1.4079 + 0.1358i | 0.1457 + 1.4010i | 0.1658 + 0.9530i | 0.1646 + 1.6407i | 1.6163 + 0.1632i |
| w17 | −1.4293 + 0.2804i | 1.7227 + 0.2900i | 1.7492 + 0.2856i | 0.1866 + 1.7346i | 0.4907 + 1.6084i | 0.4867 + 1.5743i | 1.5486 + 0.4813i |
| w18 | −1.4293 + 0.2804i | 1.3246 + 0.2562i | 1.3108 + 0.2733i | 0.1174 + 1.1035i | 0.1322 + 1.3631i | 0.1363 + 1.3579i | 1.3596 + 0.1381i |
| w19 | −1.3614 + 0.2635i | 1.3636 + 0.3654i | 1.3393 + 0.4031i | 0.1095 + 1.0132i | 0.3929 + 1.3102i | 0.4023 + 1.3026i | 1.3018 + 0.4076i |
| w20 | −1.4880 + 0.9918i | 1.3708 + 1.2834i | 1.3733 + 1.2596i | 0.4357 + 1.3636i | 1.0646 + 1.2876i | 1.0542 + 1.2584i | 1.2347 + 1.0376i |
| w21 | −1.2116 + 0.8109i | 1.6701 + 0.8403i | 1.6601 + 0.8198i | 0.5853 + 1.6820i | 0.7949 + 1.4772i | 0.7875 + 1.4450i | 1.4193 + 0.7769i |
| w22 | −1.2116 + 0.8109i | 1.1614 + 0.7909i | 1.1559 + 0.7249i | 0.3439 + 1.0689i | 0.8555 + 1.0542i | 0.8687 + 1.0407i | 1.0335 + 0.8734i |
| w23 | −1.1516 + 0.7744i | 1.2241 + 0.7367i | 1.2163 + 0.6897i | 0.3234 + 0.9962i | 0.6363 + 1.2064i | 0.6502 + 1.1951i | 1.1905 + 0.6562i |
| w24 | −1.0113 + 0.2349i | 0.9774 + 0.2034i | 0.9601 + 0.1792i | 0.1083 + 0.6241i | 0.1088 + 0.9530i | 0.0082 + 0.9745i | 0.9948 + 0.1006i |
| w25 | −1.0113 + 0.2349i | 0.9774 + 0.2034i | 0.9601 + 0.1792i | 0.1083 + 0.6241i | 0.2464 + 0.9270i | 0.2842 + 0.9344i | 0.9492 + 0.2955i |
| w26 | −1.0113 + 0.2349i | 0.9774 + 0.2034i | 0.9601 + 0.1792i | 0.1093 + 0.7170i | 0.1124 + 1.1327i | 0.1142 + 1.1448i | 1.1596 + 0.1180i |
| w27 | −1.0113 + 0.2349i | 0.9795 + 0.2417i | 0.9601 + 0.1792i | 0.1093 + 0.7170i | 0.3160 + 1.0913i | 0.3385 + 1.0973i | 1.1091 + 0.3468i |
| w28 | −0.8869 + 0.5497i | 0.8236 + 0.4847i | 0.8069 + 0.4342i | 0.3208 + 0.6318i | 0.5707 + 0.7662i | 0.6062 + 0.7465i | 0.7476 + 0.6205i |
| w29 | −0.8869 + 0.5497i | 0.8236 + 0.4847i | 0.8069 + 0.4342i | 0.3208 + 0.6318i | 0.4490 + 0.8461i | 0.4607 + 0.8538i | 0.8645 + 0.4711i |
| w30 | −0.8869 + 0.5497i | 0.8798 + 0.5374i | 0.8601 + 0.4908i | 0.3297 + 0.7141i | 0.6961 + 0.8850i | 0.7263 + 0.8764i | 0.8777 + 0.7384i |
| w31 | −0.8869 + 0.5497i | 0.8798 + 0.5374i | 0.8601 + 0.4908i | 0.3297 + 0.7141i | 0.5229 + 1.0037i | 0.5450 + 1.0067i | 1.0128 + 0.5570i |
| w32 | −0.1640 + 0.3056i | 0.1509 + 0.3272i | 0.1217 + 0.4285i | 0.9688 + 0.1119i | 0.3232 + 0.0858i | 0.2660 + 0.0752i | 0.0742 + 0.2556i |
| w33 | −0.1640 + 0.3056i | 0.1509 + 0.3272i | 0.1217 + 0.4285i | 0.9131 + 0.1709i | 0.3232 + 0.0858i | 0.2660 + 0.0752i | 0.0742 + 0.2556i |
| w34 | −0.1640 + 0.3056i | 0.1509 + 0.3272i | 0.1217 + 0.4285i | 0.9688 + 0.1119i | 0.4564 + 0.1187i | 0.4544 + 0.0957i | 0.0937 + 0.4473i |
| w35 | −0.1640 + 0.3056i | 0.1509 + 0.3272i | 0.1217 + 0.4285i | 0.9131 + 0.1709i | 0.4564 + 0.1187i | 0.4544 + 0.0957i | 0.0937 + 0.4473i |
| w36 | −0.1640 + 0.3056i | 0.1509 + 0.3272i | 0.1708 + 0.3974i | 0.6419 + 0.1441i | 0.2849 + 0.1302i | 0.2572 + 0.1781i | 0.2078 + 0.2475i |
| w37 | −0.1640 + 0.3056i | 0.1509 + 0.3272i | 0.1708 + 0.3974i | 0.6419 + 0.1441i | 0.2849 + 0.1302i | 0.2572 + 0.1781i | 0.2078 + 0.2475i |
| w38 | −0.1640 + 0.3056i | 0.1509 + 0.3272i | 0.1708 + 0.3974i | 0.6419 + 0.1441i | 0.3766 + 0.2539i | 0.3660 + 0.2732i | 0.2876 + 0.3664i |
| w39 | −0.1640 + 0.3056i | 0.1509 + 0.3272i | 0.1708 + 0.3974i | 0.6419 + 0.1441i | 0.3766 + 0.2539i | 0.3660 + 0.2732i | 0.2876 + 0.3664i |
| w40 | −0.2071 + 0.6406i | 0.1786 + 0.6836i | 0.1744 + 0.7444i | 1.3127 + 0.1240i | 0.7502 + 0.1138i | 0.7706 + 0.0922i | 0.0813 + 0.7729i |
| w41 | −0.2071 + 0.6406i | 0.1786 + 0.6836i | 0.1744 + 0.7444i | 0.9572 + 0.4344i | 0.7325 + 0.2088i | 0.7407 + 0.2260i | 0.2345 + 0.7412i |
| w42 | −0.2071 + 0.6406i | 0.1786 + 0.6836i | 0.1744 + 0.7444i | 1.2403 + 0.2631i | 0.6473 + 0.1138i | 0.6180 + 0.0927i | 0.0756 + 0.6187i |
| w43 | −0.2071 + 0.6406i | 0.1786 + 0.6836i | 0.1744 + 0.7444i | 1.0254 + 0.4130i | 0.6339 + 0.1702i | 0.6019 + 0.1658i | 0.1815 + 0.5946i |
| w44 | −0.3251 + 0.5895i | 0.3585 + 0.6001i | 0.3995 + 0.6028i | 0.6207 + 0.4139i | 0.5902 + 0.4857i | 0.6007 + 0.4980i | 0.5118 + 0.6039i |
| w45 | −0.3251 + 0.5895i | 0.3585 + 0.6001i | 0.3995 + 0.6028i | 0.6773 + 0.4284i | 0.6355 + 0.4185i | 0.6673 + 0.3928i | 0.3821 + 0.6808i |
| w46 | −0.3251 + 0.5895i | 0.3585 + 0.6001i | 0.3995 + 0.6028i | 0.6207 + 0.4139i | 0.5099 + 0.3795i | 0.4786 + 0.3935i | 0.4145 + 0.4734i |
| w47 | −0.3251 + 0.5895i | 0.3585 + 0.6001i | 0.3995 + 0.6028i | 0.6207 + 0.4139i | 0.5099 + 0.3795i | 0.5176 + 0.3391i | 0.3230 + 0.5340i |
| w48 | −0.3056 + 0.1640i | 0.2707 + 0.1533i | 0.2219 + 0.1422i | 0.1249 + 0.1155i | 0.0962 + 0.1443i | 0.0755 + 0.1004i | 0.0859 + 0.0728i |
| w49 | −0.3056 + 0.1640i | 0.2707 + 0.1533i | 0.2219 + 0.1422i | 0.1249 + 0.1155i | 0.0962 + 0.1443i | 0.0755 + 0.1004i | 0.0859 + 0.0728i |
| w50 | −0.3056 + 0.1640i | 0.2707 + 0.1533i | 0.2219 + 0.1422i | 0.1249 + 0.1155i | 0.0932 + 0.3972i | 0.0822 + 0.4771i | 0.5165 + 0.0795i |
| w51 | −0.3056 + 0.1640i | 0.2707 + 0.1533i | 0.2219 + 0.1422i | 0.1249 + 0.1155i | 0.0932 + 0.3972i | 0.0822 + 0.4771i | 0.5165 + 0.0795i |
| w52 | −0.3056 + 0.1640i | 0.2707 + 0.1533i | 0.2219 + 0.1422i | 0.3743 + 0.1248i | 0.0962 + 0.1443i | 0.1016 + 0.2242i | 0.2619 + 0.0919i |
| w53 | −0.3056 + 0.1640i | 0.2707 + 0.1533i | 0.2219 + 0.1422i | 0.3743 + 0.1248i | 0.0962 + 0.1443i | 0.1016 + 0.2242i | 0.2619 + 0.0919i |
| w54 | −0.3056 + 0.1640i | 0.2707 + 0.1533i | 0.2219 + 0.1422i | 0.3743 + 0.1248i | 0.1923 + 0.3624i | 0.1916 + 0.3944i | 0.4223 + 0.2036i |
| w55 | −0.3056 + 0.1640i | 0.2707 + 0.1533i | 0.2219 + 0.1422i | 0.3743 + 0.1248i | 0.1923 + 0.3624i | 0.1916 + 0.3944i | 0.4223 + 0.2036i |
| w56 | −0.6406 + 0.2071i | 0.6459 + 0.1725i | 0.6060 + 0.1399i | 0.1166 + 0.3558i | 0.1091 + 0.7656i | 0.0930 + 0.8122i | 0.8427 + 0.0848i |
| w57 | −0.6406 + 0.2071i | 0.6459 + 0.1725i | 0.6060 + 0.1399i | 0.1166 + 0.3558i | 0.1699 + 0.7537i | 0.2215 + 0.7840i | 0.8036 + 0.2443i |
| w58 | −0.6406 + 0.2071i | 0.6459 + 0.1725i | 0.6060 + 0.1399i | 0.1166 + 0.3558i | 0.1142 + 0.5964i | 0.0937 + 0.6514i | 0.6933 + 0.0788i |
| w59 | −0.6406 + 0.2071i | 0.6459 + 0.1725i | 0.6060 + 0.1399i | 0.1166 + 0.3558i | 0.1142 + 0.5964i | 0.1540 + 0.6366i | 0.6649 + 0.1793i |
| w60 | −0.5895 + 0.3251i | 0.5863 + 0.3220i | 0.5660 + 0.3001i | 0.3519 + 0.3779i | 0.4294 + 0.6363i | 0.4810 + 0.6306i | 0.6321 + 0.5048i |
| w61 | −0.5895 + 0.3251i | 0.5863 + 0.3220i | 0.5660 + 0.3001i | 0.3519 + 0.3779i | 0.3744 + 0.6744i | 0.3856 + 0.7037i | 0.7279 + 0.3892i |
| w62 | −0.5895 + 0.3251i | 0.5863 + 0.3220i | 0.5660 + 0.3001i | 0.3519 + 0.3779i | 0.3120 + 0.5292i | 0.3527 + 0.5230i | 0.5265 + 0.3752i |
| w63 | −0.5895 + 0.3251i | 0.5863 + 0.3220i | 0.5660 + 0.3001i | 0.3519 + 0.3779i | 0.3120 + 0.5292i | 0.3100 + 0.5559i | 0.5885 + 0.3076i |

D3) 1024-ConQQAM NUC

| w/code rate | 5/15 | 6/15 | 7/15 | 8/15 | 9/15 |
|---|---|---|---|---|---|
| w1 | 1.9734 + 0.6475i | 1.3555 + 1.1873i | 0.1119 + 1.7802i | 0.0966 + 1.7257i | 0.1003 + 1.7258i |
| w1 | 1.7794 + 0.9784i | 1.0871 + 1.4324i | 0.2324 + 2.0028i | 0.1799 + 1.9540i | 0.1722 + 1.9393i |
| w2 | 0.4642 + 1.8997i | 1.5003 + 1.4954i | 0.1416 + 1.5629i | 0.1216 + 1.5846i | 0.0956 + 1.5505i |
| w3 | 0.8851 + 1.9829i | 1.1127 + 1.7206i | 0.1594 + 1.5242i | 0.2925 + 1.5635i | 0.2621 + 1.5384i |
| w4 | 0.2393 + 1.3953i | 0.2080 + 2.0408i | 0.8323 + 1.8356i | 0.7016 + 1.7899i | 0.6393 + 1.7656i |
| w5 | 0.2393 + 1.3953i | 0.7958 + 1.4948i | 0.5102 + 1.8340i | 0.4407 + 1.8294i | 0.3969 + 1.7846i |
| w6 | 0.2534 + 1.4887i | 0.5864 + 1.9337i | 0.4040 + 1.5212i | 0.6347 + 1.5255i | 0.6050 + 1.5226i |
| w7 | 0.2393 + 1.3953i | 0.7534 + 1.6241i | 0.4040 + 1.5212i | 0.4512 + 1.5701i | 0.4221 + 1.5525i |
| w8 | 2.0528 + 0.2197i | 1.0007 + 1.0906i | 0.1151 + 1.2407i | 0.0862 + 1.3505i | 0.0799 + 1.3199i |
| w9 | 1.6003 + 1.3185i | 0.9660 + 1.1761i | 0.1151 + 1.2407i | 0.2378 + 1.3237i | 0.2425 + 1.3020i |
| w10 | 0.1805 + 2.0047i | 0.9193 + 1.0471i | 0.1219 + 1.3013i | 0.0908 + 1.3996i | 0.0833 + 1.3795i |
| w11 | 1.3579 + 1.6516i | 0.8849 + 1.0953i | 0.1219 + 1.3013i | 0.2515 + 1.3739i | 0.2487 + 1.3670i |
| w12 | 0.1534 + 1.4308i | 0.8849 + 1.0953i | 0.3445 + 1.2020i | 0.5334 + 1.2483i | 0.5352 + 1.2272i |
| w13 | 0.1532 + 1.3846i | 0.8468 + 1.2089i | 0.3445 + 1.2020i | 0.4112 + 1.2843i | 0.3974 + 1.2734i |
| w14 | 0.1492 + 1.5422i | 0.8508 + 1.0556i | 0.3544 + 1.2507i | 0.5634 + 1.3178i | 0.5666 + 1.3364i |
| w15 | 0.1534 + 1.4308i | 0.8263 + 1.1474i | 0.3544 + 1.2507i | 0.4201 + 1.3450i | 0.4117 + 1.3592i |
| w16 | 0.7168 + 1.4422i | 1.3097 + 0.8498i | 1.0272 + 1.4142i | 1.3853 + 1.1272i | 1.4270 + 1.2101i |
| w17 | 0.7660 + 1.4662i | 1.2703 + 0.7763i | 0.9293 + 1.2912i | 1.3369 + 1.3509i | 1.2720 + 1.3913i |
| w18 | 0.7079 + 1.5478i | 1.2076 + 0.7137i | 1.0481 + 1.1977i | 1.2114 + 1.0355i | 1.2297 + 1.0783i |

-continued

| | | | | | |
|---|---|---|---|---|---|
| w19 | 0.7980 + 1.5832i | 1.2076 + 0.7137i | 1.0032 + 1.1946i | 1.1082 + 1.1877i | 1.1069 + 1.2225i |
| w20 | 0.5597 + 1.2994i | 1.0228 + 0.5992i | 0.8044 + 1.5410i | 0.9388 + 1.6673i | 0.8723 + 1.6736i |
| w21 | 0.5597 + 1.2994i | 1.0228 + 0.5992i | 0.7504 + 1.3903i | 1.1497 + 1.5199i | 1.0846 + 1.5470i |
| w22 | 0.5597 + 1.2994i | 1.0228 + 0.5992i | 0.6252 + 1.4270i | 0.8175 + 1.4408i | 0.7883 + 1.4518i |
| w23 | 0.5597 + 1.2994i | 1.0228 + 0.5992i | 0.6252 + 1.4270i | 0.9821 + 1.3219i | 0.9583 + 1.3483i |
| w24 | 0.8801 + 1.2399i | 1.0659 + 0.8350i | 0.8299 + 1.0222i | 0.9456 + 0.9078i | 0.9564 + 0.8979i |
| w25 | 1.0042 + 1.2986i | 1.0650 + 0.3350i | 0.8299 + 1.0222i | 0.8986 + 0.9677i | 0.8843 + 0.9882i |
| w26 | 0.8801 + 1.2399i | 1.0347 + 0.8079i | 0.8299 + 1.0222i | 1.0292 + 0.9494i | 1.0738 + 0.9718i |
| w27 | 1.0594 + 1.3586i | 1.0347 + 0.8079i | 0.8299 + 1.0222i | 0.9610 + 1.0336i | 0.9788 + 1.0896i |
| w28 | 0.6953 + 1.1557i | 0.9737 + 0.6361i | 0.5930 + 1.1582i | 0.6851 + 1.1662i | 0.6658 + 1.1650i |
| w29 | 0.6953 + 1.1557i | 0.9737 + 0.6861i | 0.5930 + 1.1582i | 0.7736 + 1.1030i | 0.7770 + 1.0888i |
| w30 | 0.6953 + 1.1557i | 0.9737 + 0.6861i | 0.5930 + 1.1582i | 0.7229 + 1.2479i | 0.7185 + 1.2809i |
| w31 | 0.6953 + 1.1557i | 0.9737 + 0.6861i | 0.5930 + 1.1582i | 0.8384 + 1.1668i | 0.8561 + 1.1944i |
| w32 | 0.1580 + 0.9274i | 0.1594 + 1.5423i | 0.1087 + 0.9066i | 0.1143 + 1.0119i | 0.0797 + 1.0147i |
| w33 | 0.1580 + 0.9274i | 0.4315 + 1.3873i | 0.1087 + 0.9066i | 0.1143 + 1.0119i | 0.1584 + 1.0041i |
| w34 | 0.1580 + 0.9274i | 0.1970 + 1.5197i | 0.1087 + 0.9066i | 0.1143 + 1.0119i | 0.0797 + 1.0147i |
| w35 | 0.1580 + 0.9274i | 0.4315 + 1.3873i | 0.1087 + 0.9066i | 0.1143 + 1.0119i | 0.1584 + 1.0041i |
| w36 | 0.1644 + 1.0218i | 0.1795 + 1.6689i | 0.2739 + 0.8771i | 0.3260 + 0.9470i | 0.3578 + 0.9313i |
| w37 | 0.1644 + 1.0218i | 0.5011 + 1.4256i | 0.2739 + 0.8771i | 0.3260 + 0.9470i | 0.3089 + 0.9536i |
| w38 | 0.1644 + 1.0218i | 0.2493 + 1.6121i | 0.2739 + 0.8771i | 0.3260 + 0.9470i | 0.3578 + 0.9313i |
| w39 | 0.1644 + 1.0218i | 0.5011 + 1.4256i | 0.2739 + 0.8771i | 0.3260 + 0.9470i | 0.3089 + 0.9536i |
| w40 | 0.1580 + 0.9274i | 0.6307 + 0.9904i | 0.1073 + 1.0228i | 0.0934 + 1.1764i | 0.0757 + 1.1678i |
| w41 | 0.1580 + 0.9274i | 0.6077 + 1.0677i | 0.1073 + 1.0228i | 0.1853 + 1.1657i | 0.2089 + 1.1525i |
| w42 | 0.1580 + 0.9274i | 0.6307 + 0.9904i | 0.1073 + 1.0228i | 0.0934 + 1.1764i | 0.0757 + 1.1678i |
| w43 | 0.1580 + 0.9274i | 0.6077 + 1.0677i | 0.1073 + 1.0228i | 0.1853 + 1.1657i | 0.2089 + 1.1525i |
| w44 | 0.1644 + 1.0218i | 0.6307 + 0.9904i | 0.3069 + 0.9954i | 0.4320 + 1.0863i | 0.4674 + 1.0931i |
| w45 | 0.1644 + 1.0218i | 0.6077 + 1.0677i | 0.3069 + 0.9954i | 0.3704 + 1.1115i | 0.3537 + 1.1141i |
| w46 | 0.1644 + 1.0218i | 0.6307 + 0.9904i | 0.3069 + 0.9954i | 0.4320 + 1.0863i | 0.4464 + 1.0591i |
| w47 | 0.1644 + 1.0218i | 0.6077 + 1.0677i | 0.3069 + 0.9954i | 0.3704 + 1.1115i | 0.3537 + 1.1141i |
| w48 | 0.4479 + 0.8477i | 0.6537 + 0.5911i | 0.6031 + 0.7131i | 0.6171 + 0.7142i | 0.6214 + 0.7083i |
| w49 | 0.4479 + 0.8477i | 0.6537 + 0.5911i | 0.6031 + 0.7131i | 0.6171 + 0.7142i | 0.6214 + 0.7083i |
| w50 | 0.4479 + 0.8477i | 0.6537 + 0.5911i | 0.6031 + 0.7131i | 0.6171 + 0.7142i | 0.6214 + 0.7083i |
| w51 | 0.4479 + 0.8477i | 0.6537 + 0.5911i | 0.6031 + 0.7131i | 0.6171 + 0.7142i | 0.6214 + 0.7083i |
| w52 | 0.4509 + 0.9195i | 0.7084 + 0.5835i | 0.4765 + 0.7946i | 0.4944 + 0.8407i | 0.4937 + 0.8377i |
| w53 | 0.4509 + 0.9195i | 0.7084 + 0.5835i | 0.4765 + 0.7946i | 0.4944 + 0.8407i | 0.4937 + 0.8377i |
| w54 | 0.4509 + 0.9195i | 0.7084 + 0.5835i | 0.4765 + 0.7946i | 0.4944 + 0.8407i | 0.4937 + 0.8377i |
| w55 | 0.4509 + 0.9195i | 0.7084 + 0.5835i | 0.4765 + 0.7946i | 0.4944 + 0.8407i | 0.5165 + 0.8320i |
| w56 | 0.4479 + 0.8477i | 0.6624 + 0.6779i | 0.6979 + 0.8348i | 0.7645 + 0.8251i | 0.8208 + 0.8194i |
| w57 | 0.4479 + 0.8477i | 0.6624 + 0.6779i | 0.6979 + 0.8348i | 0.7645 + 0.8251i | 0.7795 + 0.8678i |
| w58 | 0.4479 + 0.8477i | 0.6624 + 0.6779i | 0.6979 + 0.8348i | 0.7645 + 0.8251i | 0.7654 + 0.7871i |
| w59 | 0.4479 + 0.8477i | 0.6624 + 0.6779i | 0.6979 + 0.8348i | 0.7645 + 0.8251i | 0.7366 + 0.8230i |
| w60 | 0.4991 + 0.9080i | 0.7073 + 0.6615i | 0.5192 + 0.9341i | 0.5944 + 0.9931i | 0.5960 + 1.0246i |
| w61 | 0.4991 + 0.9080i | 0.7073 + 0.6615i | 0.5192 + 0.9341i | 0.6271 + 0.9693i | 0.6739 + 0.9765i |
| w62 | 0.4991 + 0.9080i | 0.7073 + 0.6615i | 0.5192 + 0.9341i | 0.5944 + 0.9931i | 0.5730 + 0.9785i |
| w63 | 0.4991 + 0.9080i | 0.7073 + 0.6615i | 0.5192 + 0.9341i | 0.6271 + 0.9693i | 0.6332 + 0.9357i |
| w64 | 1.5469 + 0.5626i | 1.6936 + 1.0501i | 1.9725 + 0.1409i | 1.9480 + 0.1481i | 1.8978 + 0.1329i |
| w65 | 1.5047 + 0.6160i | 1.9944 + 0.7935i | 1.9915 + 0.4357i | 1.6746 + 0.0974i | 1.6495 + 0.0908i |
| w66 | 1.3694 + 0.4997i | 1.3954 + 0.1171i | 1.6673 + 0.1308i | 1.4082 + 0.0951i | 1.5940 + 0.0760i |
| w67 | 1.3694 + 0.4997i | 1.3954 + 0.1171i | 1.6321 + 0.1768i | 1.4516 + 0.1035i | 1.4413 + 0.1092i |
| w68 | 1.3034 + 0.4565i | 1.0291 + 0.1180i | 1.5727 + 0.6014i | 1.8289 + 0.4101i | 1.8256 + 0.3950i |
| w69 | 1.3034 + 0.4565i | 1.0291 + 0.1180i | 1.8127 + 0.6892i | 1.6508 + 0.2818i | 1.6372 + 0.2691i |
| w70 | 1.3034 + 0.4565i | 1.1010 + 0.1192i | 1.5630 + 0.4516i | 1.4163 + 0.3400i | 1.4120 + 0.3476i |
| w71 | 1.3034 + 0.4565i | 1.1010 + 0.1192i | 1.6016 + 0.3840i | 1.4507 + 0.3041i | 1.4494 + 0.2700i |
| w72 | 1.6559 + 0.1897i | 1.7938 + 0.1356i | 1.3210 + 0.1185i | 1.1634 + 0.1032i | 1.1520 + 0.1019i |
| w73 | 1.5179 + 0.1778i | 2.0345 + 0.2783i | 1.3210 + 0.1185i | 1.1634 + 0.1032i | 1.1520 + 0.1019i |
| w74 | 1.4640 + 0.1827i | 1.4715 + 0.1190i | 1.3768 + 0.1287i | 1.2231 + 0.1035i | 1.2370 + 0.0895i |
| w75 | 1.4062 + 0.1772i | 1.3954 + 0.1171i | 1.3768 + 0.1287i | 1.2231 + 0.1035i | 1.2259 + 0.1210i |
| w76 | 1.4062 + 0.1772i | 1.0291 + 0.1180i | 1.2996 + 0.3986i | 1.1512 + 0.3056i | 1.1410 + 0.3239i |
| w77 | 1.4062 + 0.1772i | 1.0291 + 0.1180i | 1.2996 + 0.3986i | 1.1512 + 0.3056i | 1.1412 + 0.2881i |
| w78 | 1.3620 + 0.1815i | 1.1010 + 0.1192i | 1.2996 + 0.3986i | 1.2183 + 0.3113i | 1.2488 + 0.3303i |
| w79 | 1.3620 + 0.1815i | 1.1010 + 0.1192i | 1.3164 + 0.3727i | 1.2183 + 0.3113i | 1.2365 + 0.2820i |
| w80 | 1.1845 + 0.7818i | 1.5434 + 0.7244i | 1.2691 + 1.5656i | 1.6390 + 1.1100i | 1.5621 + 1.0168i |
| w81 | 1.2415 + 0.8159i | 1.5406 + 0.6573i | 1.4951 + 1.3067i | 1.5553 + 0.8585i | 1.5618 + 0.8013i |
| w82 | 1.1399 + 0.7513i | 1.3581 + 0.4388i | 1.2022 + 1.0523i | 1.2808 + 0.8598i | 1.3176 + 0.9273i |
| w83 | 1.1845 + 0.7S18i | 1.3581 + 0.4388i | 1.2512 + 1.0757i | 1.3544 + 0.7773i | 1.3667 + 0.7657i |
| w84 | 1.1070 + 0.7283i | 1.0229 + 0.3452i | 1.4652 + 0.7406i | 1.6452 + 0.5697i | 1.6308 + 0.5333i |
| w85 | 1.1399 + 0.7513i | 1.0229 + 0.3452i | 1.6787 + 0.9971i | 1.8084 + 0.7652i | 1.7890 + 0.7298i |
| w86 | 1.1070 + 0.7283i | 1.0862 + 0.3510i | 1.3845 + 0.8297i | 1.4221 + 0.5360i | 1.4307 + 0.4998i |
| w87 | 1.1070 + 0.7283i | 1.0862 + 0.3510i | 1.4003 + 0.9431i | 1.3824 + 0.5909i | 1.3837 + 0.6127i |
| w88 | 1.0412 + 0.9760i | 1.6599 + 0.4298i | 1.0154 + 0.8311i | 1.0396 + 0.7205i | 1.0281 + 0.7705i |
| w89 | 1.1011 + 1.0156i | 1.6784 + 0.4687i | 1.0154 + 0.8311i | 1.0396 + 0.7205i | 1.0650 + 0.6889i |
| w90 | 1.0412 + 0.9760i | 1.4225 + 0.3641i | 1.0397 + 0.8590i | 1.1099 + 0.7731i | 1.1472 + 0.8413i |
| w91 | 1.0412 + 0.9760i | 1.4225 + 0.3641i | 1.0154 + 0.8311i | 1.1202 + 0.7192i | 1.1907 + 0.7241i |
| w92 | 0.9673 + 0.9082i | 1.0229 + 0.3452i | 1.1891 + 0.6423i | 1.1129 + 0.5091i | 1.1184 + 0.4819i |
| w93 | 0.9673 + 0.9082i | 1.0229 + 0.3452i | 1.1891 + 0.6423i | 1.1129 + 0.5091i | 1.1089 + 0.5409i |
| w94 | 0.9673 + 0.9082i | 1.0862 + 0.3510i | 1.1891 + 0.6423i | 1.1854 + 0.5260i | 1.2340 + 0.4363i |
| w95 | 0.9673 + 0.9082i | 1.0862 + 0.3510i | 1.1891 + 0.6423i | 1.1854 + 0.5260i | 1.2257 + 0.5735i |
| w96 | 0.9871 + 0.2773i | 0.6447 + 0.1114i | 0.9430 + 0.1097i | 0.8387 + 0.0879i | 0.8364 + 0.0863i |
| w97 | 0.9871 + 0.2773i | 0.6447 + 0.1114i | 0.9430 + 0.1097i | 0.8387 + 0.0879i | 0.8364 + 0.0863i |

-continued

| | | | | | |
|---|---|---|---|---|---|
| w98 | 0.9871 + 0.2773i | 0.6447 + 0.1114i | 0.9430 + 0.1097i | 0.8387 + 0.0879i | 0.8564 + 0.0863i |
| w99 | 0.9871 + 0.2773i | 0.6447 + 0.1114i | 0.9430 + 0.1097i | 0.8387 + 0.0879i | 0.8364 + 0.0863i |
| w100 | 0.9871 + 0.2773i | 0.7355 + 0.1132i | 0.9179 + 0.2418i | 0.8162 + 0.2520i | 0.8138 + 0.2554i |
| w101 | 0.9871 + 0.2773i | 0.7355 + 0.1132i | 0.9179 + 0.2418i | 0.8162 + 0.2520i | 0.8158 + 0.2554i |
| w102 | 1.0140 + 0.2913i | 0.7355 + 0.1132i | 0.9179 + 0.2418i | 0.8162 + 0.2520i | 0.8138 + 0.2554i |
| w103 | 1.0140 + 0.2913i | 0.7355 + 0.1132i | 0.9179 + 0.2418i | 0.8162 + 0.2520i | 0.8138 + 0.2554i |
| w104 | 1.0186 + 0.1704i | 0.6447 + 0.1114i | 1.1190 + 0.1134i | 0.9922 + 0.0948i | 0.9925 + 0.0954i |
| w105 | 1.0186 + 0.1704i | 0.6447 + 0.1114i | 1.1190 + 0.1134i | 0.9922 + 0.0948i | 0.9923 + 0.0954i |
| w106 | 1.0186 + 0.1704i | 0.6447 + 0.1114i | 1.1190 + 0.1134i | 0.9922 + 0.0948i | 0.9923 + 0.0954i |
| w107 | 1.0186 + 0.1704i | 0.6447 + 0.1114i | 1.1190 + 0.1134i | 0.9922 + 0.0948i | 0.9923 + 0.0954i |
| w108 | 1.0186 + 0.1704i | 0.7355 + 0.1132i | 1.0819 + 0.3141i | 0.9734 + 0.2814i | 0.9927 + 0.2869i |
| w109 | 1.0186 + 0.1704i | 0.7355 + 0.1132i | 1.0819 + 0.3141i | 0.9734 + 0.2814i | 0.9927 + 0.2869i |
| w110 | 1.0490 + 0.1738i | 0.7355 + 0.1132i | 1.0819 + 0.3141i | 0.9734 + 0.2814i | 0.9581 + 0.2810i |
| w111 | 1.0490 + 0.1738i | 0.7355 + 0.1132i | 1.0819 + 0.3141i | 0.9734 + 0.2814i | 0.9581 + 0.2310i |
| w112 | 0.8068 + 0.5977i | 0.6479 + 0.3266i | 0.7574 + 0.5584i | 0.7097 + 0.5670i | 0.7091 + 0.5666i |
| w113 | 0.8068 + 0.5977i | 0.6479 + 0.3266i | 0.7574 + 0.5584i | 0.7097 + 0.5670i | 0.7091 + 0.5666i |
| w114 | 0.8068 + 0.5977i | 0.6479 + 0.3266i | 0.7574 + 0.5584i | 0.7097 + 0.5670i | 0.7091 + 0.5666i |
| w115 | 0.8068 + 0.5977i | 0.6479 + 0.3266i | 0.7574 + 0.5584i | 0.7097 + 0.5670i | 0.7091 + 0.5666i |
| w116 | 0.8068 + 0.5977i | 0.7296 + 0.3314i | 0.8356 + 0.4419i | 0.7717 + 0.4178i | 0.7712 + 0.4159i |
| w117 | 0.8068 + 0.5977i | 0.7296 + 0.3314i | 0.8356 + 0.4419i | 0.7717 + 0.4178i | 0.7712 + 0.4159i |
| w118 | 0.8068 + 0.5977i | 0.7296 + 0.3314i | 0.8356 + 0.4419i | 0.7717 + 0.4178i | 0.7712 + 0.4159i |
| w119 | 0.8068 + 0.5977i | 0.7296 + 0.3314i | 0.8356 + 0.4419i | 0.7717 + 0.4178i | 0.7712 + 0.4159i |
| w120 | 0.7522 + 0.6666i | 0.6479 + 0.3266i | 0.8672 + 0.6827i | 0.8683 + 0.6477i | 0.8969 + 0.6804i |
| w121 | 0.7522 + 0.6666i | 0.6479 + 0.3266i | 0.8672 + 0.6827i | 0.8683 + 0.8477i | 0.9135 + 0.6445i |
| w122 | 0.7522 + 0.6666i | 0.6479 + 0.3266i | 0.8672 + 0.6827i | 0.8683 + 0.6477i | 0.8521 + 0.6381i |
| w123 | 0.7522 + 0.6666i | 0.6479 + 0.3266i | 0.8672 + 0.6827i | 0.8683 + 0.6477i | 0.8521 + 0.6381i |
| w124 | 0.7522 + 0.6666i | 0.7296 + 0.3314i | 0.9902 + 0.5156i | 0.9344 + 0.4846i | 0.9651 + 0.4745i |
| w125 | 0.7522 + 0.6666i | 0.7296 + 0.3314i | 0.9902 + 0.5156i | 0.9344 + 0.4646i | 0.9831 + 0.4745i |
| w126 | 0.7522 + 0.6666i | 0.7296 + 0.3314i | 0.9902 + 0.5156i | 0.9344 + 0.4646i | 0.9177 + 0.4631i |
| w127 | 0.7522 + 0.6666i | 0.7296 + 0.3314i | 0.9902 + 0.5156i | 0.9344 + 0.4646i | 0.9177 + 0.4631i |
| w128 | 0.1398 + 0.2219i | 0.1069 + 0.9206i | 0.0877 + 0.3362i | 0.0693 + 0.0844i | 0.0680 + 0.0343i |
| w129 | 0.1398 + 0.2219i | 0.1069 + 0.9206i | 0.0877 + 0.3362i | 0.0693 + 0.0844i | 0.0660 + 0.0843i |
| w130 | 0.1398 + 0.2219i | 0.1069 + 0.9206i | 0.0877 + 0.3362i | 0.0693 + 0.0844i | 0.0660 + 0.0843i |
| w131 | 0.1398 + 0.2219i | 0.1069 + 0.9206i | 0.0877 + 0.3362i | 0.0693 + 0.0844i | 0.0660 + 0.0843i |
| w132 | 0.1398 + 0.2219i | 0.1069 + 0.9206i | 0.0877 + 0.3362i | 0.0693 + 0.0844i | 0.0660 + 0.0843i |
| w133 | 0.1398 + 0.2219i | 0.1069 + 0.9206i | 0.0877 + 0.3362i | 0.0693 + 0.0844i | 0.0680 + 0.0343i |
| w134 | 0.1398 + 0.2219i | 0.1069 + 0.9206i | 0.0877 + 0.3362i | 0.0693 + 0.0844i | 0.0660 + 0.0343i |
| w135 | 0.1398 + 0.2219i | 0.1069 + 0.9206i | 0.0877 + 0.3362i | 0.0693 + 0.0844i | 0.0660 + 0.0843i |
| w136 | 0.1398 + 0.2219i | 0.1554 + 0.8729i | 0.1228 + 0.4390i | 0.0757 + 0.5302i | 0.0734 + 0.5323i |
| w137 | 0.1398 + 0.2219i | 0.1554 + 0.8729i | 0.1228 + 0.4390i | 0.0757 + 0.5302i | 0.0734 + 0.5323i |
| w133 | 0.1398 + 0.2219i | 0.1554 + 0.3729i | 0.1228 + 0.4390i | 0.0757 + 0.5302i | 0.0734 + 0.5323i |
| w139 | 0.1398 + 0.2219i | 0.1554 + 0.8729i | 0.1228 + 0.4390i | 0.0757 + 0.5302i | 0.0734 + 0.5323i |
| w140 | 0.1398 + 0.2219i | 0.1554 + 0.8729i | 0.1228 + 0.4390i | 0.0757 + 0.5302i | 0.0734 + 0.5323i |
| w141 | 0.1398 + 0.2219i | 0.1554 + 0.8729i | 0.1228 + 0.4390i | 0.0757 + 0.5302i | 0.0734 + 0.5323i |
| w142 | 0.1398 + 0.2219i | 0.1554 + 0.8729i | 0.1228 + 0.4390i | 0.0757 + 0.5302i | 0.0734 + 0.5323i |
| w143 | 0.1398 + 0.2219i | 0.1554 + 0.8729i | 0.1228 + 0.4390i | 0.0757 + 0.5302i | 0.0734 + 0.5323i |
| w144 | 0.1398 + 0.2219i | 0.1435 + 0.6124i | 0.1336 + 0.2886i | 0.0831 + 0.2583i | 0.0790 + 0.2724i |
| w145 | 0.1398 + 0.2219i | 0.1435 + 0.6124i | 0.1336 + 0.2886i | 0.0831 + 0.2583i | 0.0790 + 0.2724i |
| w146 | 0.1398 + 0.2219i | 0.1435 + 0.6124i | 0.1336 + 0.2886i | 0.0831 + 0.2583i | 0.0790 + 0.2724i |
| w147 | 0.1398 + 0.2219i | 0.1435 + 0.6124i | 0.1336 + 0.2886i | 0.0831 + 0.2583i | 0.0790 + 0.2724i |
| w148 | 0.1398 + 0.2219i | 0.1435 + 0.6124i | 0.1336 + 0.2886i | 0.0831 + 0.2583i | 0.0790 + 0.2724i |
| w149 | 0.1398 + 0.2219i | 0.1435 + 0.6124i | 0.1336 + 0.2886i | 0.0831 + 0.2583i | 0.0790 + 0.2724i |
| w150 | 0.1398 + 0.2219i | 0.1435 + 0.6124i | 0.1336 + 0.2886i | 0.0831 + 0.2583i | 0.0790 + 0.2724i |
| w151 | 0.1398 + 0.2219i | 0.1435 + 0.6124i | 0.1336 + 0.2886i | 0.0831 + 0.2583i | 0.0790 + 0.2724i |
| w152 | 0.1398 + 0.2219i | 0.1435 + 0.6124i | 0.2508 + 0.3619i | 0.1690 + 0.4222i | 0.1820 + 0.4289i |
| w153 | 0.1398 + 0.2219i | 0.1435 + 0.6124i | 0.2508 + 0.3619i | 0.1690 + 0.4222i | 0.1820 + 0.4289i |
| w154 | 0.1398 + 0.2219i | 0.1435 + 0.6124i | 0.2508 + 0.3619i | 0.1690 + 0.4222i | 0.1820 + 0.4289i |
| w155 | 0.1398 + 0.2219i | 0.1435 + 0.6124i | 0.2508 + 0.3619i | 0.1690 + 0.4222i | 0.1820 + 0.4289i |
| w156 | 0.1398 + 0.2219i | 0.1435 + 0.6124i | 0.2508 + 0.3619i | 0.1690 + 0.4222i | 0.1820 + 0.4289i |
| w157 | 0.1398 + 0.2219i | 0.1435 + 0.6124i | 0.2508 + 0.3619i | 0.1690 + 0.4222i | 0.1820 + 0.4289i |
| w158 | 0.1398 + 0.2219i | 0.1435 + 0.6124i | 0.2508 + 0.3619i | 0.1690 + 0.4222i | 0.1820 + 0.4289i |
| w159 | 0.1398 + 0.2219i | 0.1435 + 0.6124i | 0.2508 + 0.3619i | 0.1690 + 0.4222i | 0.1820 + 0.4289i |
| w160 | 0.1394 + 0.6100i | 0.1470 + 1.2350i | 0.1149 + 0.7104i | 0.0953 + 0.8596i | 0.0929 + 0.8638i |
| w161 | 0.1394 + 0.6100i | 0.2373 + 1.1879i | 0.1149 + 0.7104i | 0.0953 + 0.8596i | 0.0929 + 0.8638i |
| w162 | 0.1394 + 0.6100i | 0.1470 + 1.2350i | 0.1149 + 0.7104i | 0.0953 + 0.8596i | 0.0929 + 0.8638i |
| w163 | 0.1394 + 0.6100i | 0.2373 + 1.1879i | 0.1149 + 0.7104i | 0.0953 + 0.8596i | 0.0929 + 0.8638i |
| w164 | 0.1394 + 0.6100i | 0.1470 + 1.2350i | 0.2020 + 0.6970i | 0.2502 + 0.8104i | 0.2598 + 0.8068i |
| w165 | 0.1394 + 0.6100i | 0.2373 + 1.1879i | 0.2020 + 0.6970i | 0.2502 + 0.8104i | 0.2598 + 0.8068i |
| w166 | 0.1394 + 0.6100i | 0.1470 + 1.2350i | 0.2020 + 0.6970i | 0.2502 + 0.8104i | 0.2598 + 0.8068i |
| w167 | 0.1394 + 0.6100i | 0.2373 + 1.1879i | 0.2020 + 0.6970i | 0.2502 + 0.8104i | 0.2598 + 0.8068i |
| w168 | 0.1394 + 0.6100i | 0.3931 + 0.9608i | 0.1159 + 0.6379i | 0.0888 + 0.7036i | 0.0753 + 0.7148i |
| w169 | 0.1394 + 0.6100i | 0.3931 + 0.9608i | 0.1159 + 0.6379i | 0.0888 + 0.7036i | 0.0753 + 0.7148i |
| w170 | 0.1394 + 0.6100i | 0.3931 + 0.9608i | 0.1159 + 0.6379i | 0.0888 + 0.7036i | 0.0753 + 0.7148i |
| w171 | 0.1394 + 0.6100i | 0.3931 + 0.9608i | 0.1159 + 0.6379i | 0.0888 + 0.7036i | 0.0753 + 0.7148i |
| w172 | 0.1394 + 0.6100i | 0.3931 + 0.9608i | 0.1748 + 0.6236i | 0.1681 + 0.6745i | 0.1803 + 0.6749i |
| w173 | 0.1394 + 0.6100i | 0.3877 + 0.9912i | 0.1748 + 0.6236i | 0.1681 + 0.6745i | 0.1803 + 0.6749i |
| w174 | 0.1394 + 0.6100i | 0.3931 + 0.9608i | 0.1748 + 0.6236i | 0.1681 + 0.6745i | 0.1803 + 0.6749i |
| w175 | 0.1394 + 0.6100i | 0.3877 + 0.9912i | 0.1748 + 0.6236i | 0.1681 + 0.6745i | 0.1803 + 0.6749i |
| w176 | 0.2921 + 0.5723i | 0.4046 + 0.5843i | 0.4761 + 0.5695i | 0.4796 + 0.6187i | 0.4879 + 0.6095i |

-continued

| | | | | | |
|---|---|---|---|---|---|
| w177 | 0.2921 + 0.5723i | 0.4046 + 0.5843i | 0.4761 + 0.5695i | 0.4796 + 0.6187i | 0.4879 + 0.6095i |
| w178 | 0.2921 + 0.5723i | 0.4046 + 0.5843i | 0.4761 + 0.5695i | 0.4796 + 0.6187i | 0.4879 + 0.6095i |
| w179 | 0.2921 + 0.5723i | 0.4046 + 0.5843i | 0.4761 + 0.5695i | 0.4796 + 0.6187i | 0.4879 + 0.6095i |
| w180 | 0.2921 + 0.5723i | 0.4046 + 0.5843i | 0.4147 + 0.6066i | 0.3943 + 0.7094i | 0.3917 + 0.7141i |
| w181 | 0.2921 + 0.5723i | 0.4046 + 0.5843i | 0.4147 + 0.6066i | 0.3943 + 0.7094i | 0.3917 + 0.7141i |
| w182 | 0.2921 + 0.5723i | 0.4046 + 0.5843i | 0.4147 + 0.6066i | 0.3943 + 0.7094i | 0.3917 + 0.7141i |
| w183 | 0.2921 + 0.5723i | 0.4046 + 0.5843i | 0.4147 + 0.6066i | 0.3943 + 0.7094i | 0.3917 + 0.7141i |
| w184 | 0.2921 + 0.5723i | 0.4108 + 0.6369i | 0.3812 + 0.4962i | 0.3422 + 0.5304i | 0.3507 + 0.5198i |
| w185 | 0.2921 + 0.5723i | 0.4108 + 0.6369i | 0.3812 + 0.4962i | 0.3422 + 0.5304i | 0.3507 + 0.5198i |
| w186 | 0.2921 + 0.5723i | 0.4108 + 0.6369i | 0.3812 + 0.4962i | 0.3422 + 0.5304i | 0.3507 + 0.5198i |
| w187 | 0.2921 + 0.5723i | 0.4108 + 0.6369i | 0.3812 + 0.4962i | 0.3422 + 0.5304i | 0.3507 + 0.5198i |
| w188 | 0.2921 + 0.5723i | 0.4108 + 0.6369i | 0.3812 + 0.4962i | 0.3015 + 0.5755i | 0.2932 + 0.5904i |
| w189 | 0.2921 + 0.5723i | 0.4108 + 0.6369i | 0.3812 + 0.4962i | 0.3015 + 0.5755i | 0.2932 + 0.5904i |
| w190 | 0.2921 + 0.5723i | 0.4108 + 0.6369i | 0.3812 + 0.4962i | 0.3015 + 0.5755i | 0.2932 + 0.5904i |
| w191 | 0.2921 + 0.5723i | 0.4108 + 0.6369i | 0.3812 + 0.4962i | 0.3015 + 0.5755i | 0.2932 + 0.5904i |
| w192 | 0.4257 + 0.1254i | 0.1205 + 0.1201i | 0.1371 + 0.0950i | 0.2347 + 0.0789i | 0.2293 + 0.0778i |
| w193 | 0.4257 + 0.1254i | 0.1205 + 0.1201i | 0.1371 + 0.0950i | 0.2347 + 0.0789i | 0.2293 + 0.0778i |
| w194 | 0.4257 + 0.1254i | 0.1205 + 0.1201i | 0.1371 + 0.0950i | 0.2347 + 0.0789i | 0.2293 + 0.0778i |
| w195 | 0.4257 + 0.1254i | 0.1205 + 0.1201i | 0.1371 + 0.0950i | 0.2347 + 0.0789i | 0.2293 + 0.0778i |
| w196 | 0.4257 + 0.1254i | 0.1205 + 0.1201i | 0.1371 + 0.0950i | 0.2347 + 0.0789i | 0.2293 + 0.0778i |
| w197 | 0.4257 + 0.1254i | 0.1205 + 0.1201i | 0.1371 + 0.0950i | 0.2347 + 0.0789i | 0.2293 + 0.0778i |
| w198 | 0.4257 + 0.1254i | 0.1205 + 0.1201i | 0.1371 + 0.0950i | 0.2347 + 0.0789i | 0.2293 + 0.0778i |
| w199 | 0.4257 + 0.1254i | 0.1205 + 0.1201i | 0.1371 + 0.0950i | 0.2347 + 0.0789i | 0.2293 + 0.0778i |
| w200 | 0.4257 + 0.1254i | 0.1205 + 0.1201i | 0.3858 + 0.0906i | 0.3998 + 0.0948i | 0.4038 + 0.0702i |
| w201 | 0.4257 + 0.1254i | 0.1205 + 0.1201i | 0.3858 + 0.0906i | 0.3998 + 0.0948i | 0.4038 + 0.0702i |
| w202 | 0.4257 + 0.1254i | 0.1205 + 0.1201i | 0.3858 + 0.0906i | 0.3998 + 0.0948i | 0.4038 + 0.0702i |
| w203 | 0.4257 + 0.1254i | 0.1205 + 0.1201i | 0.3858 + 0.0906i | 0.3998 + 0.0948i | 0.4038 + 0.0702i |
| w204 | 0.4257 + 0.1254i | 0.1205 + 0.1201i | 0.3858 + 0.0906i | 0.3998 + 0.0948i | 0.3965 + 0.1174i |
| w205 | 0.4257 + 0.1254i | 0.1205 + 0.1201i | 0.3858 + 0.0906i | 0.3998 + 0.0948i | 0.3965 + 0.1174i |
| w206 | 0.4257 + 0.1254i | 0.1205 + 0.1201i | 0.3858 + 0.0906i | 0.3998 + 0.0948i | 0.5965 + 0.1174i |
| w207 | 0.4257 + 0.1254i | 0.1205 + 0.1201i | 0.3858 + 0.0906i | 0.3998 + 0.0948i | 0.3965 + 0.1174i |
| w208 | 0.3876 + 0.1752i | 0.1269 + 0.3505i | 0.1371 + 0.0950i | 0.2220 + 0.2149i | 0.2186 + 0.2192i |
| w209 | 0.3876 + 0.1752i | 0.1269 + 0.3505i | 0.1371 + 0.0950i | 0.2220 + 0.2149i | 0.2186 + 0.2192i |
| w210 | 0.3876 + 0.1752i | 0.1269 + 0.3505i | 0.1371 + 0.0950i | 0.2220 + 0.2149i | 0.2186 + 0.2192i |
| w211 | 0.3876 + 0.1752i | 0.1269 + 0.3505i | 0.1371 + 0.0950i | 0.2220 + 0.2149i | 0.2186 + 0.2192i |
| w212 | 0.3876 + 0.1752i | 0.1269 + 0.3505i | 0.1371 + 0.0950i | 0.2220 + 0.2149i | 0.2186 + 0.2192i |
| w213 | 0.3676 + 0.1752i | 0.1269 + 0.3505i | 0.1371 + 0.0950i | 0.2220 + 0.2149i | 0.2186 + 0.2192i |
| w214 | 0.3876 + 0.1752i | 0.1269 + 0.3505i | 0.1371 + 0.0950i | 0.2220 + 0.2149i | 0.2186 + 0.2192i |
| w215 | 0.3876 + 0.1752i | 0.1269 + 0.3505i | 0.1371 + 0.0950i | 0.2220 + 0.2149i | 0.2186 + 0.2192i |
| w216 | 0.3876 + 0.1752i | 0.1269 + 0.3505i | 0.3522 + 0.1787i | 0.3246 + 0.2889i | 0.3152 + 0.3142i |
| w217 | 0.3876 + 0.1752i | 0.1269 + 0.3505i | 0.3522 + 0.1787i | 0.3246 + 0.2889i | 0.3152 + 0.3142i |
| w218 | 0.3876 + 0.1752i | 0.1269 + 0.3505i | 0.3522 + 0.1787i | 0.3246 + 0.2889i | 0.5152 + 0.3142i |
| w219 | 0.3876 + 0.1752i | 0.1269 + 0.3505i | 0.3522 + 0.1787i | 0.3246 + 0.2889i | 0.3152 + 0.3142i |
| w220 | 0.3876 + 0.1752i | 0.1269 + 0.3505i | 0.3522 + 0.1787i | 0.3246 + 0.2889i | 0.3453 + 0.2672i |
| w221 | 0.3876 + 0.1752i | 0.1269 + 0.3505i | 0.3522 + 0.1787i | 0.3246 + 0.2889i | 0.3455 + 0.2672i |
| w222 | 0.3876 + 0.1752i | 0.1269 + 0.3505i | 0.3522 + 0.1787i | 0.3246 + 0.2889i | 0.3453 + 0.2672i |
| w223 | 0.3876 + 0.1752i | 0.1269 + 0.3505i | 0.3522 + 0.1787i | 0.3246 + 0.2889i | 0.3453 + 0.2672i |
| w224 | 0.7263 + 0.1835i | 0.3711 + 0.1147i | 0.7559 + 0.1087i | 0.6893 + 0.0866i | 0.6940 + 0.0767i |
| w225 | 0.7263 + 0.1835i | 0.3711 + 0.1147i | 0.7559 + 0.1087i | 0.6893 + 0.0866i | 0.6940 + 0.0767i |
| w226 | 0.7263 + 0.1835i | 0.3711 + 0.1147i | 0.7559 + 0.1087i | 0.6893 + 0.0866i | 0.6940 + 0.0767i |
| w227 | 0.7263 + 0.1835i | 0.3711 + 0.1147i | 0.7559 + 0.1087i | 0.6893 + 0.0866i | 0.6940 + 0.0767i |
| w228 | 0.7263 + 0.1835i | 0.3711 + 0.1147i | 0.7444 + 0.1636i | 0.6679 + 0.2112i | 0.6695 + 0.2216i |
| w229 | 0.7263 + 0.1835i | 0.3711 + 0.1147i | 0.7444 + 0.1636i | 0.6679 + 0.2112i | 0.6695 + 0.2216i |
| w230 | 0.7263 + 0.1835i | 0.3711 + 0.1147i | 0.7444 + 0.1636i | 0.6679 + 0.2112i | 0.6695 + 0.2216i |
| w231 | 0.7263 + 0.1835i | 0.3711 + 0.1147i | 0.7444 + 0.1636 | 0.6679 + 0.2112i | 0.6695 + 0.2216i |
| w232 | 0.7263 + 0.1835i | 0.3711 + 0.1147i | 0.5888 + 0.1116i | 0.5532 + 0.0884i | 0.5558 + 0.0719i |
| w233 | 0.7263 + 0.1835i | 0.3711 + 0.1147i | 0.5888 + 0.1116i | 0.5532 + 0.0884i | 0.5558 + 0.0719i |
| w234 | 0.7263 + 0.1835i | 0.3711 + 0.1147i | 0.5888 + 0.1116i | 0.5532 + 0.0884i | 0.5558 + 0.0719i |
| w235 | 0.7263 + 0.1835i | 0.3711 + 0.1147i | 0.5888 + 0.1116i | 0.5532 + 0.0884i | 0.5558 + 0.0719i |
| w236 | 0.7263 + 0.1835i | 0.3711 + 0.1147i | 0.5888 + 0.1116i | 0.5398 + 0.1629i | 0.5350 + 0.1769i |
| w237 | 0.7263 + 0.1835i | 0.3711 + 0.1147i | 0.5888 + 0.1116i | 0.5398 + 0.1629i | 0.5350 + 0.1769i |
| w238 | 0.7263 + 0.1835i | 0.3711 + 0.1147i | 0.5888 + 0.1116i | 0.5398 + 0.1629i | 0.5550 + 0.1769i |
| w239 | 0.7263 + 0.1835i | 0.3711 + 0.1147i | 0.5888 + 0.1116i | 0.5398 + 0.1629i | 0.5350 + 0.1769i |
| w240 | 0.5831 + 0.4164i | 0.3840 + 0.3362i | 0.6291 + 0.4137i | 0.5676 + 0.4800i | 0.5639 + 0.4885i |
| w241 | 0.5831 + 0.4164i | 0.3840 + 0.3362i | 0.6291 + 0.4137i | 0.5676 + 0.4800i | 0.5659 + 0.4885i |
| w242 | 0.5831 + 0.4164i | 0.3840 + 0.3362i | 0.6291 + 0.4137i | 0.5676 + 0.4800i | 0.5639 + 0.4885i |
| w243 | 0.5831 + 0.4164i | 0.3840 + 0.3362i | 0.6291 + 0.4137i | 0.5676 + 0.4800i | 0.5639 + 0.4885i |
| w244 | 0.5831 + 0.4164i | 0.3840 + 0.3362i | 0.6640 + 0.3652i | 0.6158 + 0.3724i | 0.6227 + 0.3624i |
| w245 | 0.5831 + 0.4164i | 0.3840 + 0.3362i | 0.6640 + 0.3652i | 0.6158 + 0.3724i | 0.6227 + 0.3624i |
| w246 | 0.5831 + 0.4164i | 0.3840 + 0.3362i | 0.6640 + 0.3652i | 0.6158 + 0.3724i | 0.6227 + 0.3624i |
| w247 | 0.5831 + 0.4164i | 0.3840 + 0.3362i | 0.6640 + 0.3652i | 0.6158 + 0.3724i | 0.6227 + 0.3624i |
| w248 | 0.5831 + 0.4164i | 0.3840 + 0.3362i | 0.5249 + 0.3002i | 0.4402 + 0.3948i | 0.4325 + 0.4078i |
| w249 | 0.5831 + 0.4164i | 0.3840 + 0.3362i | 0.5249 + 0.3002i | 0.4402 + 0.3948i | 0.4325 + 0.4078i |
| w250 | 0.5831 + 0.4164i | 0.3840 + 0.3362i | 0.5249 + 0.3002i | 0.4402 + 0.3948i | 0.4525 + 0.4078i |
| w251 | 0.5831 + 0.4164i | 0.3840 + 0.3362i | 0.5249 + 0.3002i | 0.4402 + 0.3948i | 0.4325 + 0.4078i |
| w252 | 0.5831 + 0.4164i | 0.3840 + 0.3362i | 0.5249 + 0.3002i | 0.4746 + 0.3330i | 0.4850 + 0.3129i |
| w253 | 0.5831 + 0.4164i | 0.3840 + 0.3362i | 0.5249 + 0.3002i | 0.4746 + 0.3330i | 0.4850 + 0.3129i |

-continued

| | | | | | |
|---|---|---|---|---|---|
| w254 | 0.5831 + 0.4164i | 0.3840 + 0.3362i | 0.5249 + 0.3002i | 0.4746 + 0.3330i | 0.4850 + 0.3129i |
| w255 | 0.5831 + 0.4164i | 0.3840 + 0.3362i | 0.5249 + 0.3002i | 0.4746 + 0.3330i | 0.4850 + 0.3129i |

| w/code rate | 10/15 | 11/15 | 12/15 | 13/15 |
|---|---|---|---|---|
| w1 | 1.7268 + 0.8306i | 0.0827 + 1.7001i | 1.6707 + 0.0830i | 0.0862 + 1.6154i |
| w1 | 1.4295 + 1.1791i | 0.2495 + 1.7069i | 1.6596 + 0.2486i | 0.2532 + 1.5973i |
| w2 | 1.5265 + 0.9329i | 0.0759 + 1.5315i | 1.5191 + 0.0748i | 0.0628 + 1.4840i |
| w3 | 1.3311 + 0.9796i | 0.2264 + 1.5296i | 1.5087 + 0.2253i | 0.1933 + 1.4746i |
| w4 | 1.0476 + 1.3141i | 0.5781 + 1.6238i | 1.5860 + 0.5707i | 0.5623 + 1.5170i |
| w5 | 1.2433 + 1.3224i | 0.4153 + 1.6700i | 1.6299 + 0.4118i | 0.4115 + 1.5641i |
| w6 | 1.0060 + 1.1520i | 0.5222 + 1.4586i | 1.4405 + 0.5184i | 0.4717 + 1.4136i |
| w7 | 1.1531 + 1.1052i | 0.3761 + 1.5021i | 1.4814 + 0.3733i | 0.3318 + 1.4521i |
| w8 | 1.6516 + 0.6120i | 0.0654 + 1.2745i | 1.2736 + 0.0635i | 0.0573 + 1.2656i |
| w9 | 1.1961 + 0.7851i | 0.1916 + 1.2647i | 1.2678 + 0.1901i | 0.1750 + 1.2589i |
| w10 | 1.4907 + 0.7274i | 0.0709 + 1.3936i | 1.3905 + 0.0691i | 0.0712 + 1.3686i |
| w11 | 1.3242 + 0.7939i | 0.2071 + 1.3855i | 1.3801 + 0.2066i | 0.2106 + 1.3583i |
| w12 | 0.9444 + 0.8682i | 0.4344 + 1.2067i | 1.2103 + 0.4364i | 0.4128 + 1.2072i |
| w13 | 1.0778 + 0.8297i | 0.3137 + 1.2425i | 1.2453 + 0.3150i | 0.2939 + 1.2391i |
| w14 | 0.9728 + 1.0019i | 0.4756 + 1.3240i | 1.3174 + 0.4751i | 0.4756 + 1.2940i |
| w15 | 1.1117 + 0.9612i | 0.3426 + 1.3612i | 1.3555 + 0.3427i | 0.3462 + 1.3333i |
| w16 | 0.7139 + 1.4630i | 1.1609 + 1.2807i | 1.2549 + 1.1333i | 1.1029 + 1.1970i |
| w17 | 0.7740 + 1.6553i | 1.0285 + 1.3890i | 1.3567 + 1.0038i | 0.9805 + 1.3006i |
| w18 | 0.6485 + 1.3230i | 1.0435 + 1.1532i | 1.1390 + 1.0306i | 0.9776 + 1.1396i |
| w19 | 0.6195 + 1.1967i | 0.9255 + 1.2490i | 1.2324 + 0.9142i | 0.8621 + 1.2273i |
| w20 | 0.8720 + 1.3702i | 0.7336 + 1.5577i | 1.5191 + 0.7201i | 0.7053 + 1.4577i |
| w21 | 0.9942 + 1.5551i | 0.8851 + 1.4823i | 1.4492 + 0.8682i | 0.8463 + 1.3878i |
| w22 | 0.8479 + 1.1984i | 0.6624 + 1.4006i | 1.3816 + 0.6559i | 0.6073 + 1.3617i |
| w23 | 0.7405 + 1.1635i | 0.7974 + 1.3323i | 1.3154 + 0.7901i | 0.7380 + 1.3004i |
| w24 | 0.5584 + 0.9220i | 0.8662 + 0.9554i | 0.9559 + 0.8672i | 0.8450 + 0.9697i |
| w25 | 0.6047 + 0.9153i | 0.7681 + 1.0353i | 1.0355 + 0.7698i | 0.7464 + 1.0441i |
| w26 | 0.5599 + 1.0238i | 0.9483 + 1.0473i | 1.0408 + 0.9445i | 0.9365 + 1.0264i |
| w27 | 0.6007 + 1.0581i | 0.8407 + 1.1336i | 1.1266 + 0.8383i | 0.8308 + 1.1108i |
| w28 | 0.8173 + 0.9002i | 0.5509 + 1.1608i | 1.1624 + 0.5530i | 0.5291 + 1.1627i |
| w29 | 0.7235 + 0.9143i | 0.6621 + 1.1020i | 1.1043 + 0.6650i | 0.6409 + 1.1079i |
| w30 | 0.8457 + 1.0230i | 0.6018 + 1.2720i | 1.2643 + 0.6023i | 0.6007 + 1.2427i |
| w31 | 0.7336 + 1.0397i | 0.7241 + 1.2084i | 1.2025 + 0.7245i | 0.7195 + 1.1826i |
| w32 | 1.4546 + 0.3656i | 0.0467 + 0.9059i | 0.9195 + 0.0458i | 0.0451 + 0.9145i |
| w33 | 1.1503 + 0.4997i | 0.1350 + 0.8973i | 0.9105 + 0.1382i | 0.1354 + 0.9073i |
| w34 | 1.3573 + 0.4202i | 0.0497 + 0.9867i | 0.9998 + 0.0502i | 0.0490 + 0.9960i |
| w35 | 1.2496 + 0.4668i | 0.1471 + 0.9764i | 0.9903 + 0.1497i | 0.1462 + 0.9883i |
| w36 | 0.8671 + 0.5471i | 0.3086 + 0.8542i | 0.8664 + 0.3143i | 0.3118 + 0.8700i |
| w37 | 1.0300 + 0.5234i | 0.2240 + 0.8802i | 0.8929 + 0.2275i | 0.2251 + 0.8927i |
| w38 | 0.8671 + 0.5471i | 0.3372 + 0.9296i | 0.9434 + 0.3421i | 0.3384 + 0.9473i |
| w39 | 0.9827 + 0.5433i | 0.2436 + 0.9574i | 0.9718 + 0.2472i | 0.2432 + 0.9721i |
| w40 | 1.5800 + 0.4522i | 0.0597 + 1.1699i | 1.1777 + 0.0583i | 0.0573 + 1.1691i |
| w41 | 1.1744 + 0.6454i | 0.1751 + 1.1583i | 1.1673 + 0.1754i | 0.1729 + 1.1617i |
| w42 | 1.4318 + 0.5695i | 0.0546 + 1.0770i | 1.0856 + 0.0541i | 0.0527 + 1.0803i |
| w43 | 1.2928 + 0.6164i | 0.1620 + 1.0654i | 1.0759 + 0.1619i | 0.1592 + 1.0726i |
| w44 | 0.9085 + 0.7546i | 0.3987 + 1.1039i | 1.1138 + 0.4023i | 0.3967 + 1.1112i |
| w45 | 1.0445 + 0.6871i | 0.2892 + 1.1363i | 1.1461 + 0.2901i | 0.2851 + 1.1427i |
| w46 | 0.8937 + 0.6812i | 0.3688 + 1.0131i | 1.0258 + 0.3708i | 0.3660 + 1.0273i |
| w47 | 0.9938 + 0.6542i | 0.2650 + 1.0458i | 1.0553 + 0.2677i | 0.2633 + 1.0553i |
| w48 | 0.5532 + 0.5705i | 0.6137 + 0.6750i | 0.6837 + 0.6227i | 0.6365 + 0.6957i |
| w49 | 0.5532 + 0.5705i | 0.5476 + 0.7291i | 0.7398 + 0.5527i | 0.5615 + 0.7517i |
| w50 | 0.5557 + 0.6030i | 0.6692 + 0.7370i | 0.7451 + 0.6776i | 0.6869 + 0.7563i |
| w51 | 0.5557 + 0.6030i | 0.5949 + 0.7949i | 0.8068 + 0.6014i | 0.6061 + 0.8169i |
| w52 | 0.7445 + 0.5538i | 0.3955 + 0.8179i | 0.8322 + 0.3986i | 0.3978 + 0.8394i |
| w53 | 0.6842 + 0.5618i | 0.4712 + 0.7798i | 0.7900 + 0.4779i | 0.4813 + 0.7997i |
| w54 | 0.7494 + 0.5848i | 0.4286 + 0.8921i | 0.9065 + 0.4330i | 0.4306 + 0.9123i |
| w55 | 0.6877 + 0.5945i | 0.5132 + 0.8496i | 0.8606 + 0.5201i | 0.5207 + 0.8689i |
| w56 | 0.5534 + 0.7977i | 0.7942 + 0.8748i | 0.8797 + 0.7981i | 0.7988 + 0.8850i |
| w57 | 0.5889 + 0.7966i | 0.7046 + 0.9484i | 0.9527 + 0.7086i | 0.7056 + 0.9563i |
| w58 | 0.5501 + 0.7239i | 0.7290 + 0.8039i | 0.8102 + 0.7357i | 0.7403 + 0.8193i |
| w59 | 0.5813 + 0.7226i | 0.6487 + 0.8706i | 0.8771 + 0.6533i | 0.6540 + 0.8851i |
| w60 | 0.7892 + 0.7789i | 0.5056 + 1.0627i | 1.0703 + 0.5098i | 0.5042 + 1.0698i |
| w61 | 0.7107 + 0.7905i | 0.6075 + 1.0087i | 1.0160 + 0.6122i | 0.6076 + 1.0178i |
| w62 | 0.7731 + 0.7034i | 0.4669 + 0.9761i | 0.9854 + 0.4703i | 0.4657 + 0.9891i |
| w63 | 0.7020 + 0.7141i | 0.5603 + 0.9273i | 0.9357 + 0.5645i | 0.5623 + 0.9416i |
| w64 | 0.0599 + 1.4685i | 1.7073 + 0.0837i | 0.0829 + 1.6709i | 1.6374 + 0.0732i |
| w65 | 0.1246 + 1.8836i | 1.7027 + 0.2504i | 0.2503 + 1.6668i | 1.6151 + 0.2229i |
| w66 | 0.0726 + 1.3309i | 1.5368 + 0.0756i | 0.0746 + 1.5195i | 1.5081 + 0.0892i |
| w67 | 0.0737 + 1.2419i | 1.5297 + 0.2272i | 0.2237 + 1.5133i | 1.4856 + 0.2487i |
| w6S | 0.1916 + 1.5130i | 1.6271 + 0.5805i | 0.5739 + 1.5837i | 1.5452 + 0.5306i |
| w69 | 0.1084 + 1.6780i | 1.6704 + 0.4169i | 0.4139 + 1.6300i | 1.5894 + 0.3775i |
| w70 | 0.2135 + 1.3547i | 1.4619 + 0.5241i | 0.5163 + 1.4416i | 1.4079 + 0.5384i |
| w71 | 0.2135 + 1.2428i | 1.5031 + 0.3768i | 0.3716 + 1.4836i | 1.4548 + 0.3961i |
| w72 | 0.0611 + 0.9575i | 1.2795 + 0.0648i | 0.0639 + 1.2810i | 1.2939 + 0.0694i |
| w73 | 0.0611 + 0.9575i | 1.2691 + 0.1929i | 0.1907 + 1.2711i | 1.2819 + 0.2049i |

-continued

| | | | | |
|---|---|---|---|---|
| w74 | 0.0653 + 1.0817i | 1.3982 + 0.0700i | 0.0695 + 1.3921i | 1.3970 + 0.0586i |
| w75 | 0.0872 + 1.1221i | 1.3874 + 0.2089i | 0.2069 + 1.3839i | 1.3864 + 0.1843i |
| w76 | 0.1822 + 0.9501i | 1.2099 + 0.4372i | 0.4372 + 1.2114i | 1.2145 + 0.4581i |
| w77 | 0.1822 + 0.9501i | 1.2462 + 0.3168i | 0.3150 + 1.2471i | 1.2539 + 0.3338i |
| w78 | 0.1937 + 1.0728i | 1.3264 + 0.4784i | 0.4753 + 1.3187i | 1.3215 + 0.4564i |
| w79 | 0.1984 + 1.1179i | 1.3636 + 0.3452i | 0.3425 + 1.3569i | 1.3601 + 0.3221i |
| w80 | 0.5319 + 1.5225i | 1.2821 + 1.1603i | 1.1360 + 1.2473i | 1.2148 + 1.0841i |
| w81 | 0.5499 + 1.7288i | 1.3913 + 1.0297i | 1.0132 + 1.3576i | 1.3161 + 0.9594i |
| w82 | 0.4997 + 1.3566i | 1.1526 + 1.1045i | 1.0324 + 1.1353i | 1.0841 + 1.0388i |
| w83 | 0.4782 + 1.2237i | 1.2494 + 0.9275i | 0.9181 + 1.2338i | 1.1820 + 0.9284i |
| w84 | 0.3541 + 1.5303i | 1.5638 + 0.7384i | 0.7279 + 1.5222i | 1.4838 + 0.6792i |
| w85 | 0.3305 + 1.7214i | 1.4790 + 0.8844i | 0.8723 + 1.4426i | 1.4082 + 0.8235i |
| w86 | 0.3534 + 1.3681i | 1.4048 + 0.6656i | 0.6568 + 1.3858i | 1.3468 + 0.6764i |
| w87 | 0.3443 + 1.2337i | 1.3309 + 0.7987i | 0.7900 + 1.3143i | 1.2717 + 0.8072i |
| w88 | 0.4274 + 0.9240i | 0.9550 + 0.8673i | 0.8674 + 0.9560i | 0.9364 + 0.8864i |
| w89 | 0.4274 + 0.9240i | 1.0345 + 0.7695i | 0.7705 + 1.0366i | 1.0217 + 0.7923i |
| w90 | 0.4493 + 1.0436i | 1.0460 + 0.9487i | 0.9433 + 1.0406i | 1.0343 + 0.9303i |
| w91 | 0.4518 + 1.1001i | 1.1334 + 0.8419i | 0.3396 + 1.1292i | 1.1243 + 0.8240i |
| w92 | 0.3048 + 0.9387i | 1.1624 + 0.5543i | 0.5539 + 1.1644i | 1.1623 + 0.5765i |
| w93 | 0.3048 + 0.9387i | 1.1032 + 0.6643i | 0.6655 + 1.1051i | 1.0975 + 0.6885i |
| w94 | 0.3191 + 1.0603i | 1.2741 + 0.6060i | 0.6027 + 1.2677i | 1.2691 + 0.5857i |
| w95 | 0.3285 + 1.1096i | 1.2092 + 0.7268i | 0.7240 + 1.2029i | 1.2035 + 0.7094i |
| w96 | 0.0583 + 0.5733i | 0.9150 + 0.0466i | 0.0457 + 0.9211i | 0.9523 + 0.0461i |
| w97 | 0.0563 + 0.5733i | 0.9085 + 0.1343i | 0.1367 + 0.9126i | 0.9440 + 0.1381i |
| w98 | 0.0561 + 0.6143i | 0.9948 + 0.0500i | 0.0499 + 1.0026i | 1.0315 + 0.0501i |
| w99 | 0.0561 + 0.6143i | 0.9843 + 0.1473i | 0.1484 + 0.9932i | 1.0228 + 0.1507i |
| w100 | 0.1686 + 0.5744i | 0.8612 + 0.3092i | 0.3131 + 0.8696i | 0.9013 + 0.3169i |
| w101 | 0.1686 + 0.5744i | 0.8883 + 0.2248i | 0.2258 + 0.8952i | 0.9267 + 0.2286i |
| w102 | 0.1683 + 0.6133i | 0.9363 + 0.3378i | 0.3412 + 0.9466i | 0.9750 + 0.3455i |
| w103 | 0.1683 + 0.6133i | 0.9652 + 0.2442i | 0.2456 + 0.9743i | 1.0035 + 0.2492i |
| w104 | 0.0575 + 0.8289i | 1.1753 + 0.0596i | 0.0588 + 1.1805i | 1.2011 + 0.0566i |
| w105 | 0.0575 + 0.8289i | 1.1638 + 0.1759i | 0.1753 + 1.1699i | 1.1922 + 0.1721i |
| w106 | 0.0559 + 0.7363i | 1.0837 + 0.0551i | 0.0537 + 1.0888i | 1.1135 + 0.0544i |
| w107 | 0.0559 + 0.7363i | 1.0729 + 0.1619i | 0.1620 + 1.0787i | 1.1046 + 0.1637i |
| w108 | 0.1725 + 0.8219i | 1.1085 + 0.4018i | 0.4022 + 1.1152i | 1.1352 + 0.4033i |
| w109 | 0.1725 + 0.8219i | 1.1424 + 0.2906i | 0.2901 + 1.1486i | 1.1698 + 0.2887i |
| w110 | 0.1881 + 0.7344i | 1.0200 + 0.3694i | 0.3708 + 1.0280i | 1.0522 + 0.3750i |
| w111 | 0.1681 + 0.7344i | 1.0510 + 0.2673i | 0.2674 + 1.0584i | 1.0842 + 0.2706i |
| w112 | 0.4142 + 0.5752i | 0.6784 + 0.6112i | 0.6203 + 0.6858i | 0.7062 + 0.6318i |
| w113 | 0.4142 + 0.5752i | 0.7341 + 0.5461i | 0.5514 + 0.7429i | 0.7682 + 0.5621i |
| w114 | 0.4154 + 0.6084i | 0.7381 + 0.6680i | 0.6762 + 0.7467i | 0.7616 + 0.6876i |
| w115 | 0.4154 + 0.6084i | 0.7989 + 0.5949i | 0.6008 + 0.8092i | 0.8283 + 0.6116i |
| w116 | 0.2879 + 0.5759i | 0.8261 + 0.3941i | 0.3968 + 0.8352i | 0.8663 + 0.4030i |
| w117 | 0.2879 + 0.5759i | 0.7851 + 0.4703i | 0.4763 + 0.7929i | 0.8211 + 0.4847i |
| w118 | 0.2879 + 0.6115i | 0.8991 + 0.4288i | 0.4321 + 0.9090i | 0.9357 + 0.4393i |
| w119 | 0.2879 + 0.6115i | 0.8540 + 0.5134i | 0.5196 + 0.8634i | 0.8873 + 0.5281i |
| w120 | 0.4234 + 0.8016i | 0.8748 + 0.7945i | 0.7985 + 0.8805i | 0.8857 + 0.8048i |
| w121 | 0.4234 + 0.8016i | 0.9480 + 0.7052i | 0.7091 + 0.9536i | 0.9624 + 0.7150i |
| w122 | 0.4202 + 0.7277i | 0.8034 + 0.7296i | 0.7351 + 0.8110i | 0.8208 + 0.7452i |
| w123 | 0.4202 + 0.7277i | 0.8718 + 0.6493i | 0.6536 + 0.8186i | 0.8922 + 0.6622i |
| w124 | 0.2928 + 0.8098i | 1.0647 + 0.5073i | 0.5098 + 1.0718i | 1.0890 + 0.5137i |
| w125 | 0.2928 + 0.8098i | 1.0114 + 0.6096i | 0.6126 + 1.0178i | 1.0308 + 0.6179i |
| w126 | 0.2889 + 0.7310i | 0.9801 + 0.4685i | 0.4703 + 0.9876i | 1.0092 + 0.4766i |
| w127 | 0.2889 + 0.7310i | 0.9294 + 0.5603i | 0.5649 + 0.9379i | 0.9560 + 0.5733i |
| w128 | 1.4412 + 0.0759i | 0.0435 + 0.2303i | 0.2333 + 0.0558i | 0.0356 + 0.2800i |
| w129 | 1.0926 + 0.0448i | 0.0435 + 0.2303i | 0.2333 + 0.0558i | 0.0833 + 0.2651i |
| w130 | 1.3092 + 0.0863i | 0.0479 + 0.3233i | 0.3230 + 0.0414i | 0.0320 + 0.3485i |
| w131 | 1.2012 + 0.0699i | 0.0479 + 0.3233i | 0.3230 + 0.0414i | 0.0823 + 0.3458i |
| w132 | 0.8308 + 0.0588i | 0.0423 + 0.1970i | 0.1828 + 0.0377i | 0.0355 + 0.2100i |
| w133 | 0.9538 + 0.0508i | 0.0423 + 0.1970i | 0.1828 + 0.0377i | 0.0355 + 0.2100i |
| w134 | 0.8308 + 0.0538i | 0.0969 + 0.3195i | 0.3356 + 0.1033i | 0.1532 + 0.3542i |
| w135 | 0.9265 + 0.0539i | 0.0969 + 0.3195i | 0.3356 + 0.1033i | 0.1532 + 0.3542i |
| w136 | 1.6156 + 0.0830i | 0.0521 + 0.5026i | 0.5221 + 0.0507i | 0.0279 + 0.5173i |
| w137 | 1.0810 + 0.1364i | 0.0521 + 0.5026i | 0.5221 + 0.0507i | 0.0833 + 0.5156i |
| w133 | 1.8273 + 0.1110i | 0.0455 + 0.4209i | 0.4318 + 0.0399i | 0.0279 + 0.4291i |
| w139 | 1.1228 + 0.1520i | 0.0455 + 0.4209i | 0.4318 + 0.0399i | 0.0778 + 0.4336i |
| w140 | 0.8380 + 0.1741i | 0.1546 + 0.4810i | 0.5001 + 0.1519i | 0.2048 + 0.4951i |
| w141 | 0.9529 + 0.1595i | 0.1546 + 0.4810i | 0.5001 + 0.1519i | 0.1456 + 0.5085i |
| w142 | 0.8380 + 0.1741i | 0.1286 + 0.4035i | 0.4199 + 0.1252i | 0.1871 + 0.4221i |
| w143 | 0.9529 + 0.1595i | 0.1286 + 0.4035i | 0.4199 + 0.1252i | 0.1338 + 0.4355i |
| w144 | 0.5353 + 0.0608i | 0.1248 + 0.1724i | 0.1833 + 0.1349i | 0.1306 + 0.1707i |
| w145 | 0.5353 + 0.0608i | 0.1248 + 0.1724i | 0.1833 + 0.1349; | 0.1465 + 0.2102i |
| w146 | 0.5353 + 0.0608i | 0.1939 + 0.2364i | 0.2524 + 0.1988i | 0.2606 + 0.2717i |
| w147 | 0.5353 + 0.0608i | 0.1939 + 0.2364i | 0.2524 + 0.1988i | 0.2014 + 0.2359i |
| w148 | 0.7097 + 0.0603i | 0.0839 + 0.1615i | 0.1221 + 0.0560i | 0.0802 + 0.1457i |
| w149 | 0.6618 + 0.0606i | 0.0839 + 0.1615i | 0.1221 + 0.0560i | 0.0348 + 0.1352i |
| w150 | 0.7097 + 0.0603i | 0.1723 + 0.2752i | 0.3098 + 0.1703i | 0.2175 + 0.3255i |
| w151 | 0.6618 + 0.0606i | 0.1723 + 0.2752i | 0.3098 + 0.1703i | 0.1851 + 0.2925i |
| w152 | 0.5362 + 0.1825i | 0.3306 + 0.3866i | 0.4013 + 0.3359i | 0.4097 + 0.4098i |

-continued

| | | | | |
|---|---|---|---|---|
| w153 | 0.5362 + 0.1825i | 0.3306 + 0.3866i | 0.4013 + 0.3359i | 0.3696 + 0.4239i |
| w154 | 0.5362 + 0.1825i | 0.2742 + 0.3181i | 0.3296 + 0.2803i | 0.3109 + 0.3161i |
| w155 | 0.5362 + 0.1825i | 0.2742 + 0.3181i | 0.3296 + 0.2803i | 0.3384 + 0.3541i |
| w156 | 0.7143 + 0.1796i | 0.2485 + 0.4415i | 0.4583 + 0.2501i | 0.2626 + 0.4826i |
| w157 | 0.6634 + 0.1812i | 0.2485 + 0.4415i | 0.4583 + 0.2501i | 0.3138 + 0.4582i |
| w158 | 0.7143 + 0.1796i | 0.2144 + 0.3607i | 0.3325 + 0.2123i | 0.2676 + 0.3932i |
| w159 | 0.6634 + 0.1812i | 0.2144 + 0.3607i | 0.3825 + 0.2123i | 0.2676 + 0.3932i |
| w160 | 1.4477 + 0.2272i | 0.0444 + 0.8222i | 0.8404 + 0.0429i | 0.0413 + 0.8350i |
| w161 | 1.1203 + 0.3790i | 0.1214 + 0.8152i | 0.3322 + 0.1261i | 0.1250 + 0.8291i |
| w162 | 1.3161 + 0.2454i | 0.0454 + 0.7459i | 0.7634 + 0.0391i | 0.0386 + 0.7570i |
| w163 | 1.2096 + 0.3196i | 0.1052 + 0.7420i | 0.7562 + 0.1141i | 0.1144 + 0.7509i |
| w164 | 0.8570 + 0.4182i | 0.2798 + 0.7766i | 0.7916 + 0.2874i | 0.2870 + 0.7948i |
| w165 | 0.9971 + 0.4062i | 0.2069 + 0.7984i | 0.8156 + 0.2082i | 0.2067 + 0.8150i |
| w166 | 0.8570 + 0.4182i | 0.2499 + 0.7071i | 0.7184 + 0.2607i | 0.2642 + 0.7207i |
| w167 | 0.9655 + 0.4069i | 0.1934 + 0.7233i | 0.7408 + 0.1901i | 0.1898 + 0.7386i |
| w168 | 1.6269 + 0.2588i | 0.0603 + 0.5859i | 0.6079 + 0.0387i | 0.0311 + 0.6001i |
| w169 | 1.0884 + 0.2705i | 0.0603 + 0.5859i | 0.6023 + 0.0822i | 0.0947 + 0.5947i |
| w170 | 1.8201 + 0.3520i | 0.0495 + 0.6628i | 0.6861 + 0.0374i | 0.0347 + 0.6790i |
| w171 | 1.1299 + 0.2516i | 0.0856 + 0.6604i | 0.6795 + 0.1006i | 0.1047 + 0.6731i |
| w172 | 0.8474 + 0.2934i | 0.1773 + 0.5618i | 0.5731 + 0.1989i | 0.2220 + 0.5721i |
| w173 | 0.9654 + 0.2826i | 0.1773 + 0.5618i | 0.5854 + 0.1576i | 0.1586 + 0.5847i |
| w174 | 0.8474 + 0.2934i | 0.2149 + 0.6311i | 0.6454 + 0.2320i | 0.2421 + 0.6464i |
| w175 | 0.9654 + 0.2826i | 0.1814 + 0.6396i | 0.6642 + 0.1725i | 0.1741 + 0.6621i |
| w176 | 0.5447 + 0.4407i | 0.5570 + 0.6126i | 0.6237 + 0.5684i | 0.5883 + 0.6374i |
| w177 | 0.5447 + 0.4407i | 0.4996 + 0.6598i | 0.6752 + 0.5053i | 0.5182 + 0.6889i |
| w178 | 0.5447 + 0.4407i | 0.5027 + 0.5591i | 0.5655 + 0.5162i | 0.5425 + 0.5800i |
| w179 | 0.5447 + 0.4407i | 0.4587 + 0.5943i | 0.6118 + 0.4591i | 0.4782 + 0.6270i |
| w180 | 0.7297 + 0.4279i | 0.3616 + 0.7417i | 0.7598 + 0.3644i | 0.3667 + 0.7681i |
| w181 | 0.6735 + 0.4327i | 0.4272 + 0.7061i | 0.7203 + 0.4365i | 0.4442 + 0.7324i |
| w182 | 0.7297 + 0.4279i | 0.3335 + 0.6719i | 0.6887 + 0.3313i | 0.3373 + 0.6966i |
| w183 | 0.6735 + 0.4327i | 0.3844 + 0.6452i | 0.6540 + 0.3956i | 0.4091 + 0.6660i |
| w184 | 0.5387 + 0.3082i | 0.3827 + 0.4523i | 0.4664 + 0.3880i | 0.4524 + 0.4675i |
| w185 | 0.5387 + 0.3082i | 0.3827 + 0.4523i | 0.4664 + 0.3880i | 0.4008 + 0.5029i |
| w186 | 0.5387 + 0.3082i | 0.4308 + 0.5124i | 0.5082 + 0.4618i | 0.4977 + 0.5232i |
| w187 | 0.5387 + 0.3082i | 0.4308 + 0.5124i | 0.5463 + 0.4147i | 0.4386 + 0.5659i |
| w188 | 0.7219 + 0.3014i | 0.2859 + 0.5163i | 0.5417 + 0.2697i | 0.2843 + 0.5533i |
| w189 | 0.6673 + 0.3041i | 0.2859 + 0.5163i | 0.5222 + 0.3074i | 0.3447 + 0.5290i |
| w190 | 0.7219 + 0.3014i | 0.3056 + 0.5933i | 0.6164 + 0.2990i | 0.3097 + 0.6251i |
| w191 | 0.6673 + 0.3041i | 0.3356 + 0.5770i | 0.5877 + 0.3530i | 0.3756 + 0.5986i |
| w192 | 0.0563 + 0.0613i | 0.1787 + 0.0384i | 0.0504 + 0.2052i | 0.1765 + 0.0357i |
| w193 | 0.0563 + 0.0613i | 0.1787 + 0.0384i | 0.0504 + 0.2052i | 0.2273 + 0.0412i |
| w194 | 0.0563 + 0.0613i | 0.2848 + 0.0454i | 0.0400 + 0.3001i | 0.3691 + 0.0298i |
| w195 | 0.0563 + 0.0613i | 0.2848 + 0.0454i | 0.0400 + 0.3001i | 0.2911 + 0.0346i |
| w196 | 0.1675 + 0.0612i | 0.0596 + 0.0562i | 0.0336 + 0.1275i | 0.1117 + 0.0289i |
| w197 | 0.1675 + 0.0612i | 0.0596 + 0.0562i | 0.0336 + 0.1275i | 0.0382 + 0.0258i |
| w198 | 0.1675 + 0.0612i | 0.3150 + 0.0732i | 0.0944 + 0.3293i | 0.3643 + 0.0969i |
| w199 | 0.1675 + 0.0612i | 0.3150 + 0.0732i | 0.0944 + 0.3293i | 0.3097 + 0.0874i |
| w200 | 0.0565 + 0.1842i | 0.5087 + 0.0506i | 0.0496 + 0.5209i | 0.5699 + 0.0285i |
| w201 | 0.0565 + 0.1842i | 0.5087 + 0.0506i | 0.0496 + 0.5209i | 0.5487 + 0.0713i |
| w202 | 0.0565 + 0.1842i | 0.4218 + 0.0424i | 0.0362 + 0.4265i | 0.4393 + 0.0368i |
| w203 | 0.0565 + 0.1842i | 0.4218 + 0.0424i | 0.0362 + 0.4265i | 0.4820 + 0.0488i |
| w204 | 0.1681 + 0.1841i | 0.4872 + 0.1426i | 0.1472 + 0.4983i | 0.5432 + 0.1831i |
| w205 | 0.1681 + 0.1841i | 0.4872 + 0.1426i | 0.1472 + 0.4983i | 0.5356 + 0.1368i |
| w206 | 0.1681 + 0.1841i | 0.4021 + 0.1054i | 0.1161 + 0.4145i | 0.4214 + 0.1199i |
| w207 | 0.1681 + 0.1841i | 0.4021 + 0.1054i | 0.1161 + 0.4145i | 0.4661 + 0.1312i |
| w208 | 0.4040 + 0.0609i | 0.1613 + 0.0909i | 0.1305 + 0.1861i | 0.1610 + 0.1081i |
| w209 | 0.4040 + 0.0609i | 0.1613 + 0.0909i | 0.1305 + 0.1861i | 0.2042 + 0.1262i |
| w210 | 0.4040 + 0.0609i | 0.2488 + 0.1625i | 0.1935 + 0.2539i | 0.2978 + 0.2229i |
| w211 | 0.4040 + 0.0609i | 0.2488 + 0.1625i | 0.1935 + 0.2539i | 0.2455 + 0.1743i |
| w212 | 0.2837 + 0.0610i | 0.0596 + 0.0562i | 0.0468 + 0.0504i | 0.1014 + 0.0859i |
| w213 | 0.2837 + 0.0610i | 0.0596 + 0.0562i | 0.0468 + 0.0504i | 0.0352 + 0.0762i |
| w214 | 0.2837 + 0.0610i | 0.2869 + 0.1559i | 0.1632 + 0.3084i | 0.3374 + 0.1692i |
| w215 | 0.2837 + 0.0610i | 0.2869 + 0.1559i | 0.1632 + 0.3084i | 0.2914 + 0.1413i |
| w216 | 0.4047 + 0.1833i | 0.3993 + 0.3148i | 0.3291 + 0.4053i | 0.4468 + 0.3693i |
| w217 | 0.4047 + 0.1833i | 0.3993 + 0.3148i | 0.3291 + 0.4053i | 0.4545 + 0.3221i |
| w218 | 0.4047 + 0.1833i | 0.3331 + 0.2583i | 0.2736 + 0.3530i | 0.3539 + 0.2625i |
| w219 | 0.4047 + 0.1833i | 0.3331 + 0.2583i | 0.2736 + 0.3330i | 0.3954 + 0.2905i |
| w220 | 0.2845 + 0.1838i | 0.4504 + 0.2317i | 0.2421 + 0.4588i | 0.5230 + 0.2380i |
| w221 | 0.2845 + 0.1838i | 0.4504 + 0.2317i | 0.2421 + 0.4588i | 0.4892 + 0.2652i |
| w222 | 0.2845 + 0.1838i | 0.3687 + 0.1952i | 0.2037 + 0.3816i | 0.3945 + 0.1942i |
| w223 | 0.2845 + 0.1838i | 0.3687 + 0.1952i | 0.2037 + 0.3816i | 0.4344 + 0.2178i |
| w224 | 0.0567 + 0.4443i | 0.8318 + 0.0442i | 0.0421 + 0.8420i | 0.8751 + 0.0419i |
| w225 | 0.0567 + 0.4443i | 0.8239 + 0.1192i | 0.1247 + 0.8342i | 0.8676 + 0.1257i |
| w226 | 0.0567 + 0.4443i | 0.7562 + 0.0454i | 0.0384 + 0.1648i | 0.7986 + 0.0381i |
| w227 | 0.0567 + 0.4443i | 0.7500 + 0.1031i | 0.1132 + 0.7575i | 0.7927 + 0.1144i |
| w228 | 0.1692 + 0.4451i | 0.7842 + 0.2789i | 0.2353 + 0.7945i | 0.8293 + 0.2896i |
| w229 | 0.1692 + 0.4451i | 0.8063 + 0.2068i | 0.2067 + 0.8184i | 0.8523 + 0.2091i |
| w230 | 0.1692 + 0.4451i | 0.7167 + 0.2465i | 0.2585 + 0.7216i | 0.7578 + 0.2626i |
| w231 | 0.1692 + 0.4451i | 0.7319 + 0.1921i | 0.1836 + 0.7429i | 0.7786 + 0.1893i |

-continued

| | | | | |
|---|---|---|---|---|
| w232 | 0.0568 + 0.3109i | 0.5929 + 0.0575i | 0.0601 + 0.6048i | 0.6439 + 0.0332i |
| w233 | 0.0568 + 0.3109i | 0.5929 + 0.0575i | 0.0601 + 0.6048i | 0.6363 + 0.0929i |
| w234 | 0.0568 + 0.3109i | 0.6701 + 0.0660i | 0.0373 + 0.6868i | 0.7212 + 0.0348i |
| w235 | 0.0568 + 0.3109i | 0.6701 + 0.0660i | 0.0991 + 0.6806i | 0.7163 + 0.1032i |
| w236 | 0.1690 + 0.3113i | 0.5701 + 0.1700i | 0.1750 + 0.5791i | 0.6122 + 0.2069i |
| w237 | 0.1690 + 0.3113i | 0.5701 + 0.1700i | 0.1750 + 0.5791i | 0.6268 + 0.1493i |
| w238 | 0.1690 + 0.3113i | 0.6451 + 0.1940i | 0.2285 + 0.6480i | 0.6853 + 0.2349i |
| w239 | 0.1690 + 0.3113i | 0.6451 + 0.1940i | 0.1719 + 0.6651i | 0.7046 + 0.1699i |
| w240 | 0.4100 + 0.4451i | 0.6189 + 0.5514i | 0.5654 + 0.6265i | 0.6521 + 0.5790i |
| w241 | 0.4100 + 0.4451i | 0.6665 + 0.4960i | 0.5027 + 0.6784i | 0.7094 + 0.5138i |
| w242 | 0.4100 + 0.4451i | 0.5667 + 0.4955i | 0.5121 + 0.5697i | 0.6013 + 0.5265i |
| w243 | 0.4100 + 0.4451i | 0.6028 + 0.4546i | 0.4555 + 0.6162i | 0.6524 + 0.4667i |
| w244 | 0.2871 + 0.4459i | 0.7506 + 0.3592i | 0.3624 + 0.7630i | 0.7984 + 0.3673i |
| w245 | 0.2871 + 0.4459i | 0.7156 + 0.4239i | 0.4347 + 0.7245i | 0.7580 + 0.4428i |
| w246 | 0.2871 + 0.4459i | 0.6809 + 0.3299i | 0.3286 + 0.6923i | 0.7298 + 0.3325i |
| w247 | 0.2871 + 0.4459i | 0.6544 + 0.3786i | 0.3924 + 0.6581i | 0.6964 + 0.4016i |
| w248 | 0.4066 + 0.3107i | 0.4637 + 0.3699i | 0.3814 + 0.4708i | 0.5005 + 0.4181i |
| w249 | 0.4066 + 0.3107i | 0.4637 + 0.3699i | 0.3814 + 0.4708i | 0.5359 + 0.3697i |
| w250 | 0.4066 + 0.3107i | 0.5223 + 0.4197i | 0.4563 + 0.5135i | 0.5509 + 0.4732i |
| w251 | 0.4066 + 0.3107i | 0.5223 + 0.4197i | 0.4093 + 0.5514i | 0.5953 + 0.4196i |
| w252 | 0.2858 + 0.3115i | 0.5265 + 0.2736i | 0.2826 + 0.5338i | 0.5896 + 0.2686i |
| w253 | 0.2858 + 0.3115i | 0.5265 + 0.2736i | 0.2826 + 0.5338i | 0.5635 + 0.3210i |
| w254 | 0.2858 + 0.3115i | 0.5946 + 0.3133i | 0.2962 + 0.6193i | 0.6601 + 0.3001i |
| w255 | 0.2858 + 0.3115i | 0.5946 + 0.3133i | 0.3481 + 0.5915i | 0.6312 + 0.3619i |

Figure 11A:
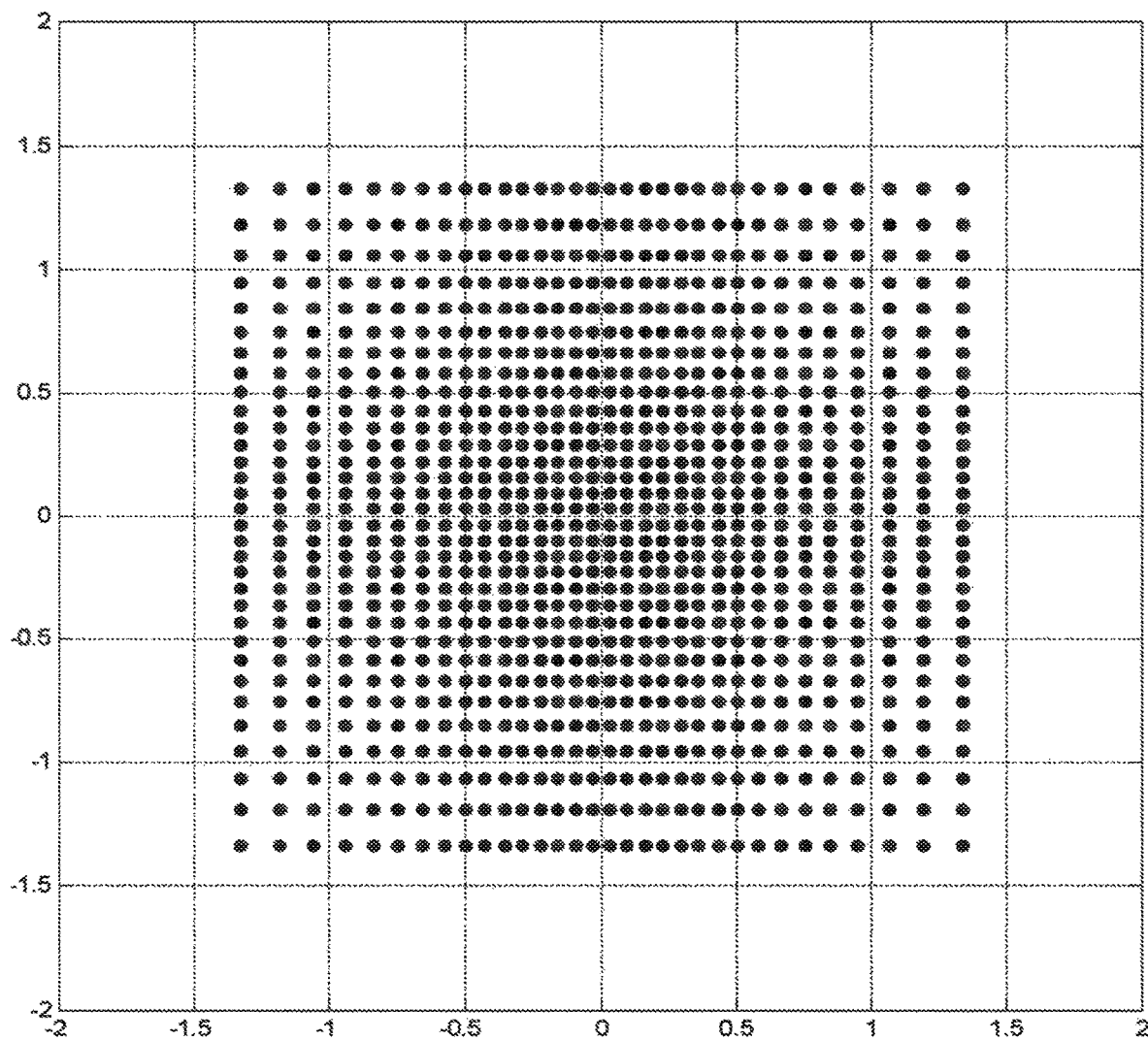
FIG. 11A shows a non-uniform 1024-QAM constellation at 27 dB SNR.
Figure 11B:
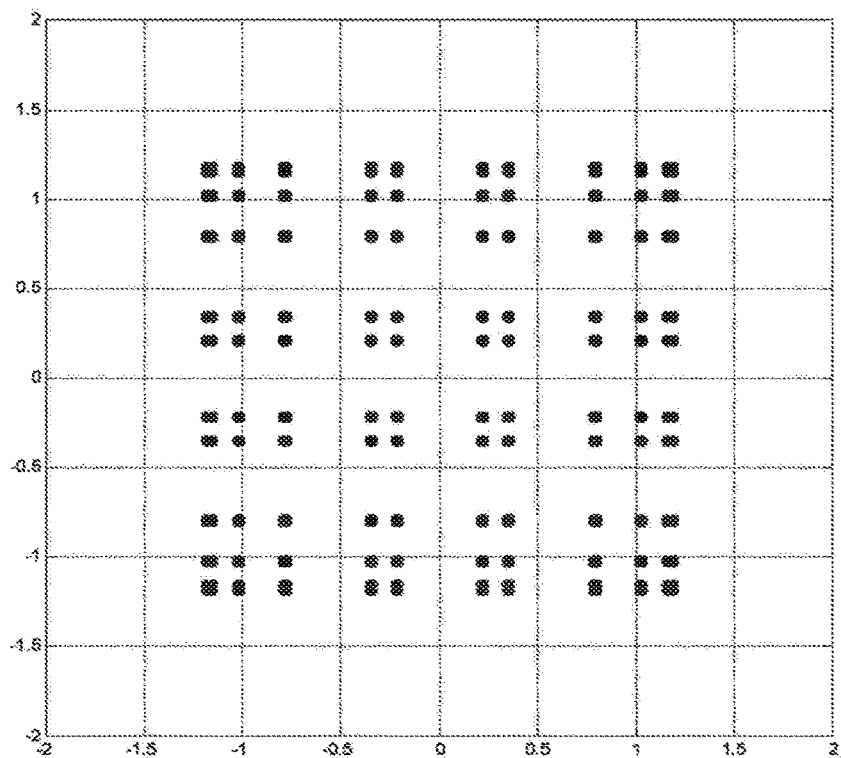
FIG. 11B shows a non-uniform 1024-QAM constellation at 8 dB SNR.
Figure 11C:
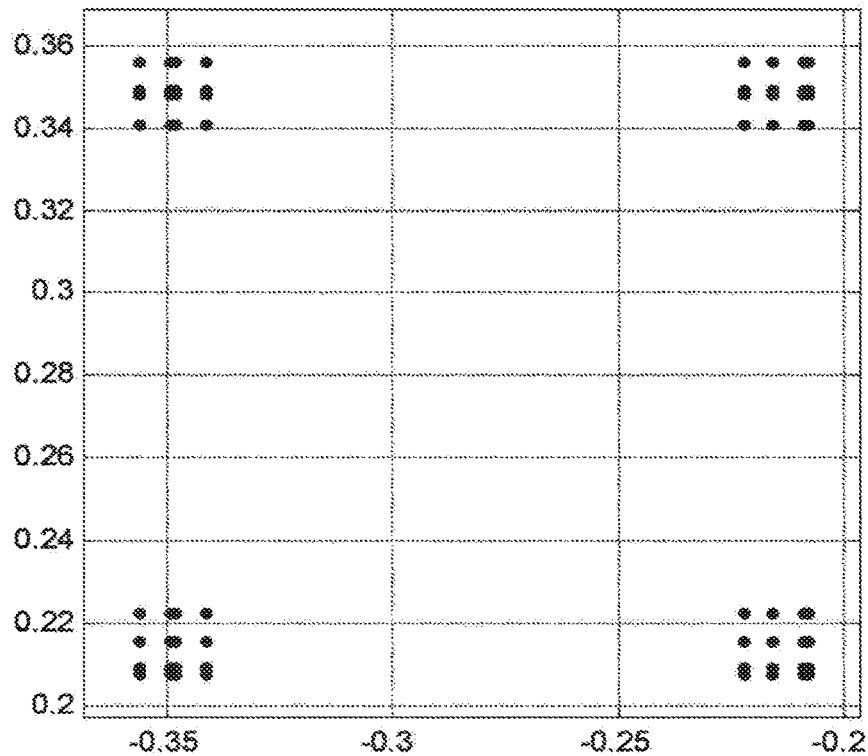
FIG. 11C shows an enlargement of the $N^2$-NUC optimized for 8 dB SNR.

For further illustration FIGS. 11A-11C show two of the proposed 1024-$N^2$-NUCs optimized for 27 dB SNR (FIG. 11A) and 8 dB SNR (FIG. 11B) and an enlargement of the $N^2$-NUC optimized for 8 dB SNR (FIG. 11C), illustrating that several constellation points tend to merge at low SNR.

Figure 12A:
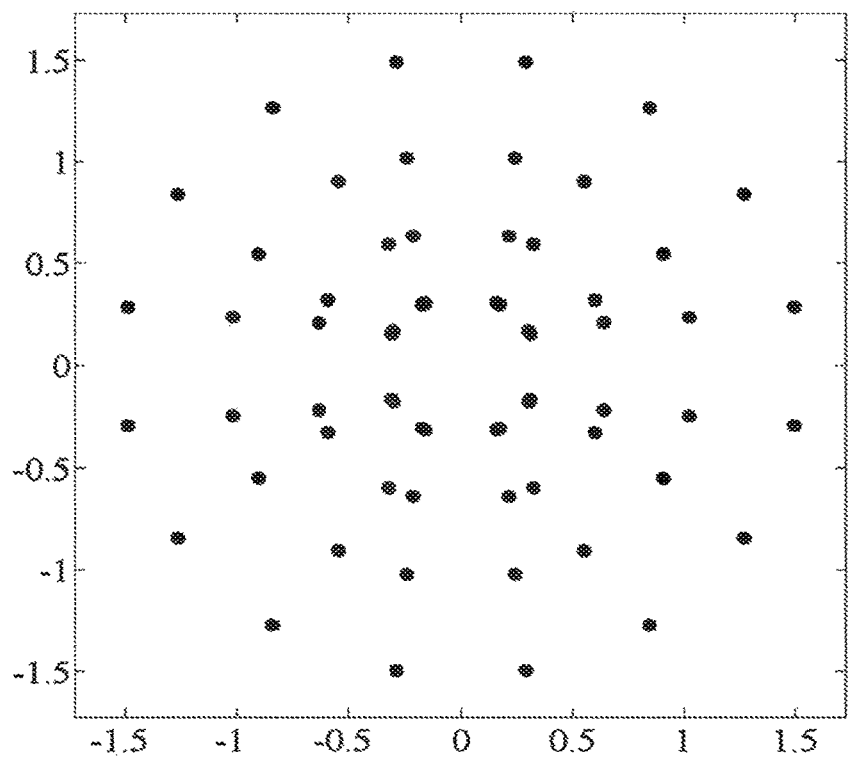
FIG. 12A shows a non-uniform 64-QQAM constellation.
Figure 12B:
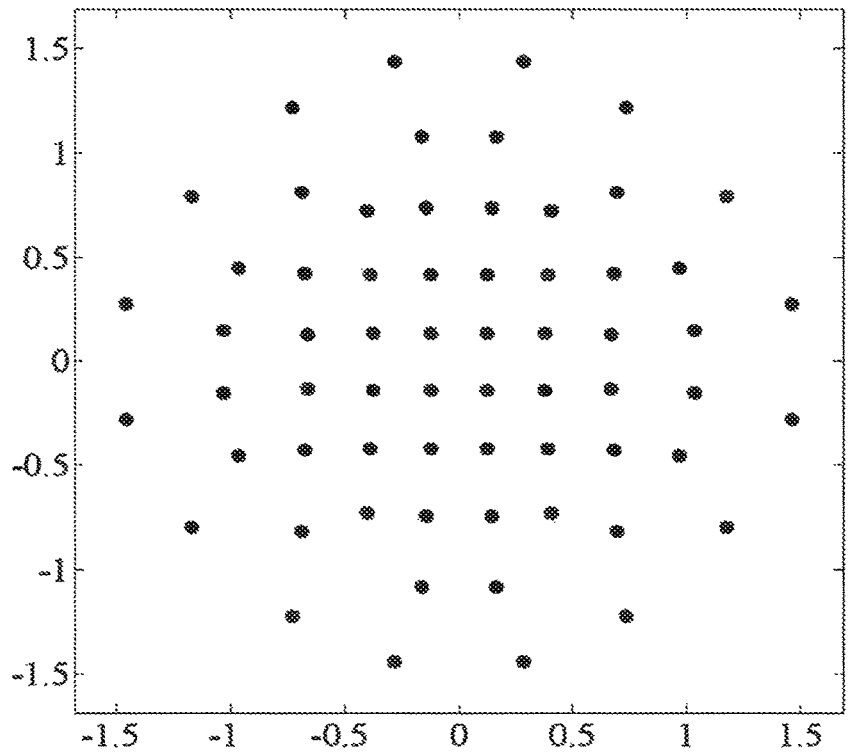
FIG. 12B shows a non-uniform 64-QQAM constellation.

FIGS. 12A and 12B show two 64-QQAMs optimized for 10 dB SNR (FIG. 12A) and 15 dB SNR (FIG. 12B). In contrast to the rectangular shaped $N^2$-NUCs, the QQAM constellations have a circular shape, reducing the peak-power of the constellation compared to $N^2$-NUCs, by avoiding the constellation points near the corner. The constellation points of large QQAMs tend to merge in the same way like $N^2$-NUCs when being optimized at low SNR. This is e.g. the case in the inner circle of the 64-QQAM optimized at 10 dB target SNR shown in FIG. 12A.

The condensation of constellations, especially if optimized for very low SNR, may sometimes lead to (complete) puncturing of the least significant bits of the constellation. This is for example the case for a 256-$N^2$-NUC optimized for 0 dB SNR, which results in a QPSK constellation with all 64 constellation points of one quadrant having exactly the same constellation point position. When demapping such a constellation in the receiver, the first two bits can be restored by means of the four different constellation point positions. In case of an unencoded system the remaining 6 least significant bits could not be restored. This is however possible using a BICM chain with state-of-the-art forward error correction codes, which is able to correct the remaining bits based on the information of the two most significant bits. Such a BICM chain, as e.g. conventionally used in systems according to various DVB standards, is thus preferably used in the transmitter and the receiver of a communication system according to the present disclosure. Preferably, the use of such a BICM chain is assumed to be used when performing an optimization of the constellations, and the BICM capacity is the target capacity during the optimization process. In the extreme example mentioned above, it would alternatively possible to directly transmit a QPSK constellation carrying only 2 bits per constellation symbol to avoid the increased demapping complexity. For higher SNR the transmission of condensed non-uniform constellations with very high order is however advantageous from a performance perspective compared to smaller non-uniform constellations.

In still another embodiment the modulator of the disclosed coding and modulation apparatus modulates said cell words into constellation values of a non-uniform constellation wherein said modulator is configured to use, based on the total number M of constellation points of the constellation and the code rate, a non-uniform constellation obtained from a constellation from anyone of groups A, B, C or D through rotation by an angle around the origin. In other words, one or more of the following "invariant transformations" do not affect the properties of a mapping:
1. rotation of all symbols by an arbitrary angle $\varphi$,
2. inversion of m-th bit y_m=b∈{0,1} to y_m=$\bar{b}$, where the bar indicates inversion,
3. interchanging of bit positions y_k1 and y_k2,
4. reflection on Re{x1}- and/or Im{x1}-axis.

In still another embodiment the modulator of the disclosed coding and modulation apparatus modulates said cell words into constellation values of a non-uniform constellation wherein said modulator is configured to use, based on the total number M of constellation points of the constellation and the code rate, a non-uniform constellation from a group E of constellations comprising one or more of the following constellations defined by the constellation position vector $w_{0 \ldots M}$. Such constellations can not be described by the symmetry from the QQAM in a straightforward manner. Therefore, the complete constellation position vector with M entries will be used.

The following non-uniform constellations comprised in group E are proposed:
E) M-QAM non-uniform constellations of group E:
E1) 8-QAM 2D NUC

| | code rate | | | |
|---|---|---|---|---|
| w | 100/180 or 104/180 | 23/36 | 25/36 or 13/18 | 32/45 (16200 length code) |
| w0 | −0.2330 | −0.2231 | −0.2416 | −0.2416 + 0.0000i |
| w1 | −0.5414 − 0.8712i | −0.5520 − 0.8882i | −0.5547 − 0.8925i | −0.5547 − 0.8925i |

-continued

| | | | | |
|---|---|---|---|---|
| w2 | −0.5414 + 0.8712i | −0.5520 + 0.8882i | −0.5547 + 0.8925i | −0.5547 + 0.8925i |
| w3 | −1.3570 | −1.3279 | −1.3165 | −1.3165 + 0.0000i |
| w4 | 0.2330 | 0.2231 | 0.2416 | 0.2416 |
| w5 | 0.5414 − 0.8712i | 0.5520 − 0.8882i | 0.5547 − 0.8925i | 0.5547 − 0.8925i |
| w6 | 0.5414 + 0.8712i | 0.5520 + 0.8882i | 0.5547 + 0.8925i | 0.5547 + 0.8925i |
| w7 | 1.3570 | 1.3279 | 1.3165 | 1.3165 |

| | code rate |
|---|---|
| w | 19/30 |
| w0 | 0.8753 + 0.5486i |
| w1 | +1.3470i |
| w2 | +0.2266i |
| w3 | −0.8753 + 0.5486i |
| w4 | 0.8753 − 0.5486i |
| w5 | −1.3470i |
| w6 | −0.2266i |
| w7 | −0.8753 − 0.5486i |

E2) 16-QAM 2D NUC

| w/code | 90/180 or 96/180 or 100/180 | 26/45 | 3/5 | 28/45 or 23/36 |
|---|---|---|---|---|
| w0 | 0.6186 + 0.2544i | 0.4718 + 0.2606i | 0.4718 + 0.2606i | 0.4936 + 0.2530i |
| w1 | −0.6186 + 0.2544i | −0.4718 + 0.2606i | −0.4718 + 0.2606i | −0.4936 + 0.2530i |
| w2 | 0.6186 − 0.25441 | 0.4718 − 0.2606i | 0.4718 − 0.2606i | 0.4936 − 0.2530i |
| w3 | −0.6186 − 0.2544i | −0.4718 − 0.2606i | −0.4718 − 0.2606i | −0.4936 − 0.2530i |
| w4 | 1.2080 + 0.5377i | 1.2088 + 0.4984i | 0.2606 + 0.4718i | 0.2530 + 0.4936i |
| w5 | −1.2080 + 0.5377i | −1.2088 + 0.4984i | −0.2606 + 0.4718i | −0.2530 + 0.4936i |
| w6 | 1.2080 − 0.5377i | 1.2088 − 0.4984i | 0.2606 − 0.4718i | 0.2530 − 0.4936i |
| w7 | −1.2080 − 0.5377i | −1.2088 − 0.4984i | −0.2606 − 0.4718; | −0.2530 − 0.4936i |
| w8 | 0.2213 + 0.4416i | 0.2606 + 0.4718i | 1.2088 + 0.4984i | 1.2040 + 0.4925i |
| w9 | −0.2213 + 0.4416i | −0.2606 + 0.4718i | −1.2088 + 0.4984i | −1.2040 + 0.4925i |
| w10 | 0.2213 − 0.4416i | 0.2606 − 0.4718i | 1.2088 − 0.4984i | 1.2040 − 0.4925i |
| w11 | −0.2213 − 0.4416i | −0.2606 − 0.4718i | −1.2088 − 0.4984i | −1.2040 − 0.4925i |
| w12 | 0.4487 + 1.1657i | 0.4984 + 1.2088i | 0.4984 + 1.2088i | 0.4925 + 1.2040i |
| w13 | −0.4487 + 1.1657i | −0.4984 + 1.2088i | −0.4984 + 1.2088i | −0.4925 + 1.2040i |
| w14 | 0.4487 − 1.1657i | 0.4984 − 1.2088i | 0.4984 − 1.2088i | 0.4925 − 1.2040i |
| w15 | −0.4487 − 1.1657i | −0.4984 − 1.2088i | −0.4984 − 1.2088i | −0.4925 − 1.2040i |

| w/code | 25/36 or 13/18 | 140/180 or 154/180 | 20/30 |
|---|---|---|---|
| w0 | 0.6186 + 0.2544i | 0.6578 + 0.2571i | 0.5061 + 0.2474i |
| w1 | −0.6186 + 0.2544i | −0.6578 + 0.2571i | 0.2474 + 0.5061i |
| w2 | 0.6186 − 0.2544i | 0.6578 − 0.2571i | −0.5061 + 0.2474i |
| w3 | −0.6186 − 0.2544i | −0.6578 − 0.2571i | −0.2474 + 0.5061i |
| w4 | 1.2080 + 0.5377i | 1.2088 + 0.5659i | 0.5061 − 0.2474i |
| w5 | −1.2080 + 0.5377i | −1.2088 + 0.5659i | 0.2474 − 0.5061i |
| w6 | 1.2080 − 0.5377i | 1.2088 − 0.5659i | −0.5061 − 0.2474i |
| w7 | −1.2080 − 0.5377i | −1.2088 − 0.5659i | −0.2474 − 0.5061i |
| w8 | 0.2213 + 0.4416i | 0.2173 + 0.4189i | 1.2007 + 0.4909i |
| w9 | −0.2213 + 0.4416i | −0.2173 + 0.4189i | 0.4909 + 1.2007i |
| w10 | 0.2213 − 0.4416i | 0.2173 − 0.4189i | −1.2007 + 0.4909i |
| w11 | −0.2213 − 0.4416i | −0.2173 − 0.4189i | −0.4909 + 1.2007i |
| w12 | 0.4487 + 1.1657i | 0.4326 + 1.1445i | 1.2007 − 0.4909i |
| w13 | −0.4487 + 1.1657i | −0.4326 + 1.1445i | 0.4909 − 1.2007i |
| w14 | 0.4487 − 1.1657i | 0.4326 − 1.1445i | −1.2007 − 0.4909i |
| w15 | −0.4487 − 1.1657i | −0.4326 − 1.1445i | −0.4909 − 1.2007i |

E3) 32-QAM 2D NUC

| | code rate | |
|---|---|---|
| w | 2/3 or 25/36 | 128/180 or 132/180 or 140/180 |
| w0 | 0.1929 + 0.1744i | 0.2121 + 0.1569i |
| w1 | 0.2283 + 0.5036i | −0.2121 + 0.1569i |
| w2 | 0.1929 − 0.1744i | 0.2121 − 0.1569i |
| w3 | 0.2283 − 0.5036i | −0.2121 − 0.1559i |
| w4 | −0.1929 + 0.1744i | 0.7185 + 0.1739i |
| w5 | −0.2283 + 0.5036i | −0.7185 + 0.1739i |
| w6 | −0.1929 − 0.1744i | 0.7185 − 0.1739i |

-continued

| | code rate | |
|---|---|---|
| w | 2/3 or 25/36 | 128/180 or 132/180 or 140/180 |
| w7 | −0.2283 − 0.5036i | −0.7185 − 0.1739i |
| w8 | 0.3541 + 1.4168i | 0.3478 + 1.4027i |
| w9 | 0.2627 + 0.9170i | −0.3478 + 1.4027i |
| w10 | 0.3541 − 1.4168i | 0.3478 − 1.4027i |
| w11 | 0.2627 − 0.9170i | −0.3478 − 1.4027i |
| w12 | −0.3541 + 1.4168i | 1.2867 + 0.3209i |
| w13 | −0.2627 + 0.9170i | −1.2867 + 0.3209i |
| w14 | −0.3541 − 1.4168i | 1.2867 − 0.3209i |

-continued

| w | code rate | |
|---|---|---|
| | 2/3 or 25/36 | 128/180 or 132/180 or 140/180 |
| w15 | −0.2627 − 0.9170i | −1.2867 − 0.3209i |
| w16 | 0.6963 + 0.1782i | 0.2258 + 0.5089i |
| w17 | 0.6364 + 0.4437i | −0.2258 + 0.5089i |
| w18 | 0.6963 − 0.1782i | 0.2258 − 0.5089i |
| w19 | 0.6364 − 0.4437i | −0.2258 − 0.5089i |
| w20 | −0.6963 + 0.1782i | 0.6431 + 0.5018i |
| w21 | −0.6364 + 0.4437i | −0.6431 + 0.5018i |
| w22 | −0.6963 − 0.1782i | 0.6431 − 0.5018i |
| w23 | −0.6364 − 0.4437i | −0.6431 − 0.5018i |
| w24 | 1.3162 + 0.3270i | 0.2443 + 0.9172i |

-continued

| w | code rate | |
|---|---|---|
| | 2/3 or 25/36 | 128/180 or 132/180 or 140/180 |
| w25 | 0.9382 + 0.8637i | −0.2443 + 0.9172i |
| w26 | 1.3162 − 0.3270i | 0.2443 − 0.9172i |
| w27 | 0.9382 − 0.8637i | −0.2443 − 0.9172i |
| w28 | −1.3162 + 0.3270i | 0.9274 + 0.8949i |
| w29 | −0.9382 + 0.8637i | −0.9274 + 0.8949i |
| w30 | −1.3162 − 0.3270i | 0.9274 − 0.8949i |
| w31 | −0.9382 − 0.8637i | −0.9274 − 0.8949i |

E4) 64-QAM U2D NUC

| w | code rate | | | | |
|---|---|---|---|---|---|
| | 132/180 | 140/180 or 144/180 | 7/9 or 4/5 | 150/180 | 5/6 |
| w0 | 0.2878 + 1.4388i | 0.9856 − 0.4661i | 0.2775 + 1.4188i | 1.0161 − 0.4912i | 1.0161 − 0.4912i |
| w1 | −0.2878 + 1.4388i | −0.9856 − 0.4661i | 0.1138 + 0.3999i | 1.0161 + 0.4912i | 0.1287 − 0.4061i |
| w2 | 0.2878 − 1.4388i | 0.9856 + 0.4661i | 0.2177 + 1.0243i | −1.0161 − 0.4912i | 1.0441 − 0.1581i |
| w3 | −0.2878 − 1.4388i | −0.9856 + 0.4661i | 0.1487 + 0.7260i | −1.0161 + 0.4912i | 0.1321 − 0.1317i |
| w4 | 0.1177 + 0.4119i | 1.1580 − 0.8178i | 0.7921 + 1.2096i | 0.1287 − 0.4061i | 0.6966 − 0.4427i |
| w5 | −0.1177 + 0.4119i | −1.1580 − 0.8178i | 0.2891 + 0.3910i | 0.1287 + 0.4061i | 0.4025 − 0.4142i |
| w6 | 0.1177 − 0.4119i | 1.1580 + 0.8178i | 0.6056 + 0.8481i | −0.1287 − 0.4061i | 0.6995 − 0.1411i |
| w7 | −0.1177 − 0.4119i | −1.1580 + 0.8178i | 0.4397 + 0.5853i | −0.1287 + 0.4061i | 0.4035 − 0.1354i |
| w8 | 1.4656 + 0.2931i | 0.1264 − 0.4145i | 0.2775 − 1.4188i | 1.1306 − 0.8649i | 1.0161 + 0.4912i |
| w9 | −1.4656 + 0.2931i | −0.1264 − 0.4145i | 0.1138 − 0.3999i | 1.1306 + 0.8649i | 0.1287 + 0.4061i |
| w10 | 1.4656 − 0.2931i | 0.1264 + 0.4145i | 0.2177 − 1.0243i | −1.1306 − 0.8649i | 1.0441 + 0.1581i |
| w11 | −1.4656 − 0.2931i | −0.1264 + 0.4145i | 0.1487 − 0.7260i | −1.1306 + 0.8649i | 0.1321 + 0.1317i |
| w12 | 0.1678 + 0.1166i | 0.1416 − 0.7330i | 0.7921 − 1.2096i | 0.1385 − 0.7199i | 0.6966 + 0.4427i |
| w13 | −0.1678 + 0.1166i | −0.1416 − 0.7330i | 0.2891 − 0.3910i | 0.1385 + 0.7199i | 0.4025 + 0.4142i |
| w14 | 0.1678 − 0.1166i | 0.1416 + 0.7330i | 0.6056 − 0.8481i | −0.1385 − 0.7199i | 0.6995 + 0.1411i |
| w15 | −0.1678 − 0.1166i | −0.1416 + 0.7330i | 0.4397 − 0.5853i | −0.1385 + 0.7199i | 0.4035 + 0.1354i |
| w16 | 0.2219 + 1.0386i | 1.0366 − 0.1534i | 1.4730 + 0.3019i | 1.0441 − 0.1581i | 1.1306 − 0.8649i |
| w17 | −0.2219 + 1.0386i | −1.0366 − 0.1534i | 0.1419 + 0.1122i | 1.0441 + 0.1581i | 0.1385 − 0.7199i |
| w18 | 0.2219 − 1.0386i | 1.0366 + 0.1534i | 1.0895 + 0.2172i | −1.0441 − 0.1581i | 1.4516 − 0.2578i |
| w19 | −0.2219 − 1.0386i | −1.0366 + 0.1534i | 0.7863 + 0.1337i | −1.0441 + 0.1581i | 0.1689 − 1.0567i |
| w20 | 0.1559 + 0.7442i | 1.4529 − 0.2702i | 1.2124 + 0.8333i | 0.1321 − 0.1317i | 0.6874 − 0.8123i |
| w21 | −0.1559 + 0.7442i | −1.4529 − 0.2702i | 0.3733 + 0.1498i | 0.1321 + 0.1317i | 0.4017 − 0.7107i |
| w22 | 0.1559 − 0.7442i | 1.4529 + 0.2702i | 0.8988 + 0.5768i | −0.1321 − 0.1317i | 0.6750 − 1.2072i |
| w23 | −0.1559 − 0.7442i | −1.4529 + 0.2702i | 0.6394 + 0.3211i | −0.1321 + 0.1317i | 0.2558 − 1.4247i |
| w24 | 1.0649 + 0.2069i | 0.1272 − 0.1353i | 1.4730 − 0.3019i | 1.4516 − 0.2578i | 1.1306 + 0.8649i |
| w25 | −1.0649 + 0.2069i | −0.1272 − 0.1353i | 0.1419 − 0.1122i | 1.4516 + 0.2578i | 0.1385 + 0.7199i |
| w26 | 1.0649 − 0.2069i | 0.1272 + 0.1353i | 1.0895 − 0.2172i | −1.4516 − 0.2578i | 1.4516 + 0.2578i |
| w27 | −1.0649 − 0.2069i | −0.1272 + 0.1353i | 0.7863 − 0.1337i | −1.4516 + 0.2578i | 0.1689 + 1.0567i |
| w28 | 0.7408 + 0.1355i | 0.1686 − 1.0718i | 1.2124 − 0.8333i | 0.1689 − 1.0567i | 0.6874 + 0.8123i |
| w29 | −0.7408 + 0.1355i | −0.1686 − 1.0718i | 0.3733 − 0.1498i | 0.1689 + 1.0567i | 0.4017 + 0.7107i |
| w30 | 0.7408 − 0.1355i | 0.1686 + 1.0718i | 0.8988 − 0.5768i | −0.1689 − 1.0567i | 0.6750 + 1.2072i |
| w31 | −0.7408 − 0.1355i | −0.1686 + 1.0718i | 0.6394 − 0.3211i | −0.1689 + 1.0567i | 0.2558 + 1.4247i |
| w32 | 0.8133 + 1.2150i | 0.6825 − 0.4329i | −0.2775 + 1.4188i | 0.6966 − 0.4427i | −1.0161 − 0.4912i |
| w33 | −0.8133 + 1.2150i | −0.6825 − 0.4329i | −0.1138 + 0.3999i | 0.6966 + 0.4427i | −0.1287 − 0.4061i |
| w34 | 0.8133 − 1.2150i | 0.6825 + 0.4329i | −0.2177 + 1.0243i | −0.6966 − 0.4427i | −1.0441 − 0.1581i |
| w35 | −0.8133 − 1.2150i | −0.6825 + 0.4329i | −0.1487 + 0.7260i | −0.6966 + 0.4427i | −0.1321 − 0.1317i |
| w36 | 0.2516 + 0.3998i | 0.6913 − 0.8132i | −0.7921 + 1.2096i | 0.4025 − 0.4142i | −0.6966 − 0.4427i |
| w37 | −0.2516 + 0.3998i | −0.6913 − 0.8132i | −0.2891 + 0.3910i | 0.4025 + 0.4142i | −0.4025 − 0.4142i |
| w38 | 0.2516 − 0.3998i | 0.6913 + 0.8132i | −0.6056 + 0.8481i | −0.4025 − 0.4142i | −0.6995 − 0.1411i |
| w39 | −0.2516 − 0.3998i | −0.6913 + 0.8132i | −0.4397 + 0.5853i | −0.4025 + 0.4142i | −0.4035 − 0.1354i |
| w40 | 1.2278 + 0.8230i | 0.3948 − 0.4179i | −0.2775 − 1.4188i | 0.6874 − 0.8123i | −1.0161 + 0.4912i |
| w41 | −1.2278 + 0.8230i | −0.3948 − 0.4179i | −0.1138 − 0.3999i | 0.6874 + 0.8123i | −0.1287 + 0.4061i |
| w42 | 1.2278 − 0.8230i | 0.3948 + 0.4179i | −0.2177 − 1.0243i | −0.6874 − 0.8123i | −1.0441 + 0.1581i |
| w43 | −1.2278 − 0.8230i | −0.3948 + 0.4179i | −0.1487 − 0.7260i | −0.6874 + 0.8123i | −0.1321 + 0.1317i |
| w44 | 0.3325 + 0.1582i | 0.4018 − 0.7177i | −0.7921 − 1.2096i | 0.4017 − 0.7107i | −0.6966 + 0.4427i |
| w45 | −0.3325 + 0.1582i | −0.4018 − 0.7177i | −0.2891 − 0.3910i | 0.4017 + 0.7107i | −0.4025 + 0.4142i |
| w46 | 0.3325 − 0.1582i | 0.4018 + 0.7177i | −0.6056 − 0.8481i | −0.4017 − 0.7107i | −0.6995 + 0.1411i |
| w47 | −0.3325 − 0.1582i | −0.4018 + 0.7177i | −0.4397 − 0.5853i | −0.4017 + 0.7107i | −0.4035 + 0.1354i |
| w48 | 0.6145 + 0.8494i | 0.6796 − 0.1340i | −1.4730 + 0.3019i | 0.6995 − 0.1411i | −1.1306 − 0.8649i |
| w49 | −0.6145 + 0.8494i | −0.6796 − 0.1340i | −0.1419 + 0.1122i | 0.6995 + 0.1411i | −0.1385 − 0.7199i |
| w50 | 0.6145 − 0.8494i | 0.6796 + 0.1340i | −1.0895 + 0.2172i | −0.6995 − 0.1411i | −1.4516 − 0.2578i |
| w51 | −0.6145 − 0.8494i | −0.6796 + 0.1340i | −0.7863 + 0.1337i | −0.6995 + 0.1411i | −0.1689 − 1.0567i |
| w52 | 0.4328 + 0.5954i | 0.7097 − 1.2125i | −1.2124 + 0.8333i | 0.4035 − 0.1354i | −0.6874 − 0.8123i |
| w53 | −0.4328 + 0.5954i | −0.7097 − 1.2125i | −0.3733 + 0.1498i | 0.4035 + 0.1354i | −0.4017 − 0.7107i |
| w54 | 0.4328 − 0.5954i | 0.7097 + 1.2125i | −0.8988 + 0.5768i | −0.4035 − 0.1354i | −0.6750 − 1.2072i |
| w55 | −0.4328 − 0.5954i | −0.7097 + 1.2125i | −0.6394 + 0.3211i | −0.4035 + 0.1354i | −0.2558 − 1.4247i |
| w56 | 0.8971 + 0.5677i | 0.3877 − 0.1359i | −1.4730 − 0.3019i | 0.6750 − 1.2072i | −1.1306 + 0.8649i |
| w57 | −0.8971 + 0.5677i | −0.3877 − 0.1359i | −0.1419 − 0.1122i | 0.6750 + 1.2072i | −0.1385 + 0.7199i |

-continued

| | | | | | |
|---|---|---|---|---|---|
| w58 | 0.8971 − 0.5677i | 0.3877 + 0.1359i | −1.0895 − 0.2172i | −0.6750 − 1.2072i | −1.4516 + 0.2578i |
| w59 | −0.8971 − 0.5677i | −0.3877 + 0.1359i | −0.7863 − 0.1337i | −0.6750 + 1.2072i | −0.1689 + 1.0567i |
| w60 | 0.6200 + 0.3227i | 0.2732 − 1.4375i | −1.2124 − 0.8333i | 0.2558 − 1.4247i | −0.6874 + 0.8123i |
| w61 | −0.6200 + 0.3227i | −0.2732 − 1.4375i | −0.3733 − 0.1498i | 0.2558 − 1.4247i | −0.4017 + 0.7107i |
| w62 | 0.6200 − 0.3227i | 0.2732 + 1.4375i | −0.8988 − 0.5768i | −0.2558 − 1.4247i | −0.6750 + 1.2072i |
| w63 | −0.6200 − 0.3227i | −0.2732 + 1.4375i | −0.6394 − 0.3211i | −0.2558 − 1.4247i | −0.2558 + 1.4247i |

| | code rate | |
|---|---|---|
| w | 21/30 | 23/30 |
| w0 | 0.2994 + 1.4627i | 0.2878 + 1.4388i |
| w1 | 0.8421 + 1.2279i | 0.8133 + 1.2150i |
| w2 | 1.4625 + 0.2831i | 0.2878 − 1.4388i |
| w3 | 1.2488 + 0.8125i | 0.8133 − 1.2150i |
| w4 | 0.1299 + 0.4106i | −0.2878 + 1.4388i |
| w5 | 0.1823 + 0.3822i | −0.8133 + 1.2150i |
| w6 | 0.2512 + 0.1287i | −0.2878 − 1.4388i |
| w7 | 0.2598 + 0.1538i | −0.8133 − 1.2150i |
| w8 | −0.2994 + 1.4627i | 0.2219 + 1.0386i |
| w9 | −0.8421 + 1.2279i | 0.6145 + 0.8494i |
| w10 | −1.4625 + 0.2831i | 0.2219 − 1.0386i |
| w11 | −1.2488 + 0.8125i | 0.6145 − 0.8494i |
| w12 | −0.1299 + 0.4106i | −0.2219 + 1.0386i |
| w13 | −0.1823 + 0.3822i | −0.6145 + 0.8494i |
| w14 | −0.2512 + 0.1287i | −0.2219 − 1.0386i |
| w15 | −0.2598 + 0.1538i | −0.6145 − 0.8494i |
| w16 | 0.2994 − 1.4627i | 0.1177 + 0.4119i |
| w17 | 0.8421 − 1.2279i | 0.2516 + 0.3998i |
| w18 | 1.4625 − 0.2831i | 0.1177 − 0.4119i |
| w19 | 1.2488 − 0.8125i | 0.2516 − 0.3998i |
| w20 | 0.1299 − 0.4106i | −0.1177 + 0.4119i |
| w21 | 0.1823 − 0.3822i | −0.2516 + 0.3998i |
| w22 | 0.2512 − 0.1287i | −0.1177 − 0.4119i |
| w23 | 0.2598 − 0.1538i | −0.2516 − 0.3998i |
| w24 | −0.2994 − 1.4627i | 0.1559 + 0.7442i |
| w25 | −0.8421 − 1.2279i | 0.4328 + 0.5954i |
| w26 | −1.4625 − 0.2831i | 0.1559 − 0.7442i |
| w27 | −1.2488 − 0.8125i | 0.4328 − 0.5954i |
| w28 | −0.1299 − 0.4106i | −0.1559 + 0.7442i |
| w29 | −0.1823 − 0.3822i | −0.4328 + 0.5954i |
| w30 | −0.2512 − 0.1287i | −0.1559 − 0.7442i |
| w31 | −0.2598 − 0.1538i | −0.4328 − 0.5954i |
| w32 | 0.2187 + 1.0467i | 1.4656 + 0.2931i |
| w33 | 0.6179 + 0.8606i | 1.2278 + 0.8230i |
| w34 | 1.0296 + 0.1935i | 1.4656 − 0.2931i |
| w35 | 0.8910 + 0.5575i | 1.2278 − 0.8230i |
| w36 | 0.1749 + 0.7440i | −1.4656 + 0.2931i |
| w37 | 0.4168 + 0.6160i | −1.2278 + 0.8230i |
| w38 | 0.6759 + 0.1488i | −1.4656 − 0.2931i |
| w39 | 0.6111 + 0.3494i | −1.2278 − 0.8230i |
| w40 | −0.2187 + 1.0467i | 1.0649 + 0.2069i |
| w41 | −0.6179 + 0.8606i | 0.8971 + 0.5677i |
| w42 | −1.0296 + 0.1935i | 1.0649 − 0.2069i |
| w43 | −0.8910 + 0.5575i | 0.8971 − 0.5677i |
| w44 | −0.1749 + 0.7440i | −1.0649 + 0.2069i |
| w45 | −0.4168 + 0.6160i | −0.8971 + 0.5677i |
| w46 | −0.6759 + 0.1488i | −1.0649 − 0.2069i |
| w47 | −0.6111 + 0.3494i | −0.8971 − 0.5677i |
| w48 | 0.2187 − 1.0467i | 0.1678 + 0.1166i |
| w49 | 0.6179 − 0.8606i | 0.3325 + 0.1582i |
| w50 | 1.0296 − 0.1935i | 0.1678 − 0.1166i |
| w51 | 0.8910 − 0.5575i | 0.3325 − 0.1582i |
| w52 | 0.1749 − 0.7440i | −0.1678 + 0.1166i |
| w53 | 0.4168 − 0.6160i | −0.3325 + 0.1582i |
| w54 | 0.6759 − 0.1488i | −0.1678 − 0.1166i |
| w55 | 0.6111 − 0.3494i | −0.3325 − 0.1582i |
| w56 | −0.2187 − 1.0467i | 0.7408 + 0.1355i |
| w57 | −0.6179 − 0.8606i | 0.6200 + 0.3227i |
| w58 | −1.0296 − 01935i | 0.7408 − 0.1355i |
| w59 | −0.8910 − 0.5575i | 0.6200 − 0.3227i |
| w60 | −0.1749 − 0.7440i | −0.7408 + 0.1355i |
| w61 | −0.4168 − 0.6160i | −0.6200 + 0.3227i |
| w62 | −0.6759 − 0.1488i | −0.7408 − 0.1355i |
| w63 | −0.6111 − 0.3494i | −0.6200 − 0.3227i |

E5) 128-QAM 2D NUC

| w | code rate 135/180 | 140/180 |
|---|---|---|
| w0 | 1.1438 + 0.4323i | 1.1021 + 0.4008i |
| w1 | 0.9006 + 0.4173i | 0.8557 + 0.4063i |
| w2 | 0.5578 + 0.4216i | 0.5499 + 0.4932i |
| w3 | 0.6797 + 0.3850i | 0.6209 + 0.3666i |
| w4 | 1.1837 + 0.8001i | 0.1083 + 0.5383i |
| w5 | 0.9008 + 0.6972i | 0.1008 + 0.3768i |
| w6 | 0.5354 + 0.6351i | 0.3317 + 0.5081i |
| w7 | 0.6549 + 0.7546i | 0.3204 + 0.3654i |
| w8 | 1.1598 + 0.1437i | 1.0961 + 0.1322i |
| w9 | 0.9102 + 0.1324i | 0.8513 + 0.1298i |
| w10 | 0.5755 + 0.1222i | 0.5343 + 0.0862i |
| w11 | 0.6787 + 0.1401i | 0.6260 + 0.1694i |
| w12 | 1.4855 + 0.1793i | 0.1082 + 0.0775i |
| w13 | 1.5681 + 0.5636i | 0.1037 + 0.2076i |
| w14 | 0.9727 + 1.2109i | 0.3325 + 0.0910i |
| w15 | 0.7102 + 1.0171i | 0.3189 + 0.2137i |
| w16 | 0.1045 + 0.4578i | 1.1805 + 0.7084i |
| w17 | 0.1067 + 0.3515i | 0.8930 + 0.6876i |
| w18 | 0.3411 + 0.4189i | 0.5622 + 0.6728i |
| w19 | 0.3088 + 0.3456i | 0.6763 + 0.8371i |
| w20 | 0.1121 + 0.6749i | 0.1170 + 0.7305i |
| w21 | 0.1179 + 0.8955i | 0.1259 + 0.9453i |
| w22 | 0.3342 + 0.6628i | 0.3446 + 0.71295 |
| w23 | 0.3585 + 0.8699i | 0.3857 + 0.9233i |
| w24 | 0.1075 + 0.0988i | 1.4038 + 0.1588i |
| w25 | 0.1136 + 0.1402i | 1.5205 + 0.4861i |
| w26 | 0.3700 + 0.1151i | 1.0743 + 1.1040i |
| w27 | 0.3294 + 0.1448i | 0.7513 + 1.0912i |
| w28 | 0.1933 + 1.4991i | 0.1870 + 1.5043i |
| w29 | 0.1440 + 1.1691i | 0.1454 + 1.1973i |
| w30 | 0.5835 + 1.4250i | 0.5736 + 1.4545i |
| w31 | 0.4344 + 1.1140i | 0.4433 + 1.1606i |
| w32 | −1.1438 + 0.4323i | 1.1021 − 0.4008i |
| w33 | −0.9006 + 0.4173i | 0.8567 − 0.4063i |
| w34 | −0.5578 + 0.4216i | 0.5499 − 0.4932i |
| w35 | −0.6797 + 0.3850i | 0.6209 − 0.3666i |
| w36 | −1.1837 + 0.8001i | 0.1083 − 0.5383i |
| w37 | −0.9008 + 0.6972i | 0.1008 − 0.3768i |
| w38 | −0.5354 + 0.6351i | 0.3317 − 0.5081i |
| w39 | −0.6549 + 0.7546i | 0.3204 − 0.3654i |
| w40 | −1.1598 + 0.1437i | 1.0961 − 0.1322i |
| w41 | −0.9102 + 0.1324i | 0.8513 − 0.1298i |
| w42 | −0.5755 + 0.1222i | 0.5343 − 0.0862i |
| w43 | −0.6787 + 0.1401i | 0.6260 − 0.1694i |
| w44 | −1.4855 + 0.1793i | 0.1082 − 0.0775i |
| w45 | −1.5681 + 0.5636i | 0.1037 − 0.2076i |
| w46 | −0.9727 + 1.2109i | 0.3325 − 0.0910i |
| w47 | −0.7102 + 1.0171i | 0.3189 − 0.2137i |
| w48 | −0.1045 + 0.4578i | 1.1805 − 0.7084i |
| w49 | −0.1067 + 0.3515i | 0.8930 − 0.6876i |
| w50 | −0.3411 + 0.4189i | 0.5622 − 0.6728i |
| w51 | −0.3088 + 0.3456i | 0.6763 − 0.8371i |
| w52 | −0.1121 + 0.6749i | 0.1170 − 0.7305i |
| w53 | −0.1179 + 0.8955i | 0.1259 − 0.9453i |
| w54 | −0.3342 + 0.6628i | 0.3446 − 0.7129i |
| w55 | −0.3585 + 0.8699i | 0.3857 − 0.9233i |
| w56 | −0.1075 + 0.0988i | 1.4038 − 0.1588i |
| w57 | −0.1136 + 0.1402i | 1.5205 − 0.4861i |
| w58 | −0.3700 + 0.1151i | 1.0743 − 1.1040i |
| w59 | −0.3294 + 0.1448i | 0.7513 − 1.0912i |
| w60 | −0.1933 + 1.4991i | 0.1870 − 1.5043i |
| w61 | −0.1440 + 1.1691i | 0.1454 − 1.1973i |
| w62 | −0.5835 + 1.4250i | 0.5736 − 1.4545i |
| w63 | −0.4344 + 1.1140i | 0.4433 − 1.1606i |
| w64 | 1.1438 − 0.4323i | −1.1021 + 0.4008i |
| w65 | 0.9006 − 0.4173i | −0.8567 + 0.4063i |
| w66 | 0.5578 − 0.4216i | −0.5499 + 0.4932i |
| w67 | 0.6797 − 0.3850i | −0.6209 + 0.3666i |
| w68 | 1.1837 − 0.8001i | −0.1083 + 0.5383i |
| w69 | 0.9008 − 0.6972i | −0.1008 + 0.3768i |
| w70 | 0.5354 − 0.6351i | −0.3317 + 0.5081i |
| w71 | 0.6549 − 0.7546i | −0.3204 + 0.3654i |
| w72 | 1.1598 − 0.1437i | −1.0961 + 0.1322i |
| w73 | 0.9102 − 0.1324i | −0.8513 + 0.1298i |
| w74 | 0.5755 − 0.1222i | −0.5343 + 0.0862i |
| w75 | 0.6787 − 0.1401i | −0.6260 + 0.1694i |
| w76 | 1.4855 − 0.1793i | −0.1082 + 0.0775i |
| w77 | 1.5681 − 0.5636i | −0.1037 + 0.2076i |
| w78 | 0.9727 − 1.2109i | −0.3325 + 0.0910i |
| w79 | 0.7102 − 1.0171i | −0.3189 + 0.2137i |
| w80 | 0.1045 − 0.4578i | −1.1805 + 0.7084i |
| w81 | 0.1067 − 0.3515i | −0.8930 + 0.6876i |
| w82 | 0.3411 − 0.4189i | −0.5622 + 0.6728i |
| w83 | 0.3088 − 0.3456i | −0.6763 + 0.8371i |
| w84 | 0.1121 − 0.6749i | −0.1170 + 0.7305i |
| w85 | 0.1179 − 0.8955i | −0.1259 + 0.9453i |
| w86 | 0.3342 − 0.6628i | −0.3446 + 0.7129i |
| w87 | 0.3585 − 0.8699i | −0.3857 + 0.9233i |
| w88 | 0.1075 − 0.0988i | −1.4038 + 0.1588i |
| w89 | 0.1136 − 0.1402i | −1.5205 + 0.4861i |
| w90 | 0.3700 − 0.1151i | −1.0743 + 1.1040i |
| w91 | 0.3294 − 0.1448i | −0.7513 + 1.0912i |
| w92 | 0.1933 − 1.4991i | −0.1870 + 1.5043i |
| w93 | 0.1440 − 1.1691i | −0.1454 + 1.1973i |
| w94 | 0.5835 − 1.4250i | −0.5736 + 1.4545i |
| w95 | 0.4344 − 1.1140i | −0.4433 + 1.1606i |
| w96 | −1.1438 − 0.4323i | −1.1021 − 0.4008i |
| w97 | −0.9006 − 0.4173i | −0.8567 − 0.4063i |
| w98 | −0.5578 − 0.4216i | −0.5499 − 0.4932i |
| w99 | −0.6797 − 0.3850i | −0.6209 − 0.3666i |
| w100 | −1.1837 − 0.8001i | −0.1083 − 0.5383i |
| w101 | −0.9008 − 0.6972i | −0.1008 − 0.3768i |
| w102 | −0.5354 − 0.6351i | −0.3317 − 0.5081i |
| w103 | −0.6549 − 0.7546i | −0.3204 − 0.3654i |
| w104 | −1.1598 − 0.1437i | −1.0961 − 0.1322i |
| w105 | −0.9102 − 0.1324i | −0.8513 − 0.1298i |
| w106 | −0.5755 − 0.1222i | −0.5343 − 0.0862i |
| w107 | −0.6787 − 0.1401i | −0.6260 − 0.1694i |
| w108 | −1.4855 − 0.1793i | −0.1082 − 0.0775i |
| w109 | −1.5681 − 0.5636i | −0.1037 − 0.2076i |
| w110 | −0.9727 − 1.2109i | −0.3325 − 0.0910i |
| w111 | −0.7102 − 1.0171i | −0.3189 − 0.2137i |
| w112 | −0.1045 − 0.4578i | −1.1805 − 0.7084i |
| w113 | −0.1067 − 0.3515i | −0.8930 − 0.6876i |
| w114 | −0.3411 − 0.4189i | −0.5622 − 0.6728i |
| w115 | −0.3088 − 0.3456i | −0.6763 − 0.8371i |
| w116 | −0.1121 − 0.6749i | −0.1170 − 0.7305i |
| w117 | −0.1179 − 0.8955i | −0.1259 − 0.9453i |
| w118 | −0.3342 − 0.6628i | −0.3446 − 0.7129i |
| w119 | −0.3585 − 0.8699i | −0.3857 − 0.9233i |
| w120 | −0.1075 − 0.0988i | −1.4038 − 0.1588i |
| w121 | −0.1136 − 0.1402i | −1.5205 − 0.4861i |
| w122 | −0.3700 − 0.1151i | −1.0743 − 1.1040i |
| w123 | −0.3294 − 0.1448i | −0.7513 − 1.0912i |
| w124 | −0.1933 − 1.4991i | −0.1870 − 1.5043i |
| w125 | −0.1440 − 1.1691i | −0.1454 − 1.1973i |
| w126 | −0.5835 − 1.4250i | −0.5736 − 1.4545i |
| w127 | −0.4344 − 1.1140i | −0.4433 − 1.1606i |

E6) 256-QAM 2D NUC

| w | code rate 20/30 | 22/30 |
|---|---|---|
| w0 | 1.6350 + 0.1593i | 1.5977 + 0.1526i |
| w1 | 1.5776 + 0.4735i | 1.3187 + 0.1269i |
| w2 | 0.9430 + 0.1100i | −1.5977 + 0.1526i |
| w3 | 0.9069 + 0.2829i | −1.3187 + 0.1269i |
| w4 | 0.3237 + 0.0849i | 0.2574 + 0.0733i |
| w5 | 0.3228 + 0.0867i | 0.4496 + 0.0807i |
| w6 | 0.7502 + 0.1138i | −0.2574 + 0.0733i |
| w7 | 0.7325 + 0.2088i | −0.4496 + 0.0807i |
| w8 | 0.1658 + 1.6747i | 1.5977 − 0.1526i |
| w9 | 0.4907 + 1.6084i | 1.3187 − 0.1269i |
| w10 | 0.1088 + 0.9530i | −1.5977 − 0.1526i |
| w11 | 0.2464 + 0.9270i | −1.3187 − 0.1269i |

|  | code rate | |
|---|---|---|
| w | 20/30 | 22/30 |
| w12 | 0.0872 + 0.1390i | 0.2574 − 0.0733i |
| w13 | 0.0871 + 0.1392i | 0.4496 − 0.0807i |
| w14 | 0.1091 + 0.7656i | −0.2574 − 0.0733i |
| w15 | 0.1699 + 0.7537i | −0.4496 − 0.0807i |
| w16 | −1.6350 + 0.1593i | 0.9269 + 0.0943i |
| w17 | −1.5776 + 0.4735i | 1.1024 + 0.1086i |
| w18 | −0.9430 + 0.1100i | −0.9269 + 0.0943i |
| w19 | −0.9069 + 0.2829i | −1.1024 + 0.1086i |
| w20 | −0.3237 + 0.0849i | 0.7663 + 0.0867i |
| w21 | −0.3228 + 0.0867i | 0.6115 + 0.0871i |
| w22 | −0.7502 + 0.1138i | −0.7663 + 0.0867i |
| w23 | −0.7325 + 0.2088i | −0.6115 + 0.0871i |
| w24 | −0.1658 + 1.6747i | 0.9269 − 0.0943i |
| w25 | −0.4907 + 1.6084i | 1.1024 − 0.1086i |
| w26 | −0.1088 + 0.9530i | −0.9269 − 0.0943i |
| w27 | −0.2464 + 0.9270i | −1.1024 − 0.1086i |
| w28 | −0.0872 + 0.1390i | 0.7663 − 0.0867i |
| w29 | −0.0871 + 0.1392i | 0.6115 − 0.0871i |
| w30 | −0.1091 + 0.7656i | −0.7663 − 0.0867i |
| w31 | −0.1699 + 0.7537i | −0.6115 − 0.0871i |
| w32 | 1.3225 + 0.1320i | 1.2701 + 1.0139i |
| w33 | 1.2742 + 0.3922i | 1.0525 + 0.8406i |
| w34 | 1.0854 + 0.1139i | −1.2701 + 1.0139i |
| w35 | 1.0441 + 0.3296i | −1.0525 + 0.8406i |
| w36 | 0.4582 + 0.1123i | 0.2487 + 0.1978i |
| w37 | 0.4545 + 0.1251i | 0.3523 + 0.2915i |
| w38 | 0.6473 + 0.1138i | −0.2487 + 0.1978i |
| w39 | 0.6339 + 0.1702i | −0.3523 + 0.2915i |
| w40 | 0.1322 + 1.3631i | 1.2701 − 1.0139i |
| w41 | 0.3929 + 1.3102i | 1.0525 − 0.8406i |
| w42 | 0.1124 + 1.1327i | −1.2701 − 1.0139i |
| w43 | 0.3160 + 1.0913i | −1.0525 − 0.8406i |
| w44 | 0.0928 + 0.3970i | 0.2487 − 0.1978i |
| w45 | 0.0937 + 0.3973i | 0.3523 − 0.2915i |
| w46 | 0.1054 + 0.5979i | −0.2487 − 0.1978i |
| w47 | 0.1230 + 0.5949i | −0.3523 − 0.2915i |
| w48 | −1.3225 + 0.1320i | 0.7359 + 0.6043i |
| w49 | −1.2742 + 0.3922i | 0.8807 + 0.7105i |
| w50 | −1.0854 + 0.1139i | −0.7359 + 0.6043i |
| w51 | −1.0441 + 0.3296i | −0.8807 + 0.7105i |
| w52 | −0.4582 + 0.1123i | 0.6017 + 0.5019i |
| w53 | −0.4545 + 0.1251i | 0.4747 + 0.3996i |
| w54 | −0.6473 + 0.1138i | −0.6017 + 0.5019i |
| w55 | −0.6339 + 0.1702i | −0.4747 + 0.3996i |
| w56 | −0.1322 + 1.3631i | 0.7359 − 0.6043i |
| w57 | −0.3929 + 1.3102i | 0.8807 − 0.7105i |
| w58 | −0.1124 + 1.1327i | −0.7359 − 0.6043i |
| w59 | −0.3160 + 1.0913i | −0.8807 − 0.7105i |
| w60 | −0.0928 + 0.3970i | 0.6017 − 0.5019i |
| w61 | −0.0937 + 0.3973i | 0.4747 − 0.3996i |
| w62 | −0.1054 + 0.5979i | −0.6017 − 0.5019i |
| w63 | −0.1230 + 0.5949i | −0.4747 − 0.3996i |
| w64 | 1.6350 − 0.1593i | 1.5441 + 0.4545i |
| w65 | 1.5776 − 0.4735i | 1.2750 + 0.3775i |
| w66 | 0.9430 − 0.1100i | −1.5441 + 0.4545i |
| w67 | 0.9069 − 0.2829i | −1.2750 + 0.3775i |
| w68 | 0.3237 − 0.0849i | 0.2586 + 0.0752i |
| w69 | 0.3228 − 0.0867i | 0.4435 + 0.1065i |
| w70 | 0.7502 − 0.1138i | −0.2586 + 0.0752i |
| w71 | 0.7325 − 0.2088i | −0.4435 + 0.1065i |
| w72 | 0.1658 − 1.6747i | 1.5441 − 0.4545i |
| w73 | 0.4907 − 1.6084i | 1.2750 − 0.3775i |
| w74 | 0.1088 − 0.9530i | −1.5441 − 0.4545i |
| w75 | 0.2464 − 0.9270i | −1.2750 − 0.3775i |
| w76 | 0.0872 − 0.1390i | 0.2586 − 0.0752i |
| w77 | 0.0871 − 0.1392i | 0.4435 − 0.1065i |
| w78 | 0.1091 − 0.7656i | −0.2586 − 0.0752i |
| w79 | 0.1699 − 0.7537i | −0.4435 − 0.1065i |
| w80 | −1.6350 − 0.1593i | 0.8925 + 0.2771i |
| w81 | −1.5776 − 0.4735i | 1.0649 + 0.3219i |
| w82 | −0.9430 − 0.1100i | −0.8925 + 0.2771i |
| w83 | −0.9069 − 0.2829i | −1.0649 + 0.3219i |
| w84 | −0.3237 − 0.0849i | 0.7362 + 0.2279i |
| w85 | −0.3228 − 0.0867i | 0.5936 + 0.1699i |
| w86 | −0.7502 − 0.1138i | −0.7362 + 0.2279i |
| w87 | −0.7325 − 0.2088i | −0.5936 + 0.1699i |
| w88 | −0.1658 − 1.6747i | 0.8925 − 0.2771i |
| w89 | −0.4907 − 1.6084i | 1.0649 − 0.3219i |
| w90 | −0.1088 − 0.9530i | −0.8925 − 0.2771i |
| w91 | −0.2464 − 0.9270i | −1.0649 − 0.3219i |
| w92 | −0.0872 − 0.1390i | 0.7362 − 0.2279i |
| w93 | −0.0871 − 0.1392i | 0.5936 − 0.1699i |
| w94 | −0.1091 − 0.7656i | −0.7362 − 0.2279i |
| w95 | −0.1699 − 0.7537i | −0.5936 − 0.1699i |
| w96 | 1.3225 − 0.1320i | 1.4352 + 0.7452i |
| w97 | 1.2742 − 0.3922i | 1.1866 + 0.6182i |
| w98 | 1.0854 − 0.1139i | −1.4352 + 0.7452i |
| w99 | 1.0441 − 0.3296i | −1.1866 + 0.6182i |
| w100 | 0.4582 − 0.1123i | 0.2523 + 0.1944i |
| w101 | 0.4545 − 0.1251i | 0.3695 + 0.2695i |
| w102 | 0.6473 − 0.1138i | −0.2523 + 0.1944i |
| w103 | 0.6339 − 0.1702i | −0.3695 + 0.2695i |
| w104 | 0.1322 − 1.3631i | 1.4352 − 0.7452i |
| w105 | 0.3929 − 1.3102i | 1.1866 − 0.6182i |
| w106 | 0.1124 − 1.1327i | −1.4352 − 0.7452i |
| w107 | 0.3160 − 1.0913i | −1.1866 − 0.6182i |
| w108 | 0.0928 − 0.3970i | 0.2523 − 0.1944i |
| w109 | 0.0937 − 0.3973i | 0.3695 − 0.2695i |
| w110 | 0.1054 − 0.5979i | −0.2523 − 0.1944i |
| w111 | 0.1230 − 0.5949i | −0.3695 − 0.2695i |
| w112 | −1.3225 − 0.1320i | 0.8273 + 0.4493i |
| w113 | −1.2742 − 0.3922i | 0.9911 + 0.5243i |
| w114 | −1.0854 − 0.1139i | −0.8273 + 0.4493i |
| w115 | −1.0441 − 0.3296i | −0.9911 + 0.5243i |
| w116 | −0.4582 − 0.1123i | 0.6708 + 0.3859i |
| w117 | −0.4545 − 0.1251i | 0.5197 + 0.3331i |
| w118 | −0.6473 − 0.1138i | −0.6708 + 0.3859i |
| w119 | −0.6339 − 0.1702i | −0.5197 + 0.3331i |
| w120 | −0.1322 − 1.3631i | 0.8273 − 0.4493i |
| w121 | −0.3929 − 1.3102i | 0.9911 − 0.5243i |
| w122 | −0.1124 − 1.1327i | −0.8273 − 0.4493i |
| w123 | −0.3160 − 1.0913i | −0.9911 − 0.5243i |
| w124 | −0.0928 − 0.3970i | 0.6708 − 0.3859i |
| w125 | −0.0937 − 0.3973i | 0.5197 − 0.3331i |
| w126 | −0.1054 − 0.5979i | −0.6708 − 0.3859i |
| w127 | −0.1230 − 0.5949i | −0.5197 − 0.3331i |
| w128 | 1.2901 + 1.0495i | 0.1646 + 1.6329i |
| w129 | 1.4625 + 0.7740i | 0.1379 + 1.3595i |
| w130 | 0.7273 + 0.6160i | −0.1646 + 1.6329i |
| w131 | 0.8177 + 0.4841i | −0.1379 + 1.3595i |
| w132 | 0.2844 + 0.1296i | 0.0736 + 0.0898i |
| w133 | 0.2853 + 0.1309i | 0.0742 + 0.5054i |
| w134 | 0.5902 + 0.4857i | −0.0736 − 0.0898i |
| w135 | 0.6355 + 0.4185i | −0.0742 + 0.5054i |
| w136 | 1.0646 + 1.2876i | 0.1646 − 1.6329i |
| w137 | 0.7949 + 1.4772i | 0.1379 − 1.3595i |
| w138 | 0.5707 + 0.7662i | −0.1646 − 1.6329i |
| w139 | 0.4490 + 0.8461i | −0.1379 − 1.3595i |
| w140 | 0.1053 + 0.1494i | 0.0736 − 0.0898i |
| w141 | 0.1052 + 0.1495i | 0.0742 − 0.5054i |
| w142 | 0.4294 + 0.6363i | −0.0736 − 0.0898i |
| w143 | 0.3744 + 0.6744i | −0.0742 − 0.5054i |
| w144 | −1.2901 + 1.0495i | 0.0992 + 0.9847i |
| w145 | −1.4625 + 0.7740i | 0.1170 + 1.1517i |
| w146 | −0.7273 + 0.6160i | −0.0992 + 0.9847i |
| w147 | −0.8177 + 0.4841i | −0.1170 + 1.1517i |
| w148 | −0.2844 + 0.1296i | 0.0894 + 0.8287i |
| w149 | −0.2853 + 0.1309i | 0.0889 + 0.6739i |
| w150 | −0.5902 + 0.4857i | −0.0894 + 0.8287i |
| w151 | −0.6355 + 0.4185i | −0.0889 + 0.6739i |
| w152 | −1.0646 + 1.2876i | 0.0992 − 0.9847i |
| w153 | −0.7949 + 1.4772i | 0.1170 − 1.1517i |
| w154 | −0.5707 + 0.7662i | −0.0992 − 0.9847i |
| w155 | −0.4490 + 0.8461i | −0.1170 − 1.1517i |
| w156 | −0.1053 + 0.1494i | 0.0894 − 0.8287i |
| w157 | −0.1052 + 0.1495i | 0.0889 − 0.6739i |
| w158 | −0.4294 + 0.6363i | −0.0894 − 0.8287i |
| w159 | −0.3744 + 0.6744i | −0.0889 − 0.6739i |
| w160 | 1.0382 + 0.8623i | 1.0516 + 1.2481i |
| w161 | 1.1794 + 0.6376i | 0.8742 + 1.0355i |

-continued

| | code rate | |
|---|---|---|
| w | 20/30 | 22/30 |
| w162 | 0.8504 + 0.7217i | −1.0516 + 1.2481i |
| w163 | 0.9638 + 0.5407i | −0.8742 + 1.0355i |
| w164 | 0.3734 + 0.2560i | 0.0970 + 0.2450i |
| w165 | 0.3799 + 0.2517i | 0.1959 + 0.4045i |
| w166 | 0.4968 + 0.3947i | −0.0970 + 0.2450i |
| w167 | 0.5231 + 0.3644i | −0.1959 + 0.4045i |
| w168 | 0.8555 + 1.0542i | 1.0516 − 1.2481i |
| w169 | 0.6363 + 1.2064i | 0.8742 − 1.0355i |
| w170 | 0.6961 + 0.8850i | −1.0516 + 1.2481i |
| w171 | 0.5229 + 1.0037i | −0.8742 + 1.0355i |
| w172 | 0.1938 + 0.3621i | 0.0970 − 0.2450i |
| w173 | 0.1909 + 0.3627i | 0.1959 − 0.4045i |
| w174 | 0.3224 + 0.5236i | −0.0970 − 0.2450i |
| w175 | 0.3016 + 0.5347i | −0.1959 − 0.4045i |
| w176 | −1.0382 + 0.8623i | 0.6150 + 0.7441i |
| w177 | −1.1794 + 0.6376i | 0.7345 + 0.8743i |
| w178 | −0.8504 + 0.7217i | −0.6150 + 0.7441i |
| w179 | −0.9638 + 0.5407i | −0.7345 + 0.8743i |
| w180 | −0.3734 + 0.2560i | 0.4932 + 0.6301i |
| w181 | −0.3799 + 0.2517i | 0.3620 + 0.5258i |
| w182 | −0.4968 + 0.3947i | −0.4932 + 0.6301i |
| w183 | −0.5231 + 0.3644i | −0.3620 + 0.5258i |
| w184 | −0.8555 + 1.0542i | 0.6150 − 0.7441i |
| w185 | −0.6363 + 1.2064i | 0.7345 − 0.8743i |
| w186 | −0.6961 + 0.8850i | −0.6150 − 0.7441i |
| w187 | −0.5229 + 1.0037i | −0.7345 − 0.8743i |
| w188 | −0.1938 + 0.3621i | 0.4932 − 0.6301i |
| w189 | −0.1909 + 0.3627i | 0.3620 − 0.5258i |
| w190 | −0.3224 + 0.5236i | −0.4932 − 0.6301i |
| w191 | −0.3016 + 0.5347i | −0.3620 − 0.5258i |
| w192 | 1.2901 − 1.0495i | 0.4866 + 1.5660i |
| w193 | 1.4625 − 0.7740i | 0.4068 + 1.3027i |
| w194 | 0.7273 − 0.6160i | −0.4866 + 1.5660i |
| w195 | 0.8177 − 0.4841i | −0.4068 + 1.3027i |
| w196 | 0.2844 − 0.1296i | 0.0732 + 0.0899i |
| w197 | 0.2853 − 0.1309i | 0.0877 + 0.4997i |
| w198 | 0.5902 − 0.4857i | −0.0732 + 0.0899i |
| w199 | 0.6355 − 0.4185i | −0.0877 + 0.4997i |
| w200 | 1.0646 − 1.2876i | 0.4866 − 1.5660i |
| w201 | 0.7949 − 1.4772i | 0.4068 − 1.3027i |
| w202 | 0.5707 − 0.7662i | −0.4866 − 1.5660i |
| w203 | 0.4490 − 0.8461i | −0.4068 − 1.3027i |
| w204 | 0.1053 − 0.1494i | 0.0732 − 0.0899i |
| w205 | 0.1052 − 0.1495i | 0.0877 − 0.4997i |
| w206 | 0.4294 − 0.6363i | −0.0732 − 0.0899i |
| w207 | 0.3744 − 0.6744i | −0.0877 − 0.4997i |
| w208 | −1.2901 − 1.0495i | 0.2927 + 0.9409i |
| w209 | −1.4625 − 0.7740i | 0.3446 + 1.1023i |
| w210 | −0.7273 − 0.6160i | −0.2927 + 0.9409i |
| w211 | −0.8177 − 0.4841i | −0.3446 + 1.1023i |
| w212 | −0.2844 − 0.1296i | 0.2350 + 0.7945i |
| w213 | −0.2853 − 0.1309i | 0.1670 + 0.6529i |
| w214 | −0.5902 − 0.4857i | −0.2350 + 0.7945i |
| w215 | −0.6355 − 0.4185i | −0.1670 + 0.6529i |
| w216 | −1.0646 − 1.2876i | 0.2927 − 0.9409i |
| w217 | −0.7949 − 1.4772i | 0.3446 − 1.1023i |
| w218 | −0.5707 − 0.7662i | −0.2927 − 0.9409i |
| w219 | −0.4490 − 0.8461i | −0.3446 − 1.1023i |
| w220 | −0.1053 − 0.1494i | 0.2350 − 0.7945i |
| w221 | −0.1052 − 0.1495i | 0.1670 − 0.6529i |
| w222 | −0.4294 − 0.6363i | −0.2350 − 0.7345i |
| w223 | −0.3744 − 0.6744i | −0.1670 − 0.6529i |
| w224 | 1.0382 − 0.8623i | 0.7867 + 1.4356i |
| w225 | 1.1794 − 0.6376i | 0.6561 + 1.1927i |
| w226 | 0.8504 − 0.7217i | −0.7867 + 1.4356i |
| w227 | 0.9638 − 0.5407i | −0.6561 + 1.1927i |
| w228 | 0.3734 − 0.2560i | 0.0947 + 0.2451i |
| w229 | 0.3799 − 0.2517i | 0.1865 + 0.4121i |
| w230 | 0.4968 − 0.3947i | −0.0947 + 0.2451i |
| w231 | 0.5231 − 0.3644i | −0.1865 + 0.4121i |
| w232 | 0.8555 − 1.0542i | 0.7867 − 1.4356i |
| w233 | 0.6363 − 1.2064i | 0.6561 − 1.1927i |
| w234 | 0.6961 − 0.8850i | −0.7867 − 1.4356i |
| w235 | 0.5229 − 1.0037i | −0.6561 − 1.1927i |
| w236 | 0.1938 − 0.3621i | 0.0947 − 0.2451i |
| w237 | 0.1909 − 0.3627i | 0.1865 − 0.4121i |
| w238 | 0.3224 − 0.5235i | −0.0947 − 0.2451i |
| w239 | 0.3016 − 0.5347i | −0.1865 − 0.4121i |
| w240 | −1.0382 − 0.8623i | 0.4677 + 0.8579i |
| w241 | −1.1794 − 0.6376i | 0.5537 + 1.0081i |
| w242 | −0.8504 − 0.7217i | −0.4677 + 0.8579i |
| w243 | −0.9638 − 0.5407i | −0.5537 + 1.0081i |
| w244 | −0.3734 − 0.2560i | 0.3893 + 0.7143i |
| w245 | −0.3799 − 0.2517i | 0.3110 + 0.5686i |
| w246 | −0.4968 − 0.3947i | −0.3893 + 0.7143i |
| w247 | −0.5231 − 0.3644i | −0.3110 + 0.5686i |
| w248 | −0.8555 − 1.0542i | 0.4677 − 0.8579i |
| w249 | −0.6363 − 1.2064i | 0.5537 − 1.0081i |
| w250 | −0.6961 − 0.8850i | −0.4677 − 0.8579i |
| w251 | −0.5229 − 1.0037i | −0.5537 − 1.0081i |
| w252 | −0.1938 − 0.3621i | 0.3893 − 0.7143i |
| w253 | −0.1909 − 0.3627i | 0.3110 − 0.5686i |
| w254 | −0.3224 − 0.5236i | −0.3893 − 0.7143i |
| w255 | −0.3016 − 0.5347i | −0.3110 − 0.5686i |

Constellations from group E can preferably be used for coding and modulation in accordance with the DVB-S2 standard or its extension DVB-Sx. Special care has been taken such that the constellations can be used together with LDPC codes and bit interleaver settings from the DVB-Sx baseline system.

Whenever constellations are proposed for LDPC codes not yet part of the DVB-Sx baseline, like e.g. codes of code rate "x/30", the constellations are optimized such that they allow for a DVB-S2-like bit interleaver. This means, the same interleaving rule can be applied as used in DVB-S2 for 64 k LDPC codes (except for code rate 3/5 from S2): the block interleaver is filled column-wise, and read out row-wise, each row read from left to right. In terms of bit interleaver patterns, as discussed in the DVB-Sx baseline, this would correspond to bit interleaver patterns [0,1,2, ... M−1], in which M is the number of bits/QAM symbol, e.g., M=3 for a constellation with 8 points, M=4, for 16 points, and so on.

It should be noted that the code rates for which the constellations of groups A, B, C, D and E have been optimized are the code rates of the LDPC encoder. However, the total code rates may actually be smaller due to the use of an additional BCH encoder.

Figure 13:
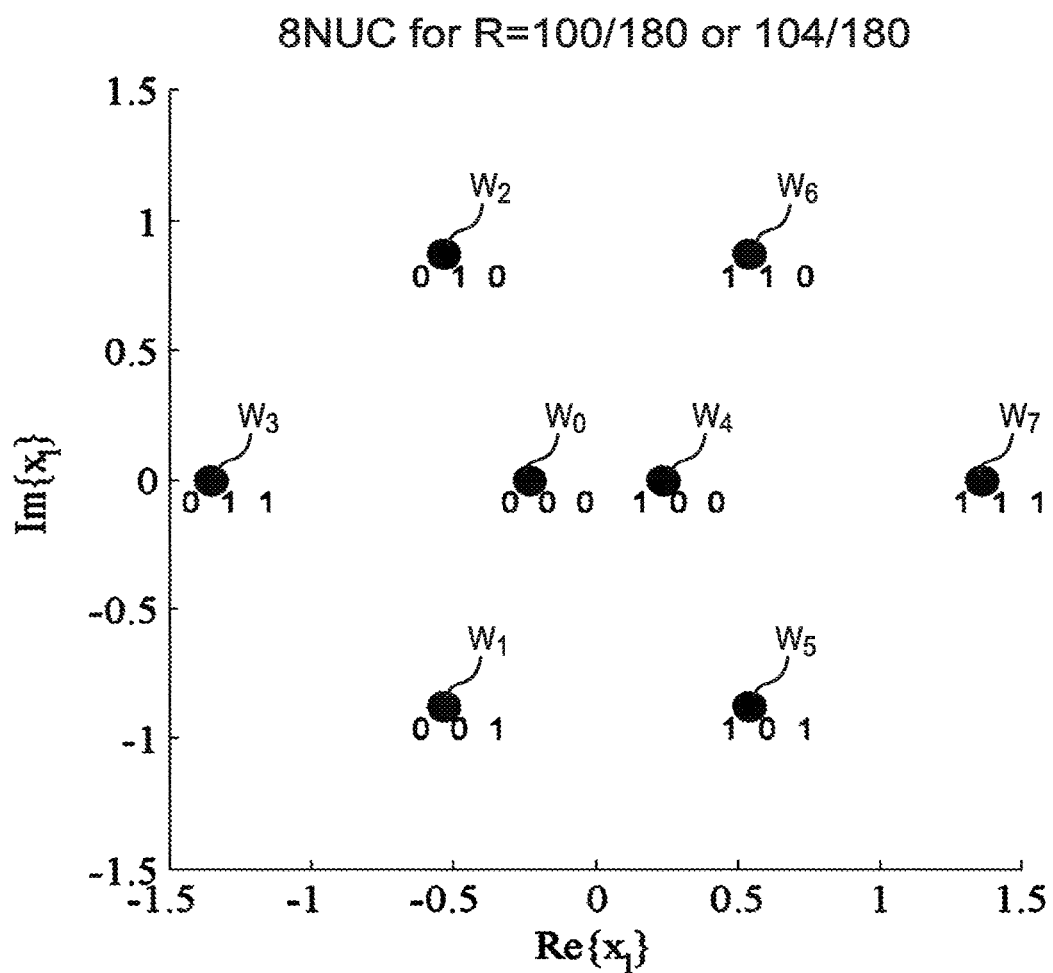
FIG. 13 shows a diagram for a constellation from group E.

FIG. 13 shows a diagram for a constellation from group E for 8-NUC for code rate R=100/180 or 104/180. The corresponding constellation point vector is w=(−0.2330, −0.5414−0.8712i, −0.5414+0.8712i, −1.3570, 0.2330, 0.5414−0.8712i, 0.5414+0.8712i, 1.3570).

FIG. 14 shows a diagram illustrating the shaping gain for the above explained non-uniform 8-ary QAM constellations which may be used for a standard relating to digital video broadcasting via satellite. The curves were obtained applying the following conditions: AWGN channel, bit error rate and frame error rates (BER, FER) after 50 LDPC iterations, and outer BCH decoding; 64 k LDPC codes were used (code length=64800). The diagram includes curves showing the BER (solid lines) and the FER (dashed lines). Further, there are curves for conventional constellations as used in known standards using baseline constellations and curves for the above explained NUCs for 8-ary QAMs. It can be seen that the same BER or FER can be achieved at lower SNR. The best result is obtained for code rate 13/18: the proposed constellation works at 0.55 dB lower SNR than the conventional constellation. The curves are almost shifted in parallel to the left with the optimized constellation by this offset. For code rate 25/36 a 0.5 dB gain is achieved.

FIGS. 15AA-15CB show examples of LDPC codes for which the disclosed constellations have been optimized. The code length and the code rate are given for the respective codes.

It should be noted that the present disclosure is to be understood such that the disclosure includes embodiments of coding and modulation apparatus for which less groups of tables of constellations are available for selection and/or use of a constellation, for which smaller tables of constellations are available for selection and/or use of a constellation, for which tables including constellations for less code rates and/or less values of M are available for selection and/or use of a constellation, and/or for which only selected (single) constellations from among all the disclosed constellations are available for selection and/or use of a constellation.

Obviously, numerous modifications and variations of the present disclosure are possible in light of the above teachings. It is therefore to be understood that within the scope of the appended claims, the disclosure may be practiced otherwise than as specifically described herein (e.g., if the NUC position vectors are rounded to a smaller number of digits).

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

A circuit that may be used for implementing one or more of the elements of the claimed apparatus is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

Any reference signs in the claims should not be construed as limiting the scope.

The invention claimed is:
1. A receiving apparatus comprising:
a receiver configured to receive at least one transmission stream including symbols representative of constellation values; and
at least one processor configured to
demodulate the symbols into 10-bit cell words and to decode the 10-bit cell words into output data words representing Forward Error Correction (FEC) data words, wherein each 10-bit cell word is associated with a point of a Non-Uniform Constellation (NUC),
wherein each point (Zq) of the NUC has an in-phase component Re(Zq) and a quadrature component Im(Zq),
wherein the in-phase component Re(Zq) corresponds to a constellation position of a first vector (u0, u1, u2, u3, u4, u5, u6, u7, u8, u9, u10, u11, u12, u13, u14, u15),
wherein the quadrature component Im(Zq) corresponds to a constellation position of the first vector (u0, u1, u2, u3, u4, u5, u6, u7, u8, u9, u10, u11, u12, u13, u14, u15), and
wherein the first vector (u0, u1, u2, u3, u4, u5, u6, u7, u8, u9, u10, u11, u12, u13, u14, u15) corresponds to a vector prior to power normalization defined as (1, 1.0003, 1.0149, 1.0158, 2.6848, 2.6903, 2.882, 2.8747, 4.7815, 4.7619, 5.5779, 5.6434, 7.3854, 7.8797, 9.635, 11.7874).

2. The receiving apparatus according to claim 1, wherein a code rate of the FEC is 6/15.

3. The receiving apparatus according to claim 1, wherein the at least one transmission stream is a digital video broadcasting stream.

4. The receiving apparatus according to claim 3, wherein the at least one transmission stream is a terrestrial digital video broadcasting stream.

5. The receiving apparatus according to claim 1, wherein the NUC is a Quadrature Amplitude Modulation (QAM) constellation.

6. The receiving apparatus according to claim 1, wherein bits of the 10-bit cell words are labeled on the NUC in accordance with a binary reflected Gray mapping.

7. The receiving apparatus according to claim 1, wherein respective in-phase and quadrature positions each provide 5 bits of the 10-bit cell words, and
wherein the in-phase and quadrature positions together provide ten bits ($y_{0,q}$, $y_{1,q}$; . . . $y_{9,q}$) of the 10-bit cell words, a first set of five bits being provided by the in phase position and a second set of five bits being provided by the quadrature position.

8. The receiving apparatus according to claim 7, wherein the first set of five bits includes bits ($y_{0q}$, $y_{2q}$, $y_{4q}$, $y_{6q}$, $y_{8q}$) and the second set of five bits includes ($y_{1q}$, $y_{3q}$, $y_{5q}$, $y_{7q}$, $y_{9q}$).

9. The receiving apparatus according to claim 7, wherein at least one of the first set of five bits and the second set of five bits is provided in accordance with bit labels of the following table:
position −u15 providing bit label 1 0 0 0 0
position −u14 providing bit label 1 0 0 0 1
position −u13 providing bit label 1 0 0 1 1
position −u12 providing bit label 1 0 0 1 0
position −u11 providing bit label 1 0 1 1 0
position −u10 providing bit label 1 0 1 1 1
position −u9 providing bit label 1 0 1 0 1
position −u8 providing bit label 1 0 1 0 0
position −u7 providing bit label 1 1 1 0 0
position −u6 providing bit label 1 1 1 0 1
position −u5 providing bit label 1 1 1 1 1
position −u4 providing bit label 1 1 1 1 0
position −u3 providing bit label 1 1 0 1 0
position −u2 providing bit label 1 1 0 1 1
position −u1 providing bit label 1 1 0 0 1
position −u0 providing bit label 1 1 0 0 0
position u0 providing bit label 0 1 0 0 0
position u1 providing bit label 0 1 0 0 1
position u2 providing bit label 0 1 0 1 1
position u3 providing bit label 0 1 0 1 0 position u4 providing bit label 0 1 1 1 0
position u5 providing bit label 0 1 1 1 1
position u6 providing bit label 0 1 1 0 1
position u7 providing bit label 0 1 1 0 0
position u8 providing bit label 0 0 1 0 0
position u9 providing bit label 0 0 1 0 1
position u10 providing bit label 0 0 1 1 1
position u11 providing bit label 0 0 1 1 0
position u12 providing bit label 0 0 0 1 0
position u13 providing bit label 0 0 0 1 1
position u14 providing bit label 0 0 0 0 1
position u15 providing bit label 0 0 0 0 0.

10. The receiving apparatus according to claim 1, wherein the at least one processor is configured to select the NUC in accordance with a code rate of the FEC.

11. The receiving apparatus according to claim 1,
wherein the in-phase component Re(Zq) corresponds to a rounded normalized constellation position of the first vector (u0, u1, u2, u3, u4, u5, u6, u7, u8, u9, u10, u11, u12, u13, u14, u15), and
wherein the quadrature component Im(Zq) corresponds to a rounded normalized constellation position of the first vector (u0, u1, u2, u3, u4, u5, u6, u7, u8, u9, u10, u11, u12, u13, u14, u15).

12. A receiving method comprising:
receiving at least one transmission stream including symbols representative of constellation values;
demodulating the symbols into 10-bit cell words and to decode the 10-bit cell words into output data words representing Forward Error Correction (FEC) data words, wherein each 10-bit cell word is associated with a point of a Non-Uniform Constellation (NUC),
wherein each point (Zq) of the NUC has an in-phase component Re(Zq) and a quadrature component Im(Zq),
wherein the in-phase component Re(Zq) corresponds to a constellation position of a first vector (u0, u1, u2, u3, u4, u5, u6, u7, u8, u9, u10, u11, u12, u13, u14, u15),
wherein the quadrature component Im(Zq) corresponds to a constellation position of the first vector (u0, u1, u2, u3, u4, u5, u6, u7, u8, u9, u10, u11, u12, u13, u14, u15), and
wherein the first vector (u0, u1, u2, u3, u4, u5, u6, u7, u8, u9, u10 u11, u12, u13, u14, u15) corresponds to a vector prior to power normalization defined as (1, 1.0003, 1.0149, 1.0158, 2.6848, 2.6903, 2.882, 2.8747, 4.7815, 4.7619, 5.5779, 5.6434, 7.3854, 7.8797, 9.635, 11.7874).

13. The receiving method according to claim 12, wherein a code rate of the forward error correction is 6/15.

14. The receiving method according to claim 12, wherein the at least one transmission stream is a digital video broadcasting stream.

15. The receiving method according to claim 12, wherein bits of the 10-bit cell words are labeled on the NUC in accordance with a binary reflected Gray mapping.

16. The receiving method according to claim 12, wherein respective in-phase and quadrature positions each provide 5 bits of the 10-bit cell words, and
wherein the in-phase and quadrature positions together provide ten bits ($y_{0,q}$, $y_{1,q}$; ... $y_{9,q}$) of the 10-bit cell words, a first set of five bits being provided by the in phase position and a second set of five bits being provided by the quadrature position.

17. The receiving method according to claim 16, wherein at least one of the first set of five bits and the second set of five bits is provided in accordance with bit labels of the following table:
position −u15 providing bit label 1 0 0 0 0
position −u14 providing bit label 1 0 0 0 1
position −u13 providing bit label 1 0 0 1 1
position −u12 providing bit label 1 0 0 1 0
position −u11 providing bit label 1 0 1 1 0
position −u10 providing bit label 1 0 1 1 1
position −u9 providing bit label 1 0 1 0 1
position −u8 providing bit label 1 0 1 0 0
position −u7 providing bit label 1 1 1 0 0
position −u6 providing bit label 1 1 1 0 1
position −u5 providing bit label 1 1 1 1 1
position −u4 providing bit label 1 1 1 1 0
position −u3 providing bit label 1 1 0 1 0
position −u2 providing bit label 1 1 0 1 1
position −u1 providing bit label 1 1 0 0 1
position −u0 providing bit label 1 1 0 0 0
position u0 providing bit label 0 1 0 0 0
position u1 providing bit label 0 1 0 0 1
position u2 providing bit label 0 1 0 1 1
position u3 providing bit label 0 1 0 1 0
position u4 providing bit label 0 1 1 1 0
position u5 providing bit label 0 1 1 1 1
position u6 providing bit label 0 1 1 0 1
position u7 providing bit label 0 1 1 0 0
position u8 providing bit label 0 0 1 0 0
position u9 providing bit label 0 0 1 0 1
position u10 providing bit label 0 0 1 1 1
position u11 providing bit label 0 0 1 1 0
position u12 providing bit label 0 0 0 1 0
position u13 providing bit label 0 0 0 1 1
position u14 providing bit label 0 0 0 0 1
position u15 providing bit label 0 0 0 0 0.

18. The receiving method according to claim 12,
wherein the in-phase component Re(Zq) corresponds to a rounded normalized constellation position of a first vector (u0, u1, u2, u3, u4, u5, u6, u7, u8, u9, u10, u11, u12, u13, u14, u15), and
wherein the quadrature component Im(Zq) corresponds to a rounded normalized constellation position of the first vector (u0, u1, u2, u3, u4, u5, u6, u7, u8, u9, u10, u11, u12, u13, u14, u15).

19. A non-transitory computer-readable storage medium storing computer-readable instructions, which, when executed by a receiving apparatus, cause the receiving apparatus to perform a receiving method comprising:
receiving at least one transmission stream including symbols representative of constellation values;
demodulating the symbols into 10-bit cell words and to decode the 10-bit cell words into output data words representing Forward Error Correction (FEC) data words, wherein each 10-bit cell word is associated with a point of a Non-Uniform Constellation (NUC),
wherein each point (Zq) of the NUC has an in-phase component Re(Zq) and a quadrature component Im(Zq),
wherein the in-phase component Re(Zq) corresponds to a constellation position of a first vector (u0, u1, u2, u3, u4, u5, u6, u7, u8, u9, u10, u11, u12, u13, u14, u15),
wherein the quadrature component Im(Zq) corresponds to a constellation position of the first vector (u0, u1, u2, u3, u4, u5, u6, u7, u8, u9, u10, u11, u12, u13, u14, u15), and wherein the first vector (u0, u1, u2, u3, u4, u5, u6, u7, u8, u9, u10, u11, u12, u13, u14, u15) corresponds to a vector prior to power normalization defined as (1, 1.0003, 1.0149, 1.0158, 2.6848, 2.6903, 2.882, 2.8747, 4.7815, 4.7619, 5.5779, 5.6434, 7.3854, 7.8797, 9.635, 11.7874).

* * * * *